US011831398B2

(12) United States Patent
Yang et al.

(10) Patent No.: US 11,831,398 B2
(45) Date of Patent: Nov. 28, 2023

(54) DATA TRANSMISSION METHOD, APPARATUS, AND SYSTEM

(71) Applicant: HUAWEI TECHNOLOGIES CO., LTD., Shenzhen (CN)

(72) Inventors: Yang Yang, Chengdu (CN); Xianfu Lei, Chengdu (CN); Xiaohu Tang, Chengdu (CN); Zhi Gu, Chengdu (CN); Min Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 126 days.

(21) Appl. No.: 17/462,275

(22) Filed: Aug. 31, 2021

(65) Prior Publication Data

US 2021/0399822 A1 Dec. 23, 2021

Related U.S. Application Data

(63) Continuation of application No. PCT/CN2020/077338, filed on Feb. 29, 2020.

(30) Foreign Application Priority Data

Mar. 1, 2019 (CN) ........................ 201910157682.X

(51) Int. Cl.
*H04J 13/00* (2011.01)
*H04J 13/10* (2011.01)
(Continued)

(52) U.S. Cl.
CPC ...... *H04J 13/0014* (2013.01); *H04J 13/0062* (2013.01); *H04J 13/10* (2013.01); *H04L 25/0202* (2013.01); *H04W 80/02* (2013.01)

(58) Field of Classification Search
CPC ............. H04L 27/2613; H04L 27/2603; H04L 27/02602; H04W 84/02
See application file for complete search history.

(56) References Cited

U.S. PATENT DOCUMENTS

2017/0033844 A1 2/2017 Kasher et al.

FOREIGN PATENT DOCUMENTS

CN 103138870 A 6/2013
CN 104104462 A 10/2014
(Continued)

OTHER PUBLICATIONS

IEEE P802.11ax /D3.0, Part 11: Wireless LAN Medium Access Control (MAC) and Physical Layer (PHY) Specifications Amendment 6: Enhancements for High Efficiency WLAN, Jun. 2018. total 682 pages.

(Continued)

*Primary Examiner* — Kevin Kim
(74) *Attorney, Agent, or Firm* — RIMON P.C.

(57) ABSTRACT

This application relates to the field of communications technologies, and discloses a data transmission method. The method includes: generating a PPDU; and transmitting the PPDU to at least one receive end. The PPDU includes a channel estimation field CEF, and the CEF includes a plurality of sub-sequences. For each of the plurality of sub-sequences, a part or all of elements in the sub-sequence are basic elements, and the basic elements are arranged into a Golay sequence or a ZC sequence in the sub-sequence. This application is used for data transmission.

18 Claims, 29 Drawing Sheets

(51) Int. Cl.
*H04L 25/02* (2006.01)
*H04W 80/02* (2009.01)

(56) References Cited

FOREIGN PATENT DOCUMENTS

| | | | | |
|---|---|---|---|---|
| CN | 107113078 | A | | 8/2017 |
| CN | 107592142 | A | | 1/2018 |
| WO | 2018006660 | A1 | | 1/2018 |
| WO | 2018034701 | A1 | | 2/2018 |
| WO | 2019014264 | A1 | | 1/2019 |
| WO | WO-2019014264 | A1 | * | 1/2019 |

OTHER PUBLICATIONS

IEEE P802.11ay /D2.0, Jul. 2018, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—, Amendment 7: Enhanced throughput for operation in license-exempt bands above 45 GHz, 673 pages.

* cited by examiner

<table>
<tr><td>3.8062</td><td>3.8062</td><td>3.9888</td><td>3.9888</td></tr>
<tr><td colspan="2">6.0670</td><td colspan="2">5.8707</td></tr>
<tr><td>3.8062</td><td colspan="2">4.7996</td><td>3.9888</td></tr>
<tr><td colspan="4">3.9348</td></tr>
</table>

| | | | | |
|---|---|---|---|---|
| 4.5285 | 4.5692 | 4.3714 | 4.0575 | 5.2977 |
| 5.4822 | | | | |

| | | | | | | | |
|---|---|---|---|---|---|---|---|
| PAPR of first G4: | 4.5285 | 3.5993 | 4.5285 | 4.8396 | 5.2070 | 3.9057 | 5.2070 |
| | 5.3267 | | | | | | |
| PAPR of second G4: | 4.8392 | 4.2371 | 4.8392 | 4.9401 | 4.5285 | 4.8486 | 4.5285 |
| | 5.3574 | | | | | | |

| | | | |
|---|---|---|---|
| 2.9879 | 2.9984 | 2.9879 | 2.9984 |
| 3.0103 | | 3.0084 | |
| 2.9879 | 3.0103 | | 2.9984 |
| 3.0024 | | | |

| | | | | |
|---|---|---|---|---|
| 3.0054 | 3.0092 | 3.0045 | 3.0092 | 3.0082 |
| 4.5600 | | | | |

<table>
<tr><td>3.0084</td><td>3.0048</td><td>3.0084</td><td>3.0048</td><td>2.9743</td><td>3.0085</td><td>2.9743</td><td>3.0085</td></tr>
<tr><td colspan="8">4.4933</td></tr>
</table>

FIG. 27

<table>
<tr><td>3.8895</td><td>3.8895</td><td>3.8895</td><td>3.8895</td></tr>
<tr><td colspan="2">6.5215</td><td colspan="2">6.6901</td></tr>
<tr><td>3.8895</td><td colspan="2">6.3278</td><td>3.8895</td></tr>
<tr><td colspan="3">6.9821</td><td>3.8895</td></tr>
<tr><td>3.8895</td><td colspan="3">6.9613</td></tr>
<tr><td colspan="4">6.2308</td></tr>
</table>

FIG. 28

PAPR of first G2:

<table>
<tr><td>5.8125</td><td>6.6660</td><td>5.8125</td></tr>
<tr><td colspan="3">7.1116</td></tr>
</table>

PAPR of second G2:

<table>
<tr><td>5.8125</td><td>7.2254</td><td>5.8125</td></tr>
<tr><td colspan="3">7.2140</td></tr>
</table>

FIG. 29

PAPR of first G3:

<table>
<tr><td>5.8125</td><td>6.8492</td><td>5.8125</td><td>6.8492</td><td>5.8125</td></tr>
<tr><td colspan="5">7.3271</td></tr>
</table>

PAPR of second G3:

<table>
<tr><td>5.8125</td><td>4.0340</td><td>5.8125</td><td>4.0340</td><td>5.8125</td></tr>
<tr><td colspan="5">7.4247</td></tr>
</table>

FIG. 30

PAPR of first G4:

| | | | | | | |
|---|---|---|---|---|---|---|
| 5.8125 | 3.9994 | 5.8125 | 7.4457 | 5.8125 | 3.9994 | 5.8125 |
| 7.6660 | | | | | | |

PAPR of second G4:

| | | | | | | |
|---|---|---|---|---|---|---|
| 5.8125 | 3.9777 | 5.8125 | 6.7831 | 5.8125 | 3.9777 | 5.8125 |
| 7.5948 | | | | | | |

FIG. 31

<table>
<tr><td>3.95</td><td>3.95</td><td>3.95</td><td>3.95</td></tr>
<tr><td colspan="2">6.935</td><td colspan="2">6.272</td></tr>
<tr><td>3.95</td><td colspan="2">6.513</td><td>3.95</td></tr>
<tr><td colspan="3">7.521</td><td>3.95</td></tr>
<tr><td>3.95</td><td colspan="3">7.345</td></tr>
<tr><td colspan="4">6.212</td></tr>
</table>

FIG. 32

PAPR of first G2:

| | | |
|---|---|---|
| 6.1800 | 6.7010 | 6.1800 |
| 7.8770 | | |

PAPR of second G2:

| | | |
|---|---|---|
| 6.1800 | 5.5250 | 6.1800 |
| 7.7880 | | |

FIG. 33

PAPR of first G3:

| | | | | |
|---|---|---|---|---|
| 6.1800 | 5.3070 | 6.1800 | 5.3070 | 6.3220 |
| 7.3630 | | | | |

PAPR of second G3:

| | | | | |
|---|---|---|---|---|
| 6.1800 | 4.3190 | 6.1800 | 4.3190 | 6.3220 |
| 7.6080 | | | | |

FIG. 34

<table>
<tr><td rowspan="2">PAPR of first G4:</td><td>6.1800</td><td>5.7970</td><td>6.1800</td><td>7.4780</td><td>6.1800</td><td>5.7970</td><td>6.1800</td></tr>
<tr><td colspan="7">7.8740</td></tr>
<tr><td rowspan="2">PAPR of second G4:</td><td>6.1800</td><td>5.5210</td><td>6.1800</td><td>6.6020</td><td>6.1800</td><td>5.5210</td><td>6.1800</td></tr>
<tr><td colspan="7">7.5670</td></tr>
</table>

FIG. 35

<table>
<tr><td>3.0070</td><td>3.0070</td><td>3.0070</td><td>3.0070</td></tr>
<tr><td colspan="2">5.9987</td><td colspan="2">5.8655</td></tr>
<tr><td>3.0070</td><td colspan="2">5.9342</td><td>3.0070</td></tr>
<tr><td colspan="3">7.0494</td><td>3.0070</td></tr>
<tr><td>3.0070</td><td colspan="3">7.2869</td></tr>
<tr><td colspan="4">5.8038</td></tr>
</table>

FIG. 36

<table>
<tr><td rowspan="2">PAPR of first G2:</td><td>5.4618</td><td>6.6290</td><td>5.4618</td></tr>
<tr><td colspan="3">7.3972</td></tr>
<tr><td rowspan="2">PAPR of second G2:</td><td>5.4618</td><td>6.5785</td><td>5.4618</td></tr>
<tr><td colspan="3">7.5583</td></tr>
</table>

FIG. 37

<table>
<tr><td rowspan="2">PAPR of first G3:</td><td>5.4618</td><td>5.5249</td><td>5.4618</td><td>5.5246</td><td>5.8993</td></tr>
<tr><td colspan="5">7.0548</td></tr>
<tr><td rowspan="2">PAPR of second G3:</td><td>5.4618</td><td>5.0767</td><td>5.4618</td><td>5.0767</td><td>5.8993</td></tr>
<tr><td colspan="5">7.5349</td></tr>
</table>

FIG. 38

PAPR of first G4:

<table>
<tr><td>5.4618</td><td>4.5406</td><td>5.4618</td><td>6.8008</td><td>5.4618</td><td>4.5406</td><td>5.4618</td></tr>
<tr><td colspan="7">7.3026</td></tr>
</table>

PAPR of second G4:

<table>
<tr><td>5.4618</td><td>4.6854</td><td>5.4618</td><td>7.5966</td><td>5.4618</td><td>4.6854</td><td>5.4618</td></tr>
<tr><td colspan="7">7.6042</td></tr>
</table>

FIG. 39

<table>
<tr><td>3.8067</td><td>3.8067</td><td>3.7774</td><td>3.8208</td></tr>
<tr><td colspan="2">3.9479</td><td colspan="2">5.0140</td></tr>
<tr><td>3.8067</td><td colspan="2">5.4465</td><td>3.8208</td></tr>
<tr><td colspan="3">5.4006</td><td>3.8208</td></tr>
<tr><td>3.8067</td><td colspan="3">5.2544</td></tr>
<tr><td colspan="4">5.5129</td></tr>
</table>

FIG. 40

<table>
<tr><td>4.2900</td><td>5.4220</td><td>5.7912</td></tr>
<tr><td colspan="3">5.8088</td></tr>
</table>

FIG. 41

<table>
<tr><td>4.2418</td><td>3.8301</td><td>5.5487</td><td>3.8301</td><td>5.9522</td></tr>
<tr><td colspan="5">5.9231</td></tr>
</table>

FIG. 42

<table>
<tr><td>4.3662</td><td>3.8270</td><td>4.3662</td><td>5.3306</td><td>4.3662</td><td>3.8270</td><td>4.3662</td></tr>
<tr><td colspan="7">5.8142</td></tr>
</table>

FIG. 43

<table>
<tr><td>3.7569</td><td>3.7523</td><td>3.7523</td><td>3.7569</td></tr>
<tr><td colspan="2">4.3619</td><td colspan="2">4.6888</td></tr>
<tr><td>3.7569</td><td colspan="2">4.7249</td><td>3.7569</td></tr>
<tr><td colspan="3">5.3875</td><td>3.7569</td></tr>
<tr><td>3.7569</td><td colspan="3">5.4132</td></tr>
<tr><td colspan="4">4.5333</td></tr>
</table>

FIG. 44

<table>
<tr><td>4.6733</td><td>4.9748</td><td>4.5463</td></tr>
<tr><td colspan="3">5.2158</td></tr>
</table>

FIG. 45

<table>
<tr><td>4.7956</td><td>3.7523</td><td>4.8505</td><td>3.8265</td><td>4.5596</td></tr>
<tr><td colspan="5">5.2668</td></tr>
</table>

FIG. 46

<table>
<tr><td>4.7025</td><td>3.8208</td><td>4.7025</td><td>5.4069</td><td>4.7025</td><td>3.8208</td><td>4.7025</td></tr>
<tr><td colspan="7">5.7053</td></tr>
</table>

FIG. 47

<table>
<tr><td>4.9427</td><td>4.9427</td><td>5.0236</td><td>4.9665</td></tr>
<tr><td colspan="2">4.5892</td><td colspan="2">5.8598</td></tr>
<tr><td>4.9427</td><td colspan="2">4.7580</td><td>4.9665</td></tr>
<tr><td colspan="3">5.0731</td><td>4.9665</td></tr>
<tr><td>4.9427</td><td colspan="3">5.7349</td></tr>
<tr><td colspan="4">5.8002</td></tr>
</table>

FIG. 48

<table>
<tr><td>5.5872</td><td>4.7750</td><td>6.0633</td></tr>
<tr><td colspan="3">6.0440</td></tr>
</table>

FIG. 49

<table>
<tr><td>4.7390</td><td>5.0722</td><td>6.0860</td><td>5.0696</td><td>4.3637</td></tr>
<tr><td colspan="5">6.3926</td></tr>
</table>

FIG. 50

<table>
<tr><td>5.5872</td><td>5.0661</td><td>4.4671</td><td>5.0722</td><td>4.4671</td><td>5.0661</td><td>4.4671</td></tr>
<tr><td colspan="7">6.5363</td></tr>
</table>

FIG. 51

<table>
<tr><td>3.8133</td><td>3.7170</td><td>3.8133</td><td>3.5808</td></tr>
<tr><td colspan="2">4.4097</td><td colspan="2">4.3552</td></tr>
<tr><td>3.8133</td><td colspan="2">3.8145</td><td>3.5808</td></tr>
<tr><td colspan="3">5.4336</td><td>3.5808</td></tr>
<tr><td>3.8133</td><td colspan="3">5.3327</td></tr>
<tr><td colspan="4">4.2790</td></tr>
</table>

FIG. 52

<table>
<tr><td>5.5897</td><td>3.9299</td><td>4.3336</td></tr>
<tr><td colspan="3">5.4642</td></tr>
</table>

FIG. 53

<table>
<tr><td>4.3403</td><td>3.8358</td><td>5.9535</td><td>3.8358</td><td>4.2326</td></tr>
<tr><td colspan="5">5.7950</td></tr>
</table>

FIG. 54

<table>
<tr><td>5.9123</td><td>3.8684</td><td>5.9123</td><td>4.0902</td><td>5.8888</td><td>3.8684</td><td>5.8888</td></tr>
<tr><td colspan="7">6.0783</td></tr>
</table>

FIG. 55

<table>
<tr><td>2.9781</td><td>2.9781</td><td>2.9781</td><td>2.9781</td></tr>
<tr><td colspan="2">3.0060</td><td colspan="2">2.9982</td></tr>
<tr><td>2.9781</td><td colspan="2">3.0057</td><td>2.9781</td></tr>
<tr><td colspan="3">4.8614</td><td>2.9781</td></tr>
<tr><td>2.9781</td><td colspan="3">5.0303</td></tr>
<tr><td colspan="4">3.0032</td></tr>
</table>

FIG. 56

<table>
<tr><td>3.0046</td><td>4.7587</td><td>3.0046</td></tr>
<tr><td colspan="3">5.0167</td></tr>
</table>

FIG. 57

<table>
<tr><td>3.0047</td><td>3.0091</td><td>3.0092</td><td>3.0091</td><td>3.0047</td></tr>
<tr><td colspan="5">5.3965</td></tr>
</table>

FIG. 58

<table>
<tr><td>3.0098</td><td>3.0009</td><td>3.0098</td><td>3.0099</td><td>3.0098</td><td>3.0009</td><td>3.0098</td></tr>
<tr><td colspan="7">5.3027</td></tr>
</table>

FIG. 59

<table>
<tr><td>3.8900</td><td>3.8900</td><td>3.8900</td><td>3.8900</td></tr>
<tr><td colspan="2">4.2313</td><td colspan="2">4.1790</td></tr>
<tr><td>3.8900</td><td colspan="2">4.3152</td><td>3.8900</td></tr>
<tr><td colspan="3">5.9694</td><td>3.8900</td></tr>
<tr><td>3.8900</td><td colspan="3">6.0301</td></tr>
<tr><td colspan="4">3.9325</td></tr>
</table>

FIG. 64

<table>
<tr><td>4.2055</td><td>5.7832</td><td>4.2055</td></tr>
<tr><td colspan="3">5.6167</td></tr>
</table>

FIG. 65

<table>
<tr><td>4.3666</td><td>3.8940</td><td>4.2876</td><td>3.8940</td><td>4.3666</td></tr>
<tr><td colspan="5">5.9168</td></tr>
</table>

FIG. 66

<table>
<tr><td>4.3402</td><td>3.8944</td><td>4.3402</td><td>5.8907</td><td>4.3402</td><td>3.8944</td><td>4.3402</td></tr>
<tr><td colspan="7">5.9331</td></tr>
</table>

FIG. 67

<table>
<tr><td>3.0067</td><td>3.0091</td><td>3.0092</td><td>3.0091</td><td>3.0067</td></tr>
<tr><td colspan="5">5.6395</td></tr>
</table>

FIG. 70

<table>
<tr><td>3.0050</td><td>3.0091</td><td>3.0050</td><td>3.0082</td><td>3.0050</td><td>3.0091</td><td>3.0050</td></tr>
<tr><td colspan="7">5.1055</td></tr>
</table>

FIG. 71

<table>
<tr><td>2.9933</td><td>2.9933</td><td>2.9933</td><td>2.9933</td></tr>
<tr><td colspan="2">2.9890</td><td colspan="2">3.0055</td></tr>
<tr><td>2.9933</td><td colspan="2">3.0100</td><td>2.9933</td></tr>
<tr><td colspan="3">5.0074</td><td>2.9933</td></tr>
<tr><td>2.9933</td><td colspan="3">5.0632</td></tr>
<tr><td colspan="4">3.0088</td></tr>
</table>

FIG. 72

<table>
<tr><td>3.0085</td><td>4.4039</td><td>3.0085</td></tr>
<tr><td colspan="3">5.7130</td></tr>
</table>

FIG. 73

| | | | | |
|---|---|---|---|---|
| 2.9934 | 3.0082 | 3.0088 | 3.0082 | 2.9934 |
| 6.1296 | | | | |

| | | | | | | |
|---|---|---|---|---|---|---|
| 3.0085 | 3.0067 | 3.0085 | 3.0100 | 3.0085 | 3.0067 | 3.0085 |
| 5.8863 | | | | | | |

DATA TRANSMISSION METHOD, APPARATUS, AND SYSTEM

CROSS-REFERENCE TO RELATED APPLICATIONS

This application is a continuation of International Application No. PCT/CN2020/077338, filed on Feb. 29, 2020, which claims priority to Chinese Patent Application No. 201910157682.X, filed on Mar. 1, 2019. The disclosures of the aforementioned applications are hereby incorporated by reference in their entireties.

TECHNICAL FIELD

This application relates to the field of communications technologies, and in particular, to a data transmission method, apparatus, and system.

BACKGROUND

Standards used by a wireless local area network (WLAN) include Institute of Electrical and Electronics Engineers (IEEE) 802.11 series standards. IEEE 802.11ay is a WLAN standard that can achieve a relatively high data transmission rate among the existing IEEE 802.11 series standards, and an operating frequency band of IEEE 802.11ay is 60 gigahertz (GHz).

IEEE 802.11ay uses an orthogonal frequency division multiplexing (OFDM) technology. In IEEE 802.11ay, a transmit end may transmit a physical protocol data unit (PPDU) in a spectrum resource to a receive end to implement data transmission. Based on different functions, the PPDU is divided into a plurality of sequence fields, for example, a short training field (STF) supporting an initial position detection function, and a channel estimation field (CEF) supporting a channel estimation function. It should be noted that if a peak-to-average power ratio PAPR) of the PPDU is high, the power utilization of the transmit end in PPDU transmission would be low. Therefore, to improve power utilization of the transmit end during PPDU transmission, in IEEE 802.11ay, according to the length of the CEF (that is, the quantity of elements in the CEF), the CEF is designed as a Golay sequence of the length, so that a PAPR of the CEF is relatively low and the PAPR of the PPDU is reduced.

However, the manner of generating a CEF by the transmit end is relatively undiversified, and the manner of generating the PPDU is also relatively undiversified. As such, there is little flexibility in generating a PPDU by the transmit end.

SUMMARY

This application provides a data transmission method, apparatus, and system, to resolve a problem that the flexibility of generating a PPDU by a transmit end is relatively low. The technical solutions are as follows:

According to a first aspect, a data transmission method is provided. The method includes the following steps: A transmit end first generates a physical protocol data unit (PPDU), and transmits the PPDU. The PPDU includes a channel estimation field (CEF), and the CEF includes a plurality of sub-sequences. For each of the plurality of sub-sequences, a part or all of elements in the sub-sequence are basic elements, and the basic elements are arranged into a Golay sequence or a Zadoff-Chu (ZC) sequence in the sub-sequence.

In other words, the CEF in this application includes a plurality of sub-sequences, and basic elements in each sub-sequence are arranged into a Golay sequence or a ZC sequence in the sub-sequence. It can be learned that during generation of the CEF, a relatively short sequence (such as a Golay sequence or a ZC sequence) may be first generated, then a plurality of sub-sequences are generated based on the generated relatively short sequence, and further, the CEF is generated. A manner of generating the CEF in some embodiments of this application is different from other manners of generating a CEF commonly used in the related art. In addition, in some embodiments of this application, only a relatively short Golay sequence or ZC sequence needs to be generated. Therefore, difficulty in generating the CEF is reduced. However, in the related art, when a CEF of a specified length needs to be generated, a Golay sequence of the specified length is directly generated. In addition, generally, the CEF is relatively long, and it is relatively difficult to directly generate the Golay sequence of the specified length.

Further, in the related art, because a PAPR of each part of the CEF is relatively high, the improvement in power utilization at a transmit end is limited. In an embodiment of this application, basic elements in a sub-sequence in the CEF may be arranged into a Golay sequence or a ZC sequence. The Golay sequence itself is characterized by a relatively low PAPR. For example, a PAPR of a Golay sequence defined on a unit circle is usually about 3, and elements in the Golay sequence defined on the unit circle include 1, −1, and the like. Therefore, when a sub-sequence includes a Golay sequence, a PAPR of the sub-sequence is relatively low, a data part in the CEF includes a plurality of sub-sequences having low PAPRs, a PAPR of the entire CEF is relatively low, and a PAPR of each part in the CEF is also relatively low. If the CEF needs to be allocated to a plurality of receive ends, a PAPR of a part received by each receive end is relatively low in the CEF, and in this case, the power utilization of the transmit end is relatively high.

According to a second aspect, a data transmission method is provided. The method includes the following steps: A receive end first receives a PPDU transmitted by a transmit end, and then parses the received PPDU. The PPDU includes a channel estimation field (CEF), and the CEF includes a plurality of sub-sequences. For each of the plurality of sub-sequences, a part or all of elements in the sub-sequence are basic elements, and the basic elements are arranged into a Golay sequence or a ZC sequence in the sub-sequence.

According to a third aspect, a data transmission apparatus is provided, and used for a transmit end. The data transmission apparatus includes: a generation unit, configured to generate a PPDU; and a transmission unit, configured to transmit the PPDU. The PPDU includes a channel estimation field (CEF), and the CEF includes a plurality of sub-sequences. For each of the plurality of sub-sequences, a part or all of elements in the sub-sequence are basic elements, and the basic elements are arranged into a Golay sequence or a ZC sequence in the sub-sequence.

According to a fourth aspect, a data transmission apparatus is provided, and used for a receive end. The data transmission apparatus includes: a receiving unit, configured to receive a PPDU transmitted by a transmit end; and a parsing unit, configured to parse the received PPDU. The PPDU includes a channel estimation field (CEF), and the CEF includes a plurality of sub-sequences. For each of the plurality of sub-sequences, a part or all of elements in the sub-sequence are basic elements, and the basic elements are arranged into a Golay sequence or a ZC sequence in the sub-sequence.

According to a fifth aspect, a data transmission apparatus is provided. The data transmission apparatus includes a processor and a transceiver, and optionally further includes a memory, where the processor, the transceiver, and the memory communicate with each other by using an internal connection. The processor is configured to generate a PPDU; the transceiver is controlled by the processor, and configured to transmit the PPDU to at least one receive end; and the memory is configured to store instructions, where the instructions are invoked by the processor to generate the PPDU. Alternatively, the transceiver is controlled by the processor, and configured to receive a PPDU transmitted by the transmit end; the processor is configured to parse the PPDU; and the memory is configured to store instructions, where the instructions are invoked by the processor to parse the PPDU. The PPDU includes a channel estimation field (CEF), and the CEF includes a plurality of sub-sequences. For each of the plurality of sub-sequences, a part or all of elements in the sub-sequence are basic elements, and the basic elements are arranged into a Golay sequence or a ZC sequence in the sub-sequence.

According to a sixth aspect, a data transmission apparatus is provided. The data transmission apparatus includes a processing circuit, an input interface, and an output interface. The processing circuit, the input interface, and the output interface communicate with each other by using an internal connection. The input interface is configured to obtain information to be processed by the processing circuit. The processing circuit is configured to process the to-be-processed information to generate a PPDU or parse a PPDU. The output interface is configured to output the information processed by the processing circuit. The PPDU includes a channel estimation field (CEF), and the CEF includes a plurality of sub-sequences. For each of the plurality of sub-sequences, a part or all of elements in the sub-sequence are basic elements, and the basic elements are arranged into a Golay sequence or a ZC sequence in the sub-sequence.

In a first possible implementation of the first aspect, the second aspect, the third aspect, the fourth aspect, the fifth aspect, or the sixth aspect, a quantity of elements in the sub-sequence is equal to a quantity of subcarriers in a resource block (RB). Therefore, in a spectrum resource used to transmit the CEF, the RB is a minimum unit allocated to the receive end, a PAPR of a part transmitted in each RB in the CEF is relatively low, and a PAPR of a part transmitted in the CEF to each receive end is relatively low.

$2^{o1}\times10^{o2}\times26^{o3}$ and o1, o2, and o3 are all integers greater than or equal to 0. It can be learned that in the related art, a quantity of elements in the data part in the generated CEF is relatively limited, and a CEF whose data part includes an integer multiple of 84 elements cannot be generated in the related art. In an embodiment of this application, because the sub-sequence includes not only a plurality of basic elements, but also an interpolation element, during generation of the CEF, the data part may be formed based on the Golay sequence and by inserting the interpolation element into the Golay sequence. In this way, a quantity of data parts in this embodiment of this application may not be $2^{o1}\times10^{o2}\times26^{o3}$, and a CEF whose data part includes an integer multiple of 84 elements can be generated.

With reference to the second possible implementation of the first aspect, in a third possible implementation of the first aspect, or with reference to the second possible implementation of the second aspect, in a third possible implementation of the second aspect, or with reference to the second possible implementation of the third aspect, in a third possible implementation of the third aspect, or with reference to the second possible implementation of the fourth aspect, in a third possible implementation of the fourth aspect, or with reference to the second possible implementation of the fifth aspect, in a third possible implementation of the fifth aspect, or with reference to the second possible implementation of the sixth aspect, in a third possible implementation of the sixth aspect, the sub-sequence includes: 80 basic elements arranged into the Golay sequence in the sub-sequence and four interpolation elements; and when a channel bonding CB of the spectrum resource is equal to 1, a target part in the CEF is G1, the target part includes a data part and a direct current part, the data part includes the plurality of sub-sequences, and G1={S84_11, ±S84_12, 0, 0, 0, ±S84_13, ±S84_14}, where S84_n represents a sequence whose length is 84, a Golay sequence in which 80 basic elements are arranged in S84_n belongs to a sequence set formed by A1, A2, A3, A4, A5, A6, A7, A8, A9, A10, A11, A12, A13, A14, A15, and A16, n≥1, and ± represents + or −; A1={C1, C2, C1, −C2}, A2={C1, C2, −C1, C2}, A3={C2, C1, C2, −C1}, A4={C2, C1, −C2, C1}, A5={C1, −C2, C1, C2}, A6={−C1, C2, C1, C2}, A7={C2, −C1, C2, C1}, A8={−C2, C1, C2, C1}, A9={S1, S2, S1, −S2}, A10={S1, S2, −S1, S2}, A11={S2, S1, S2, −S1}, A12={S2, S1, −S2, S1}, A13={S1, −S2, S1, S2}, A14={−S1, S2, S1, S2}, A15={S2, −S1, S2, S1}, and A16={−S2, S1, S2, S1}; and C1 and C2 represent two Golay sequences whose lengths are both 20, S1 and S2 represent two Golay sequences whose lengths are both 20, −C1 represents −1 times C1, −C2 represents −1 times C2, −S1 represents −1 times S1, and −S2 represents −1 times S2. This application provides a structure of the target part in the CEF when the CB is equal to 1, and an STF with this structure has a relatively low PAPR.

With reference to the third possible implementation of the first aspect, in a fourth possible implementation of the first aspect, or with reference to the third possible implementation of the second aspect, in a fourth possible implementation of the second aspect, or with reference to the third possible implementation of the third aspect, in a fourth possible implementation of the third aspect, or with reference to the third possible implementation of the fourth aspect, in a fourth possible implementation of the fourth aspect, or with reference to the third possible implementation of the fifth aspect, in a fourth possible implementation of the fifth aspect, or with reference to the third possible implementation of the sixth aspect, in a fourth possible implementation of the sixth aspect, when the CB of the spectrum resource is equal to 2, the target part is G2, and G2={S336_21, ±S84_21(1:42), 0, 0, 0, ±S84_21(43:84), ±S336_22}, where S336_n={S84_c1, ±S84_c2, ±S84_c3, ±S84_c4}, S84_n(a:b) represents $a^{th}$ to $b^{th}$ elements in S84_n, a and b are both greater than 0, and c1, c2, c3, and c4 are all integers greater than or equal to 1. This application provides a structure of the target part in the CEF when the CB is equal to 2, and an STF with this structure has a relatively low PAPR.

With reference to the third possible implementation of the first aspect, in a fifth possible implementation of the first aspect, or with reference to the third possible implementation of the second aspect, in a fifth possible implementation of the second aspect, or with reference to the third possible implementation of the third aspect, in a fifth possible implementation of the third aspect, or with reference to the third possible implementation of the fourth aspect, in a fifth possible implementation of the fourth aspect, or with reference to the third possible implementation of the fifth aspect, in a fifth possible implementation of the fifth aspect, or with reference to the third possible implementation of the sixth aspect, in a fifth possible implementation of the sixth aspect, when the CB of the spectrum resource is equal to 3, the target part is G3, and G3={S336_31, ±S84_31, ±G339_31, ±S84_32, ±S336_32}, where S336_n={S84_c1, ±S84_c2, ±S84_c3, ±S84_c4}, G339_n={S84_d1, ±S84_d2, 0, 0, 0, ±S84_d3, ±S84_d4}, and c1, c2, c3, c4, d1, d2, d3, and d4 are all integers greater than or equal to 1. This application provides a structure of the target part in the CEF when the CB is equal to 3, and an STF with this structure has a relatively low PAPR.

With reference to the third possible implementation of the first aspect, in a sixth possible implementation of the first aspect, or with reference to the third possible implementation of the second aspect, in a sixth possible implementation of the second aspect, or with reference to the third possible implementation of the third aspect, in a sixth possible implementation of the third aspect, or with reference to the third possible implementation of the fourth aspect, in a sixth possible implementation of the fourth aspect, or with reference to the third possible implementation of the fifth aspect, in a sixth possible implementation of the fifth aspect, or with reference to the third possible implementation of the sixth aspect, in a sixth possible implementation of the sixth aspect, when the CB of the spectrum resource is equal to 4, the target part is G4, and G4={S336_41, ±S84_41, ±S336_42, ±{S84_42(1:42), 0, 0, 0, S84_42(43:84)}, ±S336_43, ±S84_43, ±S336_44}, where S336_n={S84_c1, ±S84_c2, ±S84_c3, ±S84_c4}, S84_n(a:b) represents $a^{th}$ to $b^{th}$ elements in S84_n, a and b are both greater than 0, and c1, c2, c3, and c4 are all integers greater than or equal to 1. This application provides a structure of the target part in the CEF when the CB is equal to 4, and an STF with this structure has a relatively low PAPR.

With reference to the first aspect or the first possible implementation of the first aspect, in a seventh possible implementation of the first aspect, or with reference to the second aspect or the first possible implementation of the second aspect, in a seventh possible implementation of the second aspect, or with reference to the third aspect or the first possible implementation of the third aspect, in a seventh possible implementation of the third aspect, or with reference to the fourth aspect or the first possible implementation of the fourth aspect, in a seventh possible implementation of the fourth aspect, or with reference to the fifth aspect or the first possible implementation of the fifth aspect, in a seventh possible implementation of the fifth aspect, or with reference to the sixth aspect or the first possible implementation of the sixth aspect, in a seventh possible implementation of the sixth aspect, the sub-sequence includes: 80 basic elements arranged into the Golay sequence in the sub-sequence; and when a CB of the spectrum resource is equal to 1, a target part in the CEF is G1, the target part includes a data part and a direct current part, the data part includes the plurality of sub-sequences, and G1={A1, A2, 0, 0, 0, A1, −A2}, where A1={−C1, C2, C1, C2}, A2={C1, −C2, C1, C2}, C1 and C2 represent two Golay sequences whose lengths are both 20, −C1 represents −1 times C1, −C2 represents −1 times C2, and −A2 represents −1 times A2. This application provides a structure of the target part in the CEF when the CB is equal to 1, and an STF with this structure has a relatively low PAPR.

With reference to the seventh possible implementation of the first aspect, in an eighth possible implementation of the first aspect, or with reference to the seventh possible implementation of the second aspect, in an eighth possible implementation of the second aspect, or with reference to the seventh possible implementation of the third aspect, in an eighth possible implementation of the third aspect, or with reference to the seventh possible implementation of the fourth aspect, in an eighth possible implementation of the fourth aspect, or with reference to the seventh possible implementation of the fifth aspect, in an eighth possible implementation of the fifth aspect, or with reference to the seventh possible implementation of the sixth aspect, in an eighth possible implementation of the sixth aspect, when the CB of the spectrum resource is equal to 2, the target part is G2, and G2={A1, ±A2, ±A1, ±A2, ±[S80_21(1:40), 0, 0, 0, S80_21(41:80)], ±A1, ±A2, ±A1, ±A2}, where ± represents + or −, S80_n belongs to a sequence set formed by A1, A2, A3, A4, A5, A6, A7, and A8, n≥1, S80_n(a:b) represents $a^{th}$ to $b^{th}$ elements in S80_n, and a and b are both greater than 0; A3={C1, C2, −C1, C2}, A4={C1, C2, C1, −C2}, A5={−S1, S2, S1, S2}, A6={S1, −S2, S1, S2}, A7={S1, S2, −S1, S2}, A8={S1, S2, S1, −S2}, S1 and S2 represent two Golay sequences whose lengths are both 20, −S1 represents −1 times S1, and −S2 represents −1 times S2. This application provides a structure of the target part in the CEF when the CB is equal to 2, and an STF with this structure has a relatively low PAPR.

With reference to the seventh possible implementation of the first aspect, in a ninth possible implementation of the first aspect, or with reference to the seventh possible implementation of the second aspect, in a ninth possible implementation of the second aspect, or with reference to the seventh possible implementation of the third aspect, in a ninth possible implementation of the third aspect, or with reference to the seventh possible implementation of the fourth aspect, in a ninth possible implementation of the fourth aspect, or with reference to the seventh possible implementation of the fifth aspect, in a ninth possible implementation of the fifth aspect, or with reference to the seventh possible implementation of the sixth aspect, in a ninth possible implementation of the sixth aspect, when the CB of the spectrum resource is equal to 3, the target part is G3, and G3={A1, ±A2, ±A1, ±A2, ±S80_31, ±A1, ±A2, 0, 0, 0, A1, ±A2, ±S80_32, ±A1, ±A2, ±A1, ±A2}, where ± represents + or −, S80_n belongs to a sequence set formed by A1, A2, A3, A4, A5, A6, A7, and A8, n≥1, S80_n(a:b) represents $a^{th}$ to $b^{th}$ elements in S80_n, and a and b are both greater than 0; A3={C1, C2, −C1, C2}, A4={C1, C2, C1, −C2}, A5={−S1, S2, S1, S2}, A6={S1, −S2, S1, S2}, A7={S1, S2, −S1, S2}, A8={S1, S2, S1, −S2}, S1 and S2 represent two Golay sequences whose lengths are both 20, −S1 represents −1 times S1, and −S2 represents −1 times S2. This application provides a structure of the target part in the CEF when the CB is equal to 3, and an STF with this structure has a relatively low PAPR.

With reference to the seventh possible implementation of the first aspect, in a tenth possible implementation of the first aspect, or with reference to the seventh possible implementation of the second aspect, in a tenth possible implementation of the second aspect, or with reference to the seventh possible implementation of the third aspect, in a tenth possible implementation of the third aspect, or with reference to the seventh possible implementation of the fourth aspect, in a tenth possible implementation of the fourth aspect, or with reference to the seventh possible implementation of the fifth aspect, in a tenth possible implementation of the fifth aspect, or with reference to the seventh possible implementation of the sixth aspect, in a tenth possible implementation of the sixth aspect, when the CB of the spectrum resource is equal to 4, the target part is G4, and G4={S320_41, ±S80_41, ±S320_42, ±S80_42, 0, 0, 0, S80_43, ±S320_43, ±S80_44, ±S320_44}, where S320_n includes four sequentially arranged Golay sequences whose lengths are 80, ± represents + or −, S80_n belongs to a sequence set formed by A1, A2, A3, A4, A5, A6, A7, and A8, and n≥1; A3={C1, C2, −C1, C2}, A4={C1, C2, C1, −C2}, A5={−S1, S2, S1, S2}, A6={S1, −S2, S1, S2}, A7={S1, S2, −S1, S2}, A8={S1, S2, S1, −S2}, S1 and S2 represent two Golay sequences whose lengths are both 20, −S1 represents −1 times S1, and −S2 represents −1 times S2. This application provides a structure of the target part in the CEF when the CB is equal to 4, and an STF with this structure has a relatively low PAPR.

With reference to the tenth possible implementation of the first aspect, in an eleventh possible implementation of the first aspect, or with reference to the tenth possible implementation of the second aspect, in an eleventh possible implementation of the second aspect, or with reference to the seventh possible implementation of the third aspect, in an eleventh possible implementation of the third aspect, or with reference to the seventh possible implementation of the fourth aspect, in an eleventh possible implementation of the fourth aspect, or with reference to the seventh possible implementation of the fifth aspect, in an eleventh possible implementation of the fifth aspect, or with reference to the seventh possible implementation of the sixth aspect, in an eleventh possible implementation of the sixth aspect, S320_n belongs to a sequence set formed by [−x, y, x, y], [x, −y, x, y], [x, y, −x, y], [x, y, x, −y], [−c, d, c, d], [c, −d, c, d], [c, d, −c, d], and [c, d, c, −d], x is any sequence in A1, A3, A5, and A7, y is any sequence in A2, A4, A6, and A8, c is a reverse order of x, and d is a reverse order of y.

With reference to the third possible implementation, the fourth possible implementation, the fifth possible implementation, the sixth possible implementation, the eighth possible implementation, the ninth possible implementation, the tenth possible implementation, or the eleventh possible implementation of the first aspect, in a twelfth possible implementation of the first aspect, or with reference to the third possible implementation, the fourth possible implementation, the fifth possible implementation, the sixth possible implementation, the eighth possible implementation, the ninth possible implementation, the tenth possible implementation, or the eleventh possible implementation of the second aspect, in a twelfth possible implementation of the second aspect, or with reference to the third possible implementation, the fourth possible implementation, the fifth possible implementation, the sixth possible implementation, the eighth possible implementation, the ninth possible implementation, the tenth possible implementation, or the eleventh possible implementation of the third aspect, in a twelfth possible implementation of the third aspect, or with reference to the third possible implementation, the fourth possible implementation, the fifth possible implementation, the sixth possible implementation, the eighth possible implementation, the ninth possible implementation, the tenth possible implementation, or the eleventh possible implementation of the fourth aspect, in a twelfth possible implementation of the fourth aspect, or with reference to the third possible implementation, the fourth possible implementation, the fifth possible implementation, the sixth possible implementation, the eighth possible implementation, the ninth possible implementation, the tenth possible implementation, or the eleventh possible implementation of the fifth aspect, in a twelfth possible implementation of the fifth aspect, or with reference to the third possible implementation, the fourth possible implementation, the fifth possible implementation, the sixth possible implementation, the eighth possible implementation, the ninth possible implementation, the tenth possible implementation, or the eleventh possible implementation of the sixth aspect, in a twelfth possible implementation of the sixth aspect, C1={a1, b1}; C2={a1, −b1}; S1={a2, b2}; and S2={a2, −b2}, where a1=[1, 1, −1, 1, −1, 1, −1, −1, 1, 1], b1=[1, 1, −1, 1, 1, 1, 1, 1, −1, −1], a2=[−1, −1, 1, 1, 1, 1, 1, −1, 1, 1], b2=[−1, −1, 1, 1, −1, 1, −1, 1, −1, −1], −b1 represents −1 times b1, and −b2 represents −1 times b2. This application provides a structure of the target part in the CEF when the CB is equal to 1, and an STF with this structure has a relatively low PAPR.

With reference to the second possible implementation of the first aspect, in a thirteenth possible implementation of the first aspect, or with reference to the second possible implementation of the second aspect, in a thirteenth possible implementation of the second aspect, or with reference to the second possible implementation of the third aspect, in a thirteenth possible implementation of the third aspect, or with reference to the second possible implementation of the fourth aspect, in a thirteenth possible implementation of the fourth aspect, or with reference to the second possible implementation of the fifth aspect, in a thirteenth possible implementation of the fifth aspect, or with reference to the second possible implementation of the sixth aspect, in a thirteenth possible implementation of the sixth aspect, the sub-sequence includes: 80 basic elements arranged into the Golay sequence in the sub-sequence and four interpolation elements located after the 80 basic elements; and when a CB of the spectrum resource is equal to 1, a target part in the CEF is G1, the target part includes a data part and a direct current part, the data part includes the plurality of sub sequences, and G1={A, ±A, 0, 0, 0, ±A, ±A}, where a Golay sequence in which 80 basic elements are arranged in A is T1 or T2, $$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two Golay sequences whose lengths are both 10, S1 and S2 represent two Golay sequences whose lengths are both 8, ⊗ represents a Kronecker product, $\overleftarrow{S1}$ represents a reverse order of S1, $\overleftarrow{S2}$ represents a reverse order of S2, and ± represents + or −. This application provides a structure of the target part in the CEF when the CB is equal to 1, and an STF with this structure has a relatively low PAPR.

With reference to the second possible implementation of the first aspect, in a fourteenth possible implementation of the first aspect, or with reference to the second possible implementation of the second aspect, in a fourteenth possible implementation of the second aspect, or with reference to the second possible implementation of the third aspect, in a fourteenth possible implementation of the third aspect, or with reference to the second possible implementation of the fourth aspect, in a fourteenth possible implementation of the fourth aspect, or with reference to the second possible implementation of the fifth aspect, in a fourteenth possible implementation of the fifth aspect, or with reference to the second possible implementation of the sixth aspect, in a fourteenth possible implementation of the sixth aspect, the target element set further includes j and −j, where j represents an imaginary unit; the sub-sequence includes: 80 basic elements arranged into the Golay sequence in the sub-sequence and four interpolation elements located after the 80 basic elements; and when a CB of the spectrum resource is equal to 1, a target part in the CEF is G1, the target part includes a data part and a direct current part, the data part includes the plurality of sub-sequences, and G1={A, ±A, 0, 0, 0, ±A, ±A}, where a Golay sequence in which 80 basic elements are arranged in A is T1 or T2, $$T1 = C1 \otimes \frac{S1+S2}{2} + C2 \otimes \frac{S1-S2}{2}, \text{ and}$$

$$T2 = C1 \otimes \frac{\overleftarrow{S1}-\overleftarrow{S2}}{2} - C2 \otimes \frac{\overleftarrow{S1}+\overleftarrow{S2}}{2};$$

and C1 and C2 represent two Golay sequences whose lengths are both 5, S1 and S2 represent two Golay sequences whose lengths are both 16, $\overleftarrow{S1}$ represents a reverse order of S1, $\overleftarrow{S2}$ represents a reverse order of S2, and ⊗ represents a Kronecker product. This application provides a structure of the target part in the CEF when the CB is equal to 2, and an STF with this structure has a relatively low PAPR.

With reference to the second possible implementation of the first aspect, in a fifteenth possible implementation of the first aspect, or with reference to the second possible implementation of the second aspect, in a fifteenth possible implementation of the second aspect, or with reference to the second possible implementation of the third aspect, in a fifteenth possible implementation of the third aspect, or with reference to the second possible implementation of the fourth aspect, in a fifteenth possible implementation of the fourth aspect, or with reference to the second possible implementation of the fifth aspect, in a fifteenth possible implementation of the fifth aspect, or with reference to the second possible implementation of the sixth aspect, in a fifteenth possible implementation of the sixth aspect, the sub-sequence includes: 80 basic elements arranged into the Golay sequence in the sub sequence; and when a CB of the spectrum resource is equal to 1, a target part in the CEF is G1, the target part includes a data part and a direct current part, the data part includes the plurality of sub sequences, and G1={A, ±A, 0, 0, 0, ±A, ±A}, where A is T1 or T2, $$T1 = C1 \otimes \frac{S1+S2}{2} + C2 \otimes \frac{S1-S2}{2}, \text{ and}$$

$$T2 = C1 \otimes \frac{\overleftarrow{S1}-\overleftarrow{S2}}{2} - C2 \otimes \frac{\overleftarrow{S1}+\overleftarrow{S2}}{2};$$

and C1 and C2 represent two Golay sequences whose lengths are both 10, S1 and S2 represent two Golay sequences whose lengths are both 8, ⊗ represents a Kronecker product, $\overleftarrow{S1}$ represents a reverse order of S1, $\overleftarrow{S2}$ represents a reverse order of S2, and ± represents + or −. This application provides a structure of the target part in the CEF when the CB is equal to 1, and an STF with this structure has a relatively low PAPR.

With reference to the thirteenth possible implementation, the fourteenth possible implementation, or the fifteenth possible implementation of the first aspect, in a sixteenth possible implementation of the first aspect, or with reference to the thirteenth possible implementation, the fourteenth possible implementation, or the fifteenth possible implementation of the second aspect, in a sixteenth possible implementation of the second aspect, or with reference to the thirteenth possible implementation, the fourteenth possible implementation, or the fifteenth possible implementation of the third aspect, in a sixteenth possible implementation of the third aspect, or with reference to the thirteenth possible implementation, the fourteenth possible implementation, or the fifteenth possible implementation of the fourth aspect, in a sixteenth possible implementation of the fourth aspect, or with reference to the thirteenth possible implementation, the fourteenth possible implementation, or the fifteenth possible implementation of the fifth aspect, in a sixteenth possible implementation of the fifth aspect, or with reference to the thirteenth possible implementation, the fourteenth possible implementation, or the fifteenth possible implementation of the sixth aspect, in a sixteenth possible implementation of the sixth aspect, when the CB of the spectrum resource is equal to 2, the target part is G2, and G2={Z1, X, 0, 0, 0, Y, ±Z1}, where Z1={A, ±A, ±A, ±A}, X includes 0.5 m continuous elements in Z1, m is the quantity of elements in the sub-sequence, m≥80, Y=X or $\overleftarrow{X}$, and $\overleftarrow{X}$ represents a reverse order of X. This application provides a structure of the target part in the CEF when the CB is equal to 2, and an STF with this structure has a relatively low PAPR.

With reference to the thirteenth possible implementation, the fourteenth possible implementation, or the fifteenth possible implementation of the first aspect, in a seventeenth possible implementation of the first aspect, or with reference to the thirteenth possible implementation, the fourteenth possible implementation, or the fifteenth possible implementation of the second aspect, in a seventeenth possible implementation of the second aspect, or with reference to the thirteenth possible implementation, the fourteenth possible implementation, or the fifteenth possible implementation of the third aspect, in a seventeenth possible implementation of the third aspect, or with reference to the thirteenth possible implementation, the fourteenth possible implementation, or the fifteenth possible implementation of the fourth aspect, in a seventeenth possible implementation of the fourth aspect, or with reference to the thirteenth possible implementation, the fourteenth possible implementation, or the fifteenth possible implementation of the fifth aspect, in a seventeenth possible implementation of the fifth aspect, or with reference to the thirteenth possible implementation, the fourteenth possible implementation, or the fifteenth possible implementation of the sixth aspect, in a seventeenth possible implementation of the sixth aspect, when the CB of the spectrum resource is equal to 3, the target part is G3, and G3={Z1, X, ±Z0, Y, ±Z1}, where Z1={A, ±A, ±A, ±A}, Z0={A, ±A, 0, 0, 0, ±A, ±A}, X includes m continuous elements in Z1, m is the quantity of elements in the sub-sequence, m≥80, Y=X or $\overleftarrow{X}$, and $\overleftarrow{X}$ represents a reverse order of X. This application provides a structure of the target part in the CEF when the CB is equal to 3, and an STF with this structure has a relatively low PAPR.

With reference to the thirteenth possible implementation, the fourteenth possible implementation, or the fifteenth possible implementation of the first aspect, in an eighteenth possible implementation of the first aspect, or with reference to the thirteenth possible implementation, the fourteenth possible implementation, or the fifteenth possible implementation of the second aspect, in an eighteenth possible implementation of the second aspect, or with reference to the thirteenth possible implementation, the fourteenth possible implementation, or the fifteenth possible implementation of the third aspect, in an eighteenth possible implementation of the third aspect, or with reference to the thirteenth possible implementation, the fourteenth possible implementation, or the fifteenth possible implementation of the fourth aspect, in an eighteenth possible implementation of the fourth aspect, or with reference to the thirteenth possible implementation, the fourteenth possible implementation, or the fifteenth possible implementation of the fifth aspect, in an eighteenth possible implementation of the fifth aspect, or with reference to the thirteenth possible implementation, the fourteenth possible implementation, or the fifteenth possible implementation of the sixth aspect, in an eighteenth possible implementation of the sixth aspect, when the CB of the spectrum resource is equal to 4, the target part is G4, and G4={Z1, X, ±Z1, Q, 0, 0, 0, P, ±Z1, Y, ±Z1}, where Z1={A, ±A, ±A, ±A}, X includes m continuous elements in Z1, Q includes 0.5 m continuous elements in Z1, m is the quantity of elements in the sub-sequence, and m≥80; Y=X and P=Q, or Y=$\overleftarrow{X}$ and P=$\overleftarrow{Q}$; and $\overleftarrow{X}$ represents a reverse order of X, and $\overleftarrow{Q}$ represents a reverse order of Q. This application provides a structure of the target part in the CEF when the CB is equal to 4, and an STF with this structure has a relatively low PAPR.

With reference to the second possible implementation of the first aspect, in a nineteenth possible implementation of the first aspect, or with reference to the second possible implementation of the second aspect, in a nineteenth possible implementation of the second aspect, or with reference to the second possible implementation of the third aspect, in a nineteenth possible implementation of the third aspect, or with reference to the second possible implementation of the fourth aspect, in a nineteenth possible implementation of the fourth aspect, or with reference to the second possible implementation of the fifth aspect, in a nineteenth possible implementation of the fifth aspect, or with reference to the second possible implementation of the sixth aspect, in a nineteenth possible implementation of the sixth aspect, the sub-sequence includes: 80 basic elements arranged into the Golay sequence in the sub-sequence and four interpolation elements located after the 80 basic elements; and when a CB of the spectrum resource is equal to 1, a target part in the CEF is G1, the target part includes a data part and a direct current part, the data part includes the plurality of sub sequences, and G1={A, ±B, 0, 0, 0, ±C, ±D}, where A, B, C, and D all represent sequences whose lengths are 84, A, B, C, and D are different, and a Golay sequence in which 80 basic elements are arranged in each of A, B, C, and D is T1 or T2;

$$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two Golay sequences whose lengths are both 10, S1 and S2 represent two Golay sequences whose lengths are both 8, ⊗ represents a Kronecker product, $\overleftarrow{S1}$ represents a reverse order of S1, $\overleftarrow{S2}$ represents a reverse order of S2, and ± represents + or −. This application provides a structure of the target part in the CEF when the CB is equal to 1, and an STF with this structure has a relatively low PAPR.

With reference to the second possible implementation of the first aspect, in a twentieth possible implementation of the first aspect, or with reference to the second possible implementation of the second aspect, in a twentieth possible implementation of the second aspect, or with reference to the second possible implementation of the third aspect, in a twentieth possible implementation of the third aspect, or with reference to the second possible implementation of the fourth aspect, in a twentieth possible implementation of the fourth aspect, or with reference to the second possible implementation of the fifth aspect, in a twentieth possible implementation of the fifth aspect, or with reference to the second possible implementation of the sixth aspect, in a twentieth possible implementation of the sixth aspect, the target element set further includes j and −j, where j represents an imaginary unit; the sub-sequence includes: 80 basic elements arranged into the Golay sequence in the sub-sequence and four interpolation elements located after the 80 basic elements; and when a CB of the spectrum resource is equal to 1, a target part in the CEF is G1, the target part includes a data part and a direct current part, the data part includes the plurality of sub-sequences, and G1={A, ±B, 0, 0, 0, ±C, ±D}, where A, B, C, and D all represent sequences whose lengths are 84, A, B, C, and D are different, a Golay sequence in which 80 basic elements are arranged in each of A, B, C, and D is T1 or T2, $$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two Golay sequences whose lengths are both 5, S1 and S2 represent two Golay sequences whose lengths are both 16, ⊗ represents a Kronecker product, $\overleftarrow{S1}$ represents a reverse order of S1, $\overleftarrow{S2}$ represents a reverse order of S2, and ± represents + or −. This application provides a structure of the target part in the CEF when the CB is equal to 1, and an STF with this structure has a relatively low PAPR.

With reference to the nineteenth possible implementation or the twentieth possible implementation of the first aspect, in a twenty-first possible implementation of the first aspect, or with reference to the nineteenth possible implementation or the twentieth possible implementation of the second aspect, in a twenty-first possible implementation of the second aspect, or with reference to the nineteenth possible implementation or the twentieth possible implementation of the third aspect, in a twenty-first possible implementation of the third aspect, or with reference to the nineteenth possible implementation or the twentieth possible implementation of the fourth aspect, in a twenty-first possible implementation of the fourth aspect, or with reference to the nineteenth possible implementation or the twentieth possible implementation of the fifth aspect, in a twenty-first possible implementation of the fifth aspect, or with reference to the nineteenth possible implementation or the twentieth possible implementation of the sixth aspect, in a twenty-first possible implementation of the sixth aspect, when the CB of the spectrum resource is equal to 2, the target part is G2, and G2={Z2_1, ±X, 0, 0, 0, ±Y, ±Z2_2}, where Z2 n={E, ±F, ±G, ±H}, n≥1, E, F, G, and H all represent sequences whose lengths are 84, and A, B, C, D, E, F, G, and H are different; and a Golay sequence in which 80 basic elements are arranged in each of A, B, C, and D is one sequence in T1 and T2, a Golay sequence in which 80 basic elements are arranged in each of E, F, G, and H is the other sequence in T1 and T2, X includes first to $42^{nd}$ elements in Z2_1, and Y includes $43^{rd}$ to $84^{th}$ elements in Z2_1. This application provides a structure of the target part in the CEF when the CB is equal to 2, and an STF with this structure has a relatively low PAPR.

With reference to the nineteenth possible implementation or the twentieth possible implementation of the first aspect, in a twenty-second possible implementation of the first aspect, or with reference to the nineteenth possible implementation or the twentieth possible implementation of the second aspect, in a twenty-second possible implementation of the second aspect, or with reference to the nineteenth possible implementation or the twentieth possible implementation of the third aspect, in a twenty-second possible implementation of the third aspect, or with reference to the nineteenth possible implementation or the twentieth possible implementation of the fourth aspect, in a twenty-second possible implementation of the fourth aspect, or with reference to the nineteenth possible implementation or the twentieth possible implementation of the fifth aspect, in a twenty-second possible implementation of the fifth aspect, or with reference to the nineteenth possible implementation or the twentieth possible implementation of the sixth aspect, in a twenty-second possible implementation of the sixth aspect, when the CB of the spectrum resource is equal to 3, the target part is G3, and G3={Z2_1, ±X, ±Z1_1, ±Y, ±Z2_2}, where Z2_n={E, ±F, ±G, ±H}, n≥1, E, F, G, and H all represent sequences whose lengths are 84, and A, B, C, D, E, F, G, and H are different; and a Golay sequence in which 80 basic elements are arranged in each of A, B, C, and D is one sequence in T1 and T2, a Golay sequence in which 80 basic elements are arranged in each of E, F, G, and H is the other sequence in T1 and T2, structures of Z1_n and G1 are the same, X includes first 84 elements in Z2_1, and Y includes first 84 elements in Z2_2. This application provides a structure of the target part in the CEF when the CB is equal to 3, and an STF with this structure has a relatively low PAPR.

With reference to the nineteenth possible implementation or the twentieth possible implementation of the first aspect, in a twenty-third possible implementation of the first aspect, or with reference to the nineteenth possible implementation or the twentieth possible implementation of the second aspect, in a twenty-third possible implementation of the second aspect, or with reference to the nineteenth possible implementation or the twentieth possible implementation of the third aspect, in a twenty-third possible implementation of the third aspect, or with reference to the nineteenth possible implementation or the twentieth possible implementation of the fourth aspect, in a twenty-third possible implementation of the fourth aspect, or with reference to the nineteenth possible implementation or the twentieth possible implementation of the fifth aspect, in a twenty-third possible implementation of the fifth aspect, or with reference to the nineteenth possible implementation or the twentieth possible implementation of the sixth aspect, in a twenty-third possible implementation of the sixth aspect, when the CB of the spectrum resource is equal to 4, the target part is G4, and G4={Z2_1, ±X, ±Z2_2, ±Q, 0, 0, 0, ±P, ±Z2_3, ±Y, ±Z2_4}, where Z2_n={E, ±F, ±G, ±H}, n≥1, E, F, G, and H all represent sequences whose lengths are 84, and A, B, C, D, E, F, G, and H are different; and a Golay sequence in which 80 basic elements are arranged in each of A, B, C, and D is one sequence in T1 and T2, a Golay sequence in which 80 basic elements are arranged in each of E, F, G, and H is the other sequence in T1 and T2, X includes first 84 elements in Z2_1, Y includes first 84 elements in Z2_2, P includes first to $42^{nd}$ elements in Z2_1, and Q includes $43^{rd}$ to $84^{th}$ elements in Z2_1. This application provides a structure of the target part in the CEF when the CB is equal to 4, and an STF with this structure has a relatively low PAPR.

With reference to the first aspect or the first possible implementation of the first aspect, in a twenty-fourth possible implementation of the first aspect, or with reference to the second aspect or the first possible implementation of the second aspect, in a twenty-fourth possible implementation of the second aspect, or with reference to the third aspect or the first possible implementation of the third aspect, in a twenty-fourth possible implementation of the third aspect, or with reference to the fourth aspect or the first possible implementation of the fourth aspect, in a twenty-fourth possible implementation of the fourth aspect, or with reference to the fifth aspect or the first possible implementation of the fifth aspect, in a twenty-fourth possible implementation of the fifth aspect, or with reference to the sixth aspect or the first possible implementation of the sixth aspect, in a twenty-fourth possible implementation of the sixth aspect, the sub-sequence includes: 84 basic elements arranged into the ZC sequence in the sub-sequence; and when a CB of the spectrum resource is equal to 1, a target part in the CEF is G1, the target part includes a data part and a direct current part, the data part includes the plurality of sub-sequences, and G1={A, ±B, 0, 0, 0, ±C, ±D}, where A, B, C, and D are all ZC sequences whose lengths are 84, A, B, C, and D are different, and ± represents + or −. This application provides a structure of the target part in the CEF when the CB is equal to 1, and an STF with this structure has a relatively low PAPR.

With reference to the twenty-fourth possible implementation of the first aspect, in a twenty-fifth possible implementation of the first aspect, or with reference to the twenty-fourth possible implementation of the second aspect, in a twenty-fifth possible implementation of the second aspect, or with reference to the twenty-fourth possible implementation of the third aspect, in a twenty-fifth possible implementation of the third aspect, or with reference to the twenty-fourth possible implementation of the fourth aspect, in a twenty-fifth possible implementation of the fourth aspect, or with reference to the twenty-fourth possible implementation of the fifth aspect, in a twenty-fifth possible implementation of the fifth aspect, or with reference to the twenty-fourth possible implementation of the sixth aspect, in a twenty-fifth possible implementation of the sixth aspect, when the CB of the spectrum resource is equal to 2, the target part is G2, and G2={Z2_1, ±X, 0, 0, 0, ±Y, ±Z2_2}, where Z2_n={E, ±F, ±G, ±H}, n≥1, E, F, G, and H are all ZC sequences whose lengths are 84, A, B, C, D, E, F, G, and H are different, X includes first to $42^{nd}$ elements in Z2_1, and Y includes $43^{rd}$ to $84^{th}$ elements in Z2_1. This application provides a structure of the target part in the CEF when the CB is equal to 2, and an STF with this structure has a relatively low PAPR.

With reference to the twenty-fourth possible implementation of the first aspect, in a twenty-sixth possible implementation of the first aspect, or with reference to the twenty-fourth possible implementation of the second aspect, in a twenty-sixth possible implementation of the second aspect, or with reference to the twenty-fourth possible implementation of the third aspect, in a twenty-sixth possible implementation of the third aspect, or with reference to the twenty-fourth possible implementation of the fourth aspect, in a twenty-sixth possible implementation of the fourth aspect, or with reference to the twenty-fourth possible implementation of the fifth aspect, in a twenty-sixth possible implementation of the fifth aspect, or with reference to the twenty-fourth possible implementation of the sixth aspect, in a twenty-sixth possible implementation of the sixth aspect, when the CB of the spectrum resource is equal to 3, the target part is G3, and G3={Z2_1, ±X, ±Z1_1, ±Y, ±Z2_2}, where Z2_n={E, ±F, ±G, ±H}, n≥1, E, F, G, and H are all ZC sequences whose lengths are 84, A, B, C, D, E, F, G, and H are different, structures of Z1_n and G1 are the same, X includes first 84 elements in Z2_1, and Y includes $43^{rd}$ to $84^{th}$ elements in Z2_2. This application provides a structure of the target part in the CEF when the CB is equal to 3, and an STF with this structure has a relatively low PAPR.

With reference to the twenty-fourth possible implementation of the first aspect, in a twenty-seventh possible implementation of the first aspect, or with reference to the twenty-fourth possible implementation of the second aspect, in a twenty-seventh possible implementation of the second aspect, or with reference to the twenty-fourth possible implementation of the third aspect, in a twenty-seventh possible implementation of the third aspect, or with reference to the twenty-fourth possible implementation of the fourth aspect, in a twenty-seventh possible implementation of the fourth aspect, or with reference to the twenty-fourth possible implementation of the fifth aspect, in a twenty-seventh possible implementation of the fifth aspect, or with reference to the twenty-fourth possible implementation of the sixth aspect, in a twenty-seventh possible implementation of the sixth aspect, when the CB of the spectrum resource is equal to 4, the target part is G4, and G4={Z2_1, ±X, ±Z2_2, ±Q, 0, 0, 0, ±P, ±Z2_3, ±Y, ±Z2_4}, where Z2_n={E, ±F, ±G, ±H}, n≥1, E, F, G, and H are all ZC sequences whose lengths are 84, A, B, C, D, E, F, G, and H are different, X includes first 84 elements in Z2_1, Y includes first 84 elements in Z2_2, P includes first to $42^{nd}$ elements in Z2_1, and Q includes $43^{rd}$ to $84^{th}$ elements in Z2_1. This application provides a structure of the target part in the CEF when the CB is equal to 4, and an STF with this structure has a relatively low PAPR.

With reference to the second possible implementation of the first aspect, in a twenty-eighth possible implementation of the first aspect, or with reference to the second possible implementation of the second aspect, in a twenty-eighth possible implementation of the second aspect, or with reference to the second possible implementation of the third aspect, in a twenty-eighth possible implementation of the third aspect, or with reference to the second possible implementation of the fourth aspect, in a twenty-eighth possible implementation of the fourth aspect, or with reference to the second possible implementation of the fifth aspect, in a twenty-eighth possible implementation of the fifth aspect, or with reference to the second possible implementation of the sixth aspect, in a twenty-eighth possible implementation of the sixth aspect, the sub-sequence includes: 80 basic elements arranged into the Golay sequence in the sub-sequence and four interpolation elements; and when a CB of the spectrum resource is equal to 1, a target part in the CEF is G1, the target part includes a data part and a direct current part, the data part includes the plurality of sub-sequences, and G1={A, ±B, 0, 0, 0, ±C, ±D}, where A, B, C, and D all represent sequences whose lengths are 84 and all belong to a sequence set formed by T1, T2, T3, and T4, and A, B, C, and D are different; and T1={−C1, −1, C2, 1, C1, −1, C2, −1}, T2={C1, 1, −C2, −1, C1, 1, C2, −1}, T3={C1, −1, C2, 1, −C1, −1, C2, −1}, T4={C1, −1, C2, 1, C1, 1, −C2, 1}, C1 and C2 represent two Golay sequences whose lengths are both 20, −C1 represents −1 times C1, −C2 represents −1 times C2, and ± represents + or −. This application provides a structure of the target part in the CEF when the CB is equal to 1, and an STF with this structure has a relatively low PAPR.

With reference to the twenty-eighth possible implementation of the first aspect, in a twenty-ninth possible implementation of the first aspect, or with reference to the twenty-eighth possible implementation of the second aspect, in a twenty-ninth possible implementation of the second aspect, or with reference to the twenty-eighth possible implementation of the third aspect, in a twenty-ninth possible implementation of the third aspect, or with reference to the twenty-eighth possible implementation of the fourth aspect, in a twenty-ninth possible implementation of the fourth aspect, or with reference to the twenty-eighth possible implementation of the fifth aspect, in a twenty-ninth possible implementation of the fifth aspect, or with reference to the twenty-eighth possible implementation of the sixth aspect, in a twenty-ninth possible implementation of the sixth aspect, when the CB of the spectrum resource is equal to 2, the target part is G2, and G2={Z2_1, ±X, 0, 0, 0, ±Y, ±Z2_2}, where Z2_n={E, ±F, ±G, ±H}, n≥1, E, F, G, and H all belong to a sequence set formed by T5, T6, T7, and T8, E, F, G, and H are different, X includes first to $42^{nd}$ elements in Z2_1, and Y includes $43^{rd}$ to $84^{th}$ elements in Z2_1;

T5={−S1, −1, S2, 1, S1, −1, S2, −1}; T6={S1, −1, −S2, 1, S1, 1, S2, −1}; T7={S1, −1, S2, −1, −S1, 1, S2, −1}; T8={S1, 1, S2, −1, S1, 1, −S2, −1}; and S1 and S2 represent two Golay sequences whose lengths are both 20, −S1 represents −1 times S1, and −S2 represents −1 times S2. This application provides a structure of the target part in the CEF when the CB is equal to 2, and an STF with this structure has a relatively low PAPR.

With reference to the twenty-eighth possible implementation of the first aspect, in a thirtieth possible implementation of the first aspect, or with reference to the twenty-eighth possible implementation of the second aspect, in a thirtieth possible implementation of the second aspect, or with reference to the twenty-eighth possible implementation of the third aspect, in a thirtieth possible implementation of the third aspect, or with reference to the twenty-eighth possible implementation of the fourth aspect, in a thirtieth possible implementation of the fourth aspect, or with reference to the twenty-eighth possible implementation of the fifth aspect, in a thirtieth possible implementation of the fifth aspect, or with reference to the twenty-eighth possible implementation of the sixth aspect, in a thirtieth possible implementation of the sixth aspect, when the CB of the spectrum resource is equal to 3, the target part is G3, and G3={Z2_1, ±X, ±Z1_1, ±Y, ±Z2_2}, where Z2_n={E, ±F, ±G, ±H}, n≥1, E, F, G, and H all belong to a sequence set formed by T5, T6, T7, and T8, E, F, G, and H are different, structures of Z1_n and G1 are the same, X includes first 84 elements in Z2_1, and Y includes first 84 elements in Z2_2;

T5={−S1, −1, S2, 1, S1, −1, S2, −1}; T6={S1, −1, −S2, 1, S1, 1, S2, −1}; T7={S1, −1, S2, −1, −S1, 1, S2, −1}; T8={S1, 1, S2, −1, S1, 1, −S2, −1}; and S1 and S2 represent two Golay sequences whose lengths are both 20, −S1 represents −1 times S1, and −S2 represents −1 times S2. This application provides a structure of the target part in the CEF when the CB is equal to 3, and an STF with this structure has a relatively low PAPR.

With reference to the twenty-eighth possible implementation of the first aspect, in a thirty-first possible implementation of the first aspect, or with reference to the twenty-eighth possible implementation of the second aspect, in a thirty-first possible implementation of the second aspect, or with reference to the twenty-eighth possible implementation of the third aspect, in a thirty-first possible implementation of the third aspect, or with reference to the twenty-eighth possible implementation of the fourth aspect, in a thirty-first possible implementation of the fourth aspect, or with reference to the twenty-eighth possible implementation of the fifth aspect, in a thirty-first possible implementation of the fifth aspect, or with reference to the twenty-eighth possible implementation of the sixth aspect, in a thirty-first possible implementation of the sixth aspect, when the CB of the spectrum resource is equal to 4, the target part is G4, and G4={Z2_1, ±X, ±Z2_2, ±Q, 0, 0, 0, ±P, ±Z2_3, ±Y, ±Z2_4}, where Z2_n={E, ±F, ±G, ±H}, n≥1, E, F, G, and H all belong to a sequence set formed by T5, T6, T7, and T8, E, F, G, and H are different, X includes first 84 elements in Z2_1, Y includes first 84 elements in Z2_2, P includes first to $42^{nd}$ elements in Z2_1, and Q includes $43^{rd}$ to $84^{th}$ elements in Z2_1; T5={−S1, −1, S2, 1, S1, −1, S2, −1}; T6={S1, −1, −S2, 1, S1, 1, S2, −1}; T7={S1, −1, S2, −1, −S1, 1, S2, −1}; T8={S1, 1, S2, −1, S1, 1, −S2, −1}; and S1 and S2 represent two Golay sequences whose lengths are both 20, −S1 represents −1 times S1, and −S2 represents −1 times S2. This application provides a structure of the target part in the CEF when the CB is equal to 4, and an STF with this structure has a relatively low PAPR.

With reference to the first aspect or the first possible implementation of the first aspect, in a thirty-second possible implementation of the first aspect, or with reference to the second aspect or the first possible implementation of the second aspect, in a thirty-second possible implementation of the second aspect, or with reference to the third aspect or the first possible implementation of the third aspect, in a thirty-second possible implementation of the third aspect, or with reference to the fourth aspect or the first possible implementation of the fourth aspect, in a thirty-second possible implementation of the fourth aspect, or with reference to the fifth aspect or the first possible implementation of the fifth aspect, in a thirty-second possible implementation of the fifth aspect, or with reference to the sixth aspect or the first possible implementation of the sixth aspect, in a thirty-second possible implementation of the sixth aspect, the sub-sequence includes: 80 basic elements arranged into the Golay sequence in the sub-sequence, and each element in the sub-sequence belongs to a target element set including 1 and −1; and when a CB of the spectrum resource is equal to 1, a target part in the CEF is G1, the target part includes a data part and a direct current part, the data part includes the plurality of sub-sequences, and G1={A, ±B, 0, 0, 0, ±C, ±D}, where A, B, C, and D all represent Golay sequences whose lengths are 80, A, B, C, and D are different, a structure of each sequence in A, B, C, and D is the same as a structure of T1 or T2, $$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two Golay sequences whose lengths are both 10, S1 and S2 represent two Golay sequences whose lengths are both 8, ⊗ represents a Kronecker product, $\overleftarrow{S1}$ represents a reverse order of S1, $\overleftarrow{S2}$ represents a reverse order of S2, and ± represents + or −. This application provides a structure of the target part in the CEF when the CB is equal to 1, and an STF with this structure has a relatively low PAPR.

With reference to the first aspect or the first possible implementation of the first aspect, in a thirty-third possible implementation of the first aspect, or with reference to the second aspect or the first possible implementation of the second aspect, in a thirty-third possible implementation of the second aspect, or with reference to the third aspect or the first possible implementation of the third aspect, in a thirty-third possible implementation of the third aspect, or with reference to the fourth aspect or the first possible implementation of the fourth aspect, in a thirty-third possible implementation of the fourth aspect, or with reference to the fifth aspect or the first possible implementation of the fifth aspect, in a thirty-third possible implementation of the fifth aspect, or with reference to the sixth aspect or the first possible implementation of the sixth aspect, in a thirty-third possible implementation of the sixth aspect, the sub-sequence includes: 80 basic elements arranged into the Golay sequence in the sub-sequence, and each element in the sub-sequence belongs to a target element set including 1, −1, j, and −j, where j is an imaginary unit; and when a CB of the spectrum resource is equal to 1, a target part in the CEF is G1, the target part includes a data part and a direct current part, the data part includes the plurality of sub-sequences, and G1={A, ±B, 0, 0, 0, ±C, ±D}, where A, B, C, and D all represent Golay sequences whose lengths are 80, A, B, C, and D are different, a structure of each sequence in A, B, C, and D is the same as a structure of T1 or T2, $$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two Golay sequences whose lengths are both 5, S1 and S2 represent two Golay sequences whose lengths are both 16, ⊗ represents a Kronecker product, $\overleftarrow{S1}$ represents a reverse order of S1, $\overleftarrow{S2}$ represents a reverse order of S2, and ± represents + or −. This application provides a structure of the target part in the CEF when the CB is equal to 1, and an STF with this structure has a relatively low PAPR.

With reference to the thirty-second possible implementation or the thirty-third possible implementation of the first aspect, in a thirty-fourth possible implementation of the first aspect, or with reference to the thirty-second possible implementation or the thirty-third possible implementation of the second aspect, in thirty-fourth possible implementations of the second aspect, or with reference to the third aspect or the first possible implementation of the third aspect, in a thirty-fourth possible implementation of the third aspect, or with reference to the fourth aspect or the first possible implementation of the fourth aspect, in a thirty-fourth possible implementation of the fourth aspect, or with reference to the fifth aspect or the first possible implementation of the fifth aspect, in a thirty-fourth possible implementation of the fifth aspect, or with reference to the sixth aspect or the first possible implementation of the sixth aspect, in a thirty-fourth possible implementation of the sixth aspect, when the CB of the spectrum resource is equal to 2, the target part is G2, and G2={Z2_1, ±X, 0, 0, 0, ±Y, ±Z2_2}, where Z2 n={E, ±F, ±G, ±H}, n≥1, E, F, G, and H all represent Golay sequences whose lengths are 80, E, F, G, and H are different, a structure of each sequence in A, B, C, and D is the same as a structure of one sequence in T1 and T2, a structure of each sequence in E, F, G, and H is the same as a structure of the other sequence in T1 and T2, X includes first to $40^{th}$ elements in Z2_1, and Y includes $41^{st}$ to $80^{th}$ elements in Z2_1. This application provides a structure of the target part in the CEF when the CB is equal to 2, and an STF with this structure has a relatively low PAPR.

With reference to the thirty-second possible implementation or the thirty-third possible implementation of the first aspect, in a thirty-fifth possible implementation of the first aspect, or with reference to the thirty-second possible implementation or the thirty-third possible implementation of the second aspect, in a thirty-fifth possible implementation of the second aspect, when the CB of the spectrum resource is equal to 3, the target part is G3, and G3={Z2_1, ±X, ±Z1_1, ±Y, ±Z2_2}, where Z2 n={E, ±F, ±G, ±H}, n≥1, E, F, G, and H all represent Golay sequences whose lengths are 80, E, F, G, and H are different, a structure of each sequence in A, B, C, and D is the same as a structure of one sequence in T1 and T2, a structure of each sequence in E, F, G, and H is the same as a structure of the other sequence in T1 and T2, structures of Z1_n and G1 are the same, X includes first 80 elements in Z2_1, and Y includes first 80 elements in Z2_2. This application provides a structure of the target part in the CEF when the CB is equal to 3, and an STF with this structure has a relatively low PAPR.

With reference to the thirty-second possible implementation or the thirty-third possible implementation of the first aspect, in a thirty-sixth possible implementation of the first aspect, or with reference to the thirty-second possible implementation or the thirty-third possible implementation of the second aspect, in a thirty-sixth possible implementation of the second aspect, or with reference to the thirty-second possible implementation or the thirty-third possible implementation of the third aspect, in a thirty-sixth possible implementation of the third aspect, or with reference to the thirty-second possible implementation or the thirty-third possible implementation of the fourth aspect, in a thirty-sixth possible implementation of the fourth aspect, or with reference to the thirty-second possible implementation or the thirty-third possible implementation of the fifth aspect, in a thirty-sixth possible implementation of the fifth aspect, or with reference to the thirty-second possible implementation or the thirty-third possible implementation of the sixth aspect, in a thirty-sixth possible implementation of the sixth aspect, when the CB of the spectrum resource is equal to 4, the target part is G4, and G4={Z2_1, ±X, ±Z2_2, ±Q, 0, 0, 0, ±P, ±Z2_3, ±Y, ±Z2_4}, where Z2_n={E, ±F, ±G, ±H}, n≥1, E, F, G, and H all represent Golay sequences whose lengths are 80, E, F, G, and H are different, a structure of each sequence in A, B, C, and D is the same as a structure of one sequence in T1 and T2, a structure of each sequence in E, F, G, and H is the same as a structure of the other sequence in T1 and T2, X includes first 80 elements in Z2_1, Y includes first 80 elements in Z2_2, P includes $81^{st}$ to $160^{th}$ elements in Z2_1, and Q includes first 80 elements in Z2_1. This application provides a structure of the target part in the CEF when the CB is equal to 4, and an STF with this structure has a relatively low PAPR.

With reference to the second possible implementation of the first aspect, in a thirty-seventh possible implementation of the first aspect, or with reference to the second possible implementation of the second aspect, in a thirty-seventh possible implementation of the second aspect, or with reference to the second possible implementation of the third aspect, in a thirty-seventh possible implementation of the third aspect, or with reference to the second possible implementation of the fourth aspect, in a thirty-seventh possible implementation of the fourth aspect, or with reference to the second possible implementation of the fifth aspect, in a thirty-seventh possible implementation of the fifth aspect, or with reference to the second possible implementation of the sixth aspect, in a thirty-seventh possible implementation of the sixth aspect, the sub-sequence includes: 80 basic elements arranged into the Golay sequence in the sub-sequence and four interpolation elements located after the 80 basic elements; and when a CB of the spectrum resource is equal to 1, a target part in the CEF is G1, the target part includes a data part and a direct current part, the data part includes the plurality of sub-sequences, and G1={U1, ±U2, 0, 0, 0, ±U3, ±U4}, where U1, U2, U3, and U4 all belong to a sequence set formed by A, −A, *A, and A*, A represents a sequence whose length is 84, −A represents −1 times A, a $(2k+1)^{th}$ element in *A is −1 times a $(2k+1)^{th}$ element in A, a $(2k+2)^{th}$ element in *A is the same as a $(2k+2)^{th}$ element in A, a $(2k+1)^{th}$ element in A* is the same as the $(2k+1)^{th}$ element in A, a $(2k+2)^{th}$ element in A* is −1 times the $(2k+2)^{th}$ element in A, and k≥0; a sequence in which 80 elements are arranged in A is T1 or T2, $$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two Golay sequences whose lengths are both 10, S1 and S2 represent two Golay sequences whose lengths are both 8, ⊗ represents a Kronecker product, $\overleftarrow{S1}$ represents a reverse order of S1, $\overleftarrow{S2}$ represents a reverse order of S2, and ± represents + or −. This application provides a structure of the target part in the CEF when the CB is equal to 1, and an STF with this structure has a relatively low PAPR.

With reference to the second possible implementation of the first aspect, in a thirty-eighth possible implementation of the first aspect, or with reference to the second possible implementation of the second aspect, in a thirty-eighth possible implementation of the second aspect, or with reference to the second possible implementation of the third aspect, in a thirty-eighth possible implementation of the third aspect, or with reference to the second possible implementation of the fourth aspect, in a thirty-eighth possible implementation of the fourth aspect, or with reference to the second possible implementation of the fifth aspect, in a thirty-eighth possible implementation of the fifth aspect, or with reference to the second possible implementation of the sixth aspect, in a thirty-eighth possible implementation of the sixth aspect, the sub-sequence includes: 80 basic elements arranged into the Golay sequence in the sub-sequence; and when a CB of the spectrum resource is equal to 1, a target part in the CEF is G1, the target part includes a data part and a direct current part, the data part includes the plurality of sub-sequences, and G1={U1, ±U2, 0, 0, 0, ±U3, ±U4}, where U1, U2, U3, and U4 all belong to a sequence set formed by A, −A, *A, and A*, A represents a Golay sequence whose length is 80, −A represents −1 times A, a $(2k+1)^{th}$ element in *A is −1 times a $(2k+1)^{th}$ element in A, a $(2k+2)^{th}$ element in *A is the same as a $(2k+2)^{th}$ element in A, a $(2k+1)^{th}$ element in A* is the same as the $(2k+1)^{th}$ element in A, a $(2k+2)^{th}$ element in A* is −1 times the $(2k+2)^{th}$ element in A, and k≥0; A is T1 or T2, $$T1 = C1 \otimes \frac{S1+S2}{2} + C2 \otimes \frac{S1-S2}{2}, \text{ and}$$

$$T2 = C1 \otimes \frac{\overleftarrow{S1}-\overleftarrow{S2}}{2} - C2 \otimes \frac{\overleftarrow{S1}+\overleftarrow{S2}}{2};$$

and C1 and C2 represent two Golay sequences whose lengths are both 10, S1 and S2 represent two Golay sequences whose lengths are both 8, ⊗ represents a Kronecker product, $\overleftarrow{S1}$ represents a reverse order of S1, $\overleftarrow{S2}$ represents a reverse order of S2, and ± represents + or −. This application provides a structure of the target part in the CEF when the CB is equal to 1, and an STF with this structure has a relatively low PAPR.

With reference to the second possible implementation of the first aspect, in a thirty-ninth possible implementation of the first aspect, or with reference to the second possible implementation of the second aspect, in a thirty-ninth possible implementation of the second aspect, or with reference to the second possible implementation of the third aspect, in a thirty-ninth possible implementation of the third aspect, or with reference to the second possible implementation of the fourth aspect, in a thirty-ninth possible implementation of the fourth aspect, or with reference to the second possible implementation of the fifth aspect, in a thirty-ninth possible implementation of the fifth aspect, or with reference to the second possible implementation of the sixth aspect, in a thirty-ninth possible implementation of the sixth aspect, the target element set further includes j and −j, where j represents an imaginary unit; the sub-sequence includes: 80 basic elements arranged into the Golay sequence in the sub-sequence; and when a CB of the spectrum resource is equal to 1, a target part in the CEF is G1, the target part includes a data part and a direct current part, the data part includes the plurality of sub-sequences, and G1={U1, ±U2, 0, 0, 0, ±U3, ±U4}, where U1, U2, U3, and U4 all belong to a sequence set formed by A, −A, *A, and A*, A is T1 or T2, $$T1 = C1 \otimes \frac{S1+S2}{2} + C2 \otimes \frac{S1-S2}{2}, \text{ and}$$

$$T2 = C1 \otimes \frac{\overleftarrow{S1}-\overleftarrow{S2}}{2} - C2 \otimes \frac{\overleftarrow{S1}+\overleftarrow{S2}}{2};$$

C1 and C2 represent two Golay sequences whose lengths are both 5, S1 and S2 represent two Golay sequences whose lengths are both 16, ⊗ represents a Kronecker product, $\overleftarrow{S1}$ represents a reverse order of S1, $\overleftarrow{S2}$ represents a reverse order of S2, and ± represents + or −; and for any sequence E, −E represents −1 times E, a $(2k+1)^{th}$ element in *E is −1 times a $(2k+1)^{th}$ element in E, a $(2k+2)^{th}$ element in *E is the same as a $(2k+2)^{th}$ element in E, a $(2k+1)^{th}$ element in E* is the same as the $(2k+1)^{th}$ element in E, a $(2k+2)^{th}$ element in E* is −1 times the $(2k+2)^{th}$ element in E, and k≥0. This application provides a structure of the target part in the CEF when the CB is equal to 1, and an STF with this structure has a relatively low PAPR.

With reference to the thirty-eighth possible implementation or the thirty-ninth possible implementation of the first aspect, in a fortieth possible implementation of the first aspect, or with reference to the thirty-eighth possible implementation or the thirty-ninth possible implementation of the second aspect, in a fortieth possible implementation of the second aspect, or with reference to the thirty-eighth possible implementation or the thirty-ninth possible implementation of the third aspect, in a fortieth possible implementation of the third aspect, or with reference to the thirty-eighth possible implementation or the thirty-ninth possible implementation of the fourth aspect, in a fortieth possible implementation of the fourth aspect, or with reference to the thirty-eighth possible implementation or the thirty-ninth possible implementation of the fifth aspect, in a fortieth possible implementation of the fifth aspect, or with reference to the thirty-eighth possible implementation or the thirty-ninth possible implementation of the sixth aspect, in a fortieth possible implementation of the sixth aspect, when the CB of the spectrum resource is equal to 2, the target part is G2, and G2={Z2_1, ±X, 0, 0, 0, ±Y, ±Z2_2}, where Z2_n belongs to a sequence set formed by V, −V, *V, and *V', and V={U1, ±U2, ±U3, ±U4}; and X includes first to 0.5 $m^{th}$ elements in Z2_1, Y includes 0.5 $m^{th}$ to $m^{th}$ elements in Z2_1, m is the quantity of elements in the sub-sequence, and m≥80. This application provides a structure of the target part in the CEF when the CB is equal to 2, and an STF with this structure has a relatively low PAPR.

With reference to the thirty-eighth possible implementation or the thirty-ninth possible implementation of the first aspect, in a forty-first possible implementation of the first aspect, or with reference to the thirty-eighth possible implementation or the thirty-ninth possible implementation of the second aspect, in a forty-first possible implementation of the second aspect, or with reference to the thirty-eighth possible implementation or the thirty-ninth possible implementation of the third aspect, in a forty-first possible implementation of the third aspect, or with reference to the thirty-eighth possible implementation or the thirty-ninth possible implementation of the fourth aspect, in a forty-first possible implementation of the fourth aspect, or with reference to the thirty-eighth possible implementation or the thirty-ninth possible implementation of the fifth aspect, in a forty-first possible implementation of the fifth aspect, or with reference to the thirty-eighth possible implementation or the thirty-ninth possible implementation of the sixth aspect, in a forty-first possible implementation of the sixth aspect, when the CB of the spectrum resource is equal to 3, the target part is G3, and G3={Z2_1, ±X, ±Z1_1, ±Y, ±Z2_2}, where Z2_n belongs to a sequence set formed by V, −V, *V and *V', and V={U1, ±U2, ±U3, ±U4}; Z1_n belongs to a sequence set formed by G1, −G1, *G1, and *G1'; and X includes first m elements in Z2_1, Y includes first m elements in Z2_2, m is the quantity of elements in the sub-sequence, and m≥80. This application provides a structure of the target part in the CEF when the CB is equal to 3, and an STF with this structure has a relatively low PAPR.

With reference to the thirty-seventh possible implementation of the first aspect, in a forty-second possible implementation of the first aspect, or with reference to the thirty-seventh possible implementation of the second aspect, in a forty-second possible implementation of the second aspect, or with reference to the thirty-seventh possible implementation of the third aspect, in a forty-second possible implementation of the third aspect, or with reference to the thirty-seventh possible implementation of the fourth aspect, in a forty-second possible implementation of the fourth aspect, or with reference to the thirty-seventh possible implementation of the fifth aspect, in a forty-second possible implementation of the fifth aspect, or with reference to the thirty-seventh possible implementation of the sixth aspect, in a forty-second possible implementation of the sixth aspect, when the CB of the spectrum resource is equal to 4, the target part is G4, and G4={Z2_1, ±X, ±Z2_2, ±Q, 0, 0, 0, ±P, ±Z2_3, ±Y, ±Z2_4}, where Z2_n belongs to a sequence set formed by V, −V, *V, and *V', and V={U1, ±U2, ±U3, ±U4}; and X includes first 84 elements in Z2_1, Y includes first 84 elements in Z2_2, P includes first to $42^{nd}$ elements in Z2_1, and Q includes $43^{rd}$ to $84^{th}$ elements in Z2_1. This application provides a structure of the target part in the CEF when the CB is equal to 4, and an STF with this structure has a relatively low PAPR.

With reference to the thirty-eighth possible implementation or the thirty-ninth possible implementation of the first aspect, in a forty-third possible implementation of the first aspect, or with reference to the thirty-eighth possible implementation or the thirty-ninth possible implementation of the second aspect, in a forty-third possible implementation of the second aspect, or with reference to the thirty-eighth possible implementation or the thirty-ninth possible implementation of the third aspect, in a forty-third possible implementation of the third aspect, or with reference to the thirty-eighth possible implementation or the thirty-ninth possible implementation of the fourth aspect, in a forty-third possible implementation of the fourth aspect, or with reference to the thirty-eighth possible implementation or the thirty-ninth possible implementation of the fifth aspect, in a forty-third possible implementation of the fifth aspect, or with reference to the thirty-eighth possible implementation or the thirty-ninth possible implementation of the sixth aspect, in a forty-third possible implementation of the sixth aspect, when the CB of the spectrum resource is equal to 4, the target part is G4, and G4={Z2_1, ±X, ±Z2_2, ±Q, 0, 0, 0, ±P, ±Z2_3, ±Y, ±Z2_4}, where Z2_n belongs to a sequence set formed by V, −V, *V and *V', and V={U1, ±U2, ±U3, ±U4}; and X includes first 80 elements in Z2_1, Y includes first 80 elements in Z2_2, P includes $81^{st}$ to $160^{th}$ elements in Z2_1, and Q includes first to $80^{th}$ elements in Z2_1. This application provides a structure of the target part in the CEF when the CB is equal to 4, and an STF with this structure has a relatively low PAPR.

In the embodiments of this application, when the spectrum resource includes a plurality of bonded channels, the CEF in the PPDU may be obtained based on the CEF in the PPDU when the spectrum resource includes one bonded channel. Therefore, in the embodiments of this application, a process of generating the CEF in the PPDU is relatively simple.

In a forty-fourth possible implementation of the sixth aspect, the data transmission apparatus further includes a transceiver. When the processing circuit is configured to perform a processing step in the first aspect to process the to-be-processed information, the output interface is configured to output the information processed by the processing circuit to the transceiver, and the transceiver is configured to transmit the information processed by the processing circuit. When the processing circuit is configured to perform a processing step in the second aspect to process the to-be-processed information, the transceiver is configured to receive the information to be processed by the processing circuit, and transmit the information to be processed by the processing circuit to the input interface.

According to a seventh aspect, a data transmission system is provided. The data transmission system includes a transmit end and at least one receive end. The transmit end includes the data transmission apparatus according to any one of the third aspect or the possible implementations of the third aspect. The receive end includes the data transmission apparatus according to any one of the fourth aspect or the possible implementations of the fourth aspect.

According to an eighth aspect, a computer readable storage medium is provided. The storage medium stores a computer program, and the computer program includes instructions used to perform the method according to any one of the first aspect or the possible implementations of the first aspect, or the computer program includes instructions used to perform the method according to any one of the second aspect or the possible implementations of the second aspect.

According to a ninth aspect, a computer program including instructions is provided. The computer program includes instructions used to perform the method according to any one of the first aspect or the possible implementations of the first aspect, or the computer program includes instructions used to perform the method according to any one of the second aspect or the possible implementations of the second aspect.

BRIEF DESCRIPTION OF DRAWINGS

FIG. 27 is a schematic diagram of another PAPR according to an embodiment of this application;

FIG. 28 is a schematic diagram of another PAPR according to an embodiment of this application;

FIG. 29 is a schematic diagram of another PAPR according to an embodiment of this application;

FIG. 30 is a schematic diagram of another PAPR according to an embodiment of this application;

FIG. 31 is a schematic diagram of another PAPR according to an embodiment of this application;

FIG. 32 is a schematic diagram of another PAPR according to an embodiment of this application;

FIG. 33 is a schematic diagram of another PAPR according to an embodiment of this application;

FIG. 34 is a schematic diagram of another PAPR according to an embodiment of this application;

FIG. 35 is a schematic diagram of another PAPR according to an embodiment of this application;

FIG. 36 is a schematic diagram of another PAPR according to an embodiment of this application;

FIG. 37 is a schematic diagram of another PAPR according to an embodiment of this application;

FIG. 38 is a schematic diagram of another PAPR according to an embodiment of this application;

FIG. 39 is a schematic diagram of another PAPR according to an embodiment of this application;

FIG. 40 is a schematic diagram of another PAPR according to an embodiment of this application;

FIG. 41 is a schematic diagram of another PAPR according to an embodiment of this application;

FIG. 42 is a schematic diagram of another PAPR according to an embodiment of this application;

FIG. 43 is a schematic diagram of another PAPR according to an embodiment of this application;

FIG. 44 is a schematic diagram of another PAPR according to an embodiment of this application;

FIG. 45 is a schematic diagram of another PAPR according to an embodiment of this application;

FIG. 46 is a schematic diagram of another PAPR according to an embodiment of this application;

FIG. 47 is a schematic diagram of another PAPR according to an embodiment of this application;

FIG. 48 is a schematic diagram of another PAPR according to an embodiment of this application;

FIG. 49 is a schematic diagram of another PAPR according to an embodiment of this application;

FIG. 50 is a schematic diagram of another PAPR according to an embodiment of this application;

FIG. 51 is a schematic diagram of another PAPR according to an embodiment of this application;

FIG. 52 is a schematic diagram of another PAPR according to an embodiment of this application;

FIG. 53 is a schematic diagram of another PAPR according to an embodiment of this application;

FIG. 54 is a schematic diagram of another PAPR according to an embodiment of this application;

FIG. 55 is a schematic diagram of another PAPR according to an embodiment of this application;

FIG. 56 is a schematic diagram of another PAPR according to an embodiment of this application;

FIG. 57 is a schematic diagram of another PAPR according to an embodiment of this application;

FIG. 58 is a schematic diagram of another PAPR according to an embodiment of this application;

FIG. 59 is a schematic diagram of another PAPR according to an embodiment of this application;

FIG. 64 is a schematic diagram of another PAPR according to an embodiment of this application;

FIG. 65 is a schematic diagram of another PAPR according to an embodiment of this application;

FIG. 66 is a schematic diagram of another PAPR according to an embodiment of this application;

FIG. 67 is a schematic diagram of another PAPR according to an embodiment of this application;

FIG. 70 is a schematic diagram of another PAPR according to an embodiment of this application;

FIG. 71 is a schematic diagram of another PAPR according to an embodiment of this application;

FIG. 72 is a schematic diagram of another PAPR according to an embodiment of this application;

FIG. 73 is a schematic diagram of another PAPR according to an embodiment of this application;

DESCRIPTION OF EMBODIMENTS

To make the objectives, technical solutions, and advantages of this application clearer, the following further describes the embodiments of this application in detail with reference to the accompanying drawings.

Figure 1:
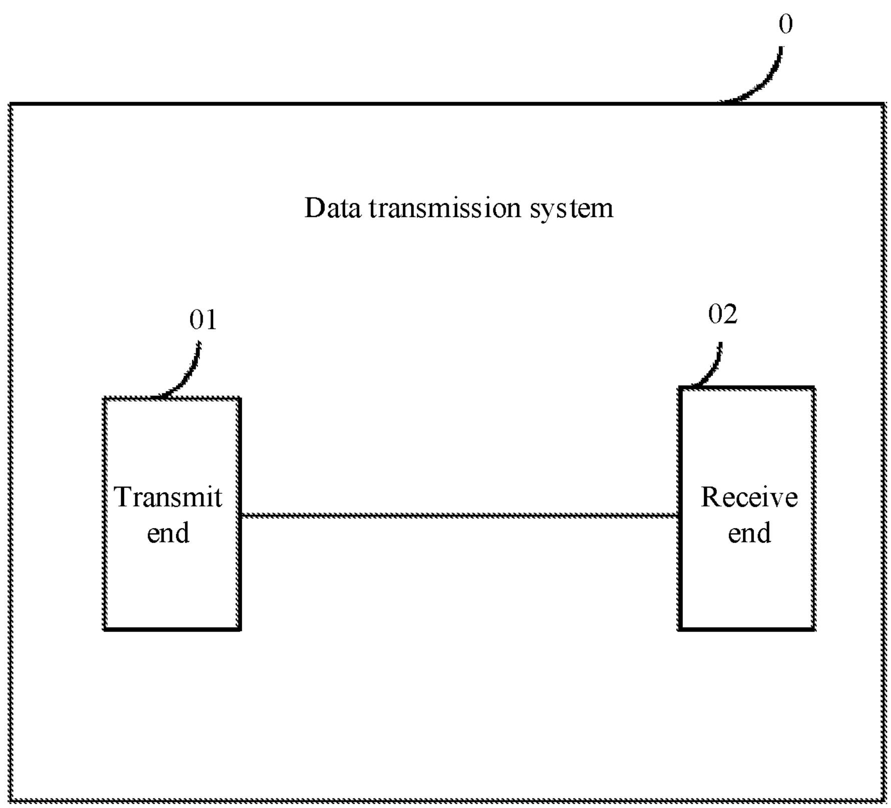
FIG. 1 is a schematic structural diagram of a data transmission system according to an embodiment of this application.

FIG. 1 is a schematic structural diagram of a data transmission system according to an embodiment of this application. As shown in FIG. 1, the data transmission system 0 may include a transmit end 01 and a receive end 02. The transmit end may establish a wireless communication connection to the receive end.

It should be noted that the data transmission system 0 may include one receive end 02, or may include a plurality of receive ends 02. Only one receive end 02 is shown in FIG. 1. In some embodiments, one of the transmit end 01 and the receive end 02 may be a device such as a base station or a wireless access point (AP), and the other one may be user equipment (UE). In some embodiments of this application, it is assumed that the transmit end 01 is a base station, and that the receive end 02 is UE (for example, a mobile phone or a computer). Optionally, the transmit end 01 may alternatively be UE, and the receive end 02 may alternatively be a base station or an AP. This is not limited in this embodiment of this application.

The transmit end 01 and the receive end 02 in FIG. 1 may transmit data in a 60 GHz frequency band by transmitting a PPDU. The PPDU includes a preamble and a data field that carries to-be-transmitted data, and the preamble supports to determine various parameters of the data field. For example, a CEF in the preamble supports estimation on a channel for transmitting the data field, and the receive end can estimate, based on the CEF, the channel for transmitting the data field. In the related art, a manner of generating a CEF by a transmit end is relatively undiversified, and a manner of generating a PPDU is also relatively undiversified. Therefore, an embodiment of this application provides a new data transmission method. A manner of generating a CEF in the data transmission method is different from that in the related art, and a manner of generating a PPDU is also different from that in the related art.

Figure 2:
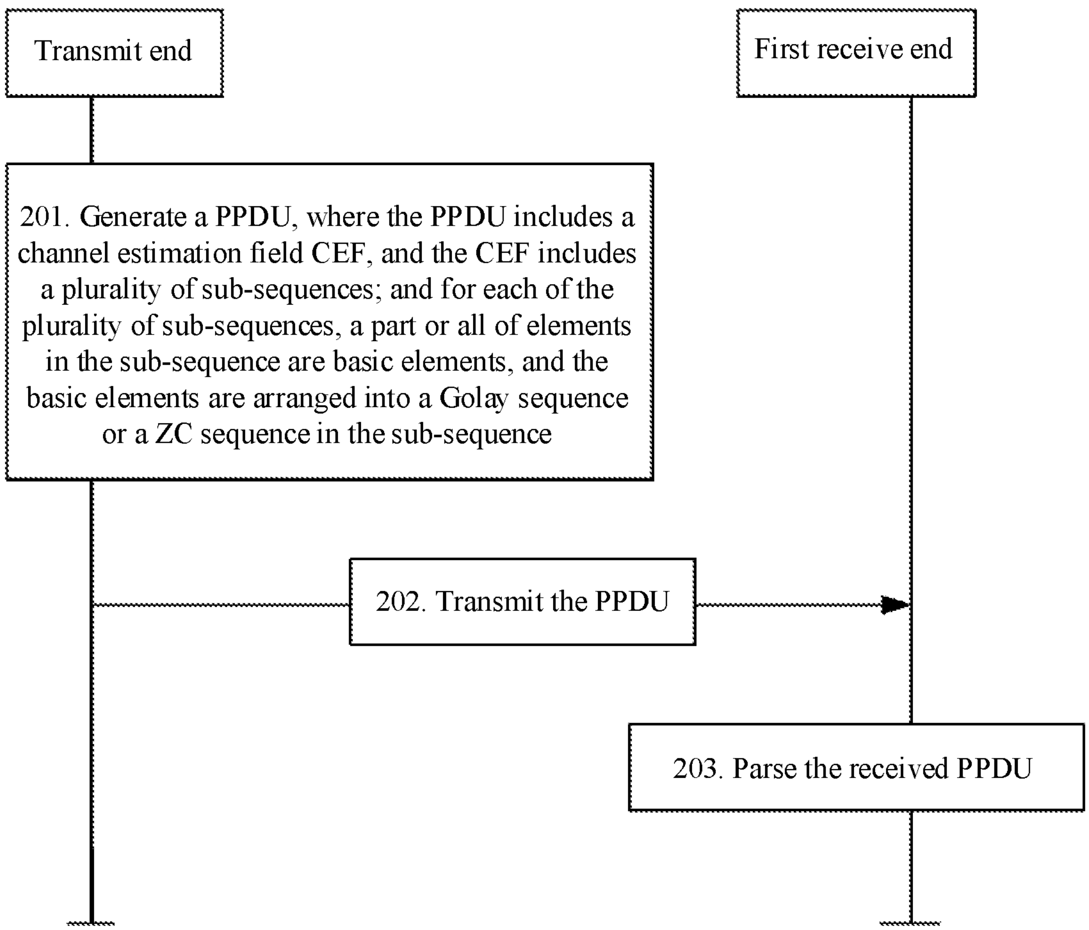
FIG. 2 is a flowchart of a data transmission method according to an embodiment of this application.

For example, FIG. 2 is a flowchart of a data transmission method according to an embodiment of this application. The data transmission method may be used in the data transmission system shown in FIG. 1. As shown in FIG. 2, the data transmission method may include the following steps.

Step 201: A transmit end generates a PPDU, where the PPDU includes a channel estimation field (CEF), and the CEF includes a plurality of sub-sequences. For each of the plurality of sub-sequences, a part or all of elements in the sub-sequence are basic elements, and the basic elements are arranged into a Golay sequence or a Zadoff-Chu (ZC) sequence in the sub-sequence.

In step 201, the transmit end may generate a PPDU based on to-be-transmitted data. The PPDU may include a preamble and a data field, the preamble may also include a CFF, and the data field may carry the to-be-transmitted data. Optionally, the PPDU may further include other parts than the preamble and the data field, for example, a reserved bit. The preamble may further include other parts than the CEF, for example, an STF. This is not limited in this embodiment of this application.

Figure 3:
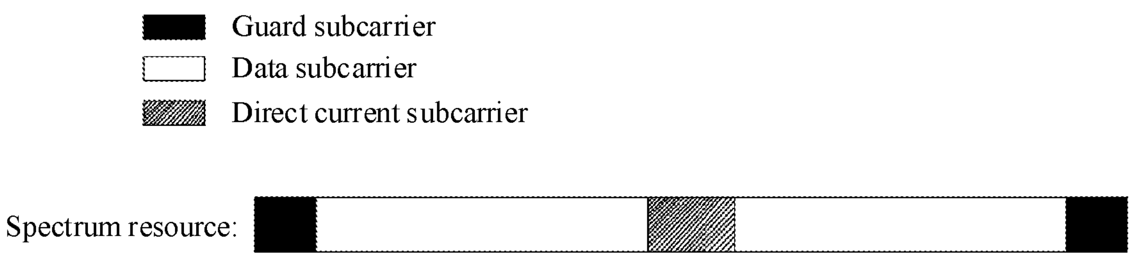
FIG. 3 is a schematic structural diagram of a spectrum resource used to transmit a CEF according to an embodiment of this application.

It should be noted that the CEF in the PPDU can be transmitted on a spectrum resource. The spectrum resource may be divided into a plurality of subcarriers, the plurality of subcarriers are in a one-to-one correspondence to elements in the CEF, and each element is transmitted on a subcarrier corresponding to the CEF. FIG. 3 is a schematic structural diagram of a spectrum resource used to transmit a CEF according to an embodiment of this application. As shown in FIG. 3, a plurality of subcarriers in the spectrum resource may include two segments of guard subcarriers, one segment of direct current subcarriers, and two segments of data subcarriers. The two segments of data subcarriers are located on two sides of the segment of direct current subcarriers, and the two segments of data subcarriers and the segment of direct current subcarriers are all located between the two segments of guard subcarriers. In an embodiment of this application, a part transmitted on the two segments of data subcarriers (that is, subcarriers other than the direct current subcarriers and the guard subcarriers) in the CEF is referred to as a data part in the CEF, a part transmitted on the segment of direct current subcarriers is referred to as a direct current part in the CEF, and a part transmitted on the two segments of guard subcarriers is referred to as a guard part in the CEF.

Optionally, in some embodiments of this application, the CEF (for example, the data part in the CEF) in the PPDU generated by the transmit end may include a plurality of sub-sequences. For each of the plurality of sub-sequences, a part or all of elements in the sub-sequence are basic elements, and the basic elements are arranged into a Golay sequence or a ZC sequence in the sub-sequence. It means that after the basic elements in the sub-sequence are sequentially arranged in an arrangement order of the basic elements in the sub-sequence, an obtained sequence is a Golay sequence or a ZC sequence. It should be noted that the sub-sequence in this embodiment of this application may include only the foregoing plurality of basic elements, or the sub-sequence may further include interpolation elements in addition to the foregoing plurality of basic elements. This is not limited in this embodiment of this application.

For example, it is assumed that the data part of the CEF is:

{1, 1, −1, 1, −1, 1, −1, −1, 1, 1, 1, 1, −1, 1, 1, 1, 1, 1, −1, −1, 1, 1, −1, 1, −1, 1, −1, −1, 1, 1, −1, −1, 1, −1, −1, −1, −1, −1, 1, 1, 1, 1, −1, 1, −1, 1, −1, −1, 1, 1, 1, 1, −1, 1, 1, 1, 1, 1, −1, −1, 1, 1, −1, 1, −1, 1, −1, −1, 1, 1, −1, −1, 1, −1, −1, −1, −1, −1, 1, 1, 1, 1, −1, 1, −1, 1, −1, −1, 1, 1, 1, 1, −1, 1, 1, 1, 1, 1, −1, −1, 1, 1, −1, 1, −1, 1, −1, −1, 1, 1, −1, −1, 1, −1, −1, −1, −1, −1, 1, 1, 1, 1, −1, 1, −1, 1, −1, −1, 1, 1, 1, 1, −1, 1, 1, 1, 1, 1, −1, −1, 1, 1, −1, 1, −1, 1, −1, −1, 1, 1, −1, −1, 1, −1, −1, −1, −1, −1, 1, 1}.

It can be learned that the CEF includes four sub-sequences, where each sub-sequence includes 40 basic elements, and the 40 basic elements are arranged into a Golay sequence in the sub sequence. The 40 basic elements are: 1, 1, −1, 1, −1, 1, −1, −1, 1, 1, 1, 1, −1, 1, 1, 1, 1, 1, −1, −1, 1, 1, −1, 1, −1, 1, −1, −1, 1, 1, −1, −1, 1, −1, −1, −1, −1, −1, 1, and 1.

For another example, it is assumed that the data part of the CEF is:

{1, 1, −1, 1, −1, 1, −1, −1, 1, 1, 1, 1, −1, 1, 1, 1, 1, 1, −1, −1, 1, 1, −1, 1, −1, 1, −1, −1, 1, 1, −1, −1, 1, −1, −1, −1, −1, −1, 1, 1, 1, 1, 1, 1, 1, −1, 1, −1, 1, −1, −1, 1, 1, 1,

1, −1, 1, 1, 1, 1, 1, −1, −1, 1, 1, −1, 1, −1, 1, −1, −1, 1, 1, −1, −1, 1, −1, −1, −1, −1, −1, 1, 1, 1, 1, 1, 1, 1, −1, 1, −1, 1, −1, −1, 1, 1, 1, 1, −1, 1, 1, 1, 1, 1, −1, −1, 1, 1, −1, 1, −1, 1, −1, −1, 1, 1, −1, −1, 1, −1, −1, −1, −1, −1, 1, 1, 1, 1, 1, 1, 1, −1, 1, −1, 1, −1, −1, 1, 1, 1, 1, −1, 1, 1, 1, 1, 1, −1, −1, 1, 1, −1, 1, −1, 1, −1, −1, 1, 1, −1, −1, 1, 1, −1, −1, −1, −1, 1, 1, 1, 1, 1, 1, 1, −1, 1, −1, 1, −1, −1, 1, 1, 1, 1, −1, 1, 1, 1, 1, 1, −1, −1, 1, 1, −1, 1, −1, 1, −1, −1, 1, 1, −1, −1, 1, −1, −1, −1, −1, −1, 1, 1, 1, 1, 1}.

It can be learned that the CEF includes five sub-sequences, where each sub-sequence includes 40 basic elements and three interpolation elements (all of which are 1) that are located after the 40 basic elements, and the 40 basic elements are arranged into a Golay sequence in the sub sequence. The 40 basic elements are: 1, 1, −1, 1, −1, 1, −1, −1, 1, 1, 1, 1, −1, 1, 1, 1, 1, 1, −1, −1, 1, 1, −1, 1, −1, 1, −1, −1, 1, 1, −1, −1, 1, −1, −1, −1, −1, −1, 1, and 1.

It should be noted that in this embodiment of this application, only the CEF including four sub-sequences and the CEF including five sub-sequences are used as examples. Optionally, a quantity of sub-sequences in the CEF may be another integer greater than or equal to 2, for example, 7 or 8. In addition, in some embodiments of this application, it is alternatively assumed that when the sub sequence includes interpolation elements in addition to the basic elements, the interpolation elements are located after the basic elements, and a quantity of the interpolation elements is 3, and all the interpolation elements are 1. Optionally, the interpolation elements may alternatively be interleaved between the basic elements or located before the basic elements. Alternatively, a quantity of the interpolation elements may be any integer greater than or equal to 1, for example, 1 or 2. The interpolation element may alternatively be a value other than 1, such as −1, j, or j (j is an imaginary unit).

Generally, in the related art, when a CEF of a specified length needs to be generated, a Golay sequence of the specified length is directly generated. In addition, generally, the CEF is relatively long, and it is relatively difficult to directly generate the Golay sequence of the specified length. In an embodiment of this application, the CEF includes a plurality of sub-sequences, and basic elements in each sub-sequence can be arranged into a Golay sequence or a ZC sequence. It can be learned that during generation of the CEF, a relatively short sequence (such as a Golay sequence or a ZC sequence) may be first generated, then a plurality of sub-sequences are generated based on the generated relatively short sequence, and further, the CEF is generated. The manner of generating the CEF in this application is different from the general manner of generating a CEF in the related art. In addition, in an embodiment of this application, only a relatively short Golay sequence or ZC sequence needs to be generated. Therefore, difficulty in generating the CEF is reduced.

Step 202: The transmit end transmits the PPDU to a receive end.

It should be noted that the spectrum resource used to transmit the CEF may include allocated subcarriers allocated to the receive end (which may be all subcarriers or some subcarriers in the entire spectrum resource). When transmitting the CEF in the PPDU to the receive end, the transmit end may transmit the CEF in the spectrum resource, and information that needs to be transmitted in the CEF to the receive end is carried on a subcarrier allocated to the receive end in the spectrum resource.

Step 203: The receive end parses the received PPDU.

After receiving the PPDU, the receive end may parse the PPDU, to obtain data that needs to be transmitted by the transmit end to the receive end. When the CEF in the preamble of the PPDU is parsed, information transmitted on the subcarrier allocated to the receive end in the CEF may be obtained, and a channel for transmitting the data field is estimated based on the part. Then data that is in the data field and transmitted to the receive end may be obtained based on the channel for transmitting the data field.

It should be noted that this embodiment of this application is based on an assumption that the transmit end transmits the PPDU to only one receive end. Optionally, when the transmit end transmits a PPDU to a plurality of receive ends, the transmit end may generate one PPDU based on data that needs to be transmitted to the plurality of receive ends. A CEF in the PPDU includes information to be transmitted to each receive end, and a data field in the PPDU includes data that needs to be transmitted to each receive end. In addition, a spectrum resource used to transmit the CEF includes a plurality of segments of subcarriers allocated to the plurality of receive ends in a one-to-one correspondence. After generating the PPDU, the transmit end may transmit the PPDU to the plurality of receive ends. After receiving the PPDU, each receive end may obtain, from the CEF in a preamble of the PPDU, a part transmitted on a segment of subcarriers allocated to the receive end, and obtain, based on the part, data that is in the data field and transmitted to the receive end.

Optionally, a minimum unit that can be allocated to the receive end in the spectrum resource used to transmit the CEF may be referred to as a resource block (Resource block, RB). In this case, the spectrum resource may include at least one resource block, where a quantity of subcarriers in one resource block (Resource block, RB) may be m. In step 201, in the CEF in the PPDU generated by the transmit end, a quantity of elements in the sub-sequence may be m, where m≥1. Given different m, the CEF in the PPDU is also different. In the following description, it is assumed that the data part of the CEF includes a plurality of sub-sequences, and 14 examples are used to describe the CEF in the PPDU generated in step 201.

In the first example, m=84. In this case, the sub-sequence includes: 80 basic elements arranged into a Golay sequence in the sub-sequence and four interpolation elements, where each element in the sub-sequence belongs to a target element set, and the target element set includes 1 and −1.

It should be noted that the spectrum resource used to transmit the CEF may include at least one bonded channel, that is, a channel bonding (Channel bonding, CB) of the spectrum resource ≥1. In addition, when the CB of the spectrum resource varies, a quantity of RBs in the spectrum resource varies, a case of allocation of the spectrum resource to the receive end also varies, and corresponding CEFs are also different. The following separately describes different CB cases of the spectrum resource by using examples.

Figure 4:
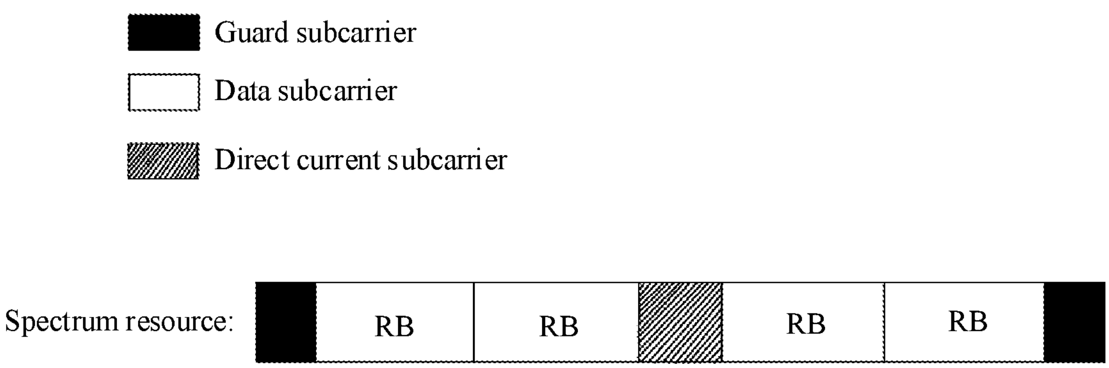
FIG. 4 is a schematic structural diagram of a spectrum resource including one bonded channel according to an embodiment of this application.

According to a first aspect, FIG. 4 is a schematic structural diagram of a spectrum resource including one bonded channel (that is, CB=1, and a bandwidth may be 2.16 GHz) according to an embodiment of this application. As shown in FIG. 4, the spectrum resource may include two segments of guard subcarriers, one segment of direct current subcarriers, and two segments of data subcarriers. Either of the two segments of data subcarriers includes two RBs, and the two segments of data subcarriers include four RBs in total. Each RB includes 84 subcarriers, and the two segments of data subcarriers include 336 subcarriers in total.

Figures 5, 6:
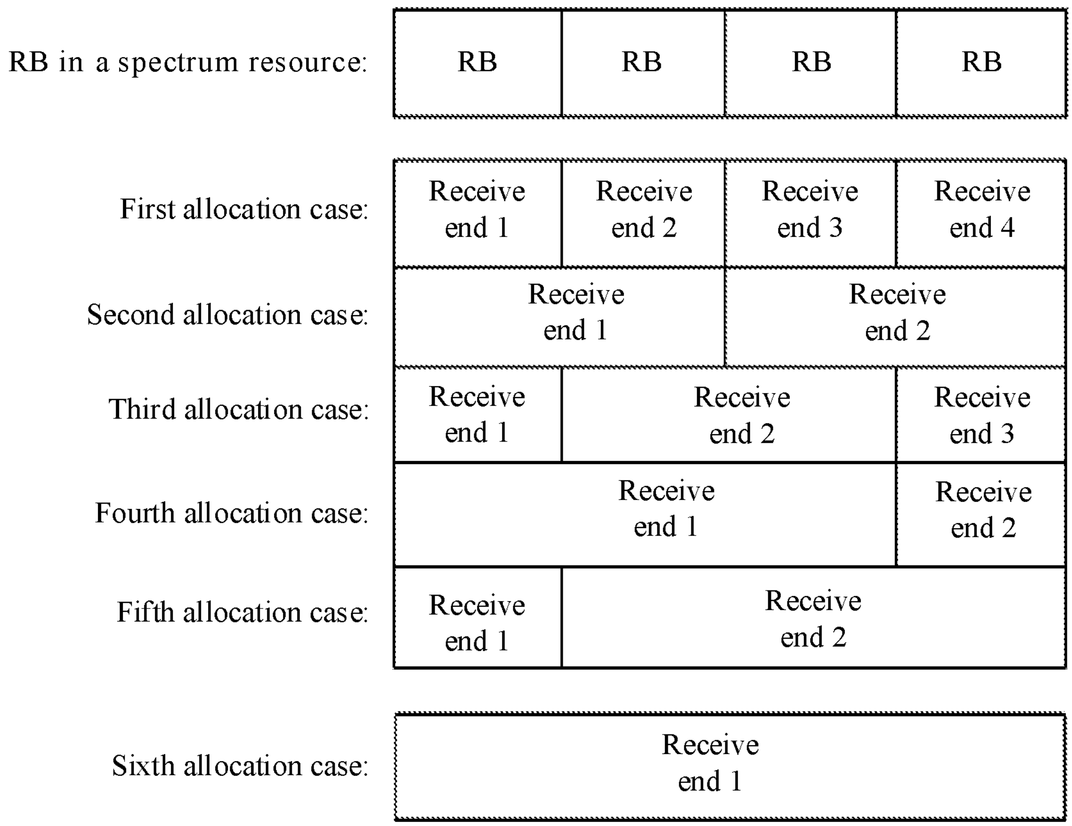
FIG. 5 is a schematic diagram of a plurality of allocation cases of the spectrum resource shown in FIG. 4 according to an embodiment of this application.
FIG. 6 is a schematic diagram of a PAPR according to an embodiment of this application.

FIG. 5 is a schematic diagram of a plurality of allocation cases of the spectrum resource shown in FIG. 4 according to an embodiment of this application. As shown in FIG. 5, six allocation cases of the spectrum resource shown in FIG. 4 may exist. In the first allocation case, the four RBs in the spectrum resource may be allocated to a maximum of four receive ends. For example, the first RB is allocated to the receive end 1, the second RB is allocated to the receive end 2, the third RB is allocated to the receive end 3, and the fourth RB is allocated to the receive end 4. In the second allocation case, the four RBs in the spectrum resource may be allocated to a maximum of two receive ends. For example, both the first RB and the second RB are allocated to the receive end 1, and both the third RB and the fourth RB are allocated to the receive end 2. In the third allocation case, the four RBs in the spectrum resource may be allocated to a maximum of three receive ends. For example, the first RB is allocated to the receive end 1, the second RB and the third RB are allocated to the receive end 2, and the fourth RB is allocated to the receive end 3. In the fourth allocation case, the four RBs in the spectrum resource may be allocated to a maximum of two receive ends. For example, the first RB, the second RB, and the third RB are all allocated to the receive end 1, and the fourth RB is allocated to the receive end 2. In the fifth allocation case, the four RBs in the spectrum resource may be allocated to a maximum of two receive ends. For example, the first RB is allocated to the receive end 1, and the second RB, the third RB, and the fourth RB are all allocated to the receive end 2. In the sixth allocation case, the four RBs in the spectrum resource may be allocated to a maximum of one receive end. For example, the first RB, the second RB, the third RB, and the fourth RB are all allocated to the receive end 1.

Based on a structure of the spectrum resource shown in FIG. 4 and the plurality of allocation cases shown in FIG. 5, a target part (including a data part and a direct current part) in the CEF obtained by the transmit end may be G1, and G1={S84_11, ±S84_12, 0, 0, 0, ±S84_13, ±S84_14}, where S84_n represents a sequence whose length is 84, a Golay sequence in which 80 basic elements are arranged in S84_n belongs to a sequence set formed by A1, A2, A3, A4, A5, A6, A7, A8, A9, A10, A11, A12, A13, A14, A15, and A16, n≥1, and ± represents + or −. A1={C1, C2, C1, −C2}, A2={C1, C2, −C1, C2}, A3={C2, C1, C2, −C1}, A4={C2, C1, −C2, C1}, A5={C1, −C2, C1, C2}, A6={−C1, C2, C1, C2}, A7={C2, −C1, C2, C1}, A8={−C2, C1, C2, C1}, A9={S1, S2, S1, −S2}, A10={S1, S2, −S1, S2}, A11={S2, S1, S2, −S1}, A12={S2, S1, −S2, S1}, A13={S1, −S2, S1, S2}, A14={−S1, S2, S1, S2}, A15={S2, −S1, S2, S1}, and A16={−S2, S1, S2, S1}; and C1 and C2 represent two Golay sequences whose lengths are both 20, S1 and S2 represent two Golay sequences whose lengths are both 20, −C1 represents −1 times C1, −C2 represents −1 times C2, −S1 represents −1 times S1, and −S2 represents −1 times S2.

For example, C1={a1, b1}; C2={a1, −b1}; S1={a2, b2}; S2={a2, −b2}; a1=[1, 1, 1, 1, −1, 1, −1, −1, 1, 1]; b1=[1, 1, −1, 1, 1, 1, 1, 1, −1, −1]; a2=[−1, −1, 1, 1, 1, 1, 1, −1, 1, 1]; and b2=[−1, −1, 1, 1, −1, 1, −1, 1, −1, −1], where −b1 represents −1 times b1, and −b2 represents −1 times b2. Certainly, a1 and b2 in this application may alternatively be different from those provided in this embodiment of this application. For example, a1=[1, 1, 1, 1, 1, −1, 1, −1, −1, 1], and a2=[1, 1, −1, −1, 1, 1, 1, −1, 1, −1]. Correspondingly, a2, b2, C1, C2, S1, and S2 may alternatively be different from those provided in this embodiment of this application. This is not limited in this embodiment of this application. It should be noted that G1 in the first example may be a binary sequence (including two elements, such as 1 and −1). Therefore, sequences (for example, sequences such as A1, A2, C1, and C2) used for forming G1 are also binary sequences.

In the first example, when generating G1, the transmit end may first obtain a binary Golay sequence pair a1 and b1 whose lengths are 10, and then generate a2 and b2 based on a1 and b1. It should be noted that, it is assumed that both the sequence a1 and the sequence b1 are binary sequences whose lengths are N where a1=(a(0), a(1), . . . , a(N−1)) b1=(b (0), b (1), . . . , b (N−1)) a(u) represents a$(u+1)^{th}$ element, b(u) represents a $(u+1)^{th}$ element, and 0≤u≤N−1. If $C_{a1}(t)+C_{b1}(t)=0$ where 1≤t≤N, the sequence a1 and the sequence b1 are both Golay sequences, and the sequence a1 and the sequence b1 are referred to as a Golay sequence pair (also referred to as a Golay pair). $C_{a1}(t)=\Sigma_{n+0}^{N-1-t}a1, a1_{i+t}^*$, $C_{b1}(t)=\Sigma_{n+0}^{N-1-t}b1, b1_{i+t}^*$, $a1_{i+t}^*$ represents a conjugate of $a1_{i+t}^*$ and $b1_{i+t}^*$ represents a conjugate of $b1_{i+t}$. a2 and b2 may be obtained based on a1 and b1, where a2=(b(N−1), . . . , b(1), b(0)) and b2=−(a(N−1), . . . , a(1), a(0)) a2 and b2 are also both Golay sequences, and a2 and b2 are also a Golay sequence pair. (a1, b1) and (a2, b2) are referred to as Golay sequence groups (also referred to as Golay mates). For example, a1=[1, 1, −1, 1, −1, 1, −1, −1, 1, 1]; b1=[1, 1, −1, 1, 1, 1, 1, 1, −1, −1]; a2=[−1, −1, 1, 1, 1, 1, 1, −1, 1, 1]; and b2=[−1, −1, 1, 1, −1, 1, −1, 1, −1, −1]. a1 and b1 may be orthogonal to each other or may not be orthogonal to each other. This is not limited in this embodiment of this application.

After the binary Golay sequences a1, b1, a2, and b2 whose lengths are 10 are generated, the transmit end may generate, based on a1, b1, a2, and b2, the binary Golay sequences C1, C2, S1, and S2 whose lengths are 20. Then the transmit end generates, based on C1, C2, S1, and S2, the binary Golay sequences A1 to A16 whose lengths are 80, and inserts four elements into each of the sequences A1 to A16 (the four elements may include at least one of 1 and −1), to obtain a plurality of sequences whose lengths are 84. Then the transmit end may screen, based on a structure of G1, each sequence in S84_1, S84_2, S84_3, and S84_4 in G1 from a sequence set formed by the sequences whose lengths are 84, where each sequence in S84_1, S84_2, S84_3, and S84_4 may be any sequence in the sequence set, and any two sequences in S84_1, S84_2, S84_3 and S84_4 may be the same or different. This is not limited in this embodiment of this application. Further, the sequence set formed by the sequences whose lengths are 84 includes all sequences that are obtained by the transmit end and whose lengths are 84. Optionally, the transmit end may also sort the obtained sequences whose lengths are 84 in ascending order of overall PAPRs of the sequences, and use sequences (for example, first 300 or first 250 sequences) with relatively low overall PAPRs to form the foregoing sequence set. This is not limited in this embodiment of this application.

Finally, the transmit end may generate, based on S84_1, S84_2, S84_3, S84_4, and the structure of G1, a plurality of sequences whose lengths are 339, sort the sequences whose lengths are 339 in ascending order of overall PAPRs of the sequences, and then use a sequence with a lowest (or lower) overall PAPR in the plurality of sequences whose lengths are 339, as G1. For example, in the first example, G1 in the CEF is as follows:

G1={−1, −1, 1, −1, 1, −1, 1, 1, −1, −1, 1, 1, 1, −1, 1, 1, 1, 1, 1, −1, −1, −1, −1, 1, 1, 1, 1, 1, −1, 1, 1, −1, 1, 1, −1, −1, 1, −1, 1, −1, 1, 1, 1, 1, −1, 1, −1, 1, −1, −1, 1, 1, −1, −1, −1, 1, −1, −1, −1, −1, −1, 1, 1, −1, −1, 1, 1, 1, 1, 1, −1, 1, 1, 1, 1, 1, −1, −1, 1, −1, 1, −1, 1, 1, −1,

−1, 1, −1, 1, −1, 1, 1, −1, 1, 1, 1, 1, −1, 1, 1, 1, 1, 1, −1, −1, −1, −1, 1, 1, 1, 1, 1, −1, 1, 1, −1, 1, 1, −1, −1, 1, −1, 1, −1, 1, 1, 1, 1, −1, 1, −1, 1, −1, −1, 1, 1, −1, −1, −1, 1, −1, −1, −1, −1, −1, 1, 1, −1, −1, 1, 1, 1, 1, 1, −1, 1, 1, 1, 1, 1, 1, −1, 1, −1, 1, −1, 1, 1, 0, 0, 0, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, 1, −1, −1, 1, 1, −1, −1, 1, −1, 1, −1, −1, 1, 1, −1, 1, −1, 1, −1, −1, 1, 1, 1, 1, 1, −1, 1, 1, 1, 1, 1, −1, −1, −1, −1, 1, 1, 1, 1, 1, −1, 1, 1, −1, −1, 1, 1, −1, −1, 1, −1, 1, −1, −1, 1, 1, −1, 1, −1, 1, −1, −1, 1, 1, 1, 1, −1, 1, 1, 1, 1, 1, −1, −1, 1, 1, −1, −1, −1, −1, −1, 1, −1, −1, −1, 1, 1, −1, −1, 1, 1, −1, 1, −1, 1, 1, −1, −1, 1, −1, 1, −1, 1, 1, −1, −1, −1, −1, −1, 1, −1, −1, −1, −1, −1, 1, 1, 1, 1, −1, −1, −1, −1, −1, 1, −1, −1, 1, 1, −1, −1, 1, 1, −1, 1, −1, 1, 1}.

FIG. 6 shows PAPRs of G1 in the plurality of allocation cases of the spectrum resource. As shown in FIG. 6, when the spectrum resource is allocated to four receive ends according to the first allocation case in FIG. 5, PAPRs of four segments of elements transmitted on four segments of subcarriers allocated to the four receive ends are all relatively low. For example, PAPRs of a segment of elements that are in G1 and transmitted on a segment of subcarriers allocated to the receive end 1 are 3.8062; PAPRs of a segment of elements that are in G1 and transmitted on a segment of subcarriers allocated to the receive end 2 are 3.8062; PAPRs of a segment of elements that are in G1 and transmitted on a segment of subcarriers allocated to the receive end 3 are 3.9888; and PAPRs of a segment of elements that are in G1 and transmitted on a segment of subcarriers allocated to the receive end 4 are 3.9888. When the spectrum resource is allocated to two receive ends according to the second allocation case in FIG. 5, PAPRs of a segment of elements that are in G1 and transmitted on a segment of subcarriers allocated to the receive end 1 are 6.0670; and PAPRs of a segment of elements that are in G1 and transmitted on a segment of subcarriers allocated to the receive end 2 are 5.8707. When the spectrum resource is allocated to one receive end according to the sixth allocation case in FIG. 5, PAPRs of a segment of elements that are in G1 and transmitted on a segment of subcarriers allocated to the receive end are all relatively low (for example, the PAPRs are 3.9349). It can be learned from FIG. 6 that no matter how the spectrum resource is allocated, an overall PAPR of G1 is relatively low, and a PAPR of a part that is in G1 and transmitted to each receive end is also relatively low.

It should be noted that in all embodiments of this application, the PAPR may be in units of decibels. The units are not shown in any schematic diagram of the PAPR provided in this application.

Figure 7:
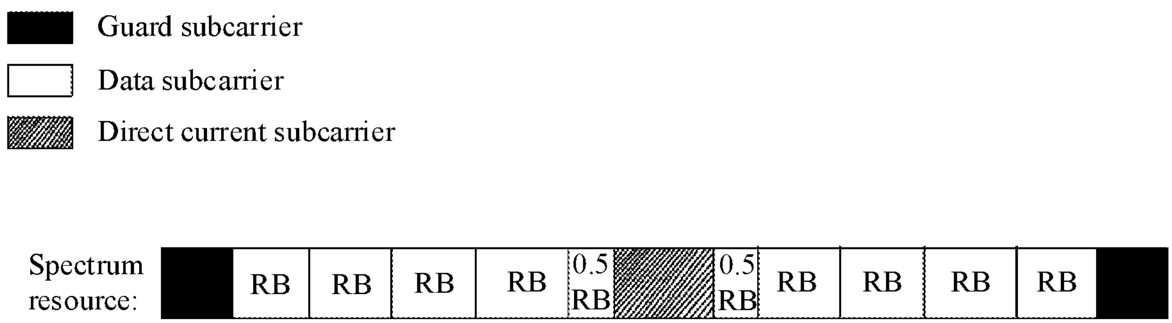
FIG. 7 is a schematic structural diagram of a spectrum resource including two bonded channels according to an embodiment of this application.

According to a second aspect, FIG. 7 is a schematic structural diagram of a spectrum resource including two bonded channels (that is, CB=2, and a bandwidth may be 4.32 GHz) according to an embodiment of this application. As shown in FIG. 7, the spectrum resource may include two segments of guard subcarriers, one segment of direct current subcarriers, and two segments of data subcarriers. Either of the two segments of data subcarriers includes 4.5 RBs, and the two segments of data subcarriers include nine RBs in total. Each RB includes 84 subcarriers, and the two segments of subcarriers include 756 subcarriers in total.

Figure 8:
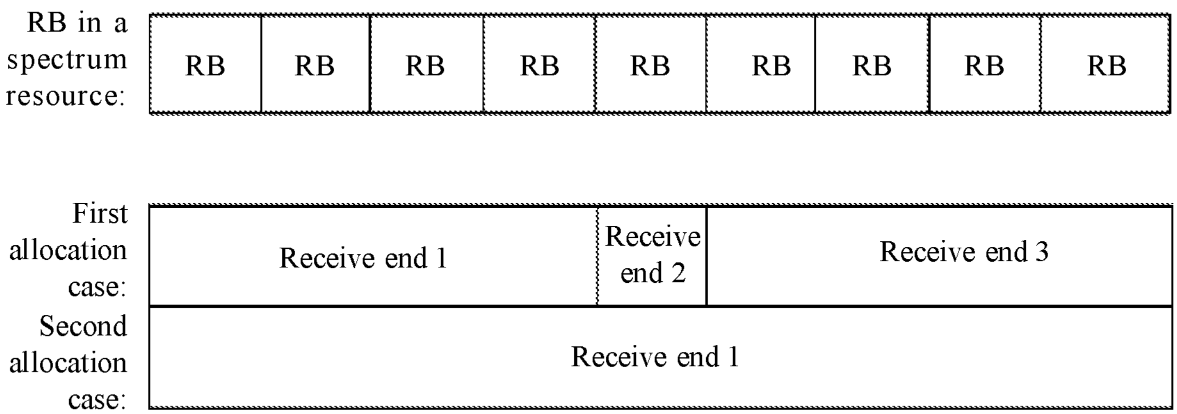
FIG. 8 is a schematic diagram of a plurality of allocation cases of the spectrum resource shown in FIG. 7 according to an embodiment of this application.

FIG. 8 is a schematic diagram of a plurality of allocation cases of the spectrum resource shown in FIG. 7 according to an embodiment of this application. As shown in FIG. 8, two allocation cases of the spectrum resource shown in FIG. 7 may exist. In the first allocation case, the nine RBs in the spectrum resource may be allocated to a maximum of three receive ends. For example, the first to the fourth RBs are all allocated to the receive end 1, the fifth RB is allocated to the receive end 2, and the sixth to the ninth RBs are all allocated to the receive end 3. In the second allocation case, the nine RBs in the spectrum resource may be allocated to a maximum of one receive end. For example, the first to the ninth RBs are all allocated to the receive end 1.

Based on a structure of the spectrum resource shown in FIG. 7 and the plurality of allocation cases shown in FIG. 8, a target part (including a data part and a direct current part) in the CEF obtained by the transmit end may be G2, and G2={S336_21, ±S84_21(1:42), 0, 0, 0, ±S84_21(43:84), ±S336_22}. S336_n={S84_c1, ±S84_c2, ±S84_c3, ±S84_c4}, S84_n(a:b) represents $a^{th}$ to $b^{th}$ elements in S84_n, both a and b are greater than 0, and c1, c2, c3, and c4 are integers greater than or equal to 1.

In the first example, after generating G1, the transmit end may generate G2 based on a sequence set formed by sequences whose lengths are 339 and a sequence set formed by sequences whose lengths are 84 that are obtained in a process of generating G1, and a structure of G2. For example, the transmit end may select, based on the structure of G2, a sequence from the sequence set formed by the sequences whose lengths are 339, use a sequence formed by the first element to the $168^{th}$ element and the $172^{nd}$ element to the $339^{th}$ element in the sequence as S336_21 (and obtain S336_22 by using a similar method), and select one sequence as S84_21 from the sequence set formed by the sequences whose lengths are 84. In this way, the transmit end may generate, based on a structure of G1, a plurality of sequences whose lengths are 759, sort the sequences whose lengths are 759 in ascending order of overall PAPRs of the sequences, and use a sequence with a lowest (or lower) overall PAPR in the plurality of sequences whose lengths are 759, as G2. For example, in the first example, G2 in the CEF is as follows:

G2={1, 1, −1, 1, −1, 1, 1, −1, −1, 1, 1, −1, −1, 1, −1, −1, −1, −1, −1, 1, 1, 1, 1, −1, −1, −1, −1, −1, 1, −1, −1, −1, −1, −1, 1, 1, −1, 1, −1, 1, −1, −1, 1, 1, −1, 1, −1, 1, 1, −1, −1, 1, 1, −1, −1, −1, 1, −1, −1, −1, −1, −1, 1, 1, −1, −1, 1, 1, 1, 1, 1, −1, 1, 1, 1, 1, −1, −1, 1, −1, 1, −1, 1, 1, −1, −1, 1, −1, 1, 1, −1, 1, 1, −1, −1, 1, 1, −1, 1, 1, 1, 1, 1, −1, −1, −1, −1, 1, 1, 1, 1, 1, −1, 1, 1, 1, 1, 1, −1, −1, 1, −1, 1, −1, 1, 1, −1, −1, 1, −1, 1, −1, −1, 1, 1, −1, −1, 1, 1, 1, −1, 1, 1, 1, 1, 1, −1, −1, 1, 1, −1, −1, −1, −1, −1, 1, −1, −1, −1, −1, 1, 1, −1, 1, −1, 1, −1, −1, 1, 1, −1, 1, −1, 1, −1, −1, 1, 1, 1, 1, 1, −1, 1, 1, 1, 1, 1, −1, −1, 1, 1, −1, −1, −1, −1, −1, 1, −1, −1, −1, 1, 1, −1, −1, 1, −1, 1, −1, 1, 1, 1, 1, −1, 1, −1, 1, −1, −1, 1, 1, −1, 1, 1, −1, 1, 1, 1, 1, 1, 1, −1, −1, −1, −1, 1, 1, 1, 1, 1, −1, 1, 1, 1, −1, −1, 1, 1, −1, 1, −1, 1, −1, −1, 1, 1, −1, 1, −1, 1, −1, −1, 1, 1, 1, 1, 1, −1, 1, 1, 1, 1, 1, −1, −1, 1, 1, −1, −1, −1, −1, −1, 1, −1, −1, −1, 1, 1, 1, −1, 1, −1, 1, −1, 1, 1, 1, 1, −1, 1, −1, 1, −1, −1, 1, 1, −1, 1, 1, −1, 1, 1, 1, 1, 1, −1, −1, −1, −1, 1, 1, 1, 1, 1, −1, 1, 1, 1, −1, −1, 1, 1, −1, 1, −1, 1, −1, −1, −1, −1, 1, −1, 1, −1, 1, 1, −1, −1, −1, 1, 1, −1, 1, 1, 1, 1, 1, −1, −1, −1, −1, 1, 1, 1, 1, 1, −1, 1, 1, 1, 1, 1, −1, −1, 1, −1, 1, −1, 1, 1, 0, 0, 0, −1, −1, 1, −1, 1, −1, 1, 1, −1, 1, −1, 1, 1, −1, 1, 1, 1, 1, 1, −1, −1, 1, 1, −1, −1, −1, −1, −1, 1, −1, −1, −1, −1, −1, 1, 1, −1, 1, −1, 1, −1, −1, −1, −1, −1, 1, −1, 1, −1, 1, 1, −1, −1, 1, 1, −1, 1, 1, 1, 1, 1, −1, −1, −1, −1, 1, 1, 1, 1, 1, 1, −1, 1, 1, 1, 1, −1, −1, 1, −1, 1, −1, 1, 1, −1, −1, −1, 1, −1, 1, −1, 1, 1, −1, −1, 1, 1, 1, −1, 1, 1, 1, 1, 1, 1, −1, 1, 1, −1, −1, −1, −1, −1, 1, −1, −1, −1, −1, 1, 1, −1, 1, −1, 1, −1, −1, −1, −1, −1, 1, −1, 1, −1, 1, 1, −1, −1, −1,

−1, 1, −1, −1, −1, −1, −1, 1, 1, 1, −1, −1, 1, 1, 1, 1, 1, −1, 1, 1, −1, −1, 1, 1, −1, 1, −1, 1, −1, −1, −1, −1, −1, 1, −1, 1, −1, 1, 1, −1, −1, −1, −1, 1, −1, −1, 1, −1, −1, −1, 1, 1, 1, 1, −1, −1, −1, −1, −1, 1, −1, −1, 1, 1, −1, −1, 1, −1, 1, −1, 1, 1, −1, −1, −1, 1, −1, 1, −1, 1, 1, −1, −1, 1, 1, −1, 1, 1, 1, 1, 1, −1, −1, −1, −1, 1, 1, 1, 1, 1, 1, −1, 1, 1, 1, 1, −1, −1, 1, −1, 1, −1, 1, 1, −1, −1, −1, 1, −1, 1, −1, 1, 1, −1, −1, 1, 1, 1, −1, 1, 1, 1, 1, 1, −1, −1, 1, 1, −1, −1, −1, −1, −1, 1, −1, −1, −1, −1, 1, 1, −1, 1, −1, 1, −1, −1, 1, 1, 1, −1, 1, −1, 1, −1, −1, 1, 1, 1, 1, −1, 1, 1, 1, 1, 1, −1, −1, −1, 1, 1, −1, −1, −1, −1, −1, 1, −1, −1, 1, 1, −1, −1, 1, −1, 1, −1, 1, 1, 1, 1, 1, −1, 1, −1, 1, −1, −1, 1, 1, 1, 1, −1, 1, 1, −1, 1, 1, 1, −1, −1, −1, −1, 1, 1, 1, 1, 1, −1, 1, 1, −1, −1, 1, 1, −1, 1, −1, 1, −1, −1}.

Figure 9:
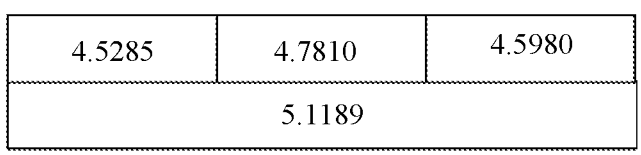
FIG. 9 is a schematic diagram of another PAPR according to an embodiment of this application.

For example, FIG. 9 shows PAPRs of G2 in the plurality of allocation cases of the spectrum resource. As shown in FIG. 9, for G2, when the spectrum resource is allocated to three receive ends according to the first allocation case in FIG. 8, PAPRs of three segments of elements transmitted on three segments of subcarriers allocated to the three receive ends are all relatively low. For example, for G2, PAPRs of a segment of elements transmitted on a segment of subcarriers allocated to the receive end 1 are 4.5285; PAPRs of a segment of elements transmitted on a segment of subcarriers allocated to the receive end 2 are 4.7810; and PAPRs of a segment of elements transmitted on a segment of subcarriers allocated to the receive end 3 are 4.5980. When the spectrum resource is allocated to one receive end according to the second allocation case in FIG. 8, for G2, PAPRs of a segment of elements transmitted on a segment of subcarriers allocated to the receive end are all relatively low (for example, the PAPRs are 5.1189). It can be learned from FIG. 9 that no matter how the spectrum resource is allocated, an overall PAPR of G2 is relatively low, and a PAPR of a part that is in G2 and transmitted to each receive end is also relatively low.

Figure 10:
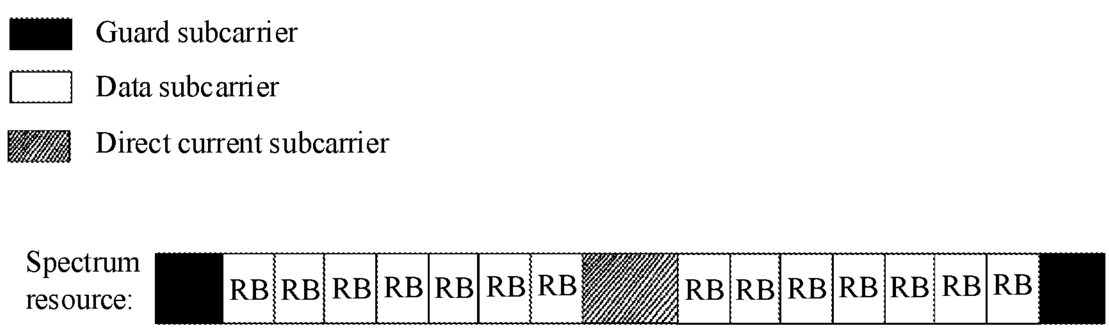
FIG. 10 is a schematic structural diagram of a spectrum resource including three bonded channels according to an embodiment of this application.

According to a third aspect, FIG. 10 is a schematic structural diagram of a spectrum resource including three bonded channels (that is, CB=3, and a bandwidth may be 6.48 GHz) according to an embodiment of this application. As shown in FIG. 10, the spectrum resource may include two segments of guard subcarriers, one segment of direct current subcarriers, and two segments of data subcarriers. Either of the two segments of data subcarriers includes seven RBs, and the two segments of data subcarriers include 14 RBs in total. Each RB includes 84 subcarriers, and the two segments of data subcarriers include 1176 subcarriers in total.

Figures 11, 12:
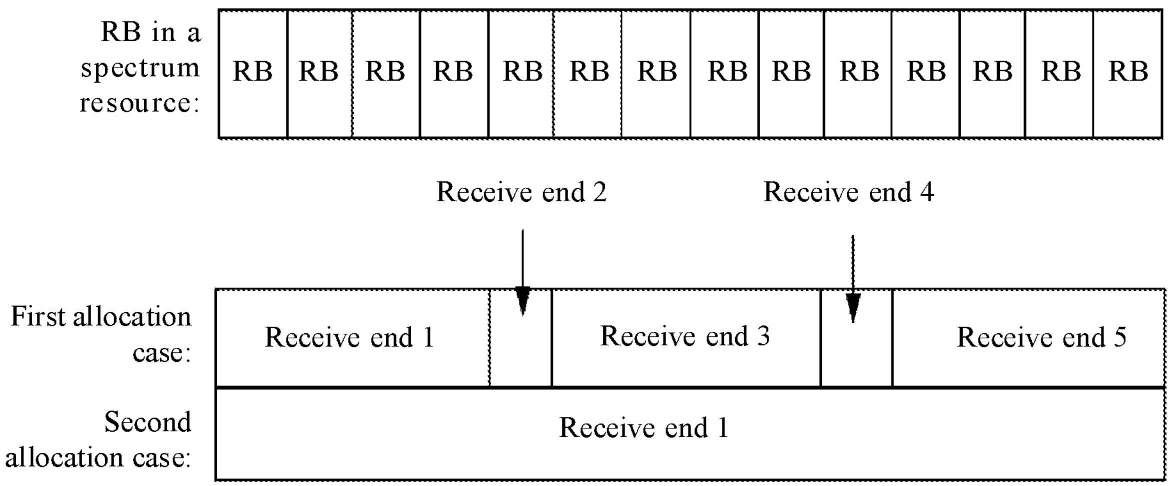
FIG. 11 is a schematic diagram of a plurality of allocation cases of the spectrum resource shown in FIG. 10 according to an embodiment of this application.
FIG. 12 is a schematic diagram of another PAPR according to an embodiment of this application.

FIG. 11 is a schematic diagram of a plurality of allocation cases of the spectrum resource shown in FIG. 10 according to an embodiment of this application. As shown in FIG. 11, two allocation cases of the spectrum resource shown in FIG. 10 may exist. In the first allocation case, the 14 RBs in the spectrum resource may be allocated to a maximum of five receive ends. For example, the first to the fourth RBs are all allocated to the receive end 1, the fifth RB is allocated to the receive end 2, the sixth to the ninth RBs are all allocated to the receive end 3, the tenth RB is allocated to the receive end 4, and the eleventh to the fourteenth RBs are all allocated to the receive end 5. In the second allocation case, the 14 RBs in the spectrum resource may be allocated to a maximum of one receive end. For example, the first to the fourteenth RBs are all allocated to the receive end 1.

Based on a structure of the spectrum resource shown in FIG. 10 and the plurality of allocation cases shown in FIG. 11, a target part (including a data part and a direct current part) in the CEF obtained by the transmit end may be G3, and G3={S336_31, ±S84_31, ±G339_32, ±S84_32, ±S336_33}, where S336_n={S84_c1, ±S84_c2, ±S84_c3, ±S84_c4}, G339_n={S84_d1, ±S84_d2, 0, 0, 0, ±S84_d3, ±S84_d4}, and c1, c2, c3, c4, d1, d2, d3, and d4 are all integers greater than or equal to 1.

In the first example, after generating G1, the transmit end may generate G3 based on a sequence set formed by sequences whose lengths are 339 and a sequence set formed by sequences whose lengths are 84 that are obtained in a process of generating G1, and a structure of G3. For example, based on the structure of G3, the transmit end may select a sequence from the sequence set formed by the sequences whose lengths are 339, and use a sequence formed by the first element to the $168^{th}$ element and the $172^{nd}$ element to the $339^{th}$ element in the sequence as S336_31 (and obtain S336_32 by using a similar method); the transmit end may further select a sequence as G339_31 (or use G1 as G339_31) from the sequence set formed by the sequences whose lengths are 339; and the transmit end may further select a sequence as S84_31 from the sequence set formed by the sequences whose lengths are 84 (and obtain S84_32 by using a similar method). Finally, the transmit end may generate, based on S336_31, S336_32, G339_31, S84_31, S84_32, and the structure of G3, a plurality of sequences whose lengths are 1179, sort the sequences whose lengths are 1179 in ascending order of overall PAPRs of the sequences, and use a sequence with a lowest (or lower) overall PAPR in the plurality of sequences whose lengths are 1179, as G3. For example, in the first example, G3 in the CEF is as follows:

G3={1, 1, 1, −1, 1, −1, 1, −1, −1, 1, 1, −1, −1, 1, −1, −1, −1, −1, −1, 1, 1, 1, 1, 1, −1, −1, −1, −1, −1, 1, −1, −1, −1, −1, 1, 1, −1, 1, −1, 1, −1, −1, −1, 1, 1, −1, 1, −1, 1, −1, −1, 1, 1, −1, −1, 1, −1, −1, −1, −1, −1, 1, 1, 1, −1, −1, 1, 1, 1, 1, 1, −1, 1, 1, 1, 1, −1, −1, 1, −1, 1, −1, 1, 1, −1, −1, −1, 1, −1, 1, −1, 1, 1, −1, −1, −1, −1, 1, −1, −1, −1, −1, −1, 1, 1, 1, −1, −1, 1, 1, 1, 1, 1, −1, 1, 1, −1, −1, 1, 1, −1, 1, −1, 1, −1, −1, −1, −1, −1, 1, −1, 1, −1, 1, 1, −1, −1, −1, −1, 1, −1, −1, 1, −1, −1, −1, 1, 1, 1, 1, −1, −1, 1, −1, −1, 1, −1, −1, 1, 1, −1, −1, 1, −1, 1, −1, 1, 1, −1, −1, −1, 1, −1, 1, −1, 1, 1, −1, −1, 1, 1, −1, 1, 1, 1, 1, 1, −1, −1, −1, −1, −1, 1, 1, 1, 1, 1, −1, 1, 1, 1, 1, −1, −1, 1, −1, 1, −1, 1, 1, 1, −1, −1, 1, −1, 1, −1, 1, 1, −1, −1, 1, 1, −1, 1, 1, 1, 1, 1, −1, −1, −1, 1, 1, −1, −1, −1, −1, −1, 1, −1, −1, −1, −1, 1, 1, −1, 1, −1, 1, −1, −1, −1, −1, −1, 1, −1, 1, −1, 1, 1, −1, −1, −1, −1, 1, −1, −1, −1, −1, −1, 1, 1, 1, −1, −1, 1, 1, 1, 1, 1, −1, 1, 1, −1, −1, 1, 1, −1, 1, −1, 1, −1, −1, −1, −1, −1, 1, −1, 1, −1, 1, 1, −1, −1, −1, −1, 1, −1, −1, 1, −1, −1, −1, 1, 1, 1, 1, −1, −1, −1, −1, −1, 1, −1, −1, 1, 1, −1, −1, 1, −1, 1, −1, 1, 1, 1, 1, −1, 1, −1, 1, −1, −1, 1, 1, 1, −1, −1, 1, −1, −1, −1, −1, −1, 1, 1, 1, 1, −1, −1, −1, −1, −1, 1, −1, −1, −1, −1, −1, 1, 1, −1, 1, −1, 1, −1, −1, 1, 1, −1, 1, 1, −1, 1, −1, −1, 1, 1, −1, −1, 1, −1, −1, −1, −1, −1, 1, 1, −1, −1, 1, 1, 1, 1, −1, 1, −1, 1, 1, 1, 1, −1, −1, 1, −1, 1, −1, 1, 1, −1, −1, −1, 1, −1, 1, −1, 1, 1, −1, −1, 1, 1, −1, 1, 1, 1, 1, 1, 1, −1, −1, −1, 1, 1, 1, 1, 1, 1, −1, 1, 1, 1, 1, −1, −1, 1, −1, 1, −1, 1, 1, −1, −1, −1, 1, −1, 1, −1, 1, 1, −1, −1, 1, 1, 1, −1, 1, 1, 1, 1, 1, −1, −1, 1, 1, −1, −1, −1, −1, −1, 1, −1, −1, −1, −1, 1, 1, −1, 1, −1, 1, −1, −1, −1, −1, −1, 1, −1, 1, −1, 1, 1, −1, −1, −1, −1, 1, −1, −1, −1, −1, −1, 1, 1, 1, −1, −1, 1, 1, 1, 1, 1, −1, 1, 1, −1, −1, 1, 1, −1, 1, −1, 1, −1, −1, −1, −1, −1, 1, −1, 1, −1, 1, 1, −1, −1, −1, −1, 1, −1, −1, 1, −1, −1, −1, 1, 1, 1, 1, −1, −1, −1, −1, −1, 1, −1, −1, 1, 1, −1, −1, 1, −1, 1, −1, 1, 1, 0, 0, 0, −1, −1, −1, 1, −1, 1, −1, 1, 1, −1, −1, 1, 1, −1, 1, 1, 1, 1, 1, −1, −1, −1, −1, 1, 1, 1, 1, 1, 1, −1, 1, 1, 1, 1,

−1, −1, 1, −1, 1, −1, 1, 1, −1, −1, −1, 1, −1, 1, −1, 1, 1, −1, −1, 1, 1, 1, −1, 1, 1, 1, 1, 1, −1, −1, 1, 1, −1, −1, −1, −1, −1, 1, −1, −1, −1, −1, 1, 1, −1, 1, −1, 1, −1, −1, 1, 1, 1, −1, 1, −1, 1, −1, −1, 1, 1, 1, 1, −1, 1, 1, 1, 1, 1, −1, −1, −1, 1, 1, −1, −1, −1, −1, −1, 1, −1, −1, 1, 1, −1, −1, 1, −1, 1, −1, 1, 1, 1, 1, 1, −1, 1, −1, 1, −1, −1, 1, 1, 1, 1, −1, 1, 1, −1, 1, 1, 1, −1, −1, −1, −1, 1, 1, 1, 1, 1, −1, 1, 1, −1, −1, 1, 1, −1, 1, −1, 1, −1, −1, −1, −1, −1, 1, −1, 1, −1, 1, 1, −1, −1, 1, 1, −1, 1, 1, 1, 1, 1, −1, −1, −1, 1, −1, 1, 1, 1, 1, 1, −1, 1, 1, 1, 1, −1, −1, 1, −1, 1, −1, 1, 1, −1, −1, −1, 1, −1, 1, −1, 1, 1, −1, −1, 1, 1, −1, 1, 1, 1, 1, 1, 1, −1, −1, 1, 1, −1, −1, −1, 1, −1, 1, −1, −1, −1, −1, 1, 1, −1, 1, −1, 1, −1, −1, 1, 1, −1, 1, −1, 1, −1, −1, 1, 1, 1, 1, 1, −1, 1, 1, 1, 1, 1, −1, −1, 1, 1, −1, −1, −1, −1, −1, 1, −1, −1, −1, 1, 1, −1, −1, 1, −1, 1, −1, 1, 1, 1, 1, −1, 1, −1, 1, −1, 1, 1, 1, 1, 1, −1, 1, 1, −1, 1, 1, 1, −1, −1, −1, −1, 1, 1, 1, 1, 1, −1, 1, 1, 1, −1, −1, 1, 1, −1, 1, −1, 1, −1, −1, 1, 1, −1, 1, −1, 1, 1, −1, −1, 1, 1, −1, −1, 1, −1, −1, −1, −1, −1, 1, 1, 1, 1, −1, −1, −1, −1, −1, 1, −1, −1, −1, −1, −1, 1, 1, −1, 1, −1, 1, −1, −1, 1, 1, −1, 1, −1, 1, 1, −1, −1, 1, 1, −1, −1, −1, 1, −1, −1, −1, −1, −1, 1, 1, −1, −1, 1, 1, 1, 1, 1, −1, 1, 1, 1, 1, −1, −1, 1, −1, 1, −1, 1, 1, −1, −1, 1, −1, 1, −1, 1, 1, −1, −1, −1, −1, −1, 1, −1, −1, −1, −1, −1, 1, 1, −1, −1, 1, 1, 1, 1, 1, −1, 1, 1, 1, −1, −1, 1, 1, −1, 1, −1, 1, −1, −1, −1, −1, 1, −1, 1, −1, 1, 1, −1, −1, −1, −1, 1, −1, −1, 1, −1, −1, −1, 1, 1, 1, 1, −1, −1, −1, −1, −1, 1, −1, 1, −1, 1, 1, −1, −1, 1, −1, 1, −1, 1, 1, 1, 1, −1, 1, −1, 1, 1, −1, −1, 1, 1, −1, −1, 1, −1, −1, −1, −1, −1, 1, 1, 1, 1, −1, −1, −1, −1, −1, 1, −1, −1, −1, −1, −1, 1, 1, −1, 1, −1, 1, −1, −1, 1, 1, −1, 1, −1, 1, 1, −1, −1, 1, 1, −1, −1, −1, 1, −1, −1, −1, −1, −1, 1, 1, −1, −1, 1, 1, 1, 1, 1, −1, 1, 1, 1, 1, −1, −1, 1, −1, 1, −1, 1, 1}.

For example, FIG. 12 shows PAPRs of G3 in the plurality of allocation cases of the spectrum resource. As shown in FIG. 12, when the spectrum resource is allocated to five receive ends according to the first allocation case in FIG. 11, PAPRs of five segments of elements that are in G3 and transmitted on five segments of subcarriers allocated to the five receive ends are all relatively low. For example, for G3, PAPRs of a segment of elements transmitted on a segment of subcarriers allocated to the receive end 1 are 4.5285; PAPRs of a segment of elements transmitted on a segment of subcarriers allocated to the receive end 2 are 4.5692; PAPRs of a segment of elements transmitted on a segment of subcarriers allocated to the receive end 3 are 4.3714; PAPRs of a segment of elements transmitted on a segment of subcarriers allocated to the receive end 4 are 4.0575; and PAPRs of a segment of elements transmitted on a segment of subcarriers allocated to the receive end 5 are 5.2977. When the spectrum resource is allocated to one receive end according to the second allocation case in FIG. 11, for G3, PAPRs of a segment of elements transmitted on a segment of subcarriers allocated to the receive end are all relatively low (for example, the PAPRs are 5.4822). It can be learned from FIG. 12 that no matter how the spectrum resource is allocated, an overall PAPR of G3 is relatively low, and a PAPR of a part that is in G3 and transmitted to each receive end is also relatively low.

Figure 13:
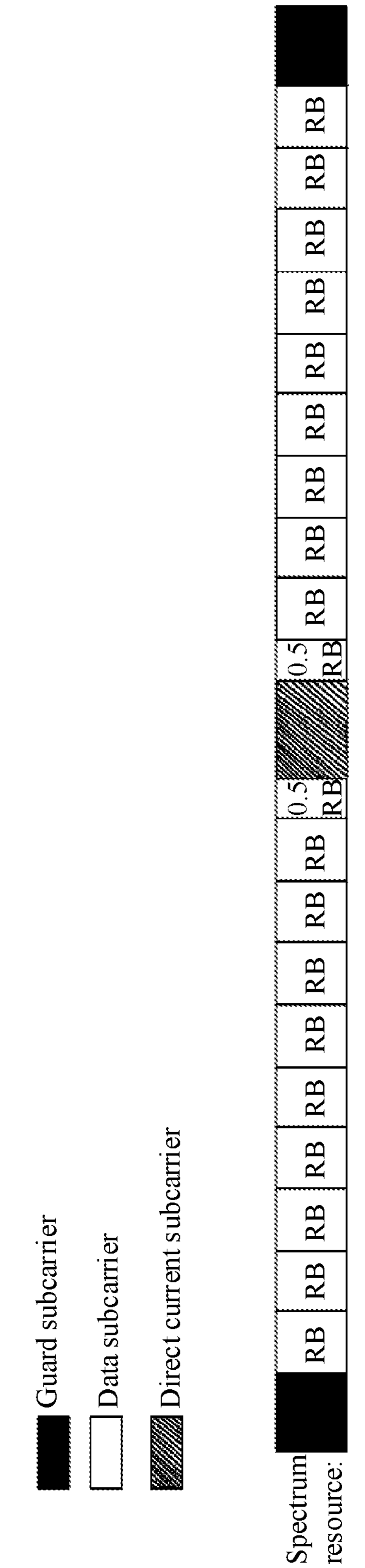
FIG. 13 is a schematic structural diagram of a spectrum resource including four bonded channels according to an embodiment of this application.

According to a fourth aspect, FIG. 13 is a schematic structural diagram of a spectrum resource including fourth bonded channels (that is, CB=4, and a bandwidth may be 8.64 GHz) according to an embodiment of this application. As shown in FIG. 13, the spectrum resource may include two segments of guard subcarriers, one segment of direct current subcarriers, and two segments of data subcarriers. Either of the two segments of data subcarriers includes 9.5 RBs, and the two segments of data subcarriers include 19 RBs in total. Each RB includes 84 subcarriers, and the two segments of data subcarriers include 1596 subcarriers in total.

Figure 14:
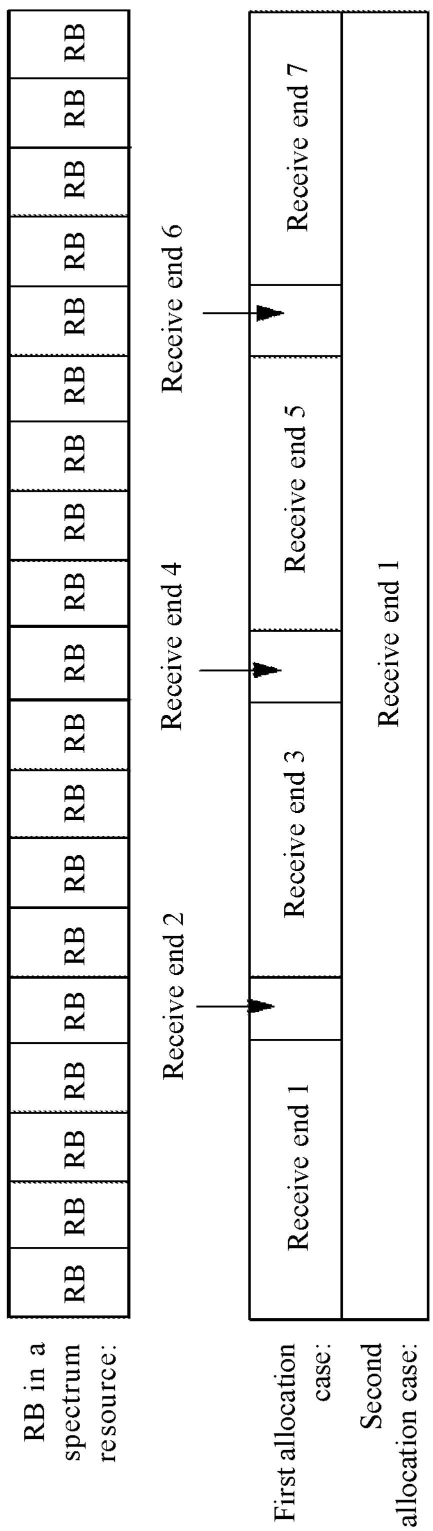
FIG. 14 is a schematic diagram of a plurality of allocation cases of the spectrum resource shown in FIG. 13 according to an embodiment of this application.

FIG. 14 is a schematic diagram of a plurality of allocation cases of the spectrum resource shown in FIG. 13 according to an embodiment of this application. As shown in FIG. 14, two allocation cases of the spectrum resource shown in FIG. 13 may exist. In the first allocation case, the 19 RBs in the spectrum resource may be allocated to a maximum of seven receive ends. For example, the first to the fourth RBs are all allocated to the receive end 1, the fifth RB is allocated to the receive end 2, the sixth to the ninth RBs are all allocated to the receive end 3, the tenth RB is allocated to the receive end 4, the eleventh to the fourteenth RBs are all allocated to the receive end 5, the fifteenth RB is allocated to the receive end 6, and the sixteenth to the nineteenth RBs are all allocated to the receive end 7. In the second allocation case, the 19 RBs in the spectrum resource may be allocated to a maximum of one receive end. For example, the first to the nineteenth RBs are all allocated to the receive end 1.

Based on a structure of the spectrum resource shown in FIG. 13 and the plurality of allocation cases shown in FIG. 14, a target part (including a data part and a direct current part) in the CEF obtained by the transmit end may be G4, and G4={S336_41, ±S84_41, ±S336_42, ±{S84_42(1:42), 0, 0, 0, S84_42(43:84)}, ±S336_43, ±S84_43, ±S336_44}, where S336_n={S84_c1, ±S84_c2, ±S84_c3, ±S84_c4}, S84_n(a:b) represents $a^{th}$ to $b^{th}$ elements in S84_n, both a and b are greater than 0, and c1, c2, c3, and c4 are integers greater than or equal to 1.

In the first example, after generating G1, the transmit end may generate G4 based on a sequence set formed by sequences whose lengths are 339 and a sequence set formed by sequences whose lengths are 84 that are obtained in a process of generating G1, and a structure of G4. For example, based on the structure of G4, the transmit end may select a sequence from the sequence set formed by the sequences whose lengths are 339, use a sequence formed by the first element to the $168^{th}$ element and the $172^{nd}$ element to the $339^{th}$ element in the sequence as S336_41 (and obtain S336_42, S336_43, and S336_44 by using a similar method); and the transmit end may further select a sequence as S84_41 from the sequence set formed by the sequences whose lengths are 84 (and obtain S84_42 and S84_43 by using a similar method). Finally, the transmit end may generate, based on S336_41, S336_42, S336_43, S336_44, S84_41, S84_42, S84_43, and the structure of G4, a plurality of sequences whose lengths are 1599, sort the sequences whose lengths are 1599 in ascending order of overall PAPRs of the sequences, and use a sequence with a lowest (or lower) overall PAPR in the plurality of sequences whose lengths are 1599, as G4.

For example, in the first example, G4 in the CEF may be as follows:

G4={1, 1, −1, 1, −1, 1, 1, −1, −1, 1, 1, −1, −1, 1, −1, −1, −1, −1, −1, 1, 1, 1, 1, −1, −1, −1, −1, −1, 1, −1, −1, −1, −1, −1, 1, 1, −1, 1, −1, 1, −1, −1, 1, 1, −1, 1, −1, 1, 1, −1, −1, 1, 1, −1, −1, −1, 1, −1, −1, −1, −1, −1, 1, 1, −1, −1, 1, 1, 1, 1, 1, −1, 1, 1, 1, 1, −1, −1, 1, −1, 1, −1, 1, 1, −1, −1, 1, −1, 1, 1, −1, 1, 1, −1, −1, 1, 1, −1, 1, 1, 1, 1, 1, −1, −1, −1, −1, 1, 1, 1, 1, 1, −1, 1, 1, 1, 1, 1, −1, −1, 1, −1, 1, −1, 1, 1, −1, −1, 1, −1, 1, −1, −1, 1, 1, −1, −1, 1, 1, 1, −1, 1, 1, 1, 1, 1, −1, −1, 1, 1, −1, −1, −1, −1, −1, 1, −1, −1, −1, −1, 1, 1, −1, 1, −1, 1, −1, −1, 1, 1, −1, 1, −1, 1, −1, −1, 1, 1, 1, 1, 1, −1, 1, 1, 1, 1, 1, −1, −1, 1, 1, −1, −1, −1, −1, −1, 1, −1, −1, −1, 1, 1, −1, −1, 1,

−1, 1, −1, 1, 1, 1, 1, −1, 1, −1, 1, −1, −1, 1, 1, −1, 1, 1,
−1, 1, 1, 1, 1, 1, −1, −1, −1, −1, 1, 1, 1, 1, 1, −1, 1, 1,
1, −1, −1, 1, 1, −1, 1, −1, 1, −1, −1, 1, 1, −1, 1, −1, 1,
−1, −1, 1, 1, 1, 1, 1, −1, 1, 1, 1, 1, 1, −1, −1, 1, 1, −1,
−1, −1, −1, −1, 1, −1, −1, −1, 1, 1, 1, −1, 1, −1, 1, −1,
1, 1, 1, 1, −1, 1, −1, 1, −1, −1, 1, 1, −1, 1, 1, −1, 1, 1,
1, 1, 1, −1, −1, −1, −1, 1, 1, 1, 1, 1, −1, 1, 1, 1, −1, −1,
1, 1, −1, 1, −1, 1, −1, −1, −1, −1, 1, −1, 1, −1, 1, 1, −1,
−1, −1, −1, 1, −1, −1, 1, −1, −1, 1, 1, 1, −1, 1, 1, −1, −1,
−1, −1, −1, 1, −1, −1, 1, 1, −1, −1, 1, −1, 1, −1, 1, 1, 1,
1, −1, 1, −1, 1, −1, −1, 1, 1, 1, 1, −1, 1, 1, 1, 1, 1, −1,
−1, −1, 1, 1, 1, −1, −1, −1, −1, −1, 1, −1, −1, 1, 1, −1,
−1, 1, 1, 1, −1, 1, 1, −1, −1, 1, −1, 1, −1, −1, 1, 1, −1,
−1, 1, 1, −1, 1, 1, 1, 1, 1, −1, −1, −1, −1, 1, 1, 1, 1, 1,
1, 1, 1, 1, 1, 1, −1, −1, 1, −1, 1, −1, 1, 1, −1, −1, 1, −1,
1, −1, −1, 1, 1, −1, −1, 1, 1, 1, −1, 1, 1, 1, 1, 1, −1, −1,
1, 1, −1, −1, −1, −1, −1, 1, −1, −1, −1, −1, 1, 1, −1, 1,
−1, 1, −1, −1, 1, 1, −1, 1, −1, 1, 1, −1, −1, 1, 1, −1, −1,
1, −1, −1, −1, −1, −1, 1, 1, 1, 1, −1, −1, −1, −1, −1, 1,
−1, −1, −1, −1, −1, 1, 1, −1, 1, −1, 1, −1, −1, 1, 1, −1,
1, −1, 1, 1, −1, −1, 1, 1, −1, −1, −1, 1, −1, −1, −1, −1,
−1, 1, 1, −1, −1, 1, 1, 1, 1, 1, −1, 1, 1, 1, 1, −1, −1, 1,
−1, 1, −1, 1, 1, −1, −1, 1, −1, 1, −1, 1, 1, −1, −1, −1, −1,
−1, 1, −1, −1, −1, −1, −1, 1, 1, −1, −1, 1, 1, 1, 1, 1, −1,
1, 1, 1, −1, −1, 1, 1, −1, 1, −1, 1, −1, −1, −1, −1, 1, −1,
1, −1, 1, 1, −1, −1, 1, −1, −1, 1, −1, −1, −1, −1, −1, 1,
1, 1, 1, −1, −1, −1, −1, −1, 1, −1, −1, −1, 1, 1, −1, −1,
1, −1, 1, −1, 1, 1, −1, −1, 1, −1, 1, −1, 1, 1, −1, −1, −1,
−1, −1, 1, −1, −1, −1, −1, −1, 1, 1, −1, −1, 1, 1, 1, 1, 1,
−1, 1, 1, 1, −1, −1, 1, 1, −1, 1, −1, 1, −1, −1, −1, −1, 1,
−1, 1, −1, 1, 1, −1, −1, 1, −1, −1, 1, −1, −1, −1, −1, −1,
1, 1, 1, 1, −1, −1, −1, −1, −1, 1, −1, −1, −1, 1, 1, −1, −1,
1, −1, 1, −1, 1, 1, −1, −1, 1, −1, 1, −1, 1, 1, −1, 1, 1, 1,
−1, 1, 1, 1, 1, 1, −1, −1, −1, 1, 1, 1, −1, −1, −1, −1, −1,
1, −1, −1, −1, −1, 1, 1, −1, 1, −1, 1, −1, −1, 0, 0, 0, −1,
−1, 1, −1, 1, −1, 1, 1, −1, −1, 1, 1, −1, 1, 1, 1, 1, 1, −1,
−1, 1, −1, −1, −1, 1, 1, 1, 1, 1, 1, 1, 1, 1, 1, −1, −1, 1,
−1, 1, −1, 1, 1, 1, 1, 1, −1, 1, −1, 1, −1, −1, 1, 1, −1, −1,
1, −1, −1, −1, −1, −1, 1, 1, 1, 1, 1, −1, −1, −1, −1, −1,
1, −1, −1, −1, −1, 1, 1, −1, 1, −1, 1, −1, −1, −1, 1, 1, −1,
1, −1, 1, −1, −1, 1, 1, −1, −1, 1, −1, −1, −1, −1, −1, 1,
1, 1, −1, −1, 1, 1, 1, 1, 1, −1, 1, 1, 1, 1, −1, −1, 1, −1,
1, −1, 1, 1, −1, −1, −1, 1, −1, 1, −1, 1, 1, −1, −1, −1, −1,
1, −1, −1, −1, −1, −1, 1, 1, 1, −1, −1, 1, 1, 1, 1, 1, −1,
1, 1, −1, −1, 1, 1, −1, 1, −1, 1, −1, −1, −1, −1, −1, 1, −1,
1, −1, 1, 1, −1, −1, −1, −1, 1, −1, −1, 1, −1, −1, −1, 1,
1, 1, 1, −1, −1, −1, −1, −1, 1, −1, −1, 1, 1, −1, −1, 1, −1,
1, −1, 1, 1, −1, −1, −1, 1, −1, 1, −1, 1, 1, −1, −1, 1, 1,
−1, 1, 1, 1, 1, 1, −1, −1, −1, −1, −1, 1, 1, 1, 1, 1, −1, 1,
1, 1, 1, −1, −1, 1, −1, 1, −1, 1, 1, 1, −1, −1, 1, −1, 1, −1,
1, 1, −1, −1, 1, 1, −1, 1, 1, 1, 1, 1, −1, −1, −1, 1, 1, −1,
−1, −1, −1, −1, 1, −1, −1, −1, −1, 1, 1, −1, 1, −1, 1, −1,
−1, −1, −1, −1, 1, −1, 1, −1, 1, 1, −1, −1, −1, −1, 1, −1,
−1, −1, −1, −1, 1, 1, 1, −1, −1, 1, 1, 1, 1, 1, −1, 1, 1, −1,
−1, 1, 1, −1, 1, −1, 1, −1, −1, −1, −1, −1, 1, −1, 1, −1,
1, 1, −1, −1, −1, −1, 1, −1, −1, 1, −1, −1, −1, 1, 1, 1, 1,
−1, −1, −1, −1, −1, 1, −1, −1, 1, 1, −1, −1, 1, −1, 1, −1,
1, 1, 1, 1, −1, 1, −1, −1, 1, −1, −1, 1, 1, −1, −1, 1, −1,
−1, −1, −1, −1, 1, 1, 1, 1, −1, −1, −1, −1, −1, 1, −1, −1,
−1, −1, 1, 1, −1, 1, −1, 1, −1, −1, −1, −1, 1, −1, 1, −1,
1, 1, −1, −1, 1, 1, 1, −1, 1, 1, 1, 1, 1, −1, −1, 1, 1, −1,
−1, −1, −1, −1, 1, −1, −1, −1, −1, 1, 1, −1, 1, −1, 1, −1,
−1, −1, 1, 1, 1, 1, −1, 1, −1, 1, −1, −1, 1, 1, −1, −1, 1,
−1, −1, −1, −1, −1, 1, 1, 1, 1, 1, −1, −1, −1, −1, −1, 1,
−1, −1, −1, −1, 1, 1, −1, 1, −1, 1, −1, −1, −1, 1, 1, −1,
1, −1, 1, −1, −1, 1, 1, −1, −1, 1, −1, −1, −1, −1, −1, 1,
1, 1, −1, −1, 1, 1, 1, 1, 1, −1, 1, 1, 1, 1, −1, −1, 1, −1,

1, −1, 1, 1, −1, −1, −1, 1, −1, 1, −1, 1, 1, −1, −1, −1, −1,
1, −1, −1, −1, −1, −1, 1, 1, 1, −1, −1, 1, 1, 1, 1, 1, −1,
1, 1, −1, −1, 1, 1, −1, 1, −1, 1, −1, −1, −1, −1, −1, 1, −1,
1, −1, 1, 1, −1, −1, −1, −1, 1, −1, −1, 1, −1, −1, −1, 1,
1, 1, 1, −1, −1, −1, −1, −1, 1, −1, −1, 1, 1, −1, −1, 1, −1,
1, −1, 1, 1, −1, −1, −1, 1, −1, 1, −1, 1, 1, −1, −1, 1, 1,
−1, 1, 1, 1, 1, 1, −1, −1, −1, −1, −1, 1, 1, 1, 1, 1, −1, 1,
1, 1, 1, −1, −1, 1, −1, 1, −1, 1, 1, 1, −1, −1, 1, −1, 1, −1,
1, 1, −1, −1, 1, 1, −1, 1, 1, 1, 1, 1, −1, −1, −1, 1, 1, −1,
−1, −1, −1, −1, 1, −1, −1, −1, −1, 1, 1, −1, 1, −1, 1, −1,
−1, −1, −1, −1, 1, −1, 1, −1, 1, 1, −1, −1, −1, −1, 1, −1,
−1, −1, −1, −1, 1, 1, 1, −1, −1, 1, 1, 1, 1, 1, −1, 1, 1, −1,
−1, 1, 1, −1, 1, −1, 1, −1, −1, −1, −1, −1, 1, −1, 1, −1,
1, 1, −1, −1, −1, −1, 1, −1, −1, 1, −1, −1, −1, 1, 1, 1, 1,
−1, −1, −1, −1, −1, 1, −1, −1, 1, 1, −1, −1, 1, −1, 1, −1,
1, 1}.

Alternatively, in the first example, G4 in the CEF may be as follows:

G4={1, 1, 1, −1, 1, −1, 1, −1, −1, 1, 1, −1, −1, 1, −1, −1,
−1, −1, −1, 1, 1, 1, 1, −1, −1, −1, −1, −1, −1, 1, −1, −1,
−1, −1, 1, 1, −1, 1, −1, 1, −1, −1, 1, 1, 1, −1, 1, −1, 1,
−1, −1, 1, 1, −1, −1, −1, 1, −1, −1, −1, −1, −1, 1, 1, −1,
−1, 1, 1, 1, 1, 1, −1, 1, 1, 1, 1, −1, −1, 1, −1, 1, −1, 1,
1, 1, 1, 1, −1, 1, −1, 1, −1, −1, 1, 1, 1, 1, −1, 1, 1, 1, 1,
1, −1, −1, −1, 1, 1, −1, −1, −1, −1, −1, 1, −1, −1, 1, 1,
−1, −1, 1, −1, 1, −1, 1, 1, 1, 1, 1, −1, 1, −1, 1, −1, −1,
1, 1, 1, 1, −1, 1, 1, −1, 1, 1, 1, −1, −1, −1, −1, 1, 1, 1,
1, 1, −1, 1, 1, −1, −1, 1, 1, −1, 1, −1, 1, −1, −1, 1, 1, 1,
−1, 1, −1, 1, −1, −1, 1, 1, −1, −1, 1, −1, −1, −1, −1, −1,
1, 1, 1, 1, −1, −1, −1, −1, −1, −1, 1, −1, −1, −1, −1, 1,
1, −1, 1, −1, 1, −1, −1, 1, 1, 1, −1, 1, −1, 1, −1, −1, 1,
1, −1, −1, −1, 1, −1, −1, −1, −1, −1, 1, 1, −1, −1, 1, 1,
1, 1, 1, −1, 1, 1, 1, 1, −1, −1, 1, −1, 1, −1, 1, 1, −1, −1,
−1, 1, −1, 1, −1, 1, 1, −1, −1, −1, −1, 1, −1, −1, −1, −1,
−1, 1, 1, 1, −1, −1, 1, 1, 1, 1, 1, −1, 1, 1, −1, −1, 1, 1,
−1, 1, −1, 1, −1, −1, −1, −1, −1, 1, −1, 1, −1, 1, 1, −1,
−1, −1, −1, 1, −1, −1, 1, −1, −1, −1, 1, 1, 1, 1, −1, −1,
−1, −1, −1, 1, −1, −1, 1, 1, −1, −1, 1, −1, 1, −1, 1, 1, −1,
−1, 1, −1, −1, 1, −1, 1, 1, −1, −1, −1, −1, 1, 1, −1, −1,
−1, −1, −1, 1, 1, −1, −1, 1, 1, 1, 1, 1, −1, 1, 1, −1, −1,
1, 1, −1, 1, −1, 1, −1, −1, − . . . 1, −1, 1, −1, 1, −1, 1,
1, −1, −1, −1, −1, 1, −1, −1, −1, −1, 1, −1, 1, 1, 1, 1, −1,
−1, −1, −1, −1, 1, 1, −1, −1, 1, 1, −1, −1, 1, −1, 1, −1,
1, 1, 1, 1, 1, −1, 1, −1, 1, −1, −1, 1, 1, −1, −1, 1, −1, −1,
−1, −1, −1, 1, 1, 1, 1, −1, −1, −1, −1, −1, −1, 1, −1, −1,
−1, −1, 1, 1, −1, 1, −1, 1, −1, −1, 1, 1, 1, −1, 1, −1, 1,
−1, −1, 1, 1, −1, −1, −1, 1, −1, −1, −1, −1, −1, 1, 1, −1,
−1, 1, 1, 1, 1, 1, −1, 1, 1, 1, 1, −1, −1, 1, −1, 1, −1, 1,
1, 1, 1, 1, −1, 1, −1, 1, −1, −1, 1, 1, 1, 1, −1, 1, 1, 1, 1,
1, −1, −1, −1, 1, 1, −1, −1, −1, −1, −1, 1, −1, −1, 1, 1,
−1, −1, 1, −1, 1, −1, 1, 1, 1, 1, 1, −1, 1, −1, 1, −1, −1,
1, 1, 1, 1, −1, 1, 1, −1, 1, 1, 1, −1, −1, −1, −1, 1, 1, 1,
1, 1, −1, 1, 1, −1, −1, 1, 1, −1, 1, −1, 1, −1, −1, 1, 1, 1,
−1, 1, −1, 1, −1, −1, 1, 1, −1, −1, 1, −1, −1, −1, −1, −1,
1, 1, 1, 1, −1, −1, −1, −1, −1, −1, 1, −1, −1, −1, −1, 1,
1, −1, 1, −1, 1, −1, −1, 1, 1, 1, −1, 1, −1, 1, −1, −1, 1,
1, −1, −1, −1, 1, −1, −1, −1, −1, −1, 1, 1, −1, −1, 1, 1,
1, 1, 1, −1, 1, 1, 1, 1, −1, −1, 1, −1, 1, −1, 1, 1, −1, −1,
−1, 1, −1, 1, −1, 1, 1, −1, −1, −1, −1, 1, −1, −1, −1, −1,
−1, 1, 1, 1, −1, −1, 1, 1, 1, 1, 1, −1, 1, 1, −1, −1, 1, 1,
−1, 1, −1, 1, −1, −1, −1, −1, −1, 1, −1, 1, −1, 1, 1, −1,
−1, −1, −1, 1, −1, −1, 1, −1, −1, −1, 1, 1, 1, 1, −1, −1,
−1, −1, −1, 1, −1, −1, 1, 1, −1, −1, 1, −1, 1, −1, 1, 1, −1,
−1, 1, −1, 1, −1, −1, 1, 1, −1, −1, 1, 1, −1, 1, 1, 1, 1, 1,
−1, −1, −1, −1, 1, 1, 1, 1, 1, −1, 1, 1, 1, 1, 1, −1, −1, 1,
−1, 1, −1, 1, 1, 0, 0, 0, −1, −1, 1, −1, 1, −1, −1, 1, 1, −1,
−1, 1, 1, 1, −1, 1, 1, 1, 1, 1, −1, −1, 1, 1, −1, −1, −1, −1,

−1, 1, −1, −1, −1, −1, 1, 1, −1, 1, −1, 1, −1, −1, 1, 1, −1,
1, −1, 1, −1, −1, 1, 1, −1, −1, −1, 1, −1, −1, −1, −1, −1,
1, 1, 1, 1, −1, −1, −1, −1, −1, 1, −1, −1, 1, −1, −1, 1, 1,
−1, 1, −1, 1, −1, −1, −1, −1, 1, −1, 1, −1, 1, 1, −1, −1,
1, 1, 1, −1, 1, 1, 1, 1, 1, −1, −1, 1, 1, −1, −1, −1, −1, −1,
1, −1, −1, −1, −1, −1, 1, 1, −1, 1, −1, 1, −1, −1, 1, 1, −1,
1, −1, 1, −1, −1, 1, 1, −1, −1, −1, 1, −1, −1, −1, −1, −1,
1, 1, 1, 1, −1, −1, −1, −1, −1, 1, −1, −1, 1, −1, −1, 1, 1,
−1, 1, −1, 1, −1, −1, −1, −1, 1, −1, 1, −1, 1, 1, −1, −1,
1, 1, 1, −1, 1, 1, 1, 1, 1, −1, −1, 1, 1, −1, −1, −1, −1, −1,
1, −1, −1, −1, −1, −1, 1, 1, −1, 1, −1, 1, −1, −1, 1, 1, −1,
1, −1, 1, −1, −1, 1, 1, 1, 1, −1, 1, 1, 1, 1, 1, −1, −1, 1,
1, −1, −1, −1, −1, −1, 1, −1, −1, −1, 1, 1, −1, −1, 1, 1,
1, 1, −1, 1, 1, −1, −1, 1, −1, 1, −1, 1, 1, −1, −1, −1, −1,
−1, 1, −1, −1, −1, −1, −1, 1, 1, 1, 1, −1, −1, −1, −1, −1,
1, −1, −1, 1, 1, −1, −1, 1, 1, −1, 1, −1, 1, 1, −1, −1, 1,
−1, 1, −1, 1, 1, −1, −1, −1, −1, 1, −1, −1, −1, −1, −1, 1,
1, −1, −1, 1, 1, 1, 1, 1, −1, 1, 1, 1, −1, −1, 1, 1, −1, −1,
1, −1, 1, −1, −1, 1, 1, −1, 1, −1, 1, −1, −1, 1, 1, 1, 1, 1,
−1, 1, 1, 1, 1, 1, −1, −1, −1, −1, 1, 1, 1, 1, 1, −1, 1, 1,
−1, −1, 1, 1, −1, −1, 1, −1, 1, −1, −1, 1, 1, −1, 1, −1, 1,
−1, −1, 1, 1, −1, −1, 1, −1, −1, −1, −1, −1, 1, 1, 1, 1, −1,
−1, 1, −1, −1, −1, 1, −1, −1, −1, −1, 1, 1, −1, 1, −1, 1,
−1, −1, 1, −1, 1, −1, 1, −1, 1, −1, −1, 1, 1, −1, −1, 1, −1,
−1, −1, −1, 1, 1, 1, −1, −1, −1, 1, 1, 1, 1, 1, −1, 1, 1, 1,
1, −1, −1, 1, −1, 1, −1, 1, 1, −1, −1, −1, 1, −1, 1, −1, 1,
1, 1, −1, 1, 1, 1, −1, 1, 1, 1, 1, 1, −1, −1, −1, −1, 1, 1,
1, 1, 1, −1, 1, 1, −1, 1, 1, −1, −1, 1, −1, 1, −1, 1, 1, 1,
1, −1, 1, −1, 1, −1, −1, 1, 1, −1, −1, −1, 1, −1, −1, −1,
−1, −1, 1, 1, −1, −1, 1, 1, 1, 1, 1, −1, 1, 1, 1, 1, 1, −1,
−1, 1, −1, 1, −1, 1, 1, −1, −1, 1, −1, 1, −1, 1, 1, −1, −1,
1, 1, 1, −1, 1, 1, 1, 1, 1, −1, −1, −1, −1, 1, 1, 1, 1, 1, −1,
1, 1, −1, 1, 1, −1, −1, 1, −1, 1, −1, 1, 1, 1, 1, −1, 1, −1,
1, −1, −1, 1, 1, −1, −1, −1, 1, −1, −1, −1, −1, −1, 1, 1,
−1, −1, 1, 1, 1, 1, 1, −1, 1, 1, 1, 1, 1, −1, −1, 1, −1, 1,
−1, 1, 1, −1, −1, 1, −1, 1, −1, 1, 1, −1, −1, −1, −1, 1, −1,
−1, −1, −1, −1, 1, 1, −1, −1, 1, 1, 1, 1, 1, −1, 1, 1, 1, −1,
−1, 1, 1, −1, −1, 1, −1, 1, −1, −1, 1, 1, −1, 1, −1, 1, −1,
−1, 1, 1, 1, 1, 1, −1, 1, 1, 1, 1, 1, −1, −1, −1, −1, 1, 1,
1, 1, 1, −1, 1, 1, −1, −1, 1, 1, −1, −1, 1, −1, 1, −1, −1,
1, 1, −1, 1, −1, 1, −1, −1, 1, 1, 1, 1, −1, 1, 1, 1, 1, 1, −1,
−1, 1, 1, −1, −1, −1, −1, −1, 1, −1, −1, −1, 1, 1, −1, −1,
1, 1, −1, 1, −1, 1, 1, −1, −1, 1, −1, 1, −1, 1, 1, −1, −1,
−1, −1, −1, 1, −1, −1, −1, −1, −1, 1, 1, 1, 1, −1, −1, −1,
−1, −1, 1, −1, −1, 1, 1, −1, −1, 1, 1, −1, 1, −1, 1, 1}.

Figures 15, 16:
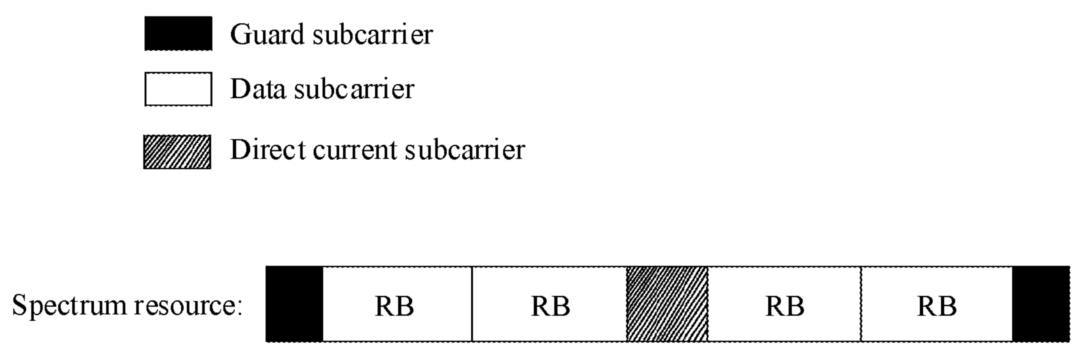
FIG. 15 is a schematic diagram of another PAPR according to an embodiment of this application.
FIG. 16 is a schematic structural diagram of another spectrum resource including one bonded channel according to an embodiment of this application.

For example, FIG. 15 shows PAPRs of two G4s in the plurality of allocation cases of the spectrum resource. As shown in FIG. 15, for the first G4, when the spectrum resource is allocated to seven receive ends according to the first allocation case in FIG. 14, PAPRs of seven segments of elements transmitted on seven segments of subcarriers allocated to the seven receive ends are all relatively low. For example, for the first G4, PAPRs of a segment of elements transmitted on a segment of subcarriers allocated to the receive end 1 are 4.5285; PAPRs of a segment of elements transmitted on a segment of subcarriers allocated to the receive end 2 are 3.5993; PAPRs of a segment of elements transmitted on a segment of subcarriers allocated to the receive end 3 are 4.5285; PAPRs of a segment of elements transmitted on a segment of subcarriers allocated to the receive end 4 are 4.8396; PAPRs of a segment of elements transmitted on a segment of subcarriers allocated to the receive end 5 are 5.2070; PAPRs of a segment of elements transmitted on a segment of subcarriers allocated to the receive end 6 are 3.9057; and PAPRs of a segment of elements transmitted on a segment of subcarriers allocated to the receive end 7 are 5.2070. When the spectrum resource is allocated to one receive end according to the second allocation case in FIG. 14, for the first G4, PAPRs of a segment of elements transmitted on a segment of subcarriers allocated to the receive end are all relatively low (for example, the PAPRs are 5.3267).

For the second G4, when the spectrum resource is allocated to seven receive ends according to the first allocation case in FIG. 14, PAPRs of seven segments of elements transmitted on seven segments of subcarriers allocated to the seven receive ends are all relatively low. For example, for the second G4, PAPRs of a segment of elements transmitted on a segment of subcarriers allocated to the receive end 1 are 4.8392; PAPRs of a segment of elements transmitted on a segment of subcarriers allocated to the receive end 2 are 4.2371; PAPRs of a segment of elements transmitted on a segment of subcarriers allocated to the receive end 3 are 4.8392; PAPRs of a segment of elements transmitted on a segment of subcarriers allocated to the receive end 4 are 4.9401; PAPRs of a segment of elements transmitted on a segment of subcarriers allocated to the receive end 5 are 4.5285; PAPRs of a segment of elements transmitted on a segment of subcarriers allocated to the receive end 6 are 4.8486; and PAPRs of a segment of elements transmitted on a segment of subcarriers allocated to the receive end 7 are 4.5285. When the spectrum resource is allocated to one receive end according to the second allocation case in FIG. 14, for the second G4, PAPRs of a segment of elements transmitted on a segment of subcarriers allocated to the receive end are all relatively low (for example, the PAPRs are 5.3574). It can be learned from FIG. 15 that no matter how the spectrum resource is allocated, an overall PAPR of G4 is relatively low, and a PAPR of a part that is in G4 and transmitted to each receive end is also relatively low.

In the second example, m=80. In this case, the sub-sequence includes: 80 basic elements arranged into a Golay sequence in the sub-sequence, where each element in the sub-sequence belongs to a target element set, and the target element set includes 1 and −1. The following separately describes different CB cases of the spectrum resource by using examples.

According to a first aspect, FIG. 16 is a schematic structural diagram of another spectrum resource including one bonded channel (that is, CB=1, and a bandwidth may be 2.16 GHz) according to an embodiment of this application. As shown in FIG. 16, the spectrum resource may include two segments of guard subcarriers, one segment of direct current subcarriers, and two segments of data subcarriers. Either of the two segments of data subcarriers includes two RBs, and the two segments of data subcarriers include four RBs in total. Each RB includes 80 subcarriers, and the two segments of data subcarriers include 320 subcarriers in total.

Figures 17, 18:
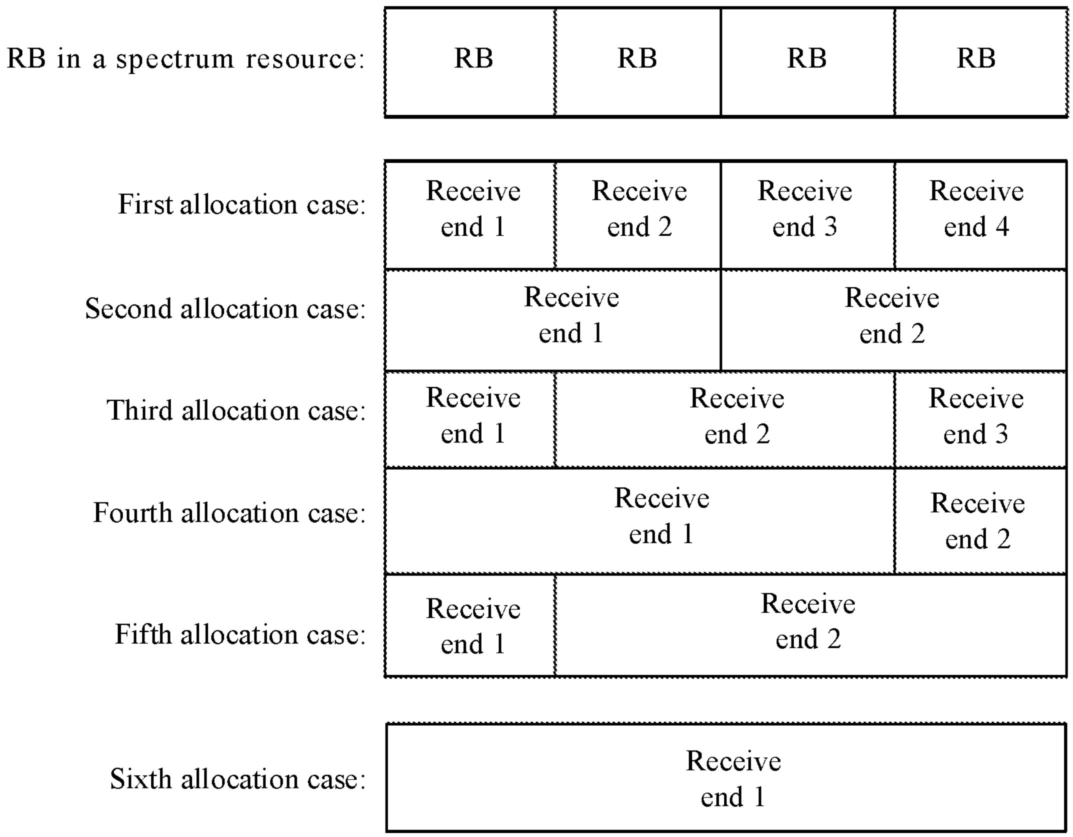
FIG. 17 is a schematic diagram of a plurality of allocation cases of the spectrum resource shown in FIG. 16 according to an embodiment of this application.
FIG. 18 is a schematic diagram of another PAPR according to an embodiment of this application.

FIG. 17 is a schematic diagram of a plurality of allocation cases of the spectrum resource shown in FIG. 16 according to an embodiment of this application. As shown in FIG. 17, six allocation cases of the spectrum resource shown in FIG. 16 may exist. In the first allocation case, the four RBs in the spectrum resource may be allocated to a maximum of four receive ends. For example, the first RB is allocated to the receive end 1, the second RB is allocated to the receive end 2, the third RB is allocated to the receive end 3, and the fourth RB is allocated to the receive end 4. In the second allocation case, the four RBs in the spectrum resource may be allocated to a maximum of two receive ends. For example, both the first RB and the second RB are allocated to the receive end 1, and both the third RB and the fourth RB are allocated to the receive end 2. In the third allocation case, the four RBs in the spectrum resource may be allocated to a maximum of three receive ends. For example, the first RB is allocated to the receive end 1, the second RB and the third RB are allocated to the receive end 2, and the fourth RB is allocated to the receive end 3. In the fourth allocation case, the four RBs in the spectrum resource may be allocated to a maximum of two receive ends. For example, the first RB, the second RB, and the third RB are all allocated to the receive end 1, and the fourth RB is allocated to the receive end 2. In the fifth allocation case, the four RBs in the spectrum resource may be allocated to a maximum of two receive ends. For example, the first RB is allocated to the receive end 1, and the second RB, the third RB, and the fourth RB are all allocated to the receive end 2. In the sixth allocation case, the four RBs in the spectrum resource may be allocated to a maximum of one receive end. For example, the first RB, the second RB, the third RB, and the fourth RB are all allocated to the receive end 1.

Based on a structure of the spectrum resource shown in FIG. 16 and the plurality of allocation cases shown in FIG. 17, a target part (including a data part and a direct current part) in the CEF obtained by the transmit end may be G1, and G1={A1, A2, 0, 0, 0, A1, −A2}.

A1={−C1, C2, C1, C2}, A2={C1, −C2, C1, C2}, C1 and C2 represent two Golay sequences whose lengths are both 20, −C1 represents −1 times C1, −C2 represents −1 times C2, and −A2 represents −1 times A2.

In the second example, when generating G1, the transmit end may first obtain a binary Golay sequence pair a1 and b1 whose lengths are 10. For example, a1=[1, 1, −1, 1, −1, 1, −1, −1, 1, 1]; and b1=[1, 1, −1, 1, 1, 1, 1, 1, −1, −1]. a1 and b1 may be orthogonal to each other or may not be orthogonal to each other. This is not limited in this embodiment of this application. After the binary Golay sequences a1 and b1 whose lengths are 10 are generated, the transmit end may generate, based on a1 and b1, the binary Golay sequences C1 and C2 whose lengths are 20. For example, C1={a1, b1}; and C2={a1, −b1}, where b1 represents −1 times b1. Certainly, C1 and C2 may alternatively be different from those provided in this embodiment of this application. This is not limited in this embodiment of this application. Then the transmit end generates, based on C1 and C2, the binary Golay sequences A1 and A2 whose lengths are 80, where A1={−C1, C2, C1, C2}, and A2={C1, −C2, C1, C2}. Then the transmit end may generate the sequence G1 whose length is 339, based on a structure of G1 and the generated sequences A1 and A2 whose lengths are 80. For example, in the second example, G1 in the CEF may be as follows:

G1={−1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, 1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, 1, 1, 1, 1, 1, −1, −1, 1, 1, −1, −1, −1, −1, −1, 1, −1, −1, 1, 1, −1, −1, 1, −1, 1, −1, 1, 1, 1, 1, −1, 1, −1, 1, −1, −1, 1, 1, 1, 1, −1, 1, 1, 1, 1, 1, −1, −1, −1, −1, 1, 1, 1, 1, 1, −1, 1, 1, −1, −1, 1, 1, −1, 1, −1, 1, −1, −1, 0, 0, 0, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, −1, −1, 1, 1, 1, 1, −1, 1, 1, −1, −1, 1, 1, −1, 1, −1, 1, −1, −1, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, −1, −1, 1, −1, 1, −1, 1, 1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1}.

FIG. 18 shows PAPRs of G1 in the plurality of allocation cases of the spectrum resource. As shown in FIG. 18, when the spectrum resource is allocated to four receive ends according to the first allocation case in FIG. 17, PAPRs of four segments of elements that are in G1 and transmitted on four segments of subcarriers allocated to the four receive ends are all relatively low. For example, for G1, PAPRs of a segment of elements transmitted on a segment of subcarriers allocated to the receive end 1 are 2.9879; PAPRs of a segment of elements transmitted on a segment of subcarriers allocated to the receive end 2 are 2.9984; PAPRs of a segment of elements transmitted on a segment of subcarriers allocated to the receive end 3 are 2.9879; and PAPRs of a segment of elements transmitted on a segment of subcarriers allocated to the receive end 4 are 2.9984. When the spectrum resource is allocated to two receive ends according to the second allocation case in FIG. 17, PAPRs of two segments of elements that are in G1 and transmitted on two segments of subcarriers allocated to the two receive ends are all relatively low. For example, for G1, PAPRs of a segment of elements transmitted on a segment of subcarriers allocated to the receive end 1 are 3.0103; and PAPRs of a segment of elements transmitted on a segment of subcarriers allocated to the receive end 2 are 3.0084. When the spectrum resource is allocated to one receive end according to the sixth allocation case in FIG. 17, PAPRs of a segment of elements that are in G1 and transmitted on a segment of subcarriers allocated to the receive end are all relatively low (for example, the PAPRs are 3.0024). It can be learned from FIG. 18 that no matter how the spectrum resource is allocated, an overall PAPR of G1 is relatively low, and a PAPR of a part that is in G1 and transmitted to each receive end is also relatively low.

Figure 19:
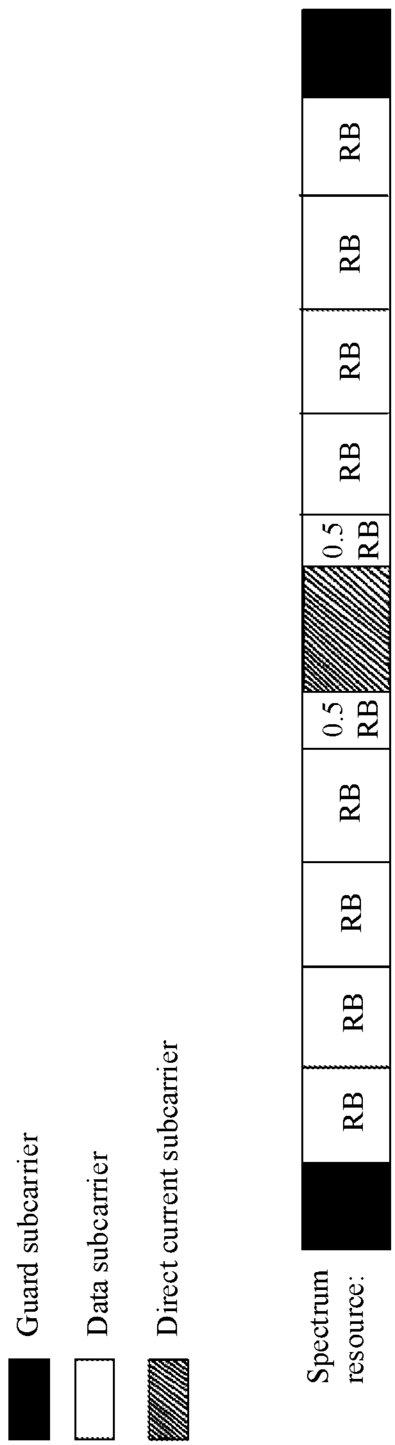
FIG. 19 is a schematic structural diagram of another spectrum resource including two bonded channels according to an embodiment of this application.

According to a second aspect, FIG. 19 is a schematic structural diagram of another spectrum resource including two bonded channels (that is, CB=2, and a bandwidth may be 4.32 GHz) according to an embodiment of this application. As shown in FIG. 19, the spectrum resource may include two segments of guard subcarriers, one segment of direct current subcarriers, and two segments of data subcarriers. Either of the two segments of data subcarriers includes 4.5 RBs, and the two segments of data subcarriers include nine RBs in total. Each RB includes 80 subcarriers, and the two segments of subcarriers include 720 subcarriers in total.

Figure 20:
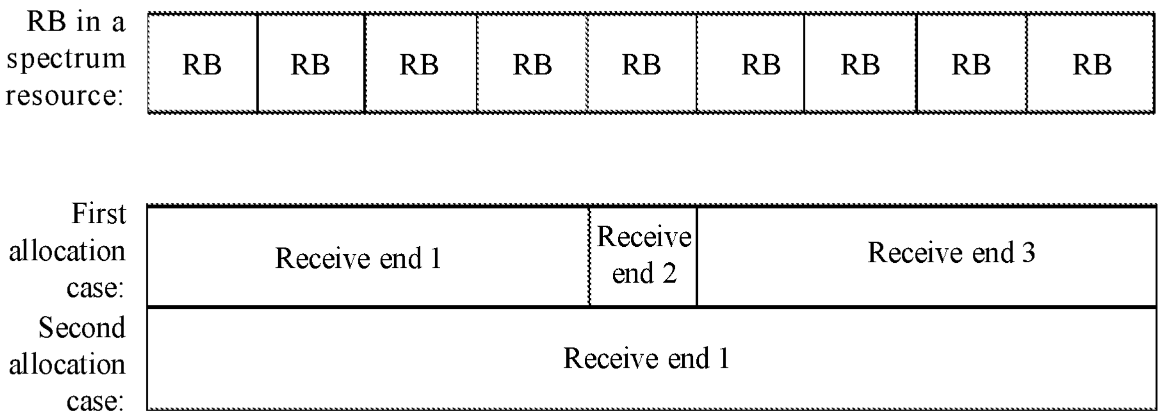
FIG. 20 is a schematic diagram of a plurality of allocation cases of the spectrum resource shown in FIG. 19 according to an embodiment of this application.

FIG. 20 is a schematic diagram of a plurality of allocation cases of the spectrum resource shown in FIG. 19 according to an embodiment of this application. As shown in FIG. 20, two allocation cases of the spectrum resource shown in FIG. 19 may exist. In the first allocation case, the nine RBs in the spectrum resource may be allocated to a maximum of three receive ends. For example, the first to the fourth RBs are all allocated to the receive end 1, the fifth RB is allocated to the receive end 2, and the sixth to the ninth RBs are all allocated to the receive end 3. In the second allocation case, the nine RBs in the spectrum resource may be allocated to a maximum of one receive end. For example, the first to the ninth RBs are all allocated to the receive end 1.

Based on a structure of the spectrum resource shown in FIG. 19 and the plurality of allocation cases shown in FIG. 20, a target part (including a data part and a direct current part) in the CEF obtained by the transmit end may be G2, and G2={A1, ±A2, ±A1, ±A2, ±[S80_21(1:40), 0, 0, 0, S80_21(41:80)], ±A1, ±A2, ±A1, ±A2}, where ± represents + or −, S80_n belongs to a sequence set formed by A1, A2, A3, A4, A5, A6, A7, and A8, n≥1, S80_n(a:b) represents $a^{th}$ to $b^{th}$ elements in S80_n, and a and b are both greater than 0; and A3={C1, C2, −C1, C2}, A4={C1, C2, C1, −C2}, A5={−S1, S2, S1, S2}, A6={S1, −S2, S1, S2}, A7={S1, S2, −S1, S2}, A8={S1, S2, S1, −S2}, S1 and S2 represent two Golay sequences whose lengths are both 20, −S1 represents −1 times S1, and −S2 represents −1 times S2.

In the second example, in a process of generating G1, after generating a1 and b1, the transmit end may generate a2 and b2 based on a1 and b1. For the process, refer to descriptions in the first example. Details are not described herein again in this embodiment of this application.

After generating the binary Golay sequences a2 and b2 whose lengths are 10, the transmit end may generate, based on a2 and b2, the binary Golay sequences S1 and S2 whose lengths are 20. For example, S1={a2, b2}; and S2={a2, −b2}, where −b1 represents −1 times b1, and −b2 represents −1 times b2. Certainly, C1, C2, S1, and S2 may alternatively be different from those provided in this embodiment of this application. This is not limited in this embodiment of this application. Then the transmit end generates, based on C1, C2, S1, and S2, the binary Golay sequences A3 to A8 whose lengths are 80. Finally, the transmit end may generate G2 based on the sequence set formed by A1 to A8 and a structure of G2. For example, the transmit end may select, based on the structure of G2, a sequence as S80_21 from the sequence set formed by A1 to A8. In this way, the transmit end may generate, based on A1, A2, S80_21, and the structure of G1, a plurality of sequences whose lengths are 723, sort the sequences whose lengths are 723 in ascending order of overall PAPRs of the sequences, and use a sequence with a lowest (or lower) overall PAPR in the plurality of sequences whose lengths are 723, as G2. In the second example, G2 in the CEF may be as follows:

G2={−1, −1, 1, −1, 1, −1, 1, 1, −1, −1, −1, −1, 1, −1, −1,
−1, −1, −1, 1, 1, −1, −1, 1, 1, 1, 1, 1, −1, 1, 1, −1, −1,
1, 1, −1, 1, −1, 1, −1, −1, 1, 1, −1, 1, −1, 1, −1, −1, 1,
1, 1, 1, −1, 1, 1, 1, 1, 1, −1, −1, −1, −1, 1, 1, 1, 1, 1, −1,
1, 1, −1, −1, 1, 1, −1, 1, −1, 1, −1, −1, −1, −1, 1, −1, 1,
−1, 1, 1, −1, −1, −1, −1, 1, −1, −1, −1, −1, −1, 1, 1, −1,
−1, 1, 1, 1, 1, 1, −1, 1, 1, −1, −1, 1, 1, −1, 1, −1, 1, −1,
−1, −1, −1, 1, −1, 1, −1, 1, 1, −1, −1, −1, −1, 1, −1, −1,
−1, −1, −1, 1, 1, 1, 1, −1, −1, −1, −1, −1, 1, −1, −1, 1,
1, −1, 1, 1, −1, 1, −1, 1, 1, −1, −1, 1, −1, 1, −1, 1, 1, −1,
−1, −1, −1, 1, −1, −1, −1, −1, −1, 1, 1, −1, −1, 1, 1, 1,
1, 1, −1, 1, 1, −1, −1, 1, 1, −1, 1, −1, 1, −1, −1, 1, 1, −1,
1, −1, 1, −1, −1, 1, 1, 1, 1, −1, 1, 1, 1, 1, 1, −1, −1, −1,
−1, 1, 1, 1, 1, 1, −1, 1, 1, −1, −1, 1, 1, −1, 1, −1, 1, −1,
−1, 1, 1, −1, 1, −1, 1, −1, −1, 1, 1, 1, 1, −1, 1, 1, 1, 1,
1, −1, −1, 1, 1, −1, −1, −1, −1, −1, 1, −1, −1, 1, 1, −1,
−1, 1, −1, 1, −1, 1, 1, 1, 1, −1, 1, −1, 1, −1, −1, 1, 1, 1,
1, −1, 1, 1, 1, 1, 1, −1, −1, −1, −1, 1, 1, 1, 1, 1, −1, 1,
1, −1, −1, 1, 1, −1, 1, −1, 1, −1, −1, −1, −1, 1, −1, 1, −1,
1, 1, −1, −1, −1, −1, 1, −1, −1, −1, −1, −1, 1, 1, −1, −1,
1, 1, 1, 1, 1, −1, 1, 1, −1, −1, 1, 1, −1, 1, −1, 1, −1, −1,
0, 0, 0, 1, 1, −1, 1, −1, 1, −1, −1, 1, 1, 1, 1, −1, 1, 1, 1,
1, 1, −1, −1, −1, −1, 1, 1, 1, 1, 1, −1, 1, 1, −1, −1, 1, 1,
−1, 1, −1, 1, −1, −1, 1, 1, −1, 1, −1, 1, −1, −1, 1, 1, 1,
1, −1, 1, 1, 1, 1, 1, −1, −1, 1, 1, −1, −1, −1, −1, −1, 1,
−1, −1, 1, 1, −1, −1, 1, −1, 1, −1, 1, 1, −1, −1, 1, −1, 1,
−1, 1, 1, −1, −1, −1, −1, 1, −1, −1, −1, −1, −1, 1, 1, 1,
1, −1, −1, −1, −1, −1, 1, −1, −1, 1, 1, −1, −1, 1, 1, 1, −1,
1, 1, 1, 1, −1, 1, −1, 1, −1, −1, 1, 1, 1, 1, −1, 1, 1, 1, 1,
1, −1, −1, 1, 1, −1, −1, −1, −1, −1, 1, 1, −1, 1, 1, −1, −1,
1, −1, 1, −1, 1, 1, 1, 1, −1, 1, −1, 1, −1, −1, 1, 1, 1, 1,
−1, 1, 1, 1, 1, 1, −1, −1, −1, 1, 1, 1, 1, 1, 1, −1, 1, 1, −1,
−1, 1, 1, −1, 1, −1, 1, −1, −1, −1, −1, 1, −1, 1, −1, 1, 1,
−1, −1, −1, −1, 1, 1, −1, −1, −1, −1, 1, 1, −1, −1, 1, 1,
1, 1, 1, −1, 1, 1, −1, −1, 1, 1, −1, 1, −1, 1, −1, −1, 1, 1,
−1, 1, −1, 1, −1, −1, 1, 1, 1, 1, −1, 1, 1, 1, 1, 1, −1, −1,

−1, −1, 1, 1, 1, 1, 1, −1, 1, 1, −1, −1, 1, 1, −1, 1, −1, 1,
−1, 1, 1, 1, −1, 1, −1, 1, −1, −1, 1, 1, 1, 1, −1, 1, 1, 1,
1, 1, −1, −1, 1, 1, −1, −1, −1, −1, −1, 1, −1, −1, 1, 1, −1,
−1, 1, −1, 1, −1, 1, 1, 1, 1, −1, 1, −1, 1, −1, −1, 1, 1, 1,
1, −1, 1, 1, 1, 1, 1, −1, −1, −1, −1, 1, 1, 1, 1, 1, −1, 1,
1, −1, −1, 1, 1, −1, 1, −1, 1, −1, −1}.

Figure 21:
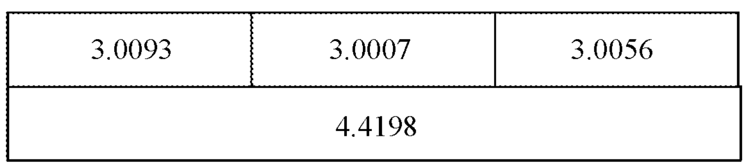
FIG. 21 is a schematic diagram of another PAPR according to an embodiment of this application.

For example, FIG. 21 shows PAPRs of G2 in the plurality of allocation cases of the spectrum resource. As shown in FIG. 21, when the spectrum resource is allocated to three receive ends according to the first allocation case in FIG. 19, PAPRs of three segments of elements that are in G2 and transmitted on three segments of subcarriers allocated to the three receive ends are all relatively low. For example, for G2, PAPRs of a segment of elements transmitted on a segment of subcarriers allocated to the receive end 1 are 3.0093; PAPRs of a segment of elements transmitted on a segment of subcarriers allocated to the receive end 2 are 3.0007; and PAPRs of a segment of elements transmitted on a segment of subcarriers allocated to the receive end 3 are 3.0056. When the spectrum resource is allocated to one receive end according to the second allocation case in FIG. 19, for G2, PAPRs of a segment of elements transmitted on a segment of subcarriers allocated to the receive end are all relatively low (for example, the PAPRs are 4.4198). It can be learned from FIG. 21 that no matter how the spectrum resource is allocated, an overall PAPR of G2 is relatively low, and a PAPR of a part that is in G2 and transmitted to each receive end is also relatively low.

Figure 22:
FIG. 22 is a schematic structural diagram of another spectrum resource including three bonded channels according to an embodiment of this application.

According to a third aspect, FIG. 22 is a schematic structural diagram of a spectrum resource including three bonded channels (that is, CB=3, and a bandwidth may be 6.48 GHz) according to an embodiment of this application. As shown in FIG. 22, the spectrum resource may include two segments of guard subcarriers, one segment of direct current subcarriers, and two segments of data subcarriers. Either of the two segments of data subcarriers includes seven RBs, and the two segments of data subcarriers include 14 RBs in total. Each RB includes 80 subcarriers, and the two segments of data subcarriers include 1120 subcarriers in total.

Figures 23, 24:
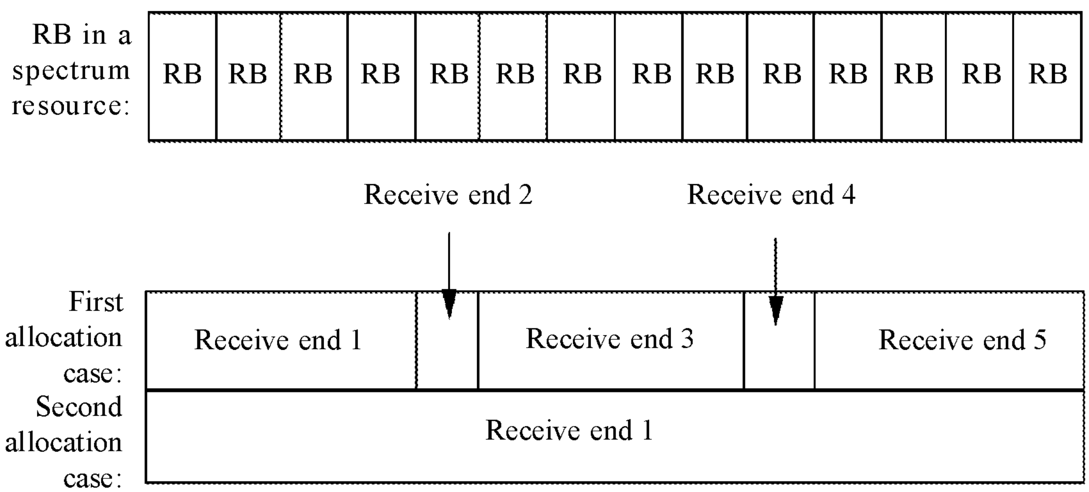
FIG. 23 is a schematic diagram of a plurality of allocation cases of the spectrum resource shown in FIG. 22 according to an embodiment of this application.
FIG. 24 is a schematic diagram of another PAPR according to an embodiment of this application.

FIG. 23 is a schematic diagram of a plurality of allocation cases of the spectrum resource shown in FIG. 22 according to an embodiment of this application. As shown in FIG. 23, two allocation cases of the spectrum resource shown in FIG. 22 may exist. In the first allocation case, the 14 RBs in the spectrum resource may be allocated to a maximum of five receive ends. For example, the first to the fourth RBs are all allocated to the receive end 1, the fifth RB is allocated to the receive end 2, the sixth to the ninth RBs are all allocated to the receive end 3, the tenth RB is allocated to the receive end 4, and the eleventh to the fourteenth RBs are all allocated to the receive end 5. In the second allocation case, the 14 RBs in the spectrum resource may be allocated to a maximum of one receive end. For example, the first to the fourteenth RBs are all allocated to the receive end 1.

Based on a structure of the spectrum resource shown in FIG. 22 and the plurality of allocation cases shown in FIG. 23, a target part (including a data part and a direct current part) in the CEF obtained by the transmit end may be G3, and G3={A1, ±A2, ±A1, ±A2, ±S80_31, ±A1, ±A2, 0, 0, 0, A1, ±A2, ±S80_32, ±A1, ±A2, ±A1, ±A2}, where ± represents + or −, S80_n belongs to a sequence set formed by A1, A2, A3, A4, A5, A6, A7, and A8, n≥1, S80_n(a:b) represents $a^{th}$ to $b^{th}$ elements in S80_n, and a and b are both greater than 0; and A3={C1, C2, −C1, C2}, A4={C1, C2, C1, −C2}, A5={−S1, S2, S1, S2}, A6={S1, −S2, S1, S2}, A7={S1, S2, −S1, S2}, A8={S1, S2, S1, −S2}, S1 and S2 represent two Golay sequences whose lengths are both 20, −S1 represents −1 times S1, and −S2 represents −1 times S2.

In the second example, after the transmit end generates the binary Golay sequences A3 to A8 whose lengths are 80, the transmit end may generate G3 based on the sequence set formed by A1 to A8 and a structure of G3. For example, the transmit end may select, based on the structure of G3, a sequence as S80_31 from the sequence set formed by A1 to A8 (and may also generate S80_32 by using a similar method). In this way, the transmit end may generate, based on A1, A2, S80_31, S80_32, and the structure of G3, a plurality of sequences whose lengths are 1123, sort the sequences whose lengths are 1123 in ascending order of overall PAPRs of the sequences, and use a sequence with a lowest (or lower) overall PAPR in the plurality of sequences whose lengths are 1123, as G3. In the second example, G3 in the CEF may be as follows:

G3={−1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, 1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, 1, 1, 1, 1, 1, 1, −1, −1, 1, 1, −1, −1, −1, −1, −1, 1, −1, −1, 1, 1, −1, −1, 1, −1, 1, −1, 1, 1, 1, 1, −1, 1, −1, 1, −1, −1, 1, 1, 1, 1, −1, 1, 1, 1, 1, 1, −1, −1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, 1, 1, −1, −1, −1, −1, −1, 1, −1, −1, 1, 1, −1, −1, 1, −1, 1, −1, 1, 1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1, 1, 1, −1, 1, −1, 1, −1, −1, 1, 1, 1, 1, −1, 1, 1, 1, 1, 1, −1, −1, 1, 1, −1, −1, −1, −1, −1, 1, −1, −1, 1, 1, −1, −1, 1, −1, 1, −1, 1, 1, 1, 1, −1, 1, −1, 1, −1, −1, 1, 1, 1, 1, −1, 1, 1, 1, 1, −1, −1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, 1, 1, −1, −1, −1, −1, −1, 1, −1, −1, 1, 1, −1, −1, 1, −1, 1, −1, 1, 1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, −1, −1, 1, −1, 1, −1, 1, 1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1, 0, 0, 0, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, 1, 1, −1, 1, −1, 1, −1, 1, 1, 1, 1, 1, −1, 1, 1, 1, 1, 1, −1, −1, −1, −1, 1, 1, 1, 1, 1, −1, 1, 1, −1, −1, 1, 1, −1, 1, −1, 1, −1, −1, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, −1, −1, 1, −1, 1, −1, 1, 1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1, 1, −1, 1, −1, 1, −1, −1, 1, 1, 1, 1, −1, 1, 1, 1, 1, 1, −1, −1, 1, 1, −1, −1, −1, −1, −1, 1, −1, −1, 1, 1, −1, −1, 1, −1, 1, −1, 1, 1, 1, 1, −1, 1, −1, 1, −1, −1, 1, 1, 1, 1, −1, 1, 1, 1, 1, 1, −1, −1, −1, −1, 1, 1, 1, 1, 1, −1, 1, 1, −1, −1, 1, 1, −1, 1, −1, 1, −1, −1, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, −1, −1, 1, 1, 1, 1, 1, 1, 1, 1, −1, −1, 1, 1, −1, 1, −1, 1, −1, 1, −1, −1, 1, 1, −1, 1, −1, 1, −1, 1, −1, −1, −1, 1, 1, 1, −1, −1, 1, 1, −1, −1, −1, −1, −1, 1, −1, −1, 1, 1, −1, 1, −1, 1, 1, 1, 1, 1, 1, 1, 1, −1, 1, 1, 1, 1, 1, −1, −1, −1, −1, 1, 1, 1, 1, 1, −1, −1, 1, 1, −1, −1, −1, −1, −1, 1, −1, −1, 1, 1, −1, −1, −1, −1, 1, −1, 1, −1, 1, 1, 1, 1, −1, 1, −1, 1, −1, −1, 1, 1, 1, 1, −1, 1, 1, 1, 1, 1, −1, −1, −1, −1, 1, 1, 1, 1, 1, −1, 1, 1, −1, −1, 1, 1, −1, 1, −1, 1, −1, 1, −1, −1, 1, 1, −1, 1, −1, 1, −1, −1, −1, −1, 1, −1, 1, −1, 1, −1, 1, −1, −1, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, 1, 1, −1, 1, −1, 1, −1, 1, 1, 1, 1, 1, −1, 1, 1, 1, 1, 1, −1, 1, 1, −1, −1, 1, 1, −1, 1, −1, 1, −1, −1, −1, −1, 1, −1, 1, −1, 1, 1, −1, −1, −1, −1, 1, −1, −1, −1, −1, −1, 1, 1, 1, −1, −1, −1, −1, −1, 1, −1, −1, 1, 1, −1, −1, 1, −1, 1, −1, 1, −1, 1, 1}.

For example, FIG. 24 shows PAPRs of G3 in the plurality of allocation cases of the spectrum resource. As shown in FIG. 24, when the spectrum resource is allocated to five receive ends according to the first allocation case in FIG. 23, PAPRs of five segments of elements that are in G3 and transmitted on five segments of subcarriers allocated to the five receive ends are all relatively low. For example, for G3, PAPRs of a segment of elements transmitted on a segment of subcarriers allocated to the receive end 1 are 3.0054; PAPRs of a segment of elements transmitted on a segment of subcarriers allocated to the receive end 2 are 3.0092; PAPRs of a segment of elements transmitted on a segment of subcarriers allocated to the receive end 3 are 3.0045; PAPRs of a segment of elements transmitted on a segment of subcarriers allocated to the receive end 4 are 3.0092; and PAPRs of a segment of elements transmitted on a segment of subcarriers allocated to the receive end 5 are 3.0082. When the spectrum resource is allocated to one receive end according to the second allocation case in FIG. 23, for G3, PAPRs of a segment of elements transmitted on a segment of subcarriers allocated to the receive end are all relatively low (for example, the PAPRs are 4.5600). It can be learned from FIG. 24 that no matter how the spectrum resource is allocated, an overall PAPR of G3 is relatively low, and a PAPR of a part that is in G3 and transmitted to each receive end is also relatively low.

Figure 25:
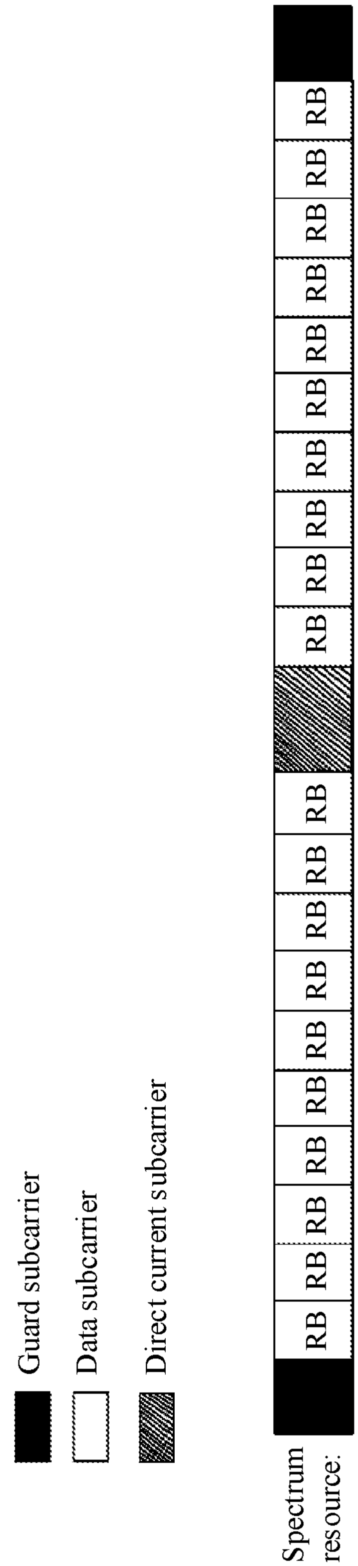
FIG. 25 is a schematic structural diagram of another spectrum resource including four bonded channels according to an embodiment of this application.

According to a fourth aspect, FIG. 25 is a schematic structural diagram of another spectrum resource including fourth bonded channels (that is, CB=4, and a bandwidth may be 8.64 GHz) according to an embodiment of this application. As shown in FIG. 25, the spectrum resource may include two segments of guard subcarriers, one segment of direct current subcarriers, and two segments of data subcarriers. Either of the two segments of data subcarriers includes 10 RBs, and the two segments of data subcarriers include 20 RBs in total. Each RB includes 80 subcarriers, and the two segments of data subcarriers include 1600 subcarriers in total.

Figure 26:
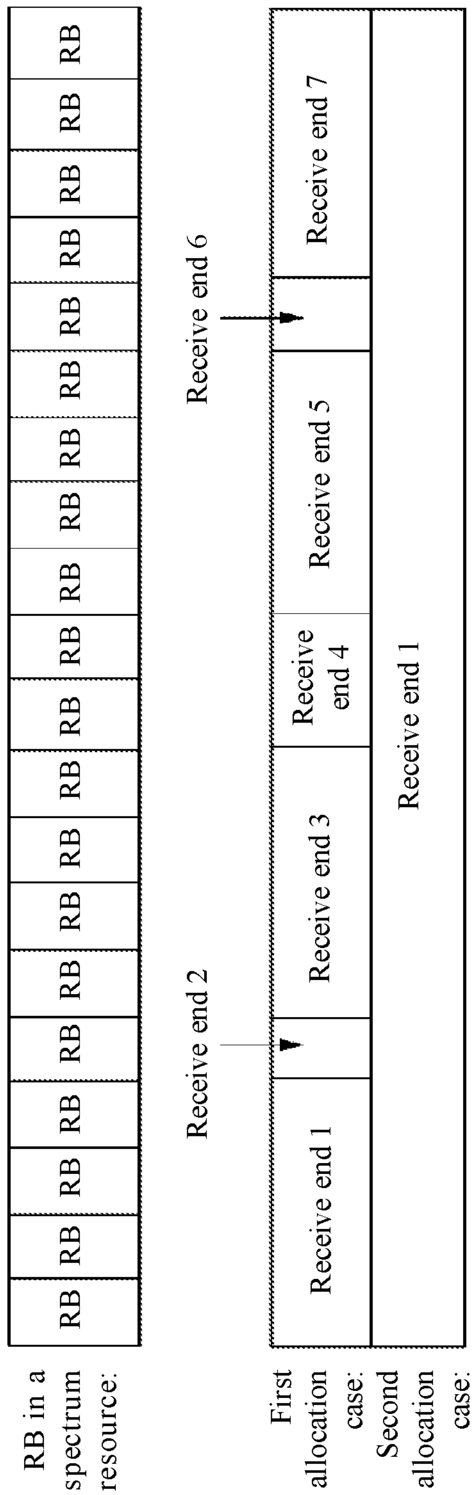
FIG. 26 is a schematic diagram of another PAPR according to an embodiment of this application.

FIG. 26 is a schematic diagram of a plurality of allocation cases of the spectrum resource shown in FIG. 25 according to an embodiment of this application. As shown in FIG. 26, two allocation cases of the spectrum resource shown in FIG. 25 may exist. In the first allocation case, the 20 RBs in the spectrum resource may be allocated to a maximum of eight receive ends. For example, the first to the fourth RBs are all allocated to the receive end 1, the fifth RB is allocated to the receive end 2, the sixth to the ninth RBs are allocated to the receive end 3, the tenth and the eleventh RBs are allocated to the receive end 4, the twelfth to the fifteenth RBs are allocated to the receive end 5, the sixteenth RB is allocated to the receive end 6, and the seventeenth to the twentieth RBs are allocated to the receive end 7. In the second allocation case, the 20 RBs in the spectrum resource may be allocated to a maximum of one receive end. For example, the first to the twentieth RBs are all allocated to the receive end 1.

Based on a structure of the spectrum resource shown in FIG. 25 and the plurality of allocation cases shown in FIG. 26, a target part (including a data part and a direct current part) in the CEF obtained by the transmit end may be G4, and G4={S320_41, ±S80_41, ±S320_42, ±S80_42, 0, 0, 0, S80_43, ±S320_43, ±S80_44, ±S320_44}, where S320_n includes four sequentially arranged Golay sequences whose lengths are 80, ± represents + or −, S80_n belongs to a sequence set formed by A1, A2, A3, A4, A5, A6, A7, and A8, and n≥1; and A3={C1, C2, −C1, C2}, A4={C1, C2, C1, −C2}, A5={−S1, S2, S1, S2}, A6={S1, −S2, S1, S2}, A7={S1, S2, −S1, S2}, A8={S1, S2, S1, −S2}, S1 and S2 represent two Golay sequences whose lengths are both 20, −S1 represents −1 times S1, and −S2 represents −1 times S2.

Optionally, S320_n belongs to a sequence set formed by [−x, y, x, y], [x, −y, x, y], [x, y, −x, y], [x, y, x, −y], [−c, d, c, d], [c, −d, c, d], [c, d, −c, d], and [c, d, c, −d], x is any sequence in A1, A3, A5, and A7, y is any sequence in A2, A4, A6, and A8, c is a reverse order of x, and d is a reverse order of y. It should be noted that if orders of two sequences are reverse to each other, an order of one of the two sequences can be reversed to obtain the other sequence.

In the second example, after generating A1 to A8, the transmit end may generate [−x, y, x, y], [x, −y, x, y], [x, y, −x, y], [x, y, x, −y], [−c, d, c, d], [c, −d, c, d], [c, d, −c, d], and [c, d, c, −d] based on A1 to A8. Then the transmit end may generate G4 based on the sequence set formed by [−x, y, x, y], [x, −y, x, y], [x, y, −x, y], [x, y, x, −y], [−c, d, c, d], [c, −d, c, d], [c, d, −c, d], and [c, d, c, −d], the sequence set formed by A1 to A8, and a structure of G4. For example, based on the structure of G4, the transmit end may select a sequence as S320_41 from the sequence set formed by [−x, y, x, y], [x, −y, x, y], [x, y, −x, y], [x, y, x, −y], [−c, d, c, d], [c, −d, c, d], [c, d, −c, d], and [c, d, c, −d] (and obtain S320_42, S320_43, and S320_44 by using a similar method); and the transmit end may further select a sequence as S80_41 from the sequence set formed by A1 to A8 (and obtain S80_42, S80_43, and S80_44 by using a similar method). Finally, the transmit end may generate, based on the structure of G4, a plurality of sequences whose lengths are 1603, sort the sequences whose lengths are 1603 in ascending order of overall PAPRs of the sequences, and use a sequence with a lowest (or lower) overall PAPR in the plurality of sequences whose lengths are 1603, as G4. In the second example, G4 in the CEF may be as follows:

G4={−1, −1, 1, −1, 1, −1, 1, 1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1, 1, 1, −1, 1, −1, 1, −1, −1, 1, 1, 1, 1, −1, 1, 1, 1, 1, 1, 1, −1, 1, 1, −1, −1, −1, −1, −1, 1, −1, −1, 1, 1, −1, −1, 1, −1, 1, −1, 1, 1, 1, 1, −1, 1, −1, 1, −1, −1, 1, 1, 1, 1, −1, 1, 1, 1, 1, 1, −1, −1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, 1, 1, −1, −1, −1, −1, −1, 1, −1, −1, 1, 1, −1, −1, 1, −1, 1, −1, 1, 1, −1, −1, 1, −1, 1, −1, 1, 1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1, 1, 1, −1, 1, −1, 1, −1, −1, 1, 1, 1, 1, −1, 1, 1, 1, 1, 1, −1, −1, 1, 1, −1, −1, −1, −1, −1, 1, −1, −1, 1, 1, −1, −1, 1, −1, 1, −1, 1, 1, −1, −1, 1, −1, 1, −1, 1, 1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1, −1, −1, 1, −1, 1, −1, 1, 1, −1, −1, 1, −1, 1, −1, 1,

1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, −1, −1, 1, 1, 1, 1, 1, −1, 1, 1, −1, −1, 1, 1, −1, 1, −1, 1, −1, −1, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, 1, −1, −1, 1, 1, 1, 1, −1, 1, 1, 1, 1, 1, −1, −1, −1, −1, 1, 1, 1, 1, 1, −1, 1, 1, −1, −1, 1, 1, −1, 1, −1, 1, −1, −1, −1, −1, 1, −1, 1, −1, 1, 1, −1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, −1, −1, 1, 1, 1, 1, 1, −1, 1, 1, −1, −1, 1, 1, −1, 1, −1, 1, −1, −1, −1, −1, 1, −1, 1, −1, −1, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, 1, −1, −1, 1, 1, 1, 1, −1, 1, 1, 1, 1, 1, −1, −1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, 1, 1, −1, −1, −1, −1, −1, 1, −1, −1, 1, 1, −1, −1, 1, −1, 1, −1, 1, 1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1, 1, 1, −1, 1, −1, 1, −1, −1, 1, 1, 1, 1, −1, 1, 1, 1, 1, 1, −1, −1, 1, 1, −1, −1, −1, −1, −1, 1, 1, 0, 0, 0, −1, −1, 1, −1, 1, −1, 1, 1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, −1, −1, 1, −1, 1, −1, 1, 1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1, 1, 1, 1, 1, −1, 1, −1, −1, 1, 1, 1, 1, −1, 1, 1, 1, 1, 1, −1, −1, 1, 1, −1, −1, −1, −1, −1, 1, −1, −1, 1, 1, −1, −1, 1, −1, 1, −1, 1, 1, 1, 1, −1, 1, −1, 1, −1, −1, 1, 1, 1, 1, −1, 1, 1, 1, 1, 1, −1, −1, −1, −1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, 1, 1, 1, −1, −1, −1, −1, 1, −1, −1, 1, 1, −1, −1, 1, −1, 1, −1, 1, 1, 1, 1, −1, 1, −1, 1, −1, −1, 1, 1, 1, 1, −1, −1, −1, −1, 1, 1, 1, 1, 1, −1, 1, 1, −1, −1, 1, 1, −1, 1, −1, 1, −1, −1, −1, −1, 1, −1, 1, −1, −1, −1, −1, 1, −1, 1, −1, 1, 1, −1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, 1, 1, −1, −1, −1, −1, −1, 1, −1, −1, 1, 1, −1, −1, 1, −1, 1, −1, 1, 1, −1, −1, −1, −1, −1, 1, −1, −1, −1, −1, −1, 1, 1, 1, 1, −1, −1, −1, −1, −1, 1, −1, 1, −1, −1, 1, 1, −1, −1, 1, −1, 1, −1, 1, 1, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, 1, −1, 1, −1, 1, −1, 1, 1, −1, −1, −1, −1, 1, −1, −1, −1, −1, −1, 1, 1, 1, 1, −1, −1, −1, −1, −1, 1, −1, −1, 1, 1, −1, −1, 1, −1, 1, −1, 1, 1, 1, 1, −1, 1, −1, 1, −1, −1, 1, 1, 1, 1, 1, −1, 1, 1, 1, 1, 1, −1, −1, 1, 1, −1, −1, 1, −1, −1, 1, −1, −1, 1, 1, −1, −1, 1, −1, 1, −1, 1, 1, 1, 1, −1, 1, −1, 1, −1, −1, 1, 1, 1, 1, −1, 1, 1, 1, 1, 1, −1, −1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, 1, 1, −1, −1, −1, −1, −1, 1, −1, −1, 1, 1, −1,

−1, 1, −1, 1, −1, 1, 1, 1, 1, −1, 1, −1, 1, −1, −1, 1, 1, 1, 1, −1, 1, 1, 1, 1, 1, 1, −1, −1, −1, −1, 1, 1, 1, 1, 1, −1, 1, 1, −1, −1, 1, 1, −1, 1, −1, 1, −1, −1, −1, −1, 1, −1, 1, −1, 1, 1, −1, −1, −1, −1, 1, −1, −1, −1, −1, −1, 1, 1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, −1, −1, 1, 1, 1, 1, 1, −1, 1, 1, −1, −1, 1, 1, −1, 1, −1, 1, −1, −1, 1, 1, −1, 1, −1, 1, −1, −1, 1, 1, 1, 1, −1, 1, 1, 1, 1, 1, −1, −1, 1, 1, −1, −1, −1, −1, −1, 1, −1, −1, 1, 1, −1, −1, 1, −1, 1, −1, 1, 1}.

For example, FIG. 27 shows PAPRs of G4 in the plurality of allocation cases of the spectrum resource. As shown in FIG. 27, when the spectrum resource is allocated to eight receive ends according to the first allocation case in FIG. 26, PAPRs of eight segments of elements that are in G4 and transmitted on eight segments of subcarriers allocated to the eight receive ends are all relatively low. For example, for G4, PAPRs of a segment of elements transmitted on a segment of subcarriers allocated to the receive end 1 are 3.0084; PAPRs of a segment of elements transmitted on a segment of subcarriers allocated to the receive end 2 are 3.0048; PAPRs of a segment of elements transmitted on a segment of subcarriers allocated to the receive end 3 are 3.0084; PAPRs of a segment of elements transmitted on a part of subcarriers in a segment of subcarriers allocated to the receive end 4 are 3.0084, and PAPRs of a segment of elements transmitted on another part of subcarriers in the segment of subcarriers allocated to the receive end 4 are 2.9743; PAPRs of a segment of elements transmitted on a segment of subcarriers allocated to the receive end 5 are 3.0085; PAPRs of a segment of elements transmitted on a segment of subcarriers allocated to the receive end 6 are 2.9743; and PAPRs of a segment of elements transmitted on a segment of subcarriers allocated to the receive end 7 are 3.0085. When the spectrum resource is allocated to one receive end according to the second allocation case in FIG. 26, for G4, PAPRs of a segment of elements transmitted on a segment of subcarriers allocated to the receive end are all relatively low (for example, the PAPRs are 4.4933). It can be learned from FIG. 27 that no matter how the spectrum resource is allocated, an overall PAPR of G4 is relatively low, and a PAPR of a part that is in G4 and transmitted to each receive end is also relatively low.

In the third example, m=84. In this case, the sub-sequence includes: 80 basic elements arranged into a Golay sequence in the sub-sequence and four interpolation elements located after the 80 basic elements, where each element in the sub-sequence belongs to a target element set, and the target element set includes 1 and −1. The following separately describes different CB cases of the spectrum resource by using examples.

According to a first aspect, based on a structure of a spectrum resource shown in FIG. 4 and a plurality of allocation cases shown in FIG. 5, a target part (including a data part and a direct current part) in the CEF obtained by the transmit end may be G1, and G1={A, ±A, 0, 0, 0, ±A, ±A}.

A Golay sequence in which 80 basic elements are arranged in A is T1 or T2, $$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two Golay sequences whose lengths are both 10, S1 and S2 represent two Golay sequences whose lengths are both 8, ⊗ represents a Kronecker product, $\overleftarrow{S1}$ represents a reverse order of S1, $\overleftarrow{S2}$ represents a reverse order of S2, and ± represents + or −. C1 and C2 may be orthogonal to each other or may not be orthogonal to each other, and S1 and S2 may be orthogonal to each other or may not be orthogonal to each other. This is not limited in this embodiment of this application.

In the third example, when generating G1, the transmit end may first obtain binary Golay sequences C1 and C2 whose lengths are 10 (both include two elements, such as 1 and −1), and binary Golay sequences S1 and S2 whose lengths are 8 (both include two elements, such as 1 and −1). Then T1 and T2 are generated based on S1, S2, C1, and C2. Then the transmit end appends four elements to each sequence in T1 and T2 (the four elements may include at least one element of 1 and −1) to obtain a plurality of sequences whose lengths are 84. Then the transmit end may sort the obtained sequences whose lengths are 84 in ascending order of overall PAPRs of the sequences, and use a sequence with a lowest (or lower) overall PAPR as A in G1. Finally, the transmit end may generate, based on A and a structure of G1, a plurality of sequences whose lengths are 339, sort the sequences whose lengths are 339 in ascending order of overall PAPRs of the sequences, and use a sequence with a lowest (or lower) overall PAPR in the plurality of sequences whose lengths are 339, as G1.

For example, FIG. 28 shows PAPRs of G1 in the plurality of allocation cases of the spectrum resource. As shown in FIG. 28, when the spectrum resource is allocated to four receive ends according to the first allocation case in FIG. 5, PAPRs of four segments of elements that are in G1 and transmitted on four segments of subcarriers allocated to the four receive ends are all relatively low. For example, PAPRs of parts that are in G1 and transmitted on subcarriers allocated to the receive end 1, the receive end 2, the receive end 3, and the receive end 4 are all 3.8895. When the spectrum resource is allocated to two receive ends according to the second allocation case in FIG. 5, PAPRs of a segment of elements that are in G1 and transmitted on a segment of subcarriers allocated to the receive end 1 are 6.5215; and PAPRs of a segment of elements that are in G1 and transmitted on a segment of subcarriers allocated to the receive end 2 are 6.6901. When the spectrum resource is allocated to one receive end according to the sixth allocation case in FIG. 5, PAPRs of a segment of elements that are in G1 and transmitted on a segment of subcarriers allocated to the receive end are all relatively low (for example, the PAPRs are 6.2308). It can be learned from FIG. 28 that no matter how the spectrum resource is allocated, an overall PAPR of G1 is relatively low, and a PAPR of a part that is in G1 and transmitted to each receive end is also relatively low.

According to a second aspect, based on a structure of a spectrum resource shown in FIG. 7 and a plurality of allocation cases shown in FIG. 8, a target part (including a data part and a direct current part) in the CEF obtained by the transmit end may be G2, and G2={Z1, X, 0, 0, 0, Y, ±Z1}, where Z1={A, ±A, ±A, ±A}, X includes 0.5 m continuous elements in Z1, m is the quantity of elements in the sub-sequence, m≥80 (m=84 in the third example), Y=X or $\overleftarrow{X}$, and $\overleftarrow{X}$ represents a reverse order of X.

In the third example, after generating a plurality of sequences whose lengths are 339, the transmit end may remove three zero elements in the middle from a sequence (for example, the foregoing G1) with a lowest (or lower) overall PAPR in the plurality of sequences whose lengths are 339, to obtain Z 1. Then the transmit end obtains X and Y based on Z1, finally generates, based on Z1, X, Y, and a structure of G2, a plurality of sequences whose lengths are 759, sorts the sequences whose lengths are 759 in ascending order of overall PAPRs of the sequences, and uses a sequence with a lowest (or lower) overall PAPR in the plurality of sequences whose lengths are 759, as G2.

For example, FIG. 29 shows PAPRs of two different G2s in the plurality of allocation cases of the spectrum resource. As shown in FIG. 29, for the first G2, when the spectrum resource is allocated to three receive ends according to the first allocation case in FIG. 8, PAPRs of three segments of elements transmitted on three segments of subcarriers allocated to the three receive ends are all relatively low. For example, for the first G2, PAPRs of a segment of elements transmitted on a segment of subcarriers allocated to the receive end 1 are 5.8125; PAPRs of a segment of elements transmitted on a segment of subcarriers allocated to the receive end 2 are 6.6660; and PAPRs of a segment of elements transmitted on a segment of subcarriers allocated to the receive end 3 are 5.8125. When the spectrum resource is allocated to one receive end according to the second allocation case in FIG. 8, for the first G2, PAPRs of a segment of elements transmitted on a segment of subcarriers allocated to the receive end are all relatively low (for example, the PAPRs are 7.1116). For the second G2, when the spectrum resource is allocated to three receive ends according to the first allocation case in FIG. 8, PAPRs of three segments of elements transmitted on three segments of subcarriers allocated to the three receive ends are all relatively low. For example, for the second G2, PAPRs of a segment of elements transmitted on a segment of subcarriers allocated to the receive end 1 are 5.8125; PAPRs of a segment of elements transmitted on a segment of subcarriers allocated to the receive end 2 are 7.2254; and PAPRs of a segment of elements transmitted on a segment of subcarriers allocated to the receive end 3 are 5.8125. When the spectrum resource is allocated to one receive end according to the second allocation case in FIG. 8, for the second G2, PAPRs of a segment of elements transmitted on a segment of subcarriers allocated to the receive end are all relatively low (for example, the PAPRs are 7.2140). It can be learned from FIG. 29 that no matter how the spectrum resource is allocated, an overall PAPR of G2 is relatively low, and a PAPR of a part that is in G2 and transmitted to each receive end is also relatively low.

According to a third aspect, based on a structure of a spectrum resource shown in FIG. 10 and a plurality of allocation cases shown in FIG. 11, a target part (including a data part and a direct current part) in the CEF obtained by the transmit end may be G3, and G3={Z1, X, ±Z0, Y, ±Z1}, where Z1={A, ±A, ±A, ±A}, Z0={A, ±A, 0, 0, 0, ±A, ±A}, X includes m continuous elements in Z1, m is the quantity of elements in the sub-sequence, m≥80, Y=X or $\overleftarrow{X}$, and $\overleftarrow{X}$ represents a reverse order of X.

In the third example, after generating a plurality of sequences whose lengths are 339, the transmit end may remove three zero elements in the middle from a sequence (for example, the foregoing G1) with a lowest (or lower) overall PAPR in the plurality of sequences whose lengths are 339, to obtain Z1. The transmit end may further use the foregoing G1 as Z0. Then the transmit end obtains X and Y based on Z1, finally generates, based on Z1, Z0, X, Y, and a structure of G3, a plurality of sequences whose lengths are 1179, sorts the sequences whose lengths are 1179 in ascending order of overall PAPRs of the sequences, and uses a sequence with a lowest (or lower) overall PAPR in the plurality of sequences whose lengths are 1179, as G3.

For example, FIG. 30 shows PAPRs of two G3s in the plurality of allocation cases of the spectrum resource. As shown in FIG. 30, when the spectrum resource is allocated to five receive ends according to the first allocation case in FIG. 11, PAPRs of five segments of elements that are in the first G3 and transmitted on five segments of subcarriers allocated to the five receive ends are all relatively low. For example, for the first G3, PAPRs of a segment of elements transmitted on a segment of subcarriers allocated to the receive end 1 are 5.8125; PAPRs of a segment of elements transmitted on a segment of subcarriers allocated to the receive end 2 are 6.8492; PAPRs of a segment of elements transmitted on a segment of subcarriers allocated to the receive end 3 are 5.8125; PAPRs of a segment of elements transmitted on a segment of subcarriers allocated to the receive end 4 are 6.8492; and PAPRs of a segment of elements transmitted on a segment of subcarriers allocated to the receive end 5 are 5.8125. When the spectrum resource is allocated to one receive end according to the second allocation case in FIG. 11, PAPRs of a segment of elements that are in the first G3 and transmitted on a segment of subcarriers allocated to the receive end are all relatively low (for example, the PAPRs are 7.3271). When the spectrum resource is allocated to five receive ends according to the first allocation case in FIG. 11, PAPRs of five segments of elements that are in the second G3 and transmitted on five segments of subcarriers allocated to the five receive ends are all relatively low. For example, for the second G3, PAPRs of a segment of elements transmitted on a segment of subcarriers allocated to the receive end 1 are 5.8125; PAPRs of a segment of elements transmitted on a segment of subcarriers allocated to the receive end 2 are 4.0340; PAPRs of a segment of elements transmitted on a segment of subcarriers allocated to the receive end 3 are 5.8125; PAPRs of a segment of elements transmitted on a segment of subcarriers allocated to the receive end 4 are 4.0340; and PAPRs of a segment of elements transmitted on a segment of subcarriers allocated to the receive end are 5.8125. When the spectrum resource is allocated to one receive end according to the second allocation case in FIG. 11, PAPRs of a segment of elements that are in the second G3 and transmitted on a segment of subcarriers allocated to the receive end are all relatively low (for example, the PAPRs are 7.4247). It can be learned from FIG. 30 that no matter how the spectrum resource is allocated, an overall PAPR of G3 is relatively low, and a PAPR of a part that is in G3 and transmitted to each receive end is also relatively low.

According to a fourth aspect, based on a structure of a spectrum resource shown in FIG. 13 and a plurality of allocation cases shown in FIG. 14, a target part (including a data part and a direct current part) in the CEF obtained by the transmit end may be G4, and G4={Z1, X, ±Z1, Q, 0, 0, 0, P, ±Z1, Y, ±Z1}, where Z1={A, ±A, ±A, ±A}, X includes m continuous elements in Z1, Q includes 0.5 m continuous elements in Z1, m is the quantity of elements in the sub-sequence, and m≥80; Y=X and P=Q, or Y=$\overleftarrow{X}$ and P=$\overleftarrow{Q}$; and $\overleftarrow{X}$ represents a reverse order of X, and $\overleftarrow{Q}$ represents a reverse order of Q.

In the third example, after generating a plurality of sequences whose lengths are 339, the transmit end may remove three zero elements in the middle from a sequence (for example, the foregoing G1) with a lowest (or lower) overall PAPR in the plurality of sequences whose lengths are 339, to obtain Z 1. Then the transmit end obtains X, Y, P, and Q based on Z1, finally generates, based on Z1, X, Y, P, Q, and a structure of G4, a plurality of sequences whose lengths are 1599, sorts the sequences whose lengths are 1599 in ascending order of overall PAPRs of the sequences, and uses a sequence with a lowest (or lower) overall PAPR in the plurality of sequences whose lengths are 1599, as G4.

For example, FIG. 31 shows PAPRs of two G4s in the plurality of allocation cases of the spectrum resource. As shown in FIG. 31, for the first G4, when the spectrum resource is allocated to seven receive ends according to the first allocation case in FIG. 14, PAPRs of seven segments of elements transmitted on seven segments of subcarriers allocated to the seven receive ends are all relatively low. For example, PAPRs of a segment of elements transmitted on a segment of subcarriers allocated to the receive end 1 are 5.8125; PAPRs of a segment of elements transmitted on a segment of subcarriers allocated to the receive end 2 are 3.9994; PAPRs of a segment of elements transmitted on a segment of subcarriers allocated to the receive end 3 are 5.8125; PAPRs of a segment of elements transmitted on a segment of subcarriers allocated to the receive end 4 are 7.4457; PAPRs of a segment of elements transmitted on a segment of subcarriers allocated to the receive end 5 are 5.8125; PAPRs of a segment of elements transmitted on a segment of subcarriers allocated to the receive end 6 are 3.9994; and PAPRs of a segment of elements transmitted on a segment of subcarriers allocated to the receive end 7 are 5.8125. When the spectrum resource is allocated to one receive end according to the second allocation case in FIG. 14, PAPRs of a segment of elements transmitted on a segment of subcarriers allocated to the receive end are all relatively low (for example, the PAPRs are 7.6660).

For the second G4, when the spectrum resource is allocated to seven receive ends according to the first allocation case in FIG. 14, PAPRs of seven segments of elements transmitted on seven segments of subcarriers allocated to the seven receive ends are all relatively low. For example, PAPRs of a segment of elements transmitted on a segment of subcarriers allocated to the receive end 1 are 5.8125; PAPRs of a segment of elements transmitted on a segment of subcarriers allocated to the receive end 2 are 3.9777; PAPRs of a segment of elements transmitted on a segment of subcarriers allocated to the receive end 3 are 5.8125; PAPRs of a segment of elements transmitted on a segment of subcarriers allocated to the receive end 4 are 6.7831; PAPRs of a segment of elements transmitted on a segment of subcarriers allocated to the receive end 5 are 5.8125; PAPRs of a segment of elements transmitted on a segment of subcarriers allocated to the receive end 6 are 3.9777; and PAPRs of a segment of elements transmitted on a segment of subcarriers allocated to the receive end 7 are 5.8125. When the spectrum resource is allocated to one receive end according to the second allocation case in FIG. 14, PAPRs of a segment of elements that are in the second G4 and transmitted on a segment of subcarriers allocated to the receive end are all relatively low (for example, the PAPRs are 7.5948). It can be learned from FIG. 31 that no matter how the spectrum resource is allocated, an overall PAPR of G4 is relatively low, and a PAPR of a part that is in G4 and transmitted to each receive end is also relatively low.

In the fourth example, m=84. In this case, the sub-sequence includes: 80 basic elements arranged into a Golay sequence in the sub-sequence and four interpolation elements located after the 80 basic elements. Each element in the sub-sequence belongs to a target element set, the target element set includes 1, −1, j, and −j, and j is an imaginary unit. The following separately describes different CB cases of the spectrum resource by using examples.

According to a first aspect, based on a structure of a spectrum resource shown in FIG. 4 and a plurality of allocation cases shown in FIG. 5, a target part (including a data part and a direct current part) in the CEF obtained by the transmit end may be G1, and G1={A, ±A, 0, 0, 0, ±A, ±A}.

A Golay sequence in which 80 basic elements are arranged in A is T1 or T2, $$T1 = C1 \otimes \frac{S1+S2}{2} + C2 \otimes \frac{S1-S2}{2}, \text{ and}$$

$$T2 = C1 \otimes \frac{\overleftarrow{S1}-\overleftarrow{S2}}{2} - C2 \otimes \frac{\overleftarrow{S1}+\overleftarrow{S2}}{2};$$

and C1 and C2 represent two quaternary Golay sequences that both include 1, −1, j, and −j and whose lengths are both 5, S1 and S2 represent two binary Golay sequences that both include 1 and −1 and whose lengths are both 16, ⊗ represents a Kronecker product, $\overleftarrow{S1}$ represents a reverse order of S1, and $\overleftarrow{S2}$ represents a reverse order of S2. Optionally, both C1 and C2 may alternatively be binary Golay sequences, and both S1 and S2 are quaternary Golay sequences. This is not limited in this embodiment of this application. C1 and C2 may be orthogonal to each other or may not be orthogonal to each other, and S1 and S2 may be orthogonal to each other or may not be orthogonal to each other. This is not limited in this embodiment of this application.

In the fourth example, when generating G1, the transmit end may first obtain the quaternary Golay sequences C1 and C2 whose lengths are 5 and the binary Golay sequences S1 and S2 whose lengths are 16, and then generate T1 and T2 based on S1, S2, C1, and C2. Then the transmit end appends four elements to each sequence in T1 and T2 (the four elements may include at least one element of 1, −1, j, and −j) to obtain a plurality of sequences whose lengths are 84. Then the transmit end may sort the obtained sequences whose lengths are 84 in ascending order of overall PAPRs of the sequences, and use a sequence with a lowest (or lower) overall PAPR as A in G1. Finally, the transmit end may generate, based on a structure of G1, a plurality of sequences whose lengths are 339, sort the sequences whose lengths are 339 in ascending order of overall PAPRs of the sequences, and use a sequence with a lowest (or lower) overall PAPR in the plurality of sequences whose lengths are 339, as G1.

For example, FIG. 32 shows PAPRs of G1 in the plurality of allocation cases of the spectrum resource. As shown in FIG. 32, when the spectrum resource is allocated to four receive ends according to the first allocation case in FIG. 5, PAPRs of four segments of elements that are in G1 and transmitted on four segments of subcarriers allocated to the four receive ends are all relatively low. For example, PAPRs of parts that are in G1 and transmitted on subcarriers allocated to the receive end 1, the receive end 2, the receive end 3, and the receive end 4 are all 3.95. When the spectrum resource is allocated to two receive ends according to the second allocation case in FIG. 5, PAPRs of a segment of elements that are in G1 and transmitted on a segment of subcarriers allocated to the receive end 1 are 6.935; and PAPRs of a segment of elements that are in G1 and transmitted on a segment of subcarriers allocated to the receive end 2 are 6.272. When the spectrum resource is allocated to one receive end according to the sixth allocation case in FIG. 5, PAPRs of a segment of elements that are in G1 and transmitted on a segment of subcarriers allocated to the receive end are all relatively low (for example, the PAPRs are 6.212). It can be learned from FIG. 32 that no matter how the spectrum resource is allocated, an overall PAPR of G1 is relatively low, and a PAPR of a part that is in G1 and transmitted to each receive end is also relatively low.

According to a second aspect, based on a structure of a spectrum resource shown in FIG. 7 and a plurality of allocation cases shown in FIG. 8, a target part (including a data part and a direct current part) in the CEF obtained by the transmit end may be G2. For G2 generated by the transmit end in the fourth example, refer to G2 generated by the transmit end in the third example. However, T1 in the fourth example is different from that in the third example, and T2 is also different. Details are not described herein again in this embodiment of this application.

For example, FIG. 33 shows PAPRs of two different G2s in the plurality of allocation cases of the spectrum resource. As shown in FIG. 33, for the first G2, when the spectrum resource is allocated to three receive ends according to the first allocation case in FIG. 8, PAPRs of three segments of elements transmitted on three segments of subcarriers allocated to the three receive ends are all relatively low. For example, for the first G2, PAPRs of a segment of elements transmitted on a segment of subcarriers allocated to the receive end 1 are 6.1800; PAPRs of a segment of elements transmitted on a segment of subcarriers allocated to the receive end 2 are 6.7010; and PAPRs of a segment of elements transmitted on a segment of subcarriers allocated to the receive end 3 are 6.1800. When the spectrum resource is allocated to one receive end according to the second allocation case in FIG. 8, for the first G2, PAPRs of a segment of elements transmitted on a segment of subcarriers allocated to the receive end are all relatively low (for example, the PAPRs are 7.8770). For the second G2, when the spectrum resource is allocated to three receive ends according to the first allocation case in FIG. 8, PAPRs of three segments of elements transmitted on three segments of subcarriers allocated to the three receive ends are all relatively low. For example, for the first G2, PAPRs of a segment of elements transmitted on a segment of subcarriers allocated to the receive end 1 are 6.1800; PAPRs of a segment of elements transmitted on a segment of subcarriers allocated to the receive end 2 are 5.5250; and PAPRs of a segment of elements transmitted on a segment of subcarriers allocated to the receive end 3 are 6.1800. When the spectrum resource is allocated to one receive end according to the second allocation case in FIG. 8, for the second G2, PAPRs of a segment of elements transmitted on a segment of subcarriers allocated to the receive end are all relatively low (for example, the PAPRs are 7.7880). It can be learned from FIG. 33 that no matter how the spectrum resource is allocated, an overall PAPR of G2 is relatively low, and a PAPR of a part that is in G2 and transmitted to each receive end is also relatively low.

According to a third aspect, based on a structure of a spectrum resource shown in FIG. 10 and a plurality of allocation cases shown in FIG. 11, a target part (including a data part and a direct current part) in the CEF obtained by the transmit end may be G3. For G3 generated by the transmit end in the fourth example, refer to G3 generated by the transmit end in the third example. However, T1 in the fourth example is different from that in the third example, and T2 is also different. Details are not described herein again in this embodiment of this application.

For example, FIG. 34 shows PAPRs of two G3s in the plurality of allocation cases of the spectrum resource. As shown in FIG. 34, when the spectrum resource is allocated to five receive ends according to the first allocation case in FIG. 11, PAPRs of five segments of elements that are in the first G3 and transmitted on five segments of subcarriers allocated to the five receive ends are all relatively low. For example, for the first G3, PAPRs of a segment of elements transmitted on a segment of subcarriers allocated to the receive end 1 are 6.1800; PAPRs of a segment of elements transmitted on a segment of subcarriers allocated to the receive end 2 are 5.3070; PAPRs of a segment of elements transmitted on a segment of subcarriers allocated to the receive end 3 are 6.1800; PAPRs of a segment of elements transmitted on a segment of subcarriers allocated to the receive end 4 are 5.3070; and PAPRs of a segment of elements transmitted on a segment of subcarriers allocated to the receive end 5 are 6.3220. When the spectrum resource is allocated to one receive end according to the second allocation case in FIG. 11, PAPRs of a segment of elements that are in the first G3 and transmitted on a segment of subcarriers allocated to the receive end are all relatively low (for example, the PAPRs are 7.3630). When the spectrum resource is allocated to five receive ends according to the first allocation case in FIG. 11, PAPRs of five segments of elements that are in the second G3 and transmitted on five segments of subcarriers allocated to the five receive ends are all relatively low. For example, for the second G3, PAPRs of a segment of elements transmitted on a segment of subcarriers allocated to the receive end 1 are 6.1800; PAPRs of a segment of elements transmitted on a segment of subcarriers allocated to the receive end 2 are 4.3190; PAPRs of a segment of elements transmitted on a segment of subcarriers allocated to the receive end 3 are 6.1800; PAPRs of a segment of elements transmitted on a segment of subcarriers allocated to the receive end 4 are 4.3190; and PAPRs of a segment of elements transmitted on a segment of subcarriers allocated to the receive end 5 are 6.3220. When the spectrum resource is allocated to one receive end according to the second allocation case in FIG. 11, PAPRs of a segment of elements that are in the second G3 and transmitted on a segment of subcarriers allocated to the receive end are all relatively low (for example, the PAPRs are 7.6080). It can be learned from FIG. 34 that no matter how the spectrum resource is allocated, an overall PAPR of G3 is relatively low, and a PAPR of a part that is in G3 and transmitted to each receive end is also relatively low.

According to a fourth aspect, based on a structure of a spectrum resource shown in FIG. 13 and a plurality of allocation cases shown in FIG. 14, a target part (including a data part and a direct current part) in the CEF obtained by the transmit end may be G4. For G4 generated by the transmit end in the fourth example, refer to G4 generated by the transmit end in the third example. However, T1 in the fourth example is different from that in the third example, and T2 is also different. Details are not described herein again in this embodiment of this application.

For example, FIG. 35 shows PAPRs of two G4s in the plurality of allocation cases of the spectrum resource. As shown in FIG. 35, for the first G4, when the spectrum resource is allocated to seven receive ends according to the first allocation case in FIG. 14, PAPRs of seven segments of elements transmitted on seven segments of subcarriers allocated to the seven receive ends are all relatively low. For example, for the first G4, PAPRs of a segment of elements transmitted on a segment of subcarriers allocated to the receive end 1 are 6.1800; PAPRs of a segment of elements transmitted on a segment of subcarriers allocated to the receive end 2 are 5.7970; PAPRs of a segment of elements transmitted on a segment of subcarriers allocated to the receive end 3 are 6.1800; PAPRs of a segment of elements transmitted on a segment of subcarriers allocated to the receive end 4 are 7.4780; PAPRs of a segment of elements transmitted on a segment of subcarriers allocated to the receive end 5 are 6.1800; PAPRs of a segment of elements transmitted on a segment of subcarriers allocated to the receive end 6 are 5.7970; and PAPRs of a segment of elements transmitted on a segment of subcarriers allocated to the receive end 7 are 6.1800. When the spectrum resource is allocated to one receive end according to the second allocation case in FIG. 14, PAPRs of a segment of elements that are in the first G4 and transmitted on a segment of subcarriers allocated to the receive end are all relatively low (for example, the PAPRs are 7.8740).

For the second G4, when the spectrum resource is allocated to seven receive ends according to the first allocation case in FIG. 14, PAPRs of seven segments of elements transmitted on seven segments of subcarriers allocated to the seven receive ends are all relatively low. For example, PAPRs of a segment of elements transmitted on a segment of subcarriers allocated to the receive end 1 are 6.1800; PAPRs of a segment of elements transmitted on a segment of subcarriers allocated to the receive end 2 are 5.5210; PAPRs of a segment of elements transmitted on a segment of subcarriers allocated to the receive end 3 are 6.1800; PAPRs of a segment of elements transmitted on a segment of subcarriers allocated to the receive end 4 are 6.6020; PAPRs of a segment of elements transmitted on a segment of subcarriers allocated to the receive end 5 are 6.1800; PAPRs of a segment of elements transmitted on a segment of subcarriers allocated to the receive end 6 are 5.5210; and PAPRs of a segment of elements transmitted on a segment of subcarriers allocated to the receive end 7 are 6.1800. When the spectrum resource is allocated to one receive end according to the second allocation case in FIG. 14, PAPRs of a segment of elements that are in the second G4 and transmitted on a segment of subcarriers allocated to the receive end are all relatively low (for example, the PAPRs are 7.5670). It can be learned from FIG. 35 that no matter how the spectrum resource is allocated, an overall PAPR of G4 is relatively low, and a PAPR of a part that is in G4 and transmitted to each receive end is also relatively low.

In the fifth example, m=80. In this case, the sub-sequence includes: 80 basic elements arranged into a Golay sequence in the sub-sequence, where each element in the sub-sequence belongs to a target element set, and the target element set includes 1 and −1. The following separately describes different CB cases of the spectrum resource by using examples.

According to a first aspect, based on a structure of a spectrum resource shown in FIG. 16 and a plurality of allocation cases shown in FIG. 17, a target part (including a data part and a direct current part) in the CEF obtained by the transmit end may be G1, and G1={A, ±A, 0, 0, 0, ±A, ±A}, where A is T1 or T2, $$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two Golay sequences whose lengths are both 10, S1 and S2 represent two Golay sequences whose lengths are both 8, ⊗ represents a Kronecker product, $\overleftarrow{S1}$ represents a reverse order of S1, $\overleftarrow{S2}$ represents a reverse order of S2, and ± represents + or −. C1 and C2 may be orthogonal to each other or may not be orthogonal to each other, and S1 and S2 may be orthogonal to each other or may not be orthogonal to each other. This is not limited in this embodiment of this application.

In the fifth example, when generating G1, the transmit end may first obtain binary Golay sequences C1 and C2 whose lengths are 10, and binary Golay sequences S1 and S2 whose lengths are 8. Then T1 and T2 are generated based on S1, S2, C1, and C2. Then the transmit end may select a sequence with a lowest (or lower) overall PAPR in T1 and T2 as A in G1. Finally, the transmit end may generate, based on A and a structure of G1, a plurality of sequences whose lengths are 323, sort the sequences whose lengths are 323 in ascending order of overall PAPRs of the sequences, and use a sequence with a lowest (or lower) overall PAPR in the plurality of sequences whose lengths are 323, as G1.

For example, FIG. 36 shows PAPRs of G1 in the plurality of allocation cases of the spectrum resource. As shown in FIG. 36, when the spectrum resource is allocated to four receive ends according to the first allocation case in FIG. 17, PAPRs of four segments of elements that are in G1 and transmitted on four segments of subcarriers allocated to the four receive ends are all relatively low. For example, PAPRs of parts that are in G1 and transmitted on subcarriers allocated to the receive end 1, the receive end 2, the receive end 3, and the receive end 4 are 3.0070. When the spectrum resource is allocated to four receive ends according to the second allocation case in FIG. 17, PAPRs of two segments of elements that are in G1 and transmitted on two segments of subcarriers allocated to the two receive ends are all relatively low. For example, for G1, PAPRs of a segment of elements transmitted on a segment of subcarriers allocated to the receive end 1 are 5.9987; and PAPRs of a segment of elements transmitted on a segment of subcarriers allocated to the receive end 2 are 5.8665. When the spectrum resource is allocated to one receive end according to the sixth allocation case in FIG. 17, PAPRs of a segment of elements that are in G1 and transmitted on a segment of subcarriers allocated to the receive end are all relatively low (for example, the PAPRs are 5.8038). It can be learned from FIG. 36 that no matter how the spectrum resource is allocated, an overall PAPR of G1 is relatively low, and a PAPR of a part that is in G1 and transmitted to each receive end is also relatively low.

According to a second aspect, based on a structure of a spectrum resource shown in FIG. 7 and a plurality of allocation cases shown in FIG. 8, a target part (including a data part and a direct current part) in the CEF obtained by the transmit end may be G2. A structure of G2 generated by the transmit end in the fifth example is the same as that of G2 generated by the transmit end in the third example. However, in the third example, m=84, and in the fifth example, m=80. Details are not described herein again in this embodiment of this application.

It should be noted that if two sequences have a same structure, relationships between parts transmitted on each RB in the two sequences are the same. For example, in the third example, G2={Z1, X, 0, 0, 0, Y, ±Z1}, and in G2 in the third example, a part transmitted on the first four RBs in a data subcarrier may include a sequence formed by A, ±A, ±A, and ±A in the third example; a part transmitted on the first half of subcarriers of the third RB in the data subcarrier may include 0.5 m continuous elements in the part transmitted on the first four RBs; a part transmitted on the last half of subcarriers of the fifth RB in the data subcarrier may be a reverse order of the part transmitted on the first half of subcarriers; and a part transmitted on the last four RBs in the data subcarrier may include a sequence formed by A, ±A, ±A, and ±A in the fifth example, or a sequence that is −1 times the sequence formed by A, ±A, ±A, and ±A in the fifth example. Likewise, in G2 in the fifth example, a part transmitted on the first four RBs in a data subcarrier may include a sequence formed by A, ±A, ±A, and ±A in the fifth example; a part transmitted on the first half of subcarriers of the fifth RB in the data subcarrier may include 0.5 m continuous elements in the part transmitted on the first four RBs; a part transmitted on the last half of subcarriers in the fifth RB in the data subcarrier may be a reverse order of the part transmitted on the first half of subcarriers; and a part transmitted on the last four RBs in the data subcarrier may include a sequence formed by A, ±A, ±A, and ±A in the fifth example, or a sequence that is −1 times the sequence.

For example, FIG. 37 shows PAPRs of two different G2s in the plurality of allocation cases of the spectrum resource. As shown in FIG. 37, for the first G2, when the spectrum resource is allocated to three receive ends according to the first allocation case in FIG. 8, PAPRs of three segments of elements transmitted on three segments of subcarriers allocated to the three receive ends are all relatively low. For example, for the first G2, PAPRs of a segment of elements transmitted on a segment of subcarriers allocated to the receive end 1 are 5.4618; PAPRs of a segment of elements transmitted on a segment of subcarriers allocated to the receive end 2 are 6.6290; and PAPRs of a segment of elements transmitted on a segment of subcarriers allocated to the receive end 3 are 5.4618. When the spectrum resource is allocated to one receive end according to the second allocation case in FIG. 8, for the first G2, PAPRs of a segment of elements transmitted on a segment of subcarriers allocated to the receive end are all relatively low (for example, the PAPRs are 7.3972). For the second G2, when the spectrum resource is allocated to three receive ends according to the first allocation case in FIG. 8, PAPRs of three segments of elements transmitted on three segments of subcarriers allocated to the three receive ends are all relatively low. For example, for the first G2, PAPRs of a segment of elements transmitted on a segment of subcarriers allocated to the receive end 1 are 5.4618; PAPRs of a segment of elements transmitted on a segment of subcarriers allocated to the receive end 2 are 6.5785; and PAPRs of a segment of elements transmitted on a segment of subcarriers allocated to the receive end 3 are 5.4618. When the spectrum resource is allocated to one receive end according to the second allocation case in FIG. 8, for the second G2, PAPRs of a segment of elements transmitted on a segment of subcarriers allocated to the receive end are all relatively low (for example, the PAPRs are 7.5583). It can be learned from FIG. 37 that no matter how the spectrum resource is allocated, an overall PAPR of G2 is relatively low, and a PAPR of a part that is in G2 and transmitted to each receive end is also relatively low.

According to a third aspect, based on a structure of a spectrum resource shown in FIG. 10 and a plurality of allocation cases shown in FIG. 11, a target part (including a data part and a direct current part) in the CEF obtained by the transmit end may be G3. A structure of G3 generated by the transmit end in the fifth example is the same as that of G3 generated by the transmit end in the third example. However, in the third example, m=84, and in the fifth example, m=80. Details are not described herein again in this embodiment of this application.

For example, FIG. 38 shows PAPRs of two G3s in the plurality of allocation cases of the spectrum resource. As shown in FIG. 38, when the spectrum resource is allocated to five receive ends according to the first allocation case in FIG. 11, PAPRs of five segments of elements that are in the first G3 and transmitted on five segments of subcarriers allocated to the five receive ends are all relatively low. For example, for the first G3, PAPRs of a segment of elements transmitted on a segment of subcarriers allocated to the receive end 1 are 5.4618; PAPRs of a segment of elements transmitted on a segment of subcarriers allocated to the receive end 2 are 5.5246; PAPRs of a segment of elements transmitted on a segment of subcarriers allocated to the receive end 3 are 5.4618; PAPRs of a segment of elements transmitted on a segment of subcarriers allocated to the receive end 4 are 5.5246; and PAPRs of a segment of elements transmitted on a segment of subcarriers allocated to the receive end 5 are 5.8993. When the spectrum resource is allocated to one receive end according to the second allocation case in FIG. 11, PAPRs of a segment of elements that are in the first G3 and transmitted on a segment of subcarriers allocated to the receive end are all relatively low (for example, the PAPRs are 7.0548). When the spectrum resource is allocated to five receive ends according to the first allocation case in FIG. 11, PAPRs of five segments of elements that are in the second G3 and transmitted on five segments of subcarriers allocated to the five receive ends are all relatively low. For example, for the second G3, PAPRs of a segment of elements transmitted on a segment of subcarriers allocated to the receive end 1 are 5.4618; PAPRs of a segment of elements transmitted on a segment of subcarriers allocated to the receive end 2 are 5.0767; PAPRs of a segment of elements transmitted on a segment of subcarriers allocated to the receive end 3 are 5.4618; PAPRs of a segment of elements transmitted on a segment of subcarriers allocated to the receive end 4 are 5.0767; and PAPRs of a segment of elements transmitted on a segment of subcarriers allocated to the receive end 5 are 5.8993. When the spectrum resource is allocated to one receive end according to the second allocation case in FIG. 11, PAPRs of a segment of elements that are in the second G3 and transmitted on a segment of subcarriers allocated to the receive end are all relatively low (for example, the PAPRs are 7.5349). It can be learned from FIG. 38 that no matter how the spectrum resource is allocated, an overall PAPR of G3 is relatively low, and a PAPR of a part that is in G3 and transmitted to each receive end is also relatively low.

According to a fourth aspect, based on a structure of a spectrum resource shown in FIG. 13 and a plurality of allocation cases shown in FIG. 14, a target part (including a data part and a direct current part) in the CEF obtained by the transmit end may be G4. A structure of G4 generated by the transmit end in the fifth example is the same as that of G4 generated by the transmit end in the third example. However, in the third example, m=84, and in the fifth example, m=80. Details are not described herein again in this embodiment of this application.

For example, FIG. 39 shows PAPRs of G4 in the plurality of allocation cases of the spectrum resource. As shown in FIG. 39, for G4, when the spectrum resource is allocated to seven receive ends according to the first allocation case in FIG. 14, PAPRs of seven segments of elements transmitted on seven segments of subcarriers allocated to the seven receive ends are all relatively low. For example, PAPRs of a segment of elements transmitted on a segment of subcarriers allocated to the receive end 1 are 5.4618; PAPRs of a segment of elements transmitted on a segment of subcarriers allocated to the receive end 2 are 4.5406; PAPRs of a segment of elements transmitted on a segment of subcarriers allocated to the receive end 3 are 5.4618; PAPRs of a segment of elements transmitted on a segment of subcarriers allocated to the receive end 4 are 6.8008; PAPRs of a segment of elements transmitted on a segment of subcarriers allocated to the receive end 5 are 5.4618; PAPRs of a segment of elements transmitted on a segment of subcarriers allocated to the receive end 6 are 4.5406; and PAPRs of a segment of elements transmitted on a segment of subcarriers allocated to the receive end 7 are 5.4618. When the spectrum resource is allocated to one receive end according to the second allocation case in FIG. 14, PAPRs of a segment of elements transmitted on a segment of subcarriers allocated to the receive end are all relatively low (for example, the PAPRs are 7.3026). It can be learned from FIG. 39 that no matter how the spectrum resource is allocated, an overall PAPR of G4 is relatively low, and a PAPR of a part that is in G4 and transmitted to each receive end is also relatively low.

In the sixth example, m=84. In this case, the sub-sequence includes: 80 basic elements arranged into a Golay sequence in the sub-sequence and four interpolation elements located after the 80 basic elements, where each element in the sub-sequence belongs to a target element set, and the target element set includes 1 and −1. The following separately describes different CB cases of the spectrum resource by using examples.

According to a first aspect, based on a structure of a spectrum resource shown in FIG. 4 and a plurality of allocation cases shown in FIG. 5, a target part (including a data part and a direct current part) in the CEF obtained by the transmit end may be G1, and G1={A, ±B, 0, 0, 0, ±C, ±D}.

A, B, C, and D all represent sequences whose lengths are 84, A, B, C, and D are different, and a Golay sequence in which 80 basic elements are arranged in each of A, B, C, and D is T1 or T2;

$$T1 = C1 \otimes \frac{S1+S2}{2} + C2 \otimes \frac{S1-S2}{2}, \text{ and}$$

$$T2 = C1 \otimes \frac{\overleftarrow{S1}-\overleftarrow{S2}}{2} - C2 \otimes \frac{\overleftarrow{S1}+\overleftarrow{S2}}{2};$$

and C1 and C2 represent two Golay sequences whose lengths are both 10, S1 and S2 represent two Golay sequences whose lengths are both 8, ⊗ represents a Kronecker product, $\overleftarrow{S1}$ represents a reverse order of S1, $\overleftarrow{S2}$ represents a reverse order of S2, and ± represents + or −. C1 and C2 may be orthogonal to each other or may not be orthogonal to each other, and S1 and S2 may be orthogonal to each other or may not be orthogonal to each other. This is not limited in this embodiment of this application.

In the sixth example, when generating G1, the transmit end may first obtain binary Golay sequences C1 and C2 whose lengths are 10, and binary Golay sequences S1 and S2 whose lengths are 8. Then T1 and T2 are generated based on S1, S2, C1, and C2. Then the transmit end appends four elements to T1 (or T2) (the four elements may include at least one element of 1 and −1) to obtain a plurality of sequences whose lengths are 84, sorts the obtained sequences whose lengths are 84 in ascending order of overall PAPRs of the sequences, and uses four sequences with lowest (or lower) overall PAPRs as A, B, C, and D in G1. Finally, the transmit end may generate, based on A, B, C, D, and a structure of G1, a plurality of sequences whose lengths are 339, sort the sequences whose lengths are 339 in ascending order of overall PAPRs of the sequences, and use a sequence with a lowest (or lower) overall PAPR in the plurality of sequences whose lengths are 339, as G1.

For example, FIG. 40 shows PAPRs of G1 in the plurality of allocation cases of the spectrum resource. As shown in FIG. 40, when the spectrum resource is allocated to four receive ends according to the first allocation case in FIG. 5, PAPRs of four segments of elements that are in G1 and transmitted on four segments of subcarriers allocated to the four receive ends are all relatively low. For example, PAPRs of parts that are in G1 and transmitted on subcarriers allocated to the receive end 1 and the receive end 2 are all 3.8067; PAPRs of parts that are in G1 and transmitted on subcarriers allocated to the receive end 3 are all 3.7774; and PAPRs of parts that are in G1 and transmitted on subcarriers allocated to the receive end 4 are all 3.8208. When the spectrum resource is allocated to one receive end according to the sixth allocation case in FIG. 5, PAPRs of a segment of elements that are in G1 and transmitted on a segment of subcarriers allocated to the receive end are all relatively low (for example, the PAPRs are 5.5129). It can be learned from FIG. 40 that no matter how the spectrum resource is allocated, an overall PAPR of G1 is relatively low, and a PAPR of a part that is in G1 and transmitted to each receive end is also relatively low.

According to a second aspect, based on a structure of a spectrum resource shown in FIG. 7 and a plurality of allocation cases shown in FIG. 8, a target part (including a data part and a direct current part) in the CEF obtained by the transmit end may be G2, and G2={Z2_1, ±X, 0, 0, 0, ±Y, ±Z2_2}, where Z2_n={E, ±F, ±G, ±H}, n≥1, E, F, G, and H all represent sequences whose lengths are 84, and A, B, C, D, E, F, G, and H are different; and a Golay sequence in which 80 basic elements are arranged in each of A, B, C, and D is one sequence in T1 and T2, a Golay sequence in which 80 basic elements are arranged in each of E, F, G, and H is the other sequence in T1 and T2, X includes first to $42^{nd}$ elements in Z2_1, and Y includes $43^{rd}$ to $84^{th}$ elements in Z2_1.

In the sixth example, when generating G1, the transmit end appends four elements to one sequence in T1 and T2, to obtain a plurality of sequences whose lengths are 84 and further obtain A, B, C, and D. The transmit end may further append four elements to the other sequence in T1 and T2 (the four elements may include at least one element of 1 and −1) to obtain a plurality of sequences whose lengths are 84, sort the obtained sequences whose lengths are 84 in ascending order of overall PAPRs of the sequences, and use four sequences with lowest (or lower) overall PAPRs as E, F, G, and H in G1. The transmit end may generate, based on E, F, G, H, and a structure of Z2_n, a plurality of sequences whose lengths are 336, and sort the sequences whose lengths are 336 in ascending order of overall PAPRs of the sequences. When generating G2, the transmit end may use two sequences with lowest (or lower) overall PAPRs in the plurality of sequences whose lengths are 336, as Z2_1 and Z2_2. Finally, the transmit end may generate X and Y based on Z2_1, generate, based on Z2_1, Z2_2, X, Y, and a structure of G2, a plurality of sequences whose lengths are 759, sort the sequences whose lengths are 759 in ascending order of overall PAPRs of the sequences, and use a sequence with a lowest (or lower) overall PAPR in the plurality of sequences whose lengths are 759, as G2.

For example, FIG. 41 shows PAPRs of G2 in the plurality of allocation cases of the spectrum resource. As shown in FIG. 41, for G2, when the spectrum resource is allocated to three receive ends according to the first allocation case in FIG. 8, PAPRs of three segments of elements transmitted on three segments of subcarriers allocated to the three receive ends are all relatively low. For example, for G2, PAPRs of a segment of elements transmitted on a segment of subcarriers allocated to the receive end 1 are 4.2900; PAPRs of a segment of elements transmitted on a segment of subcarriers allocated to the receive end 2 are 5.4220; and PAPRs of a segment of elements transmitted on a segment of subcarriers allocated to the receive end 3 are 5.7912. When the spectrum resource is allocated to one receive end according to the second allocation case in FIG. 8, for G2, PAPRs of a segment of elements transmitted on a segment of subcarriers allocated to the receive end are all relatively low (for example, the PAPRs are 5.8088). It can be learned from FIG. 41 that no matter how the spectrum resource is allocated, an overall PAPR of G2 is relatively low, and a PAPR of a part that is in G2 and transmitted to each receive end is also relatively low.

According to a third aspect, based on a structure of a spectrum resource shown in FIG. 10 and a plurality of allocation cases shown in FIG. 11, a target part (including a data part and a direct current part) in the CEF obtained by the transmit end may be G3, and G3={Z2_1, ±X, ±Z1_1, ±Y, ±Z2_2}, where Z2_n={E, ±F, ±G, ±H}, n≥1, E, F, G, and H all represent sequences whose lengths are 84, and A, B, C, D, E, F, G, and H are different; and a Golay sequence in which 80 basic elements are arranged in each of A, B, C, and D is one sequence in T1 and T2, a Golay sequence in which 80 basic elements are arranged in each of E, F, G, and H is the other sequence in T1 and T2, structures of Z1_n and G1 are the same, X includes first 84 elements in Z2_1, and Y includes first 84 elements in Z2_2.

In the sixth example, when generating G3, the transmit end may use two sequences with lowest (or lower) overall PAPRs among previously generated sequences (generated based on E, F, G, and H) whose lengths are 336, as Z2_1 and Z2_2. Then the transmit end may generate X based on Z2_1, generate Y based on Z2_2, and use a sequence with a lowest (or lower) PAPR in a plurality of sequences that are generated based on A, B, C, D, and a structure of G1 and whose lengths are 339, as Z1_1, so that structures of Z1_1 and G1 are the same. Finally, the transmit end may generate, based on Z2_1, Z2_2, Z1_1, X, Y, and a structure of G3, a plurality of sequences whose lengths are 1179, sort the sequences whose lengths are 1179 in ascending order of overall PAPRs of the sequences, and use a sequence with a lowest (or lower) overall PAPR in the plurality of sequences whose lengths are 1179, as G3.

For example, FIG. 42 shows PAPRs of G3 in the plurality of allocation cases of the spectrum resource. As shown in FIG. 42, when the spectrum resource is allocated to five receive ends according to the first allocation case in FIG. 11, PAPRs of five segments of elements that are in G3 and transmitted on five segments of subcarriers allocated to the five receive ends are all relatively low. For example, for G3, PAPRs of a segment of elements transmitted on a segment of subcarriers allocated to the receive end 1 are 4.2418; PAPRs of a segment of elements transmitted on a segment of subcarriers allocated to the receive end 2 are 3.8301; PAPRs of a segment of elements transmitted on a segment of subcarriers allocated to the receive end 3 are 5.5487; PAPRs of a segment of elements transmitted on a segment of subcarriers allocated to the receive end 4 are 3.8301; and PAPRs of a segment of elements transmitted on a segment of subcarriers allocated to the receive end 5 are 5.9522. When the spectrum resource is allocated to one receive end according to the second allocation case in FIG. 11, PAPRs of a segment of elements that are in G3 and transmitted on a segment of subcarriers allocated to the receive end are all relatively low (for example, the PAPRs are 5.9231). It can be learned from FIG. 42 that no matter how the spectrum resource is allocated, an overall PAPR of G3 is relatively low, and a PAPR of a part that is in G3 and transmitted to each receive end is also relatively low.

According to a fourth aspect, based on a structure of a spectrum resource shown in FIG. 13 and a plurality of allocation cases shown in FIG. 14, a target part (including a data part and a direct current part) in the CEF obtained by the transmit end may be G4, and G4={Z2_1, ±X, ±Z2_2, ±Q, 0, 0, 0, ±P, ±Z2_3, ±Y, ±Z2_4}, where Z2_n={E, ±F, ±G, ±H}, n≥1, E, F, G, and H all represent sequences whose lengths are 84, and A, B, C, D, E, F, G, and H are different; and a Golay sequence in which 80 basic elements are arranged in each of A, B, C, and D is one sequence in T1 and T2, a Golay sequence in which 80 basic elements are arranged in each of E, F, G, and H is the other sequence in T1 and T2, X includes first 84 elements in Z2_1, Y includes first 84 elements in Z2_2, P includes first to $42^{nd}$ elements in Z2_1, and Q includes $43^{rd}$ to $84^{th}$ elements in Z2_1.

In the sixth example, when generating G4, the transmit end may use four sequences with lowest (or lower) overall PAPRs among sequences (previously generated based on E, F, G, and H) whose lengths are 336, as Z2_1, Z2_2, Z2_3, and Z2_4 respectively. Then the transmit end may generate X, P, and Q based on Z2_1, and generate Y based on Z2_2. Finally, the transmit end may generate, based on Z2_1, Z2_2, Z2_3, Z2_4, X, Y, P, Q, and a structure of G4, a plurality of sequences whose lengths are 1599, sort the sequences whose lengths are 1599 in ascending order of overall PAPRs of the sequences, and use a sequence with a lowest (or lower) overall PAPR in the plurality of sequences whose lengths are 1599, as G4.

For example, FIG. 43 shows PAPRs of G4 in the plurality of allocation cases of the spectrum resource. As shown in FIG. 43, when the spectrum resource is allocated to seven receive ends according to the first allocation case in FIG. 14, PAPRs of seven segments of elements that are in G4 and transmitted on seven segments of subcarriers allocated to the seven receive ends are all relatively low. For example, for G4, PAPRs of a segment of elements transmitted on a segment of subcarriers allocated to the receive end 1 are 4.3662; PAPRs of a segment of elements transmitted on a segment of subcarriers allocated to the receive end 2 are 3.8270; PAPRs of a segment of elements transmitted on a segment of subcarriers allocated to the receive end 3 are 4.3662; PAPRs of a segment of elements transmitted on a segment of subcarriers allocated to the receive end 4 are 5.3306; PAPRs of a segment of elements transmitted on a segment of subcarriers allocated to the receive end 5 are 4.3662; PAPRs of a segment of elements transmitted on a segment of subcarriers allocated to the receive end 6 are 3.8270; and PAPRs of a segment of elements transmitted on a segment of subcarriers allocated to the receive end 7 are 4.3662. When the spectrum resource is allocated to one receive end according to the second allocation case in FIG. 14, PAPRs of a segment of elements that are in G4 and transmitted on a segment of subcarriers allocated to the receive end are all relatively low (for example, the PAPRs are 5.8143). It can be learned from FIG. 43 that no matter how the spectrum resource is allocated, an overall PAPR of G4 is relatively low, and a PAPR of a part that is in G4 and transmitted to each receive end is also relatively low.

In the seventh example, m=84. In this case, the sub-sequence includes: 80 basic elements arranged into a Golay sequence in the sub-sequence and four interpolation elements located after the 80 basic elements, where each element in the sub-sequence belongs to a target element set, the target element set includes 1, −1, j, and −j, and j is an imaginary unit. The following separately describes different CB cases of the spectrum resource by using examples.

According to a first aspect, based on a structure of a spectrum resource shown in FIG. 4 and a plurality of allocation cases shown in FIG. 5, a target part (including a data part and a direct current part) in the CEF obtained by the transmit end may be G1, and G1={A, ±B, 0, 0, 0, ±C, ±D}, where A, B, C, and D all represent sequences whose lengths are 84, A, B, C, and D are different, a Golay sequence in which 80 basic elements are arranged in each of A, B, C, and D is T1 or T2, $$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two quaternary Golay sequences that both include 1, −1, j, and −j and whose lengths are both 5, S1 and S2 represent two binary Golay sequences that both include 1 and −1, and whose lengths are both 16, ⊗ represents a Kronecker product, $\overleftarrow{S1}$ represents a reverse order of S1, $\overleftarrow{S2}$ represents a reverse order of S2, and ± represents + or −. Optionally, both C1 and C2 may alternatively be binary Golay sequences, and both S1 and S2 are quaternary Golay sequences. This is not limited in this embodiment of this application. C1 and C2 may be orthogonal to each other or may not be orthogonal to each other, and S1 and S2 may be orthogonal to each other or may not be orthogonal to each other. This is not limited in this embodiment of this application.

In the seventh example, when generating G1, the transmit end may first obtain the quaternary Golay sequences C1 and C2 whose lengths are 5 and the binary Golay sequences S1 and S2 whose lengths are 16, and then generate T1 and T2 based on S1, S2, C1, and C2. Then the transmit end appends four elements to T1 or T2 (the four elements may include at least one element of 1, −1, j, and −j) to obtain a plurality of sequences whose lengths are 84. Then the transmit end may sort the obtained sequences whose lengths are 84 in ascending order of overall PAPRs of the sequences, and use four sequences with lowest (or lower) overall PAPRs as A, B, C, and D in G1. Finally, the transmit end may generate, based on A, B, C, D, and a structure of G1, a plurality of sequences whose lengths are 339, sort the sequences whose lengths are 339 in ascending order of overall PAPRs of the sequences, and use a sequence with a lowest (or lower) overall PAPR in the plurality of sequences whose lengths are 339, as G1.

For example, FIG. 44 shows PAPRs of G1 in the plurality of allocation cases of the spectrum resource. As shown in FIG. 44, when the spectrum resource is allocated to four receive ends according to the first allocation case in FIG. 5, PAPRs of four segments of elements that are in G1 and transmitted on four segments of subcarriers allocated to the four receive ends are all relatively low. For example, PAPRs of parts that are in G1 and transmitted on subcarriers allocated to the receive end 1 and the receive end 4 are all 3.7569, and PAPRs of parts that are in G1 and transmitted on subcarriers allocated to the receive end 2 and the receive end 3 are all 3.7523. When the spectrum resource is allocated to one receive end according to the sixth allocation case in FIG. 5, PAPRs of a segment of elements that are in G1 and transmitted on a segment of subcarriers allocated to the receive end are all relatively low (for example, the PAPRs are 4.5333). It can be learned from FIG. 44 that no matter how the spectrum resource is allocated, an overall PAPR of G1 is relatively low, and a PAPR of a part that is in G1 and transmitted to each receive end is also relatively low.

According to a second aspect, based on a structure of a spectrum resource shown in FIG. 7 and a plurality of allocation cases shown in FIG. 8, a target part (including a data part and a direct current part) in the CEF obtained by the transmit end may be G2. For G2 generated by the transmit end in the seventh example, refer to G2 generated by the transmit end in the sixth example. However, T1 in the seventh example is different from that in the sixth example, and T2 is also different. Details are not described herein again in this embodiment of this application.

For example, FIG. 45 shows PAPRs of G2 in the plurality of allocation cases of the spectrum resource. As shown in FIG. 45, when the spectrum resource is allocated to three receive ends according to the first allocation case in FIG. 8, PAPRs of three segments of elements that are in G2 and transmitted on three segments of subcarriers allocated to the three receive ends are all relatively low. For example, for G2, PAPRs of a segment of elements transmitted on a segment of subcarriers allocated to the receive end 1 are 4.6733; PAPRs of a segment of elements transmitted on a segment of subcarriers allocated to the receive end 2 are 4.9748; and PAPRs of a segment of elements transmitted on a segment of subcarriers allocated to the receive end 3 are 4.5463. When the spectrum resource is allocated to one receive end according to the second allocation case in FIG. 8, for G2, PAPRs of a segment of elements transmitted on a segment of subcarriers allocated to the receive end are all relatively low (for example, the PAPRs are 5.2158). It can be learned from FIG. 45 that no matter how the spectrum resource is allocated, an overall PAPR of G2 is relatively low, and a PAPR of a part that is in G2 and transmitted to each receive end is also relatively low.

According to a third aspect, based on a structure of a spectrum resource shown in FIG. 10 and a plurality of allocation cases shown in FIG. 11, a target part (including a data part and a direct current part) in the CEF obtained by the transmit end may be G3. For G3 generated by the transmit end in the seventh example, refer to G3 generated by the transmit end in the sixth example. However, T1 in the seventh example is different from that in the sixth example, and T2 is also different. Details are not described herein again in this embodiment of this application.

For example, FIG. 46 shows PAPRs of G3 in the plurality of allocation cases of the spectrum resource. As shown in FIG. 46, when the spectrum resource is allocated to five receive ends according to the first allocation case in FIG. 11, PAPRs of five segments of elements that are in G3 and transmitted on five segments of subcarriers allocated to the five receive ends are all relatively low. For example, for the first G3, PAPRs of a segment of elements transmitted on a segment of subcarriers allocated to the receive end 1 are 4.7956; PAPRs of a segment of elements transmitted on a segment of subcarriers allocated to the receive end 2 are 3.7523; PAPRs of a segment of elements transmitted on a segment of subcarriers allocated to the receive end 3 are 4.8505; PAPRs of a segment of elements transmitted on a segment of subcarriers allocated to the receive end 4 are 3.8265; and PAPRs of a segment of elements transmitted on a segment of subcarriers allocated to the receive end 5 are 4.5596. When the spectrum resource is allocated to one receive end according to the second allocation case in FIG. 11, PAPRs of a segment of elements that are in G3 and transmitted on a segment of subcarriers allocated to the receive end are all relatively low (for example, the PAPRs are 5.2668). It can be learned from FIG. 46 that no matter how the spectrum resource is allocated, an overall PAPR of G3 is relatively low, and a PAPR of a part that is in G3 and transmitted to each receive end is also relatively low.

According to a fourth aspect, based on a structure of a spectrum resource shown in FIG. 13 and a plurality of allocation cases shown in FIG. 14, a target part (including a data part and a direct current part) in the CEF obtained by the transmit end may be G4. For G4 generated by the transmit end in the seventh example, refer to G4 generated by the transmit end in the sixth example. However, T1 in the seventh example is different from that in the sixth example, and T2 is also different. Details are not described herein again in this embodiment of this application.

For example, FIG. 47 shows PAPRs of G4 in the plurality of allocation cases of the spectrum resource. As shown in FIG. 47, when the spectrum resource is allocated to seven receive ends according to the first allocation case in FIG. 14, PAPRs of seven segments of elements that are in G4 and transmitted on seven segments of subcarriers allocated to the seven receive ends are all relatively low. For example, PAPRs of a segment of elements transmitted on a segment of subcarriers allocated to the receive end 1 are 4.7025; PAPRs of a segment of elements transmitted on a segment of subcarriers allocated to the receive end 2 are 3.8208; PAPRs of a segment of elements transmitted on a segment of subcarriers allocated to the receive end 3 are 4.7025; PAPRs of a segment of elements transmitted on a segment of subcarriers allocated to the receive end 4 are 5.4069; PAPRs of a segment of elements transmitted on a segment of subcarriers allocated to the receive end 5 are 4.8382; PAPRs of a segment of elements transmitted on a segment of subcarriers allocated to the receive end 6 are 3.8208; and PAPRs of a segment of elements transmitted on a segment of subcarriers allocated to the receive end 7 are 4.8382. When the spectrum resource is allocated to one receive end according to the second allocation case in FIG. 14, PAPRs of a segment of elements that are in G4 and transmitted on a segment of subcarriers allocated to the receive end are all relatively low (for example, the PAPRs are 5.7053). It can be learned from FIG. 47 that no matter how the spectrum resource is allocated, an overall PAPR of G4 is relatively low, and a PAPR of a part that is in G4 and transmitted to each receive end is also relatively low.

In the eighth example, m=84. In this case, the sub-sequence includes: 84 basic elements arranged into a ZC sequence in the sub-sequence. The following separately describes different CB cases of the spectrum resource by using examples.

According to a first aspect, based on a structure of a spectrum resource shown in FIG. 4 and a plurality of allocation cases shown in FIG. 5, a target part (including a data part and a direct current part) in the CEF obtained by the transmit end may be G1, and G1={A, ±B, 0, 0, 0, ±C, ±D}, where A, B, C, and D are all ZC sequences whose lengths are 84, A, B, C, and D are different, and ± represents + or −.

In the eighth example, when generating G1, the transmit end may first generate a plurality of ZC sequences whose lengths are 84, and use four ZC sequences with lowest (or lower) overall PAPRs among the ZC sequences as A, B, C, and D. Finally, the transmit end may generate, based on A, B, C, D, and a structure of G1, a plurality of sequences whose lengths are 339, sort the sequences whose lengths are 339 in ascending order of overall PAPRs of the sequences, and use a sequence with a lowest (or lower) overall PAPR in the plurality of sequences whose lengths are 339, as G1.

For example, FIG. 48 shows PAPRs of G1 in the plurality of allocation cases of the spectrum resource. As shown in FIG. 48, when the spectrum resource is allocated to four receive ends according to the first allocation case in FIG. 5, PAPRs of four segments of elements that are in G1 and transmitted on four segments of subcarriers allocated to the four receive ends are all relatively low. For example, PAPRs of parts that are in G1 and transmitted on subcarriers allocated to the receive end 1 and the receive end 2 are all 4.9427; PAPRs of parts that are in G1 and transmitted on subcarriers allocated to the receive end 3 are 5.0236; and PAPRs of parts that are in G1 and transmitted on subcarriers allocated to the receive end 4 are 4.9665. When the spectrum resource is allocated to one receive end according to the sixth allocation case in FIG. 5, PAPRs of a segment of elements that are in G1 and transmitted on a segment of subcarriers allocated to the receive end are all relatively low (for example, the PAPRs are 5.8002). It can be learned from FIG. 48 that no matter how the spectrum resource is allocated, an overall PAPR of G1 is relatively low, and a PAPR of a part that is in G1 and transmitted to each receive end is also relatively low.

According to a second aspect, based on a structure of a spectrum resource shown in FIG. 7 and a plurality of allocation cases shown in FIG. 8, a target part (including a data part and a direct current part) in the CEF obtained by the transmit end may be G2, and G2={Z2_1, ±X, 0, 0, 0, ±Y, ±Z2_2}, where Z2_n={E, ±F, ±G, ±H}, n≥1, E, F, G, and H are all ZC sequences whose lengths are 84, A, B, C, D, E, F, G, and H are different, X includes first to $42^{nd}$ elements in Z2_1, and Y includes $43^{rd}$ to $84^{th}$ elements in Z2_1.

In the eighth example, the transmit end may use eight sequences with lowest (or lower) PAPRs in the plurality of ZC sequences whose lengths are 84, as A, B, C, D, E, F G, and H. Then the transmit end may generate, based on E, F, G, H, and a structure of Z2_n, a plurality of sequences whose lengths are 336, and sort the sequences whose lengths are 336 in ascending order of overall PAPRs of the sequences. When generating G2, the transmit end may use two sequences with lowest (or lower) overall PAPRs in the plurality of sequences whose lengths are 336, as Z2_1 and Z2_2. Finally, the transmit end may generate X and Y based on Z2_1, generate, based on Z2_1, Z2_2, X, Y, and a structure of G2, a plurality of sequences whose lengths are 759, sort the sequences whose lengths are 759 in ascending order of overall PAPRs of the sequences, and use a sequence with a lowest (or lower) overall PAPR in the plurality of sequences whose lengths are 759, as G2.

For example, FIG. 49 shows PAPRs of G2 in the plurality of allocation cases of the spectrum resource. As shown in FIG. 49, for G2, when the spectrum resource is allocated to three receive ends according to the first allocation case in FIG. 8, PAPRs of three segments of elements transmitted on three segments of subcarriers allocated to the three receive ends are all relatively low. For example, for G2, PAPRs of a segment of elements transmitted on a segment of subcarriers allocated to the receive end 1 are 5.5872; PAPRs of a segment of elements transmitted on a segment of subcarriers allocated to the receive end 2 are 4.7750; and PAPRs of a segment of elements transmitted on a segment of subcarriers allocated to the receive end 3 are 6.0633. When the spectrum resource is allocated to one receive end according to the second allocation case in FIG. 8, for the first G2, PAPRs of a segment of elements transmitted on a segment of subcarriers allocated to the receive end are all relatively low (for example, the PAPRs are 6.0440). It can be learned from FIG. 49 that no matter how the spectrum resource is allocated, an overall PAPR of G2 is relatively low, and a PAPR of a part that is in G2 and transmitted to each receive end is also relatively low.

According to a third aspect, based on a structure of a spectrum resource shown in FIG. 10 and a plurality of allocation cases shown in FIG. 11, a target part (including a data part and a direct current part) in the CEF obtained by the transmit end may be G3, and G3={Z2_1, ±X, ±Z1_1, ±Y, ±Z2_2}, where Z2_n={E, ±F, ±G, ±H}, n≥1, E, F, G, and H are all ZC sequences whose lengths are 84, A, B, C, D, E, F, G, and H are different, structures of Z1_n and G1 are the same, X includes first 84 elements in Z2_1, and Y includes 43' to $84^{th}$ elements in Z2_2.

In the eighth example, the transmit end may use eight sequences with lowest (or lower) PAPRs in the plurality of ZC sequences whose lengths are 84, as A, B, C, D, E, F G, and H. Then the transmit end may generate, based on E, F, G, H, and a structure of Z2_n, a plurality of sequences whose lengths are 336, and sort the sequences whose lengths are 336 in ascending order of overall PAPRs of the sequences. When generating G3, the transmit end may use two sequences with lowest (or lower) overall PAPRs in the plurality of sequences whose lengths are 336, as Z2_1 and Z2_2. Then the transmit end may generate X based on Z2_1, generate Y based on Z2_2, and use a sequence with a lowest (or lower) PAPR in a plurality of sequences that are generated based on A, B, C, D, and a structure of G1 and whose lengths are 339, as Z1_1, so that structures of Z1_1 and G1 are the same. Finally, the transmit end may generate, based on Z2_1, Z2_2, X, Y, and a structure of G3, a plurality of sequences whose lengths are 1179, sort the sequences whose lengths are 1179 in ascending order of overall PAPRs of the sequences, and use a sequence with a lowest (or lower) overall PAPR in the plurality of sequences whose lengths are 1179, as G3.

For example, FIG. 50 shows PAPRs of G3 in the plurality of allocation cases of the spectrum resource. As shown in FIG. 50, when the spectrum resource is allocated to five receive ends according to the first allocation case in FIG. 11, PAPRs of five segments of elements that are in G3 and transmitted on five segments of subcarriers allocated to the five receive ends are all relatively low. For example, for G3, PAPRs of a segment of elements transmitted on a segment of subcarriers allocated to the receive end 1 are 4.7390; PAPRs of a segment of elements transmitted on a segment of subcarriers allocated to the receive end 2 are 5.0722; PAPRs of a segment of elements transmitted on a segment of subcarriers allocated to the receive end 3 are 6.0860; PAPRs of a segment of elements transmitted on a segment of subcarriers allocated to the receive end 4 are 5.0696; and PAPRs of a segment of elements transmitted on a segment of subcarriers allocated to the receive end 5 are 4.3637. When the spectrum resource is allocated to one receive end according to the second allocation case in FIG. 11, PAPRs of a segment of elements that are in G3 and transmitted on a segment of subcarriers allocated to the receive end are all relatively low (for example, the PAPRs are 6.2916). It can be learned from FIG. 50 that no matter how the spectrum resource is allocated, an overall PAPR of G3 is relatively low, and a PAPR of a part that is in G3 and transmitted to each receive end is also relatively low.

According to a fourth aspect, based on a structure of a spectrum resource shown in FIG. 13 and a plurality of allocation cases shown in FIG. 14, a target part (including a data part and a direct current part) in the CEF obtained by the transmit end may be G4, and G4={Z2_1, ±X, ±Z2_2, ±Q, 0, 0, 0, ±P, ±Z2_3, ±Y, ±Z2_4}, where Z2_n={E, ±F, ±G, ±H}, n≥1, E, F, G, and H all represent sequences whose lengths are 84, A, B, C, D, E, F, G, and H are different, X includes first 84 elements in Z2_1, Y includes first 84 elements in Z2_2, P includes first to $42^{nd}$ elements in Z2_1, and Q includes $43^{rd}$ to $84^{th}$ elements in Z2_1.

In the eighth example, the transmit end may use eight sequences with lowest (or lower) PAPRs in the plurality of ZC sequences whose lengths are 84, as A, B, C, D, E, F G, and H. Then the transmit end may generate, based on E, F, G, H, and a structure of Z2_n, a plurality of sequences whose lengths are 336, and sort the sequences whose lengths are 336 in ascending order of overall PAPRs of the sequences. When generating G4, the transmit end may use four sequences with lowest (or lower) overall PAPRs in the plurality of sequences whose lengths are 336, as Z2_1, Z2_2, Z2_3, and Z2_4. Then the transmit end may generate X, P, and Q based on Z2_1, generate Y based on Z2_2, generate, based on Z2_1, Z2_2, Z2_3, Z2_4, X, Y, P, Q, and a structure of G4, a plurality of sequences whose lengths are 1599, sort the sequences whose lengths are 1599 in ascending order of overall PAPRs of the sequences, and use a sequence with a lowest (or lower) overall PAPR in the plurality of sequences whose lengths are 1599, as G4.

For example, FIG. 51 shows PAPRs of G4 in the plurality of allocation cases of the spectrum resource. As shown in FIG. 51, when the spectrum resource is allocated to seven receive ends according to the first allocation case in FIG. 14, PAPRs of seven segments of elements that are in G4 and transmitted on seven segments of subcarriers allocated to the seven receive ends are all relatively low. For example, for G4, PAPRs of a segment of elements transmitted on a segment of subcarriers allocated to the receive end 1 are 5.5872; PAPRs of a segment of elements transmitted on a segment of subcarriers allocated to the receive end 2 are 5.0661; PAPRs of a segment of elements transmitted on a segment of subcarriers allocated to the receive end 3 are 4.4671; PAPRs of a segment of elements transmitted on a segment of subcarriers allocated to the receive end 4 are 5.0722; PAPRs of a segment of elements transmitted on a segment of subcarriers allocated to the receive end 5 are 4.4671; PAPRs of a segment of elements transmitted on a segment of subcarriers allocated to the receive end 6 are 5.0661; and PAPRs of a segment of elements transmitted on a segment of subcarriers allocated to the receive end 7 are 4.4671. When the spectrum resource is allocated to one receive end according to the second allocation case in FIG. 14, PAPRs of a segment of elements that are in G4 and transmitted on a segment of subcarriers allocated to the receive end are all relatively low (for example, the PAPRs are 6.5363). It can be learned from FIG. 51 that no matter how the spectrum resource is allocated, an overall PAPR of G4 is relatively low, and a PAPR of a part that is in G4 and transmitted to each receive end is also relatively low.

In the eighth example, the transmit end generates the CEF based on the ZC sequence. Because autocorrelation of the ZC sequence is relatively good, autocorrelation of the CEF generated in this example of this application is also relatively good.

In the ninth example, m=84. In this case, the sub-sequence includes: 80 basic elements arranged into a Golay sequence in the sub-sequence and four interpolation elements located after the 80 basic elements, where each element in the sub-sequence belongs to a target element set, and the target element set includes 1 and −1. The following separately describes different CB cases of the spectrum resource by using examples.

According to a first aspect, based on a structure of a spectrum resource shown in FIG. 4 and a plurality of allocation cases shown in FIG. 5, a target part (including a data part and a direct current part) in the CEF obtained by the transmit end may be G1, and G1={A, ±B, 0, 0, 0, ±C, ±D}, where A, B, C, and D all represent sequences whose lengths are 84 and all belong to a sequence set formed by T1, T2, T3, and T4, and A, B, C, and D are different; and T1={−C1, −1, C2, 1, C1, −1, C2, −1}, T2={C1, 1, −C2, −1, C1, 1, C2, −1}, T3={C1, −1, C2, 1, −C1, −1, C2, −1}, T4={C1, −1, C2, 1, C1, 1, −C2, 1}, C1 and C2 represent two Golay sequences whose lengths are both 20, −C1 represents −1 times C1, −C2 represents −1 times C2, and ± represents + or −. C1 and C2 may be orthogonal to each other or may not be orthogonal to each other, and S1 and S2 may be orthogonal to each other or may not be orthogonal to each other. This is not limited in this embodiment of this application.

In the ninth example, when generating G1, the transmit end may first generate C1 and C2 (for the generation process, refer to the generation process of C1 and C2 in the first example), then generate T1 to T4 based on C1 and C2, and determine A, B, C and D based on T1 to T4 (for example, use T1 as A, use T2 as B, use T3 as C, and use T4 as D; or use T1 as B, use T2 as A, use T3 as C, and use T4 as D). Finally, the transmit end may generate, based on A, B, C, D, and a structure of G1, a plurality of sequences whose lengths are 339, sort the sequences whose lengths are 339 in ascending order of overall PAPRs of the sequences, and use a sequence with a lowest (or lower) overall PAPR in the plurality of sequences whose lengths are 339, as G1.

For example, FIG. 52 shows PAPRs of G1 in the plurality of allocation cases of the spectrum resource. As shown in FIG. 52, when the spectrum resource is allocated to four receive ends according to the first allocation case in FIG. 5, PAPRs of four segments of elements that are in G1 and transmitted on four segments of subcarriers allocated to the four receive ends are all relatively low. For example, PAPRs of parts that are in G1 and transmitted on subcarriers allocated to the receive end 1 and the receive end 3 are all 3.8133; PAPRs of parts that are in G1 and transmitted on subcarriers allocated to the receive end 2 are 3.7170; and PAPRs of parts that are in G1 and transmitted on subcarriers allocated to the receive end 4 are 3.5808. When the spectrum resource is allocated to one receive end according to the sixth allocation case in FIG. 5, PAPRs of a segment of elements that are in G1 and transmitted on a segment of subcarriers allocated to the receive end are all relatively low (for example, the PAPRs are 4.2790). It can be learned from FIG. 52 that no matter how the spectrum resource is allocated, an overall PAPR of G1 is relatively low, and a PAPR of a part that is in G1 and transmitted to each receive end is also relatively low.

According to a second aspect, based on a structure of a spectrum resource shown in FIG. 7 and a plurality of allocation cases shown in FIG. 8, a target part (including a data part and a direct current part) in the CEF obtained by the transmit end may be G2, and G2={Z2_1, ±X, 0, 0, 0, ±Y, ±Z2_2}, where Z2_n={E, ±F, ±G, ±H}, n≥1, E, F, G, and H all belong to a sequence set formed by T5, T6, T7, and T8, E, F, G, and H are different, X includes first to $42^{nd}$ elements in Z2_1, and Y includes $43^{rd}$ to $84^{th}$ elements in Z2_1.

T5={−S1, −1, S2, 1, S1, −1, S2, −1}; T6={S1, −1, −S2, 1, S1, 1, S2, −1}; T7={S1, −1, S2, −1, −S1, 1, S2, −1}; T8={S1, 1, S2, −1, S1, 1, −S2, −1}; and S1 and S2 represent two Golay sequences whose lengths are both 20, −S1 represents −1 times S1, and −S2 represents −1 times S2.

In the ninth example, the transmit end may further generate S1 and S2 (for the generation process, refer to the generation process of S1 and S2 in the first example), then generate T5 to T8 based on S1 and S2, and determine E, F, G and H based on T5 to T8 (for example, use T5 as E, use T6 as F, use T7 as G, and use T8 as H; or use T5 as F, use T6 as E, use T7 as G, and use T8 as H). Then the transmit end may generate, based on E, F, G, H, and a structure of Z2_n, a plurality of sequences whose lengths are 336, and sort the sequences whose lengths are 336 in ascending order of overall PAPRs of the sequences. When generating G2, the transmit end may use two sequences with lowest (or lower) overall PAPRs in the plurality of sequences whose lengths are 336, as Z2_1 and Z2_2. Finally, the transmit end may generate X and Y based on Z2_1, generate, based on Z2_1, Z2_2, X, Y, and a structure of G2, a plurality of sequences whose lengths are 759, sort the sequences whose lengths are 759 in ascending order of overall PAPRs of the sequences, and use a sequence with a lowest (or lower) overall PAPR in the plurality of sequences whose lengths are 759, as G2.

For example, FIG. 53 shows PAPRs of G2 in the plurality of allocation cases of the spectrum resource. As shown in FIG. 53, for G2, when the spectrum resource is allocated to three receive ends according to the first allocation case in FIG. 8, PAPRs of three segments of elements transmitted on three segments of subcarriers allocated to the three receive ends are all relatively low. For example, for G2, PAPRs of a segment of elements transmitted on a segment of subcarriers allocated to the receive end 1 are 5.5897; PAPRs of a segment of elements transmitted on a segment of subcarriers allocated to the receive end 2 are 3.9299; and PAPRs of a segment of elements transmitted on a segment of subcarriers allocated to the receive end 3 are 4.3336. When the spectrum resource is allocated to one receive end according to the second allocation case in FIG. 8, for G2, PAPRs of a segment of elements transmitted on a segment of subcarriers allocated to the receive end are all relatively low (for example, the PAPRs are 5.4642). It can be learned from FIG. 53 that no matter how the spectrum resource is allocated, an overall PAPR of G2 is relatively low, and a PAPR of a part that is in G2 and transmitted to each receive end is also relatively low.

According to a third aspect, based on a structure of a spectrum resource shown in FIG. 10 and a plurality of allocation cases shown in FIG. 11, a target part (including a data part and a direct current part) in the CEF obtained by the transmit end may be G3, G3={Z2_1, ±X, ±Z1_1, ±Y, ±Z2_2}, where Z2_n={E, ±F, ±G, ±H}, n≥1, E, F, G, and H all belong to a sequence set formed by T5, T6, T7, and T8, E, F, G, and H are different, structures of Z1_n and G1 are the same, X includes first 84 elements in Z2_1, and Y includes first 84 elements in Z2_2.

T5={−S1, −1, S2, 1, S1, −1, S2, −1}; T6={S1, −1, −S2, 1, S1, 1, S2, −1}; T7={S1, −1, S2, −1, −S1, 1, S2, −1}; T8={S1, 1, S2, −1, S1, 1, −S2, −1}; and S1 and S2 represent two Golay sequences whose lengths are both 20, −S1 represents −1 times S1, and −S2 represents −1 times S2.

In the ninth example, when generating G3, the transmit end may use two sequences with lowest (or lower) overall PAPRs in a plurality of sequences (generated based on E, F, G, and H) whose lengths are 336, as Z2_1 and Z2_2. Then the transmit end may generate X based on Z2_1, generate Y based on Z2_2, and use a sequence with a lowest (or lower) PAPR in a plurality of sequences that are generated based on A, B, C, D, and a structure of G1 and whose lengths are 339, as Z1_1, so that structures of Z1_1 and G1 are the same. Finally, the transmit end may generate, based on Z2_1, Z2_2, Z1_1, X, Y, and a structure of G3, a plurality of sequences whose lengths are 1179, sort the sequences whose lengths are 1179 in ascending order of overall PAPRs of the sequences, and use a sequence with a lowest (or lower) overall PAPR in the plurality of sequences whose lengths are 1179, as G3.

For example, FIG. 54 shows PAPRs of G3 in the plurality of allocation cases of the spectrum resource. As shown in FIG. 54, when the spectrum resource is allocated to five receive ends according to the first allocation case in FIG. 11, PAPRs of five segments of elements that are in G3 and transmitted on five segments of subcarriers allocated to the five receive ends are all relatively low. For example, for G3, PAPRs of a segment of elements transmitted on a segment of subcarriers allocated to the receive end 1 are 4.3403; PAPRs of a segment of elements transmitted on a segment of subcarriers allocated to the receive end 2 are 3.8538; PAPRs of a segment of elements transmitted on a segment of subcarriers allocated to the receive end 3 are 5.9535; PAPRs of a segment of elements transmitted on a segment of subcarriers allocated to the receive end 4 are 3.8538; and PAPRs of a segment of elements transmitted on a segment of subcarriers allocated to the receive end 5 are 4.2326. When the spectrum resource is allocated to one receive end according to the second allocation case in FIG. 11, PAPRs of a segment of elements that are in G3 and transmitted on a segment of subcarriers allocated to the receive end are all relatively low (for example, the PAPRs are 5.7950). It can be learned from FIG. 54 that no matter how the spectrum resource is allocated, an overall PAPR of G3 is relatively low, and a PAPR of a part that is in G3 and transmitted to each receive end is also relatively low.

According to a fourth aspect, based on a structure of a spectrum resource shown in FIG. 13 and a plurality of allocation cases shown in FIG. 14, a target part (including a data part and a direct current part) in the CEF obtained by the transmit end may be G4, and G4={Z2_1, ±X, ±Z2_2, ±Q, 0, 0, 0, ±P, ±Z2_3, ±Y, ±Z2_4}, where Z2 n={E, ±F, ±G, ±H}, n≥1, E, F, G, and H all belong to a sequence set formed by T5, T6, T7, and T8, E, F, G, and H are different, X includes first 84 elements in Z2_1, Y includes first 84 elements in Z2_2, P includes first to $42^{nd}$ elements in Z2_1, and Q includes $43^{rd}$ to $84^{th}$ elements in Z2_1.

In the ninth example, when generating G4, the transmit end may use four sequences with lowest (or lower) overall PAPRs in a plurality of sequences (generated based on E, F, G, and H) whose lengths are 336, as Z2_1, Z2_2, Z2_3, and Z2_4. Then the transmit end may generate X, P, and Q based on Z2_1, and generate Y based on Z2_2. Finally, the transmit end may generate, based on Z2_1, Z2_2, Z2_3, Z2_4, X, Y, P, Q, and a structure of G4, a plurality of sequences whose lengths are 1599, sort the sequences whose lengths are 1599 in ascending order of overall PAPRs of the sequences, and use a sequence with a lowest (or lower) overall PAPR in the plurality of sequences whose lengths are 1599, as G4.

For example, FIG. 55 shows PAPRs of G4 in a plurality of allocation cases of the spectrum resources. As shown in FIG. 55, when the spectrum resource is allocated to seven receive ends according to the first allocation case in FIG. 14, PAPRs of seven segments of elements that are in G4 and transmitted on seven segments of subcarriers allocated to the seven receive ends are all relatively low. For example, for G4, PAPRs of a segment of elements transmitted on a segment of subcarriers allocated to the receive end 1 are 5.9123; PAPRs of a segment of elements transmitted on a segment of subcarriers allocated to the receive end 2 are 3.8684; PAPRs of a segment of elements transmitted on a segment of subcarriers allocated to the receive end 3 are 5.9123; PAPRs of a segment of elements transmitted on a segment of subcarriers allocated to the receive end 4 are 4.0902; PAPRs of a segment of elements transmitted on a segment of subcarriers allocated to the receive end 5 are 5.8888; PAPRs of a segment of elements transmitted on a segment of subcarriers allocated to the receive end 6 are 3.8684; and PAPRs of a segment of elements transmitted on a segment of subcarriers allocated to the receive end 7 are 5.8888. When the spectrum resource is allocated to one receive end according to the second allocation case in FIG. 14, PAPRs of a segment of elements that are in G4 and transmitted on a segment of subcarriers allocated to the receive end are all relatively low (for example, the PAPRs are 6.0783). It can be learned from FIG. 55 that no matter how the spectrum resource is allocated, an overall PAPR of G4 is relatively low, and a PAPR of a part that is in G4 and transmitted to each receive end is also relatively low.

In the tenth example, m=80. In this case, the sub-sequence includes: 80 basic elements arranged into a Golay sequence in the sub-sequence, where each element in the sub-sequence belongs to a target element set, and the target element set includes 1 and −1. The following separately describes different CB cases of the spectrum resource by using examples.

According to a first aspect, based on a structure of a spectrum resource shown in FIG. 16 and a plurality of allocation cases shown in FIG. 17, a target part (including a data part and a direct current part) in the CEF obtained by the transmit end may be G1, and G1={A, ±B, 0, 0, 0, ±C, ±D}, where A, B, C, and D all represent Golay sequences whose lengths are 80, A, B, C, and D are different, a structure of each sequence in A, B, C, and D is the same as a structure of T1 or T2, $$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two Golay sequences whose lengths are both 10, S1 and S2 represent two Golay sequences whose lengths are both 8, ⊗ represents a Kronecker product, $\overleftarrow{S1}$ represents a reverse order of S1, $\overleftarrow{S2}$ represents a reverse order of S2, and ± represents + or −. C1 and C2 may be orthogonal to each other or may not be orthogonal to each other, and S1 and S2 may be orthogonal to each other or may not be orthogonal to each other. This is not limited in this embodiment of this application.

In the tenth example, when generating G1, the transmit end may first obtain binary Golay sequences C1 and C2 whose lengths are 10 (both include 1 and −1), and binary Golay sequences S1 and S2 whose lengths are 8 (both include 1 and −1). Then a Golay sequence T1 or T2 whose length is 80 is generated based on S1, S2, C1, and C2. By referring to the method for generating a Golay sequence whose length is 80, the transmit end may further generate more Golay sequences whose lengths are 80. Then the transmit end may sort the obtained sequences whose lengths are 80 in ascending order of overall PAPRs of the sequences, and use four sequences with lowest (or lower) overall PAPRs as A, B, C, and D in G1. Finally, the transmit end may generate, based on A, B, C, D, and a structure of G1, a plurality of sequences whose lengths are 323, sort the sequences whose lengths are 323 in ascending order of overall PAPRs of the sequences, and use a sequence with a lowest (or lower) overall PAPR in the plurality of sequences whose lengths are 323, as G1.

For example, FIG. 56 shows PAPRs of G1 in the plurality of allocation cases of the spectrum resource. As shown in FIG. 56, when the spectrum resource is allocated to four receive ends according to the first allocation case in FIG. 17, PAPRs of four segments of elements that are in G1 and transmitted on four segments of subcarriers allocated to the four receive ends are all relatively low. For example, PAPRs of parts that are in G1 and transmitted on subcarriers allocated to the receive end 1, the receive end 2, the receive end 3, and the receive end 4 are 2.9781. When the spectrum resource is allocated to one receive end according to the sixth allocation case in FIG. 17, PAPRs of a segment of elements that are in G1 and transmitted on a segment of subcarriers allocated to the receive end are all relatively low (for example, the PAPRs are 3.0032). It can be learned from FIG. 56 that no matter how the spectrum resource is allocated, an overall PAPR of G1 is relatively low, and a PAPR of a part that is in G1 and transmitted to each receive end is also relatively low.

According to a second aspect, based on a structure of a spectrum resource shown in FIG. 7 and a plurality of allocation cases shown in FIG. 8, a target part (including a data part and a direct current part) in the CEF obtained by the transmit end may be G2, and G2={Z2_1, ±X, 0, 0, 0, ±Y, ±Z2_2}, where Z2 n={E, ±F, ±G, ±H}, n≥1, E, F, G, and H all represent Golay sequences whose lengths are 80, E, F, G, and H are different, a structure of each sequence in A, B, C, and D is the same as a structure of one sequence in T1 and T2, a structure of each sequence in E, F, G, and H is the same as a structure of the other sequence in T1 and T2, X includes first to $40^{th}$ elements in Z2_1, and Y includes $41^{st}$ to $80^{th}$ elements in Z2_1.

In the tenth example, the transmit end may generate, based on S1, S2, C1, and C2, Golay sequences T1 and T2 whose lengths are 80. By referring to the method for generating T1, the transmit end may further generate more Golay sequences whose structures are the same as that of T1 and whose lengths are 80, and by referring to the method for generating T2, generate more Golay sequences whose structures are the same as that of T2 and whose lengths are 80. Then the transmit end may sort the obtained sequences that have the structure of one sequence in T1 and T2 and whose lengths are 80, in ascending order of overall PAPRs of the sequences, and use four sequences with lowest (or lower) overall PAPRs as A, B, C, and D in G1. The transmit end may sort the obtained sequences that have the structure of the other sequence in T1 and T2 and whose lengths are 80, in ascending order of overall PAPRs of the sequences, and use four sequences with lowest (or lower) overall PAPRs as E, F, G, and H in G1. Then the transmit end may generate, based on E, F, G, H, and a structure of Z2 n, a plurality of sequences whose lengths are 320, and sort the sequences whose lengths are 320 in ascending order of overall PAPRs of the sequences. When generating G2, the transmit end may use two sequences with lowest (or lower) overall PAPRs in the plurality of sequences whose lengths are 320, as Z2_1 and Z2_2. Finally, the transmit end may generate X and Y based on Z2_1, generate, based on Z2_1, Z2_2, X, Y, and a structure of G2, a plurality of sequences whose lengths are 723, sort the sequences whose lengths are 723 in ascending order of overall PAPRs of the sequences, and use a sequence with a lowest (or lower) overall PAPR in the plurality of sequences whose lengths are 723, as G2.

For example, FIG. 57 shows PAPRs of G2 in the plurality of allocation cases of the spectrum resource. As shown in FIG. 57, when the spectrum resource is allocated to three receive ends according to the first allocation case in FIG. 8, PAPRs of three segments of elements that are in G2 and transmitted on three segments of subcarriers allocated to the three receive ends are all relatively low. For example, for G2, PAPRs of a segment of elements transmitted on a segment of subcarriers allocated to the receive end 1 are 3.0046; PAPRs of a segment of elements transmitted on a segment of subcarriers allocated to the receive end 2 are 4.7587; and PAPRs of a segment of elements transmitted on a segment of subcarriers allocated to the receive end 3 are 3.0046. When the spectrum resource is allocated to one receive end according to the second allocation case in FIG. 8, for G2, PAPRs of a segment of elements transmitted on a segment of subcarriers allocated to the receive end are all relatively low (for example, the PAPRs are 5.0167). It can be learned from FIG. 57 that no matter how the spectrum resource is allocated, an overall PAPR of G2 is relatively low, and a PAPR of a part that is in G2 and transmitted to each receive end is also relatively low.

According to a third aspect, based on a structure of a spectrum resource shown in FIG. 10 and a plurality of allocation cases shown in FIG. 11, a target part (including a data part and a direct current part) in the CEF obtained by the transmit end may be G3, and G3={Z2_1, ±X, ±Z1_1, ±Y, ±Z2_2}, where Z2_n={E, ±F, ±G, ±H}, n≥1, E, F, G, and H all represent Golay sequences whose lengths are 80, E, F, G, and H are different, a structure of each sequence in A, B, C, and D is the same as a structure of one sequence in T1 and T2, a structure of each sequence in E, F, G, and H is the same as a structure of the other sequence in T1 and T2, structures of Z1_n and G1 are the same, X includes first 80 elements in Z2_1, and Y includes first 80 elements in Z2_2.

In the tenth example, when generating G3, the transmit end may use two sequences with lowest (or lower) overall PAPRs in a plurality of sequences (generated based on E, F, G, H, and a structure of Z2_n) whose lengths are 320, as Z2_1 and Z2_2. The transmit end may further use a sequence with a lowest (or lower) overall PAPR in a plurality of sequences (generated based on A, B, C, D, and a structure of G1) whose lengths are 320, as Z1_1, so that the structures of Z1_n and G1 are the same. Finally, the transmit end may generate X based on Z2_1, generate Y based on Z2_2, generate, based on Z2_1, Z2_2, Z1_1, X, Y, and a structure of G3, a plurality of sequences whose lengths are 1123, sort the sequences whose lengths are 1123 in ascending order of overall PAPRs of the sequences, and use a sequence with a lowest (or lower) overall PAPR in the plurality of sequences whose lengths are 1123, as G3.

For example, FIG. 58 shows PAPRs of G3 in the plurality of allocation cases of the spectrum resource. As shown in FIG. 58, when the spectrum resource is allocated to five receive ends according to the first allocation case in FIG. 11, PAPRs of five segments of elements that are in G3 and transmitted on five segments of subcarriers allocated to the five receive ends are all relatively low. For example, for G3, PAPRs of a segment of elements transmitted on a segment of subcarriers allocated to the receive end 1 are 3.0047; PAPRs of a segment of elements transmitted on a segment of subcarriers allocated to the receive end 2 are 3.0091; PAPRs of a segment of elements transmitted on a segment of subcarriers allocated to the receive end 3 are 3.0092; PAPRs of a segment of elements transmitted on a segment of subcarriers allocated to the receive end 4 are 3.0091; and PAPRs of a segment of elements transmitted on a segment of subcarriers allocated to the receive end 5 are 3.0047. When the spectrum resource is allocated to one receive end according to the second allocation case in FIG. 11, PAPRs of a segment of elements that are in the first G3 and transmitted on a segment of subcarriers allocated to the receive end are all relatively low (for example, the PAPRs are 5.3965). It can be learned from FIG. 58 that no matter how the spectrum resource is allocated, an overall PAPR of G3 is relatively low, and a PAPR of a part that is in G3 and transmitted to each receive end is also relatively low.

According to a fourth aspect, based on a structure of a spectrum resource shown in FIG. 13 and a plurality of allocation cases shown in FIG. 14, a target part (including a data part and a direct current part) in the CEF obtained by the transmit end may be G4, and G4={Z2_1, ±X, ±Z2_2, ±Q, 0, 0, 0, ±P, ±Z2_3, ±Y, ±Z2_4}, where Z2_n={E, ±F, ±G, ±H}, n≥1, E, F, G, and H all represent Golay sequences whose lengths are 80, E, F, G, and H are different, a structure of each sequence in A, B, C, and D is the same as a structure of one sequence in T1 and T2, a structure of each sequence in E, F, G, and H is the same as a structure of the other sequence in T1 and T2, X includes first 80 elements in Z2_1, Y includes first 80 elements in Z2_2, P includes $81^{st}$ to $160^{th}$ elements in Z2_1, and Q includes first 80 elements in Z2_1.

In the tenth example, when generating G4, the transmit end may use four sequences with lowest (or lower) overall PAPRs in a plurality of sequences (generated based on E, F, G, H, and a structure of Z2_n) whose lengths are 320, as Z2_1, Z2_2, Z2_3, and Z2_4. Finally, the transmit end may generate X, P, and Q based on Z2_1, generate Y based on Z2_2, generate, based on Z2_1, Z2_2, Z2_3, Z2_2, X, Y, P, Q, and a structure of G4, a plurality of sequences whose lengths are 1603, sort the sequences whose lengths are 1603 in ascending order of overall PAPRs of the sequences, and use a sequence with a lowest (or lower) overall PAPR in the plurality of sequences whose lengths are 1603, as G4.

For example, FIG. 59 shows PAPRs of G4 in the plurality of allocation cases of the spectrum resource. As shown in FIG. 59, for G4, when the spectrum resource is allocated to seven receive ends according to the first allocation case in FIG. 14, PAPRs of seven segments of elements transmitted on seven segments of subcarriers allocated to the seven receive ends are all relatively low. For example, for G4, PAPRs of parts transmitted on subcarriers allocated to the receive end 1, the receive end 3, the receive end 5, and the receive end 7 are all 3.0098; and PAPRs of parts transmitted on subcarriers allocated to the receive end 2, the receive end 4, and the receive end 6 are all 3.0009. When the spectrum resource is allocated to one receive end according to the second allocation case in FIG. 14, PAPRs of a segment of elements transmitted on a segment of subcarriers allocated to the receive end are all relatively low (for example, the PAPRs are 5.3027). It can be learned from FIG. 59 that no matter how the spectrum resource is allocated, an overall PAPR of G4 is relatively low, and a PAPR of a part that is in G4 and transmitted to each receive end is also relatively low.

In the eleventh example, m=80. In this case, the sub-sequence includes: 80 basic elements arranged into a Golay sequence in the sub-sequence, where each element in the sub-sequence belongs to a target element set, the target element set includes 1, −1, j, and −j, and j is an imaginary unit. The following separately describes different CB cases of the spectrum resource by using examples.

According to a first aspect, based on a structure of a spectrum resource shown in FIG. 16 and a plurality of allocation cases shown in FIG. 17, a target part (including a data part and a direct current part) in the CEF obtained by the transmit end may be G1, and G1={A, ±B, 0, 0, 0, ±C, ±D}.

A, B, C, and D all represent Golay sequences whose lengths are 80, A, B, C, and D are different, a structure of each sequence in A, B, C, and D is the same as a structure of T1 or T2, $$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two quaternary Golay sequences that both include 1, −1, j, and −j and whose lengths are both 5, S1 and S2 represent two binary Golay sequences that both include 1 and −1 and whose lengths are both 16, ⊗ represents a Kronecker product, $\overleftarrow{S1}$ represents a reverse order of S1, $\overleftarrow{S2}$ represents a reverse order of S2, and ± represents + or −. Optionally, both C1 and C2 may alternatively be binary Golay sequences, and both S1 and S2 are quaternary Golay sequences. This is not limited in this embodiment of this application. C1 and C2 may be orthogonal to each other or may not be orthogonal to each other, and S1 and S2 may be orthogonal to each other or may not be orthogonal to each other. This is not limited in this embodiment of this application.

In the eleventh example, when generating G1, the transmit end may first obtain the quaternary Golay sequences C1 and C2 whose lengths are 5 and the binary Golay sequences S1 and S2 whose lengths are 16, and then generate, based on S1, S2, C1, and C2, a Golay sequence T1 or T2 whose length is 80. By referring to the method for generating a Golay sequence whose length is 80, the transmit end may further generate more Golay sequences whose lengths are 80. Then the transmit end may sort the obtained sequences whose lengths are 80 in ascending order of overall PAPRs of the sequences, and use four sequences with lowest (or lower) overall PAPRs as A, B, C, and D in G1. Finally, the transmit end may generate, based on A, B, C, D, and a structure of G1, a plurality of sequences whose lengths are 323, sort the sequences whose lengths are 323 in ascending order of overall PAPRs of the sequences, and then use a sequence with a lowest (or lower) overall PAPR in the plurality of sequences whose lengths are 323, as G1.

Figure 60:
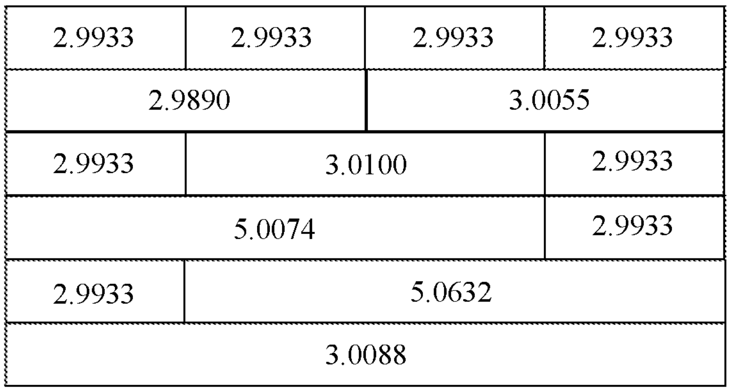
FIG. 60 is a schematic diagram of another PAPR according to an embodiment of this application.

For example, FIG. 60 shows PAPRs of G1 in the plurality of allocation cases of the spectrum resource. As shown in FIG. 60, when the spectrum resource is allocated to four receive ends according to the first allocation case in FIG. 17, PAPRs of four segments of elements that are in G1 and transmitted on four segments of subcarriers allocated to the four receive ends are all relatively low. For example, PAPRs of parts that are in G1 and transmitted on subcarriers allocated to the receive end 1, the receive end 2, the receive end 3, and the receive end 4 are 2.9933. When the spectrum resource is allocated to one receive end according to the sixth allocation case in FIG. 17, PAPRs of a segment of elements that are in G1 and transmitted on a segment of subcarriers allocated to the receive end are all relatively low (for example, the PAPRs are 3.0088). It can be learned from FIG. 60 that no matter how the spectrum resource is allocated, an overall PAPR of G1 is relatively low, and a PAPR of a part that is in G1 and transmitted to each receive end is also relatively low.

According to a second aspect, based on a structure of a spectrum resource shown in FIG. 7 and a plurality of allocation cases shown in FIG. 8, a target part (including a data part and a direct current part) in the CEF obtained by the transmit end may be G2. For G2 generated by the transmit end in the eleventh example, refer to G2 generated by the transmit end in the tenth example. However, T1 in the eleventh example is different from that in the tenth example, and T2 is also different. Details are not described herein again in this embodiment of this application.

Figure 61:
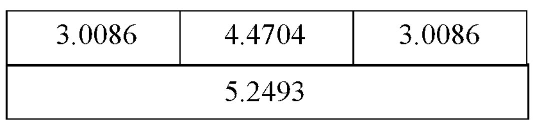
FIG. 61 is a schematic diagram of another PAPR according to an embodiment of this application.

For example, FIG. 61 shows PAPRs of G2 in the plurality of allocation cases of the spectrum resource. As shown in FIG. 61, when the spectrum resource is allocated to three receive ends according to the first allocation case in FIG. 8, PAPRs of three segments of elements that are in G2 and transmitted on three segments of subcarriers allocated to the three receive ends are all relatively low. For example, for G2, PAPRs of parts transmitted on sub carriers allocated to the receive end 1 and the receive end 3 are 3.0086; and PAPRs of a segment of elements transmitted on a segment of subcarriers allocated to the receive end 2 are 4.4704. When the spectrum resource is allocated to one receive end according to the second allocation case in FIG. 8, for G2, PAPRs of a segment of elements transmitted on a segment of subcarriers allocated to the receive end are all relatively low (for example, the PAPRs are 5.2493). It can be learned from FIG. 61 that no matter how the spectrum resource is allocated, an overall PAPR of G2 is relatively low, and a PAPR of a part that is in G2 and transmitted to each receive end is also relatively low.

According to a third aspect, based on a structure of a spectrum resource shown in FIG. 10 and a plurality of allocation cases shown in FIG. 11, a target part (including a data part and a direct current part) in the CEF obtained by the transmit end may be G3. For G3 generated by the transmit end in the eleventh example, refer to G3 generated by the transmit end in the tenth example. However, T1 in the eleventh example is different from that in the tenth example, and T2 is also different. Details are not described herein again in this embodiment of this application.

Figure 62:
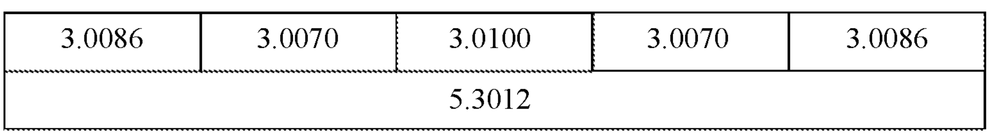
FIG. 62 is a schematic diagram of another PAPR according to an embodiment of this application.

For example, FIG. 62 shows PAPRs of G3 in the plurality of allocation cases of the spectrum resource. As shown in FIG. 62, when the spectrum resource is allocated to five receive ends according to the first allocation case in FIG. 11, PAPRs of five segments of elements that are in G3 and transmitted on five segments of subcarriers allocated to the five receive ends are all relatively low. For example, for G3, PAPRs of parts transmitted on subcarriers allocated to the receive end 1 and the receive end 5 are all 3.0086; PAPRs of parts transmitted on subcarriers allocated to the receive end 2 and the receive end 4 are all 3.0070; and PAPRs of a segment of elements transmitted on a segment of subcarriers allocated to the receive end 3 are 3.0100. When the spectrum resource is allocated to one receive end according to the second allocation case in FIG. 11, PAPRs of a segment of elements that are in the first G3 and transmitted on a segment of subcarriers allocated to the receive end are all relatively low (for example, the PAPRs are 5.3012). It can be learned from FIG. 62 that no matter how the spectrum resource is allocated, an overall PAPR of G3 is relatively low, and a PAPR of a part that is in G3 and transmitted to each receive end is also relatively low.

According to a fourth aspect, based on a structure of a spectrum resource shown in FIG. 13 and a plurality of allocation cases shown in FIG. 14, a target part (including a data part and a direct current part) in the CEF obtained by the transmit end may be G4. For G4 generated by the transmit end in the eleventh example, refer to G4 generated by the transmit end in the tenth example. However, T1 in the eleventh example is different from that in the tenth example, and T2 is also different. Details are not described herein again in this embodiment of this application.

Figure 63:
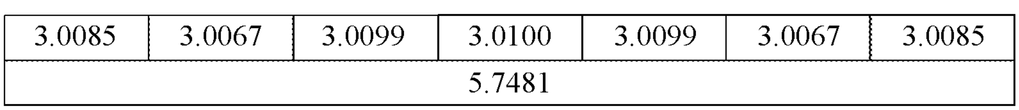
FIG. 63 is a schematic diagram of another PAPR according to an embodiment of this application.

For example, FIG. 63 shows PAPRs of G4 in the plurality of allocation cases of the spectrum resource. As shown in FIG. 63, for G4, when the spectrum resource is allocated to seven receive ends according to the first allocation case in FIG. 14, PAPRs of seven segments of elements transmitted on seven segments of subcarriers allocated to the seven receive ends are all relatively low. For example, for G4, PAPRs of parts transmitted on subcarriers allocated to the receive end 1 and the receive end 7 are all 3.0085; PAPRs of parts transmitted on subcarriers allocated to the receive end 2 and the receive end 6 are all 3.0067; PAPRs of parts transmitted on subcarriers allocated to the receive end 3 and the receive end 5 are all 3.0099; and PAPRs of parts transmitted on subcarriers allocated to the receive end 4 are all 3.0100. When the spectrum resource is allocated to one receive end according to the second allocation case in FIG. 14, PAPRs of a segment of elements transmitted on a segment of subcarriers allocated to the receive end are all relatively low (for example, the PAPRs are 5.7481). It can be learned from FIG. 63 that no matter how the spectrum resource is allocated, an overall PAPR of G4 is relatively low, and a PAPR of a part that is in G4 and transmitted to each receive end is also relatively low.

In the twelfth example, m=84. In this case, the sub-sequence includes: 80 basic elements arranged into a Golay sequence in the sub-sequence and four interpolation elements located after the 80 basic elements, where each element in the sub-sequence belongs to a target element set, and the target element set includes 1 and −1. The following separately describes different CB cases of the spectrum resource by using examples.

According to a first aspect, based on a structure of a spectrum resource shown in FIG. 4 and a plurality of allocation cases shown in FIG. 5, a target part (including a data part and a direct current part) in the CEF obtained by the transmit end may be G1, and G1={U1, ±U2, 0, 0, 0, ±U3, ±U4}.

U1, U2, U3, and U4 all belong to a sequence set formed by A, −A, *A, and A*, A represents a sequence whose length is 84, −A represents −1 times A, a $(2k+1)^{th}$ element (an element in an odd bit) in *A is −1 times a $(2k+1)^{th}$ element in A, a $(2k+2)^{th}$ element (an element in an even bit) in *A is the same as a $(2k+2)^{th}$ element in A, a $(2k+1)^{th}$ element in A* is the same as the $(2k+1)^{th}$ element in A, a $(2k+2)^{th}$ element in A* is −1 times the $(2k+2)^{th}$ element in A, and k≥0.

A sequence in which 80 elements are arranged in A is T1 or T2, $$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two Golay sequences whose lengths are both 10, S1 and S2 represent two Golay sequences whose lengths are both 8, ⊗ represents a Kronecker product, $\overleftarrow{S1}$ represents a reverse order of S1, $\overleftarrow{S2}$ represents a reverse order of S2, and ± represents + or −. C1 and C2 may be orthogonal to each other or may not be orthogonal to each other, and S1 and S2 may be orthogonal to each other or may not be orthogonal to each other. This is not limited in this embodiment of this application.

In the twelfth example, when generating G1, the transmit end may first obtain the binary Golay sequences C1 and C2 whose lengths are 10 and the binary Golay sequences S1 and S2 whose lengths are 8, and then generate T1 and T2 based on S1, S2, C1, and C2. Then the transmit end appends four elements to each sequence in T1 and T2 (the four elements may include at least one element of 1 and −1) to obtain a plurality of sequences whose lengths are 84, sorts the obtained sequences whose lengths are 84 in ascending order of overall PAPRs of the sequences, and uses a sequence with a lowest (or lower) overall PAPR as A in G1. Then the transmit end may generate −A, *A, and A* based on A, and obtain U1, U2, U3, and U4 based on the sequence set formed by A, −A, *A, and A*. Finally, the transmit end may generate, based on U1, U2, U3, U4, and a structure of G1, a plurality of sequences whose lengths are 339, sort the sequences whose lengths are 339 in ascending order of overall PAPRs of the sequences, and use a sequence with a lowest (or lower) overall PAPR in the plurality of sequences whose lengths are 339, as G1.

For example, FIG. 64 shows PAPRs of G1 in the plurality of allocation cases of the spectrum resource. As shown in FIG. 64, when the spectrum resource is allocated to four receive ends according to the first allocation case in FIG. 5, PAPRs of four segments of elements that are in G1 and transmitted on four segments of subcarriers allocated to the four receive ends are all relatively low. For example, PAPRs of parts that are in G1 and transmitted on subcarriers allocated to the receive end 1, the receive end 2, the receive end 3, and the receive end 4 are all 3.8900. When the spectrum resource is allocated to one receive end according to the sixth allocation case in FIG. 5, PAPRs of a segment of elements that are in G1 and transmitted on a segment of subcarriers allocated to the receive end are all relatively low (for example, the PAPRs are 3.9325). It can be learned from FIG. 64 that no matter how the spectrum resource is allocated, an overall PAPR of G1 is relatively low, and a PAPR of a part that is in G1 and transmitted to each receive end is also relatively low.

According to a second aspect, based on a structure of a spectrum resource shown in FIG. 7 and a plurality of allocation cases shown in FIG. 8, a target part (including a data part and a direct current part) in the CEF obtained by the transmit end may be G2, and G2={Z2_1, ±X, 0, 0, 0, ±Y, ±Z2_2}, where Z2_n belongs to a sequence set formed by V, −V, *V and *V', and V={U1, ±U2, ±U3, ±U4}; and X includes first to 0.5 $m^{th}$ elements in Z2_1, Y includes 0.5 $m^{th}$ to $m^{th}$ elements in Z2_1, m is the quantity of elements in the sub-sequence, and m≥80.

In the twelfth example, the transmit end obtains U1, U2, U3, and U4 in a process of generating G1, and the transmit end may further generate, based on U1, U2, U3, U4, and a structure of V, a plurality of sequences whose lengths are 336, and sort the sequences whose lengths are 336 in ascending order of overall PAPRs of the sequences. When generating G2, the transmit end may use a sequence with a lowest (or lower) overall PAPR in the plurality of sequences whose lengths are 336, as V. Then the transmit end may generate −V, *V and *V' based on V, determine Z2_1 and Z2_2 based on the sequence set formed by V, −V, *V and *V', and then determine X and Y based on Z2_1. Finally, the transmit end may generate, based on Z2_1, Z2_2, X, Y, and a structure of G2, a plurality of sequences whose lengths are 759, sort the sequences whose lengths are 759 in ascending order of overall PAPRs of the sequences, and use a sequence with a lowest (or lower) overall PAPR in the plurality of sequences whose lengths are 759, as G2.

For example, FIG. 65 shows PAPRs of G2 in the plurality of allocation cases of the spectrum resource. As shown in FIG. 65, for G2, when the spectrum resource is allocated to three receive ends according to the first allocation case in FIG. 8, PAPRs of three segments of elements transmitted on three segments of subcarriers allocated to the three receive ends are all relatively low. For example, for G2, PAPRs of parts transmitted on subcarriers allocated to the receive end 1 and the receive end 3 are all 4.2055; and PAPRs of a segment of elements transmitted on a segment of subcarriers allocated to the receive end 2 are 5.7832. When the spectrum resource is allocated to one receive end according to the second allocation case in FIG. 8, for G2, PAPRs of a segment of elements transmitted on a segment of subcarriers allocated to the receive end are all relatively low (for example, the PAPRs are 5.6167). It can be learned from FIG. 65 that no matter how the spectrum resource is allocated, an overall PAPR of G2 is relatively low, and a PAPR of a part that is in G2 and transmitted to each receive end is also relatively low.

According to a third aspect, based on a structure of a spectrum resource shown in FIG. 10 and a plurality of allocation cases shown in FIG. 11, a target part (including a data part and a direct current part) in the CEF obtained by the transmit end may be G3, and G3={Z2_1, ±X, ±Z1_1, ±Y, ±Z2_2}, where Z2_n belongs to a sequence set formed by V, −V, *V, and *V', and V={U1, ±U2, ±U3, ±U4}; Z1_n belongs to a sequence set formed by G1, −G1, *G1, and *G1'; and X includes first m elements in Z2_1, Y includes first m elements in Z2_2, m is the quantity of elements in the sub sequence, and m≥80.

In the twelfth example, when generating G3, the transmit end may determine Z2_1 and Z2_2 based on the sequence set formed by V, −V, *V and *V', determine Z1_1 based on the sequence set formed by G1, −G1, *G1, and *G1', determine X based on Z2_1, and determine Y based on Z2_2. Finally, the transmit end may generate, based on Z2_1, Z2_2, Z1_1, X, Y, and a structure of G3, a plurality of sequences whose lengths are 1179, sort the sequences whose lengths are 1179 in ascending order of overall PAPRs of the sequences, and use a sequence with a lowest (or lower) overall PAPR in the plurality of sequences whose lengths are 1179, as G3.

For example, FIG. 66 shows PAPRs of G3 in the plurality of allocation cases of the spectrum resource. As shown in FIG. 66, when the spectrum resource is allocated to five receive ends according to the first allocation case in FIG. 11, PAPRs of five segments of elements that are in G3 and transmitted on five segments of subcarriers allocated to the five receive ends are all relatively low. For example, for G3, PAPRs of parts transmitted on subcarriers allocated to the receive end 1 and the receive end 5 are all 4.3666; PAPRs of parts transmitted on subcarriers allocated to the receive end 2 and the receive end 4 are all 3.8940; and PAPRs of a segment of elements transmitted on a segment of subcarriers allocated to the receive end 3 are 4.2876. When the spectrum resource is allocated to one receive end according to the second allocation case in FIG. 11, PAPRs of a segment of elements that are in the first G3 and transmitted on a segment of subcarriers allocated to the receive end are all relatively low (for example, the PAPRs are 5.9168). It can be learned from FIG. 66 that no matter how the spectrum resource is allocated, an overall PAPR of G3 is relatively low, and a PAPR of a part that is in G3 and transmitted to each receive end is also relatively low.

According to a fourth aspect, based on a structure of a spectrum resource shown in FIG. 13 and a plurality of allocation cases shown in FIG. 14, a target part (including a data part and a direct current part) in the CEF obtained by the transmit end may be G4, and G4={Z2_1, ±X, ±Z2_2, ±Q, 0, 0, 0, ±P, ±Z2_3, ±Y, ±Z2_4}, where Z2_n belongs to a sequence set formed by V, −V, *V and *V', and V={U1, ±U2, ±U3, ±U4}; and X includes first 84 elements in Z2_1, Y includes first 84 elements in Z2_2, P includes first to 42$^{nd}$ elements in Z2_1, and Q includes 43$^{rd}$ to 84$^{th}$ elements in Z2_1.

In the twelfth example, when generating G4, the transmit end may determine Z2_1, Z2_2, Z2_3, and Z2_4 based on the sequence set formed by V, −V, *V, and *V', determine X, P and Q based on Z2_1, and determine Y based on Z2_2. Finally, the transmit end may generate, based on Z2_1, Z2_2, Z2_3, Z2_4, X, Y, P, Q, and a structure of G4, a plurality of sequences whose lengths are 1559, sort the sequences whose lengths are 1559 in ascending order of overall PAPRs of the sequences, and use a sequence with a lowest (or lower) overall PAPR in the plurality of sequences whose lengths are 1559, as G4.

For example, FIG. 67 shows PAPRs of G4 in the plurality of allocation cases of the spectrum resource. As shown in FIG. 67, when the spectrum resource is allocated to seven receive ends according to the first allocation case in FIG. 14, PAPRs of seven segments of elements that are in G4 and transmitted on seven segments of subcarriers allocated to the seven receive ends are all relatively low. For example, for G4, PAPRs of parts transmitted on subcarriers allocated to the receive end 1, the receive end 3, the receive end 5, and the receive end 7 are all 4.3402; PAPRs of parts transmitted on subcarriers allocated to the receive end 2 and the receive end 6 are all 3.8944; PAPRs of a segment of elements transmitted on a segment of subcarriers allocated to the receive end 4 are 5.8907. When the spectrum resource is allocated to one receive end according to the second allocation case in FIG. 14, PAPRs of a segment of elements transmitted on a segment of subcarriers allocated to the receive end are all relatively low (for example, the PAPRs are 5.9331). It can be learned from FIG. 67 that no matter how the spectrum resource is allocated, an overall PAPR of G4 is relatively low, and a PAPR of a part that is in G4 and transmitted to each receive end is also relatively low.

In the thirteenth example, m=80. In this case, the sub-sequence includes: 80 basic elements arranged into a Golay sequence in the sub-sequence, where each element in the sub sequence belongs to a target element set, and the target element set includes 1 and −1. The following separately describes different CB cases of the spectrum resource by using examples.

According to a first aspect, based on a structure of a spectrum resource shown in FIG. 16 and a plurality of allocation cases shown in FIG. 17, a target part (including a data part and a direct current part) in the CEF obtained by the transmit end may be G1, and G1={U1, ±U2, 0, 0, 0, ±U3, ±U4}.

U1, U2, U3, and U4 all belong to a sequence set formed by A, −A, *A, and A*, A represents a Golay sequence whose length is 80, −A represents −1 times A, a (2k+1)$^{th}$ element in *A is −1 times a (2k+1)$^{th}$ element in A, a (2k+2)$^{th}$ element in *A is the same as a (2k+2)$^{th}$ element in A, a (2k+1)$^{th}$ element in A* is the same as the (2k+1)$^{th}$ element in A, a (2k+2)$^{th}$ element in A* is −1 times the (2k+2)$^{th}$ element in A, and k≥0.

A is T1 or T2, $$T1 = C1 \otimes \frac{S1 + S2}{2} + C2 \otimes \frac{S1 - S2}{2}, \text{ and}$$

$$T2 = C1 \otimes \frac{\overleftarrow{S1} - \overleftarrow{S2}}{2} - C2 \otimes \frac{\overleftarrow{S1} + \overleftarrow{S2}}{2};$$

and C1 and C2 represent two Golay sequences whose lengths are both 10, S1 and S2 represent two Golay sequences whose lengths are both 8, ⊗ represents a Kronecker product, $\overleftarrow{S1}$ represents a reverse order of S1, $\overleftarrow{S2}$ represents a reverse order of S2, and ± represents + or −. C1 and C2 may be orthogonal to each other or may not be orthogonal to each other, and S1 and S2 may be orthogonal to each other or may not be orthogonal to each other. This is not limited in this embodiment of this application.

In the thirteenth example, when generating G1, the transmit end may first obtain the binary Golay sequences C1 and C2 whose lengths are 10 and the binary Golay sequences S1 and S2 whose lengths are 8, and then generate T1 and T2 based on S1, S2, C1, and C2. Then the transmit end uses a sequence with a lowest (or lower) overall PAPR in T1 and T2 as A in G1, generates −A, *A, and A* based on A, and obtains U1, U2, U3, and U4 based on the sequence set formed by A, −A, *A, and A*. Finally, the transmit end may generate, based on U1, U2, U3, U4, and a structure of G1, a plurality of sequences whose lengths are 323, sort the sequences whose lengths are 323 in ascending order of overall PAPRs of the sequences, and use a sequence with a lowest (or lower) overall PAPR in the plurality of sequences whose lengths are 323, as G1.

Figure 68:
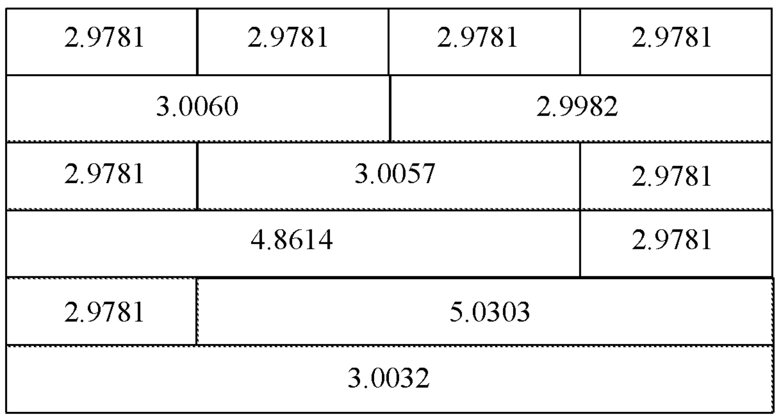
FIG. 68 is a schematic diagram of another PAPR according to an embodiment of this application.

For example, FIG. 68 shows PAPRs of G1 in the plurality of allocation cases of the spectrum resource. As shown in FIG. 68, when the spectrum resource is allocated to four receive ends according to the first allocation case in FIG. 17, PAPRs of four segments of elements that are in G1 and transmitted on four segments of subcarriers allocated to the four receive ends (the receive ends 1, 2, 3, and 4) are all relatively low (for example, are all 2.9781). When the spectrum resource is allocated to one receive end according to the sixth allocation case in FIG. 17, PAPRs of a segment of elements that are in G1 and transmitted on a segment of subcarriers allocated to the receive end are all relatively low (for example, the PAPRs are 3.0002). It can be learned from FIG. 68 that no matter how the spectrum resource is allocated, an overall PAPR of G1 is relatively low, and a PAPR of a part that is in G1 and transmitted to each receive end is also relatively low.

According to a second aspect, based on a structure of a spectrum resource shown in FIG. 19 and a plurality of allocation cases shown in FIG. 20, a target part (including a data part and a direct current part) in the CEF obtained by the transmit end may be G2, and G2={Z2_1, ±X, 0, 0, 0, ±Y, ±Z2_2}, where Z2_n belongs a sequence set formed by V, −V, *V, and *V', and V={U1, ±U2, ±U3, ±U4}; X includes first to 0.5 $m^t$ elements in Z2_1, Y includes 0.5 $m^{th}$ to $m^{th}$ elements in Z2_1, m is the quantity of elements in the sub-sequence, and m≥80.

In the thirteenth example, when generating G2, the transmit end may generate, based on U1, U2, U3, U4, and a structure of V that are obtained when G1 is generated, a plurality of sequences whose lengths are 320. Then the transmit end may use a sequence with a lowest (or lower) PAPR among the sequences whose lengths are 320, as V, and obtain −V, *V, and *V based on V. The transmit end may further obtain Z2_1 and Z2_2 based on the sequence set formed by V, −V, *V, and *V, and obtain X and Y based on Z2_1. Finally, the transmit end may generate, based on Z2_1, Z2_2, X, Y, and a structure of G2, a plurality of sequences whose lengths are 723, sort the sequences whose lengths are 723 in ascending order of overall PAPRs of the sequences, and use a sequence with a lowest (or lower) overall PAPR in the plurality of sequences whose lengths are 723, as G2.

Figure 69:
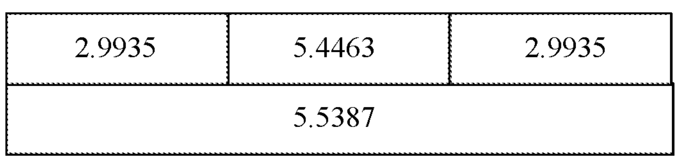
FIG. 69 is a schematic diagram of another PAPR according to an embodiment of this application.

For example, FIG. 69 shows PAPRs of G2 in the plurality of allocation cases of the spectrum resource. As shown in FIG. 69, for G2, when the spectrum resource is allocated to three receive ends according to the first allocation case in FIG. 8, PAPRs of three segments of elements transmitted on three segments of subcarriers allocated to the three receive ends are all relatively low. For example, for G2, PAPRs of parts transmitted on subcarriers allocated to the receive end 1 and the receive end 3 are all 2.9935; and PAPRs of a segment of elements transmitted on a segment of subcarriers allocated to the receive end 2 are 5.4463. When the spectrum resource is allocated to one receive end according to the second allocation case in FIG. 8, for G2, PAPRs of a segment of elements transmitted on a segment of subcarriers allocated to the receive end are all relatively low (for example, the PAPRs are 5.5387). It can be learned from FIG. 69 that no matter how the spectrum resource is allocated, an overall PAPR of G2 is relatively low, and a PAPR of a part that is in G2 and transmitted to each receive end is also relatively low.

According to a third aspect, based on a structure of a spectrum resource shown in FIG. 22 and a plurality of allocation cases shown in FIG. 23, a target part (including a data part and a direct current part) in the CEF obtained by the transmit end may be G3, and G3={Z2_1, ±X, ±Z1_1, ±Y, ±Z2_2}, where Z2_n belongs to a sequence set formed by V, −V, *V, and *V, and V={U1, ±U2, ±U3, ±U4}; Z1_n belongs to a sequence set formed by G1, −G1, *G1, and *G1'; and X includes first m elements in Z2_1, Y includes first m elements in Z2_2, m is the quantity of elements in the sub sequence, and m≥80.

In the thirteenth example, when generating G3, the transmit end may determine Z2_1 and Z2_2 based on the sequence set formed by V, −V, *V, and *V, determine Z1_1 based on the sequence set formed by G1, −G1, *G1, and *G1', determine X based on Z2_1, and determine Y based on Z2_2. Finally, the transmit end may generate, based on Z2_1, Z2_2, Z1_1, X, Y, and a structure of G3, a plurality of sequences whose lengths are 1123, sort the sequences whose lengths are 1123 in ascending order of overall PAPRs of the sequences, and use a sequence with a lowest (or lower) overall PAPR in the plurality of sequences whose lengths are 1123, as G3.

For example, FIG. 70 shows PAPRs of G3 in the plurality of allocation cases of the spectrum resource. As shown in FIG. 70, when the spectrum resource is allocated to five receive ends according to the first allocation case in FIG. 11, PAPRs of five segments of elements that are in G3 and transmitted on five segments of subcarriers allocated to the five receive ends are all relatively low. For example, for G3, PAPRs of parts transmitted on subcarriers allocated to the receive end 1 and the receive end 5 are all 3.0667; PAPRs of parts transmitted on subcarriers allocated to the receive end 2 and the receive end 4 are all 3.0091; and PAPRs of a segment of elements transmitted on a segment of subcarriers allocated to the receive end 3 are 3.0092. When the spectrum resource is allocated to one receive end according to the second allocation case in FIG. 11, PAPRs of a segment of elements that are in the first G3 and transmitted on a segment of subcarriers allocated to the receive end are all relatively low (for example, the PAPRs are 5.6395). It can be learned from FIG. 70 that no matter how the spectrum resource is allocated, an overall PAPR of G3 is relatively low, and a PAPR of a part that is in G3 and transmitted to each receive end is also relatively low.

According to a fourth aspect, based on a structure of a spectrum resource shown in FIG. 25 and a plurality of allocation cases shown in FIG. 26, a target part (including a data part and a direct current part) in the CEF obtained by the transmit end may be G4, and G4={Z2_1, ±X, ±Z2_2, ±Q, 0, 0, 0, ±P, ±Z2_3, ±Y, ±Z2_4}, where Z2_n belongs to a sequence set formed by V, −V, *V, and *V', and V={U1, ±U2, ±U3, ±U4}; and X includes first 80 elements in Z2_1, Y includes first 80 elements in Z2_2, P includes $81^{st}$ to $160^{th}$ elements in Z2_1, and Q includes first to $80^{th}$ elements in Z2_1.

In the thirteenth example, when generating G4, the transmit end may determine Z2_1, Z2_2, Z2_3, and Z2_4 based on the sequence set formed by V, −V, *V, and *V', determine X, P and Q based on Z2_1, and determine Y based on Z2_2. Finally, the transmit end may generate, based on Z2_1, Z2_2, Z2_3, Z2_4, X, Y, P, Q, and a structure of G4, a plurality of sequences whose lengths are 1603, sort the sequences whose lengths are 1603 in ascending order of overall PAPRs of the sequences, and use a sequence with a lowest (or lower) overall PAPR in the plurality of sequences whose lengths are 1603, as G4.

For example, FIG. 71 shows PAPRs of G4 in the plurality of allocation cases of the spectrum resource. As shown in FIG. 71, when the spectrum resource is allocated to seven receive ends according to the first allocation case in FIG. 14, PAPRs of seven segments of elements that are in G4 and transmitted on seven segments of subcarriers allocated to the seven receive ends are all relatively low. For example, for G4, PAPRs of parts transmitted on subcarriers allocated to the receive end 1, the receive end 3, the receive end 5, and the receive end 7 are all 3.0050; PAPRs of parts transmitted on subcarriers allocated to the receive end 2 and the receive end 6 are all 3.0091; and PAPRs of a segment of elements transmitted on a segment of subcarriers allocated to the receive end 4 are 3.0082. When the spectrum resource is allocated to one receive end according to the second allocation case in FIG. 14, PAPRs of a segment of elements transmitted on a segment of subcarriers allocated to the receive end are all relatively low (for example, the PAPRs are 5.1055). It can be learned from FIG. 71 that no matter how the spectrum resource is allocated, an overall PAPR of G4 is relatively low, and a PAPR of a part that is in G4 and transmitted to each receive end is also relatively low.

In the fourteenth example, m=80. In this case, the sub-sequence includes: 80 basic elements arranged into a Golay sequence in the sub-sequence, where each element in the sub sequence belongs to a target element set, and the target element set includes 1, −1, j, and H. The following separately describes different CB cases of the spectrum resource by using examples.

According to a first aspect, based on a structure of a spectrum resource shown in FIG. 16 and a plurality of allocation cases shown in FIG. 17, a target part (including a data part and a direct current part) in the CEF obtained by the transmit end may be G1, and G1={U1, ±U2, 0, 0, 0, ±U3, ±U4}.

U1, U2, U3, and U4 all belong to a sequence set formed by A, −A, *A, and A*, A is T1 or T2, $$T1 = C1 \otimes \frac{S1+S2}{2} + C2 \otimes \frac{S1-S2}{2}, \text{ and}$$

$$T2 = C1 \otimes \frac{\overleftarrow{S1}-\overleftarrow{S2}}{2} - C2 \otimes \frac{\overleftarrow{S1}+\overleftarrow{S2}}{2};$$

C1 and C2 represent two quaternary Golay sequences that both include 1, −1, j, and −j and whose lengths are both 5, S1 and S2 represent two binary Golay sequences that both include 1 and −1 and whose lengths are both 16, ⊗ represents a Kronecker product, $\overleftarrow{S1}$ represents a reverse order of S1, $\overleftarrow{S2}$ represents a reverse order of S2, and ± represents + or −; and for any sequence E, −E represents −1 times E, a $(2k+1)^{th}$ element in *E is −1 times a $(2k+1)^{th}$ element in E, a $(2k+2)^{th}$ element in *E is the same as a $(2k+2)^{th}$ element in E, a $(2k+1)^{th}$ element in E* is the same as the $(2k+1)^{th}$ element in E, a $(2k+2)^{th}$ element in E* is −1 times the $(2k+2)^{th}$ element in E, and k≥0. Optionally, both C1 and C2 may alternatively be binary Golay sequences, and both S1 and S2 are quaternary Golay sequences. This is not limited in this embodiment of this application. C1 and C2 may be orthogonal to each other or may not be orthogonal to each other, and S1 and S2 may be orthogonal to each other or may not be orthogonal to each other. This is not limited in this embodiment of this application.

In the fourteenth example, for a process of generating G1 by the transmit end, refer to a process of generating G1 in the thirteenth example. However, C1, C2, S1, and S2 in the two examples are all different.

For example, FIG. 72 shows PAPRs of G1 in the plurality of allocation cases of the spectrum resource. As shown in FIG. 72, when the spectrum resource is allocated to four receive ends according to the first allocation case in FIG. 17, PAPRs of four segments of elements that are in G1 and transmitted on four segments of subcarriers allocated to the four receive ends (the receive ends 1, 2, 3, and 4) are all relatively low (for example, are all 2.9933). When the spectrum resource is allocated to one receive end according to the sixth allocation case in FIG. 17, PAPRs of a segment of elements that are in G1 and transmitted on a segment of subcarriers allocated to the receive end are all relatively low (for example, the PAPRs are 3.0088). It can be learned from FIG. 72 that no matter how the spectrum resource is allocated, an overall PAPR of G1 is relatively low, and a PAPR of a part that is in G1 and transmitted to each receive end is also relatively low.

According to a second aspect, based on a structure of a spectrum resource shown in FIG. 19 and a plurality of allocation cases shown in FIG. 20, a target part (including a data part and a direct current part) in the CEF obtained by the transmit end may be G2. A structure of G2 in the fourteenth example may be the same as that of G2 in the thirteenth example. In addition, for a process of generating G2 by the transmit end in the fourteenth example, refer to a process of generating G2 by the transmit end in the thirteenth example. The only difference is that C1, C2, S1, and S2 in the two examples are all different.

For example, FIG. 73 shows PAPRs of G2 in the plurality of allocation cases of the spectrum resource. As shown in FIG. 73, for G2, when the spectrum resource is allocated to three receive ends according to the first allocation case in FIG. 8, PAPRs of three segments of elements transmitted on three segments of subcarriers allocated to the three receive ends are all relatively low. For example, for G2, PAPRs of parts transmitted on subcarriers allocated to the receive end 1 and the receive end 3 are all 3.0085; and PAPRs of a segment of elements transmitted on a segment of subcarriers allocated to the receive end 2 are 4.4039. When the spectrum resource is allocated to one receive end according to the second allocation case in FIG. 8, for G2, PAPRs of a segment of elements transmitted on a segment of subcarriers allocated to the receive end are all relatively low (for example, the PAPRs are 5.7130). It can be learned from FIG. 73 that no matter how the spectrum resource is allocated, an overall PAPR of G2 is relatively low, and a PAPR of a part that is in G2 and transmitted to each receive end is also relatively low.

According to a third aspect, based on a structure of a spectrum resource shown in FIG. 22 and a plurality of allocation cases shown in FIG. 23, a target part (including a data part and a direct current part) in the CEF obtained by the transmit end may be G3. A structure of G3 in the fourteenth example may be the same as that of G3 in the thirteenth example. In addition, for a process of generating G3 by the transmit end in the fourteenth example, refer to a process of generating G3 by the transmit end in the thirteenth example. The only difference is that C1, C2, S1, and S2 in the two examples are all different.

Figures 74, 75, 76:
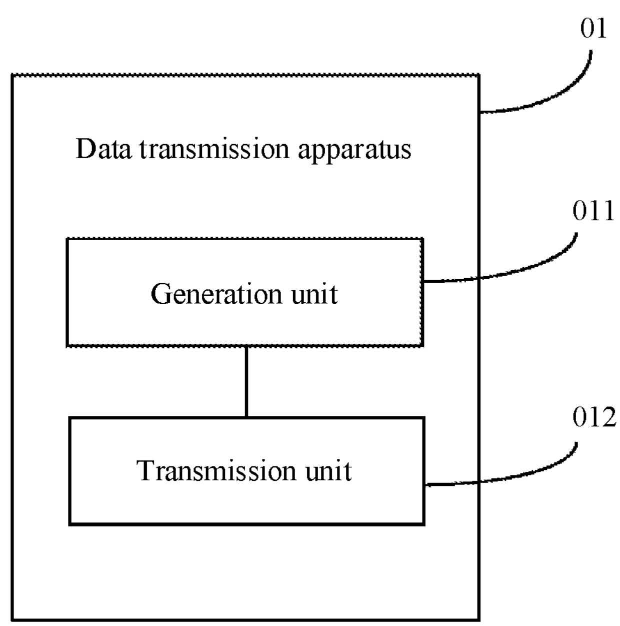
FIG. 74 is a schematic diagram of another PAPR according to an embodiment of this application.
FIG. 75 is a schematic diagram of another PAPR according to an embodiment of this application.
FIG. 76 is a schematic structural diagram of a data transmission apparatus according to an embodiment of this application.

For example, FIG. 74 shows PAPRs of G3 in the plurality of allocation cases of the spectrum resource. As shown in FIG. 74, when the spectrum resource is allocated to five receive ends according to the first allocation case in FIG. 11, PAPRs of five segments of elements that are in G3 and transmitted on five segments of subcarriers allocated to the five receive ends are all relatively low. For example, for G3, PAPRs of parts transmitted on subcarriers allocated to the receive end 1 and the receive end 5 are all 2.9934; PAPRs of parts transmitted on subcarriers allocated to the receive end 2 and the receive end 4 are all 3.0082; and PAPRs of a segment of elements transmitted on a segment of subcarriers allocated to the receive end 3 are 3.0088. When the spectrum resource is allocated to one receive end according to the second allocation case in FIG. 11, PAPRs of a segment of elements that are in the first G3 and transmitted on a segment of subcarriers allocated to the receive end are all relatively low (for example, the PAPRs are 6.1296). It can be learned from FIG. 74 that no matter how the spectrum resource is allocated, an overall PAPR of G3 is relatively low, and a PAPR of a part that is in G3 and transmitted to each receive end is also relatively low.

According to a fourth aspect, based on a structure of a spectrum resource shown in FIG. 25 and a plurality of allocation cases shown in FIG. 26, a target part (including a data part and a direct current part) in the CEF obtained by the transmit end may be G4. A structure of G4 in the fourteenth example may be the same as that of G4 in the thirteenth example. In addition, for a process of generating G4 by the transmit end in the fourteenth example, refer to a process of generating G4 by the transmit end in the thirteenth example. The only difference is that C1, C2, S1, and S2 in the two examples are all different.

For example, FIG. 75 shows PAPRs of G4 in the plurality of allocation cases of the spectrum resource. As shown in FIG. 75, when the spectrum resource is allocated to seven receive ends according to the first allocation case in FIG. 14, PAPRs of seven segments of elements that are in G4 and transmitted on seven segments of subcarriers allocated to the seven receive ends are all relatively low. For example, for G4, PAPRs of parts transmitted on subcarriers allocated to the receive end 1, the receive end 3, the receive end 5, and the receive end 7 are all 3.0085; PAPRs of parts transmitted on subcarriers allocated to the receive end 2 and the receive end 6 are all 3.0067; and PAPRs of a segment of elements transmitted on a segment of subcarriers allocated to the receive end 4 are 3.0100. When the spectrum resource is allocated to one receive end according to the second allocation case in FIG. 14, PAPRs of a segment of elements transmitted on a segment of subcarriers allocated to the receive end are all relatively low (for example, the PAPRs are 5.8863). It can be learned from FIG. 75 that no matter how the spectrum resource is allocated, an overall PAPR of G4 is relatively low, and a PAPR of a part that is in G4 and transmitted to each receive end is also relatively low.

In some embodiments of this application (for example, the foregoing 14 examples), when the transmit end needs to obtain a sequence of a specific length (for example, G1, G2, G3, or G4), the transmit end first obtains a plurality of sequences of the length, and then uses a sequence with a lowest (or lower) overall PAPR among the sequences as a finally obtained sequence (for example, G1, G2, G3, or G4). Optionally, when the transmit end needs to obtain a sequence of a specific length (for example, G1, G2, G3, or G4), the transmit end may alternatively first obtain a plurality of sequences of the length, and then use a sequence with a lowest (or lower) sum of an overall sequence PAPR and partial PAPRs among the sequences as a finally obtained sequence (for example, G1, G2, G3, or G4). This is not limited in this embodiment of this application.

In addition, Golay sequences S1 and S2 whose lengths are 8 are mentioned in the foregoing plurality of examples. The following describes a process of constructing two Golay sequences whose lengths are the $m^{th}$ power of 2 (for example, 8 is the third power of 2) (m is an integer greater than or equal to 2). It should be noted that letters in this paragraph are irrelevant to letters in other paragraphs. It is assumed that H is an even number, and it is a permutation of {1, 2, . . . , m}; and w is an $H^{th}$ primitive element of unity, $c_k \in \{0, 1, 2, \ldots, m-1\}$, and sequences $a=(a_i)$ and $b=(b_i)$ are Golay sequences whose lengths are both $2^m$, where $$a_i = w^{\frac{H}{2} * \sum_{k=1}^{m-1} i_{\pi(k)} i_{\pi(k+1)} + \sum_{k=1}^{m} c_k i_k + c_0},$$

$$b_i = w^{\frac{H}{2} * \sum_{k=1}^{m-1} i_{\pi(k)} i_{\pi(k+1)} + \sum_{k=1}^{m} c_k i_k + c_0 + \frac{H}{2} i_{\pi(m)}}, \text{ and}$$

$$i = \sum_{k=1}^{m} i_k 2^{k-1}.$$

Further, the existing IEEE 802.11ay allows a transmit end to transmit data in one spectrum resource to only one receive end. To enable the transmit end to concurrently transmit data in one spectrum resource to a plurality of receive ends, an orthogonal frequency division multiple access (Orthogonal frequency division multiple access, OFDMA) technology may be used on a basis of IEEE 802.11ay. By using the OFDMA technology, one spectrum resource may be divided into a plurality of groups of subcarriers that are allocated to a plurality of receive ends in a one-to-one correspondence, and a CEF in a corresponding PPDU is divided into a plurality of parts in a one-to-one correspondence to the plurality of receive ends. When the transmit end transmits the CEF in the PPDU to the plurality of receive ends, a part corresponding to each receive end in the CEF is transmitted in a group of subcarriers allocated to the receive end. In this case, based on a CEF design in IEEE 802.11 ay, a PAPR of the entire CEF in the PPDU transmitted by the transmit end can be relatively low; however, because a PAPR of each part of the CEF is still relatively high, an improvement in power utilization at the transmit end is limited. In an embodiment of this application, basic elements in a sub-sequence in the CEF may be arranged into a Golay sequence or a ZC sequence. The Golay sequence itself is characterized by a relatively low PAPR. For example, a PAPR of a Golay sequence defined on a unit circle is usually about 3, and elements in the Golay sequence defined on the unit circle include 1, −1, and the like. Therefore, when a sub-sequence includes a Golay sequence, a PAPR of the sub-sequence is relatively low, a data part in the CEF includes a plurality of sub sequences having low PAPRs, a PAPR of the entire CEF is relatively low, and a PAPR of each part in the CEF is also relatively low. If the CEF needs to be allocated to a plurality of receive ends, a PAPR of a part received by each receive end is relatively low in the CEF, and in this case, the power utilization at the transmit end is relatively high.

In addition, in an embodiment of this application, when the spectrum resource includes a plurality of bonded channels, the CEF in the PPDU may be obtained based on the CEF in the PPDU when the spectrum resource includes one bonded channel. Therefore, the process of generating the CEF in the PPDU becomes relatively simpler.

In addition, in the related art, only a CEF whose data part is a Golay sequence can be generated, where a length of the Golay sequence is generally $2^{o1}\times10^{o2}\times26^{o3}$ and o1, o2, and o3 are all integers greater than or equal to 0. It can be learned that in the related art, a quantity of elements in the data part in the generated CEF is relatively limited, and a CEF whose data part includes an integer multiple of 84 elements cannot be generated in the related art. In an embodiment of this application, because the sub-sequence includes not only a plurality of basic elements, but also an interpolation element, during generation of the CEF, the data part may be formed based on the Golay sequence and by inserting the interpolation element into the Golay sequence. In this way, a quantity of data parts may not be $2^{o1}*10^{o2}*26^{o3}$, and a CEF whose data part includes an integer multiple of 84 elements can be generated.

It should also be noted that both the transmit end and the receive end in this embodiment of this application can support a multiple-input multiple-output (MIMO) technology. To be specific, the transmit end may have a target spatial stream quantity of transmit antennas, and the receive end may have a target spatial stream quantity of receive antennas, where the target spatial stream quantity is an integer greater than or equal to 2. The transmit end may transmit a PPDU to the receive end by using the transmit antennas. In this case, the PPDU may include a target spatial stream quantity of CEFs, and the target spatial stream quantity of CEFs are transmitted one by one by using the target spatial stream quantity of transmit antennas. Structures of the target spatial stream quantity of CEFs may be the same as structures of the CEFs provided in this embodiment of this application. Optionally, to prevent adverse impact between the target spatial stream quantity of CEFs, any two of the target spatial stream quantity of CEFs may be orthogonal. It should be noted that, it is assumed that both a sequence c and a sequence d are binary sequences whose lengths are N (that is, sequences including two elements), where c=(c(0), c(1), . . . , c(N−1)) d=(d(0), d(1), . . . , d(N−1)) c(u) represents a $(u+1)^{th}$ element in the sequence c, d(u) represents a $(u+1)^{th}$ element in the sequence d, and $0 \le u \le N-1$. If $C_{cd}(0)=0$, the sequence c and the sequence d may be known as orthogonal, where $C_{cd}(0)=\Sigma_{i=0}^{N-1}c_i d_i^*$, and $d_i^*$ represents a conjugate of $d_i$.

It should be noted that only a finite quantity of CEFs are provided in this embodiment of this application, and that a CEF obtained by making a simple variation based on the CEF provided in this embodiment of this application also falls within the protection scope of this application. For example, a CEF obtained by reversing an order of elements in the CEF provided in this application (that is, a reverse order of the CEF provided in this application) is also a CEF claimed in this application.

In conclusion, in the data transmission method provided in some embodiments of this application, the CEF generated by the transmit end includes a plurality of sub-sequences, and each sub-sequence further includes basic elements that can be arranged into a Golay sequence or a ZC sequence. It can be learned that when the transmit end generates the CEF, the transmit end may first generate a relatively short Golay sequence or ZC sequence, and then generate a plurality of sub sequences based on the generated relatively short Golay sequence or ZC sequence, to further generate the CEF. A manner of generating the CEF in this application is different from a manner of generating a CEF generally used in the related art. Therefore, the manner of generating the CEF and the manner of generating the PPDU are enriched.

FIG. 76 is a schematic structural diagram of a data transmission apparatus according to an embodiment of this application. The data transmission apparatus may be used at the transmit end 01 in FIG. 1, and the data transmission apparatus may include units configured to perform the method performed by the transmit end in FIG. 2. As shown in FIG. 76, the data transmission apparatus may include:

a generation unit 011, configured to generate a PPDU; and a transmission unit 012, configured to transmit the PPDU to at least one receive end.

The PPDU includes a CEF, and the CEF includes a plurality of sub-sequences.

For each sub-sequence in the plurality of sub-sequences, a part or all of elements in the sub-sequence are basic elements, and the basic elements are arranged into a Golay sequence or a ZC sequence in the sub-sequence.

In an embodiment of this application, the data transmission apparatus shown in FIG. 76 is used as an example to describe units in the data transmission apparatus used at the transmit end. It should be understood that in an embodiment of this application, the data transmission apparatus used at the transmit end has any function of the transmit end in the data transmission method shown in FIG. 2.

Figure 77:
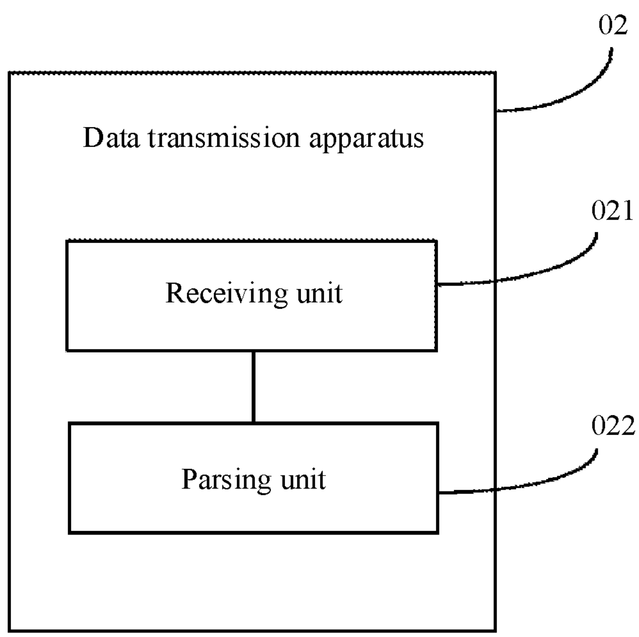
FIG. 77 is a schematic structural diagram of another data transmission apparatus according to an embodiment of this application.

FIG. 77 is a schematic structural diagram of another data transmission apparatus according to an embodiment of this application. The data transmission apparatus may be used at the receive end 02 in FIG. 1, and the data transmission apparatus may include units configured to perform the method performed by the receive end in FIG. 2. As shown in FIG. 77, the data transmission apparatus 02 may include:

a receiving unit 021, configured to receive a PPDU transmitted by a transmit end; and a parsing unit 022, configured to parse the received PPDU.

The PPDU includes a CEF, and the CEF includes a plurality of sub-sequences. For each of the plurality of sub-sequences, a part or all of elements in the sub-sequence are basic elements, and the basic elements are arranged into a Golay sequence or a ZC sequence in the sub-sequence.

In an embodiment of this application, the data transmission apparatus shown in FIG. 77 is used as an example to describe units in the data transmission apparatus used at the receive end. It should be understood that in an embodiment of this application, the data transmission apparatus used at the receive end has any function of the receive end in the data transmission method shown in FIG. 2.

The data transmission apparatus (used at the transmit end or the receive end) provided in the foregoing embodiments of this application may be implemented in a plurality of product forms. For example, the data transmission apparatus may be configured as a general-purpose processing system. For example, the data transmission apparatus may be implemented by a general bus architecture. For example, the data transmission apparatus may be implemented by an application specific integrated circuit (ASIC). The following provides several possible product forms of the data transmission apparatus in the embodiments of this application. It should be understood that the following is merely an example and is not intended to limit the possible product forms of the embodiments of this application.

Figure 78:
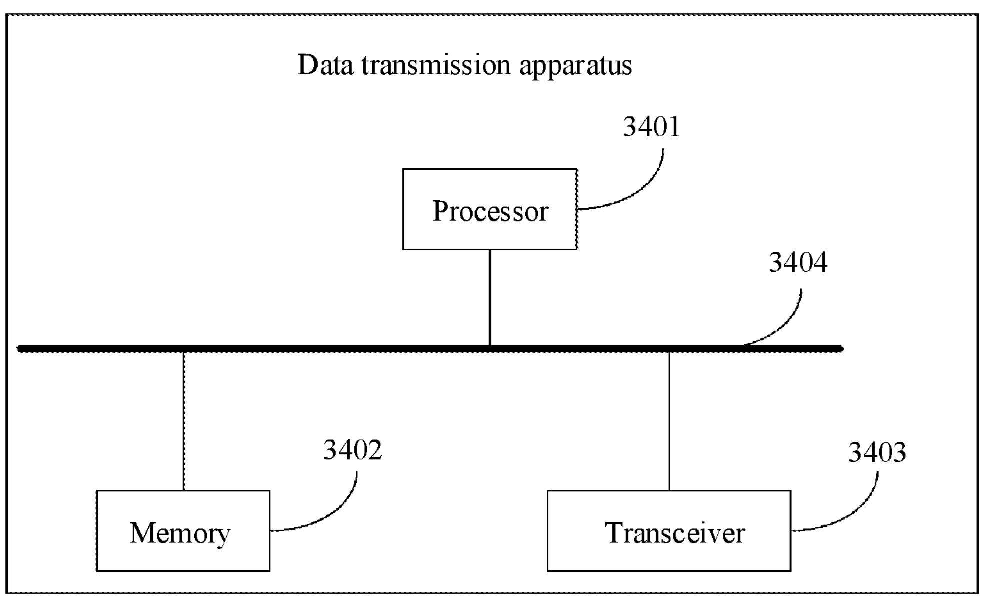
FIG. 78 is a schematic structural diagram of still another data transmission apparatus according to an embodiment of this application.

In a possible product form, the data transmission apparatus may be a device (for example, a base station, UE, or an AP) configured to transmit data. As shown in FIG. 78, the data transmission apparatus may include a processor 3401 and a transceiver 3402. Optionally, the data transmission apparatus may further include a memory 3403. The processor 3401, the transceiver 3402, and the memory 3403 communicate with each other by using an internal connection. For example, the data transmission apparatus 340 may further include a bus 3404. The processor 3401, the transceiver 3402, and the memory 3403 communicate with each other by using the bus 3404.

The processor 3401 is configured to generate a PPDU; the transceiver 3402 is controlled by the processor 3401, and configured to transmit the PPDU to at least one receive end; and the memory 3403 is configured to store instructions, where the instructions are invoked by the processor 3401 to generate the PPDU. The PPDU includes a CEF, and the CEF includes a plurality of sub sequences. For each of the plurality of sub-sequences, a part or all of elements in the sub-sequence are basic elements, and the basic elements are arranged into a Golay sequence or a ZC sequence in the sub-sequence.

Alternatively, the transceiver 3402 is controlled by the processor 3401, and configured to receive a PPDU transmitted by the transmit end; the processor 3401 is configured to parse the PPDU received by the transceiver; and the memory 3403 is configured to store instructions, where the instructions are invoked by the processor 3401 to parse the PPDU. The PPDU includes a CEF, and the CEF includes a plurality of sub-sequences. For each of the plurality of sub-sequences, a part or all of elements in the sub-sequence are basic elements, and the basic elements are arranged into a Golay sequence or a ZC sequence in the sub-sequence.

Figure 79:
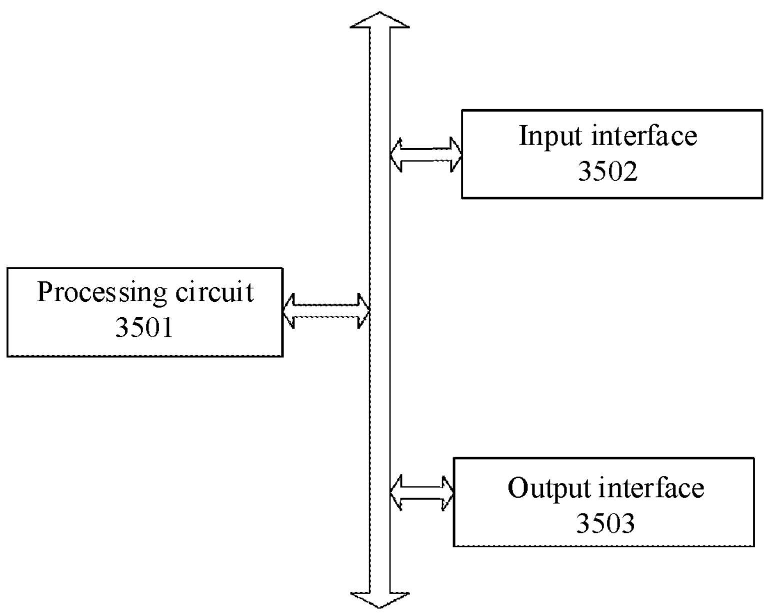
FIG. 79 is a schematic structural diagram of yet another data transmission apparatus according to an embodiment of this application.

In another possible product form, the data transmission apparatus is also implemented by a general-purpose processor, that is, implemented by a chip. As shown in FIG. 79, the data transmission apparatus may include a processing circuit 3501, an input interface 3502, and an output interface 3503, where the processing circuit 3501, the input interface 3502, and the output interface 3503 communicate with each other by using an internal connection.

In one aspect, the input interface 3502 is configured to obtain information (for example, the to-be-transmitted data in step 201) to be processed by the processing circuit 3501; the processing circuit 3501 is configured to process the to-be-processed information to generate a PPDU; and the output interface 3503 is configured to output the information processed by the processing circuit 3501. The PPDU includes a CEF, and the CEF includes a plurality of sub-sequences. For each of the plurality of sub-sequences, a part or all of elements in the sub-sequence are basic elements, and the basic elements are arranged into a Golay sequence or a ZC sequence in the sub-sequence. Optionally, the data transmission apparatus may further include a transceiver (not shown in FIG. 79). The output interface 3503 is configured to output, to the transceiver, the information processed by the processing circuit 3501, and the transceiver is configured to transmit the information processed by the processing circuit 3501.

In another aspect, the input interface 3502 is configured to obtain a received PPDU; the processing circuit 3501 is configured to process to-be-processed information to parse the PPDU; and the output interface 3503 is configured to output the information processed by the processing circuit. The PPDU includes a CEF, and the CEF includes a plurality of sub-sequences. For each of the plurality of sub-sequences, a part or all of elements in the sub-sequence are basic elements, and the basic elements are arranged into a Golay sequence or a ZC sequence in the sub-sequence. Optionally, the data transmission apparatus may further include a transceiver (not shown in FIG. 79). The transceiver is configured to receive the information (for example, a to-be-parsed PPDU) to be processed by the processing circuit 3501, and transmit the information to be processed by the processing circuit 3501 to the input interface 3502.

In still another possible product form, the data transmission apparatus may also be implemented by using the following: a field-programmable gate array (FPGA), a programmable logic device (PLD), a controller, a state machine, gate logic, a discrete hardware component, or the like, any other suitable circuit, or any combination of circuits capable of performing various functions described throughout this application.

It should be noted that mutual reference can be made between the method embodiments provided in the embodiments of this application and corresponding apparatus embodiments. This is not limited in the embodiments of this application. A sequence of steps in the method embodiments provided in the embodiments of this application can be properly adjusted, and steps can also be correspondingly added or deleted based on a situation. Any variation readily figured out by a person skilled in the art within the technical scope disclosed in this application shall fall within the protection scope of this application, and details are not described herein again.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A data transmission method, wherein the method is used for a transmit end, and the method comprises:

receiving to-be-transmitted data, processing the to-be-transmitted data to generate a physical protocol data unit (PPDU); and transmitting the PPDU in a spectrum resource via a communication link, wherein the PPDU comprises a channel estimation field (CEF), and the CEF comprises a plurality of sub-sequences;

for each sub-sequence in the plurality of sub-sequences, one or more elements in the sub sequence are basic elements, and the one or more elements are arranged into a Golay sequence or a Zadoff-Chu ZC sequence in the sub-sequence; and each of the plurality of sub-sequences further comprises: an interpolation element located in at least one of positions: before, between, or after the plurality of basic elements, wherein each element in the sub-sequence belongs to a target element set, and the target element set comprises 1 and −1.

2. The method according to claim 1, wherein each of the plurality of sub-sequences comprises: 80 basic elements arranged into the Golay sequence in the sub-sequence and four interpolation elements; and when a channel bonding (CB) of a spectrum resource is equal to 1, a target part in the CEF is G1, the target part comprises a data part and a direct current part, and the data part comprises the plurality of sub-sequences; and G1={S84_11, ±S84_12, 0, 0, 0, ±S84_13, ±S84_14}, wherein S84_n represents a sequence whose length is 84, a Golay sequence in which 80 basic elements are arranged in S84_n belongs to a sequence set formed by A1, A2, A3, A4, A5, A6, A7, A8, A9, A10, A11, A12, A13, A14, A15, and A16, n≥1, and ± represents + or −; and A1={C1, C2, C1, −C2}, A2={C1, C2, −C1, C2}, A3={C2, C1, C2, −C1}, A4={C2, C1, −C2, C1}, A5={C1 −C2, C1, C2}, A6={−C1, C2, C1, C2}, A7={C2, −C1, C2, C1}, A8={−C2, C1, C2, C1}, A9={S1, S2, S1, −S2}, A10={S1, S2, −S1, S2}, A11={S2, S1, S2, −S1}, A12={S2, S1, −S2, S1}, A13={S1, −S2, S1, S2}, A14={−S1, S2, S1, S2}, A15={S2, −S1, S2, S1}, and A16={−S2, S1, S2, S1}; and C1 and C2 represent two Golay sequences whose lengths are both 20, S1 and S2 represent two Golay sequences whose lengths are both 20, −C1 represents −1 times C1, −C2 represents −1 times C2, −SI represents −1 times S1, and −S2 represents −1 times S2.

3. The method according to claim 2, wherein when the CB of the spectrum resource is equal to 2, the target part is G2; and G2={S336 21, ±S84_21(1:42), 0, 0, 0, ±S84_21(43:84), ±S336_22}, wherein S336_n={S84_c1, ±S84_c2, ±S84_c3, ±S84_c4}, S84n (a:b) represents a$^{th}$ to b$^{th}$ elements in S84_n, a and b are both greater than 0, and c1, c2, c3, and c4 are all integers greater than or equal to 1.

4. The method according to claim 2, wherein when the CB of the spectrum resource is equal to 3, the target part is G3; and G3={S336_31, ±S84_31, ±G339_31, ±S84_32, ±S336_32}, wherein S336_n={S84_c1, ±S84_c2, ±S84_c3, ±S84_c4}, G339_n={S84_d1, ±S84_d2, 0, 0, 0, ±S84_d3, ±S84_d4}, and c1, c2, c3, c4, d1, d2, d3, and d4 are all integers greater than or equal to 1.

5. The method according to claim 2, wherein when the CB of the spectrum resource is equal to 4, the target part is G4; and G4={S336_41, ±S84_41, ±S336_42, ±{S84_42(1:42), 0, 0, 0, S84_42(43:84)}, ±S336_43, ±S84_43, ±S336_44}, wherein S336_n={S84_c1, ±S84_c2, ±S84_c3, ±S84_c4}, S84_n (a:b) represents a$^{th}$ to b$^{th}$ elements in S84_n, a and b are both greater than 0, and c1, c2, c3, and c4 are all integers greater than or equal to 1.

6. The method according to claim 1, wherein each of the plurality of sub-sequences comprises: 80 basic elements arranged into the Golay sequence in the sub-sequence; and when a CB of a spectrum resource is equal to 1, a target part in the CEF is G1, the target part comprises a data part and a direct current part, and the data part comprises the plurality of subsequences; and G1={A1, A2, 0, 0, 0, A1, −A2}, wherein A1={−C1, C2, C1, C2}, A2={C1, −C2, C1, C2}, C1 and C2 represent two Golay sequences whose lengths are both 20, −C1 represents −1 times C1, −C2 represents −1 times C2, and −A2 represents −1 times A2.

7. The method according to claim 6, wherein when the CB of the spectrum resource is equal to 2, the target part is G2; and G2={A1, ±A2, ±A1, ±A2, ±[S80_21(1:40), 0, 0, 0, S80_21(41:80)], ±A1, ±A2, ±A1, ±A2}, wherein ± represents + or −, S80_n belongs to a sequence set formed by A1, A2, A3, A4, A5, A6, A7, and A8, n≥1, S80_n(a:b) represents a$^{th}$ to b$^{th}$ elements in S80_n, and a and b are both greater than 0; and A3={C1, C2, −C1, C2}, A4={C1, C2, C1, −C2}, A5={−S1, S2, S1, S2}, A6={S1, −S2, S1, S2}, A7={S1, S2, −S1, S2}, A8={S1, S2, S1, −S2}, S1 and S2 represent two Golay sequences whose lengths are both 20, −S1 represents −1 times S1, and −S2 represents −1 times S2.

8. The method according to claim 6, wherein when the CB of the spectrum resource is equal to 3, the target part is G3; and G3={A1, ±A2, ±A1, ±A2, ±S80_31, ±A1, ±A2, 0, 0, 0, A1, ±A2, ±S80_32, ±A1, ±A2, ±A1, ±A2}, wherein ± represents + or −, S80_n belongs to a sequence set formed by A1, A2, A3, A4, A5, A6, A7, and A8, n≥1, S80_n(a:b) represents a$^{th}$ to b$^{th}$ elements in S80_n, and a and b are both greater than 0; and A3={C1, C2, −C1, C2}, A4={C1, C2, C1, −C2}, A5={−S1, S2, S1, S2}, A6={S1, −S2, S1, S2}, A7={S1, S2, −S1, S2}, A8={S1, S2, S1, −S2}, S1 and S2 represent two Golay sequences whose lengths are both 20, −S1 represents −1 times S1, and −S2 represents −1 times S2.

9. The method according to claim 6, wherein when the CB of the spectrum resource is equal to 4, the target part is G4; and G4={S320_41, ±S80_41, ±S320_12, ±S80_42, 0, 0, 0, S80_43, ±S320_43, ±S80_44, ±S320_44}, wherein S320_n comprises four sequentially arranged Golay sequences whose lengths are 80, ± represents + or −, S80_n belongs to a sequence set formed by A1, A2, A3, A4, A5, A6, A7, and A8, and n≥1; and A3={C1, C2, −C1, C2}, A4={C1, C2, C1, −C2}, A5={−S1, S2, S1, S2}, A6={S1, −S2, S1, S2}, A7={S1, S2, −S1, S2}, A8={S1 S2, S1, −S2}, S1 and S2 represent two Golay sequences whose lengths are both 20, −S1 represents −1 times S1, and −S2 represents −1 times S2.

10. A data transmission method, wherein the method is used for a receive end, and the method comprises:

receiving a physical protocol data unit (PPDU) transmitted by a transmit end; and parsing the received PPDU, wherein the PPDU comprises a channel estimation field (CEF), and the CEF comprises a plurality of sub-sequences;

for each sub-sequence in the plurality of sub-sequences, one or more elements in the sub sequence are basic elements, and the one or more elements are arranged into a Golay sequence or a Zadoff-Chu ZC sequence in the sub-sequence; and each of the plurality of sub-sequences further comprises: an interpolation element located in at least one of positions before, between, or after the plurality of basic elements, wherein each element in the sub-sequence belongs to a target element set, and the target element set comprises 1 and −1.

11. The method according to claim 10, wherein each of the plurality of sub-sequences comprises: 80 basic elements arranged into the Golay sequence in the sub-sequence and four interpolation elements; and when a channel bonding (CB) of a spectrum resource is equal to 1, a target part in the CEF is G1, the target part comprises a data part and a direct current part, and the data part comprises the plurality of sub-sequences; and G1={S84_11, ±S84_12, 0, 0, 0, ±S84_13, ±S84_14}, wherein S84_n represents a sequence whose length is 84, a Golay sequence in which 80 basic elements are arranged in S84_n belongs to a sequence set formed by A1, A2, A3, A4, A5, A6, A7, A8, A9, A10, A11, A12, A13, A14, A15, and A16, n≥1, and ± represents + or −; and A1={C1, C2, C1, −C2}, A2={C1, C2, −C1, C2}, A3={C2, C1, C2, −C1}, A4={C2, C1, −C2, C1}, A5={C1, −C2, C1, C2}, A6={−C1, C2, C1, C2}, A7={C2, −C1, C2, C1}, A8={−C2, C1, C2, C1}, A9={S1, S2, S1, −S2}, A10={S1, S2, −S1, S2}, A11={S2, S1, S2, −S1}, A12={S2, S1, −S2, S1}, A13={S1, −S2, S1, S2}, A14={−S1, S2, S1, S2}, A15={S2, −S1, S2, S1}, and A16={−S2, S1, S2, S1}, and C1 and C2 represent two Golay sequences whose lengths are both 20, S1 and S2 represent two Golay sequences whose lengths are both 20, −C1 represents −1 times C1, −C2 represents −1 times C2, −S1 represents −1 times S1, and −S2 represents −1 times S2.

12. The method according to claim 11, wherein when the CB of the spectrum resource is equal to 2, the target part is G2; and G2={S336_21, ±S84_21(1:42), 0, 0, 0, ±S84_21(43:84), ±S336_22}, wherein S336_n={S84_c1, ±S84_c2, ±S84_c3, ±S84_c4}, S84_n (a:b) represents $a^{th}$ to $b^{th}$ elements in S84_n, a and b are both greater than 0, and c1, c2, c3, and c4 are all integers greater than or equal to 1.

13. The method according to claim 11, wherein when the CB of the spectrum resource is equal to 3, the target part is G3; and G3={S336_31, ±S84 31, ±G339_31, ±S84_32, ±S336_32}, wherein S336_n={S84_c1, ±S84_c2, ±S84_c3, ±S84_c4}, G339_n={S84_d1, ±S84_d2, 0, 0, 0, ±S84_d3, ±S84_d4}, and c1, c2, c3, c4, d1, d2, d3, and d4 are all integers greater than or equal to 1.

14. The method according to claim 11, wherein when the CB of the spectrum resource is equal to 4, the target part is G4; and G4={S336_41, ±S84_41, ±S336_42, ±{S84_42(1:42), 0, 0, 0, S84_42(43:84)}, ±S336_43, ±S84_43, ±S336_44}, wherein S336_n={S84_c1, ±S84_c2, ±S84_c3, ±S84_c4}, S84_n (a:b) represents $a^{th}$ to $b^{th}$ elements in S84_n, a and b are both greater than 0, and c1, c2, c3, and c4 are all integers greater than or equal to 1.

15. The method according to claim 10, wherein each of the plurality of sub-sequences comprises: 80 basic elements arranged into the Golay sequence in the sub sequence; and when a CB of a spectrum resource is equal to 1, a target part in the CEF is G1, the target part comprises a data part and a direct current part, and the data part comprises the plurality of subsequences; and G1={A1, A2, 0, 0, 0, A1, −A2}, wherein A1={−C1, C2, C1, C2}, A2={C1, −C2, C1, C2}, C1 and C2 represent two Golay sequences whose lengths are both 20, −C1 represents −1 times C1, −C2 represents −1 times C2, and −A2 represents −1 times A2.

16. The method according to claim 15, wherein when the CB of the spectrum resource is equal to 2, the target part is G2; and G2={A1, ±A2, ±A1, ±A2, ±[S80_21(1:40), 0, 0, 0, S80_21(41:80)], ±A1, ±A2, ±A1, ±A2}, wherein ± represents + or −, S80_n belongs to a sequence set formed by A1, A2, A3, A4, A5, A6, A7, and A8, n≥1, S80_n(a:b) represents $a^{th}$ to $b^{th}$ elements in S80_n, and a and b are both greater than 0; and A3={C1, C2, −C1, C2}, A4={C1, C2, C1, −C2}, A5={−S1, S2, S1, S2}, A6={S1, −S2, S1, S2}, A7={S1, S2, −S1, S2}, A8={S1, S2, S1, −S2}, S1 and S2 represent two Golay sequences whose lengths are both 20, −S1 represents −1 times S1, and −S2 represents −1 times S2.

17. The method according to claim 15, wherein when the CB of the spectrum resource is equal to 3, the target part is G3; and G3={A1, ±A2, ±A1, ±A2, ±S80_31, ±A1, ±A2, 0, 0, 0, A1, ±A2, ±S80_32, ±A1, ±A2, ±A1, ±A2}, wherein ± represents + or −, S80_n belongs to a sequence set formed by A1, A2, A3, A4, A5, A6, A7, and A8, n≥1, S80_n(a:b) represents $a^{th}$ to $b^{th}$ elements in S80_n, and a and b are both greater than 0; and A3={C1, C2, −C1, C2}, A4={C1, C2, C1, −C2}, A5={−S1, S2, S1, S2}, A6={S1, −S2, S1, S2}, A7={S1, S2, −S1, S2}, A8={S1, S2, S1, −S2}, S1 and S2 represent two Golay sequences whose lengths are both 20, −S1 represents −1 times S1, and −S2 represents −1 times S2.

18. The method according to claim 15, wherein when the CB of the spectrum resource is equal to 4, the target part is G4; and G4={S320_41, ±S8C_41, ±S320_12, ±S80_42, 0, 0, 0, S80_43, ±S320_43, ±S80_44, ±S320_44}, wherein S320_n comprises four sequentially arranged Golay sequences whose lengths are 80, ± represents + or −, S80_n belongs to a sequence set formed by A1, A2, A3, A4, A5, A6, A7, and A8, and n≥1; and A3={C1, C2, −C1, C2}, A4={C1, C2, C1, −C2}, A5={−S1, S2, S1, S2}, A6={S1, −S2, S1, S2}, A7={S1, S2, −S1, S2}, A8={S1, S2, S1, −S2}, S1 and S2 represent two Golay sequences whose lengths are both 20, −S1 represents −1 times S1, and −S2 represents −1 times S2.

* * * * *

UNITED STATES PATENT AND TRADEMARK OFFICE

CERTIFICATE OF CORRECTION

PATENT NO. : 11,831,398 B2
APPLICATION NO. : 17/462275
DATED : November 28, 2023
INVENTOR(S) : Yang Yang et al.

It is certified that error appears in the above-identified patent and that said Letters Patent is hereby corrected as shown below:

In the Claims

In Column 96, Line 46, in Claim 1, delete “sub sequence” and insert -- sub-sequence --.

In Column 97, Line 6, in Claim 2, delete “{C1” and insert -- {C1, --.

In Column 97, Line 15, in Claim 2, delete “–SI” and insert -- –S1 --.

In Column 97, Line 20, in Claim 3, delete “{S336 21,” and insert -- {S336_21, --.

In Column 97, Line 22, in Claim 3, delete “S84n” and insert -- S84_n --.

In Column 98, Line 21, In Claim 9, delete “±S320_12,” and insert -- ±S320_42, --.

In Column 98, Line 29, in Claim 9, delete “{S1” and insert -- {S1, --.

In Column 98, Line 40, in Claim 10, delete “sub sequence” and insert -- sub-sequence --.

In Column 99, Line 5, in Claim 11, delete “S1},” and insert -- S1}; --.

In Column 99, Line 24, in Claim 13, delete “±S84 31,” and insert -- ±S84_31, --.

In Column 100, Line 36, in Claim 18, delete “±S8C_41, ±S320_12,” and insert -- ±S80_41, ±S320_42, --.

Signed and Sealed this
Fourth Day of June, 2024

Katherine Kelly Vidal

Katherine Kelly Vidal
*Director of the United States Patent and Trademark Office*